US011303353B2

(12) United States Patent
Edge

(10) Patent No.: US 11,303,353 B2
(45) Date of Patent: Apr. 12, 2022

(54) SYSTEMS AND METHODS FOR SUPPORTING SATELLITE ACCESS FROM MOBILE DEVICES TO PUBLIC LAND MOBILE NETWORKS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/090,811

(22) Filed: Nov. 5, 2020

(65) Prior Publication Data

US 2021/0143900 A1 May 13, 2021

Related U.S. Application Data

(60) Provisional application No. 62/932,486, filed on Nov. 7, 2019, provisional application No. 62/989,572, filed
(Continued)

(51) Int. Cl.
*H04B 7/185* (2006.01)
*H04W 60/04* (2009.01)
(Continued)

(52) U.S. Cl.
CPC ..... *H04B 7/18547* (2013.01); *H04B 7/18513* (2013.01); *H04B 7/18541* (2013.01);
(Continued)

(58) Field of Classification Search
CPC . H04W 76/15; H04W 36/08; H04W 56/0045; H04W 8/26; H04W 64/00;
(Continued)

(56) References Cited

U.S. PATENT DOCUMENTS

2008/0102896 A1 5/2008 Wang et al.
2009/0016274 A1 1/2009 Nylander et al.
(Continued)

FOREIGN PATENT DOCUMENTS

EP 1987691 A1 11/2008
EP 2014111 A2 1/2009
(Continued)

OTHER PUBLICATIONS

"3rd Generation Partnership Project; Technical Specification Group Radio Access Network; Solutions for NR to support non-terrestrial networks (NTN) (Release 16)", 3GPP Standard; Technical Report; 3GPP TR 38.821, 3rd Generation Partnership Project (3GPP), Mobile Competence Centre ; 650, Route Des Lucioles; F-06921 Sophia-Antipolis Cedex; France, No. V0.4.0, Apr. 11, 2019 (Apr. 11, 2019), pp. 1-46, XP051723405, [retrieved on Apr. 11, 2019], Paragraph [04.2], Paragraph [08.1], Paragraph [08.3].
(Continued)

*Primary Examiner* — Brandon J Miller
(74) *Attorney, Agent, or Firm* — Paradice and Li LLP

(57) ABSTRACT

Access, mobility management and regulatory services are supported for satellite access to a Fifth Generation (5G) core network (5GCN). A location of a UE may be obtained by a UE or by a base station and used to determine a country in which the UE is located. The UE can then select a serving PLMN in the country of the UE which is accessible from a radio cell supported by a satellite. The UE can register with the serving PLMN and receive information from the serving PLMN concerning fixed cells and fixed tracking areas supported by the serving PLMN. If the UE attempt to register with a PLMN not in the country of the UE, a serving base station can reject the attempt and indicate the country to the UE.

30 Claims, 45 Drawing Sheets

Related U.S. Application Data on Mar. 13, 2020, provisional application No. 63/010,564, filed on Apr. 15, 2020, provisional application No. 63/028,539, filed on May 21, 2020.

(51) Int. Cl.
| | |
|---|---|
| *H04W 48/10* | (2009.01) |
| *H04W 64/00* | (2009.01) |
| *H04W 16/28* | (2009.01) |
| *H04W 12/037* | (2021.01) |
| *H04W 12/63* | (2021.01) |
| *H04W 36/00* | (2009.01) |
| *H04W 36/32* | (2009.01) |
| *H04W 36/38* | (2009.01) |
| *H04W 8/26* | (2009.01) |
| *H04W 76/15* | (2018.01) |
| *H04W 36/08* | (2009.01) |
| *H04W 56/00* | (2009.01) |
| *H04W 16/26* | (2009.01) |
| *H04W 84/04* | (2009.01) |

(52) U.S. Cl.
CPC ............ *H04W 8/26* (2013.01); *H04W 12/037* (2021.01); *H04W 12/63* (2021.01); *H04W 16/28* (2013.01); *H04W 36/00837* (2018.08); *H04W 36/08* (2013.01); *H04W 36/32* (2013.01); *H04W 36/385* (2013.01); *H04W 48/10* (2013.01); *H04W 56/0045* (2013.01); *H04W 60/04* (2013.01); *H04W 64/00* (2013.01); *H04W 64/006* (2013.01); *H04W 76/15* (2018.02); *H04W 16/26* (2013.01); *H04W 84/042* (2013.01)

(58) Field of Classification Search
CPC ........... H04W 36/00837; H04W 36/32; H04W 36/385; H04W 12/037; H04W 12/63; H04W 60/04; H04W 48/10; H04W 64/006; H04W 16/28; H04W 16/26; H04W 84/042; H04W 84/005; H04W 48/12; H04W 84/06; H04W 12/08; H04W 36/0061; H04B 7/18513; H04B 7/18541; H04B 7/18545; H04B 7/18547
See application file for complete search history.

(56) References Cited

U.S. PATENT DOCUMENTS

| | | | |
|---|---|---|---|
| 2015/0341846 A1* | 11/2015 | Shi .................. | H04W 64/00 455/434 |
| 2019/0090289 A1* | 3/2019 | Huang-Fu ............ | H04W 48/20 |
| 2019/0246260 A1 | 8/2019 | Edge et al. | |
| 2020/0077358 A1 | 3/2020 | Kovacs et al. | |
| 2020/0236731 A1* | 7/2020 | Jung .................. | H04W 68/005 |
| 2021/0136666 A1* | 5/2021 | Srivastava ............ | H04W 16/14 |
| 2021/0143897 A1 | 5/2021 | Edge | |
| 2021/0143898 A1 | 5/2021 | Edge | |
| 2021/0144539 A1 | 5/2021 | Edge | |
| 2021/0144669 A1 | 5/2021 | Edge | |
| 2021/0144670 A1 | 5/2021 | Shrestha | |
| 2021/0242933 A1 | 8/2021 | Edge | |
| 2022/0022155 A1 | 1/2022 | Wang et al. | |

FOREIGN PATENT DOCUMENTS

| | | | |
|---|---|---|---|
| EP | 2603998 A2 | 6/2013 | |
| EP | 2966903 A1 | 1/2016 | |
| WO | WO-0021216 A2 | 4/2000 | |
| WO | WO-2008054668 A2 | 5/2008 | |
| WO | WO-2012171128 A1 | 12/2012 | |
| WO | WO-2019080056 A1 | 5/2019 | |

OTHER PUBLICATIONS

Hughes: "NR-NTN: Paging in NGSO Satellite Systems", 3GPP TSG RAN WG3 Meeting #101, 3GPP Draft, R3-184403, 3rd Generation Partnership Project (3GPP), Mobile Competence Centre, 650, Route Des Lucioles, F-06921 Sophia-Antipolis Cedex, France, vol. RAN WG3, No. Gothernburg, Sweden; Aug. 20, 2018-Aug. 24, 2018, Aug. 10, 2018 (Aug. 10, 2018), 5 Pages, XP051527768, Retrieved from the Internet: URL: http://www.3gpp.org/ftp/tsg%5Fran/WG3%5Flu/TSGR3%5F101/Docs/R3%2D184403%2Ezip [retrieved on Aug. 10, 2018] Chapters 2, 3, the whole document.

International Search Report and Written Opinion—PCT/US2020/059557—ISA/EPO—dated Mar. 2, 2021.

LG Electronics Inc: "Considerations on Fixed on Earth Tracking Area Management in NTN", 3GPP TSG-RAN WG2 Meeting #105, 3GPP Draft; R2-1905122 Considerations on Fixed on Earth Tracking Area Management in NTN, 3rd Generation Partnership Project (3GPP), Mobile Competence Centre; 650, Route Des Lucioles; F-06921 Sophia-, vol. RAN WG2, No. Xi'an, China; Apr. 8, 2019-Apr. 12, 2019 Apr. 6, 2019 (Apr. 6, 2019), 3 Pages, XP051702398, Retrieved from the Internet: URL: http://www.3gpp.org/ftp/Meetings%5F3GPP%5FSYNC/RAN2/Docs/R2%2D1905122%2Ezip [retrieved on Apr. 6, 2019], The Whole Document.

LG Electronics Inc: "Report on Email Discussion [107#64] [NTN] Cell Selection & Reselection", 3GPP TSG-RAN WG2Meeting #107bis, 3GPP Draft; R2-1914070 Report of Email Discussion [107#64][NTN] Cell Selection&Reselection, 3rd Generation Partnership Project (3GPP), Mobile Competence Centre; 650, Route Des Lucioles; F-06921 Soph, vol. RAN WG2, No. Chongqing, China; Oct. 14, 2019-Oct. 18, 2019, Oct. 18, 2019 (Oct. 18, 2019), 22 Pages, XP051797900, Retrieved from the Internet: URL: https://ftp.3gpp.org/tsg_ran/WG2_RL2/TSGR2_107bis/Docs/R2-1914070.zip R2-1914070 Report of email discussion [107#64] [NTN] Cell selection&reselection.doc [retrieved on Oct. 18, 2019] ZTE Contribution, "Approach 2"; p. 17.

Nokia, et al., "Analysis on Tracking Area Design," 3GPP Draft, 3GPP TSG-WG3 Meeting #104, R3-193191_WAS_R3-192802 TA REVTHALES2, 3rd Generation Partnership Project (3GPP), Mobile Competence Centre, 650, Route Des Lucioles, F-06921, Sophia-Antipolis Cedex, France, vol. RAN WG3, No. Reno, NV, USA; May 13, 2019-May 17, 2019, May 21, 2019 (May 21, 2019), XP051740754, 5 pages ,Retrieved from the Internet: URL: http://www.3gpp.org/ftp/tsg%5Fran/WG3%5Flu/TSGR3%5F104/Docs/R3%2D193191%2Ezip [retrieved on May 21, 2019] the whole document.

Nomor Research Gmbh, et al., "Multiple PLMN Identities in NTN", 3GPP Draft, 3GPP TSG-RAN WG2 Meeting #107-Bis, R2-1912696_MULTIPLE_PLMN_NTN 3rd Generation Partnership Project (3GPP), Mobile Competence Centre, 650, Route Des Lucioles, F-06921, Sophia-Antipolis Cedex, France, vol. RAN WG2, No. Chongqing, China; Oct. 14, 2019-Oct. 18, 2019, Oct. 2, 2019 (Oct. 2, 2019), XP051803661, 6 pages, Retrieved from the Internet: URL: https://ftp.3gpp.org/tsg_ran/WG2_RL2/TSGR2_107bis/Docs/R2-1912696.zip R2-1912696 Multiple PLMN NTN.docx [retrieved-on 2019-I0-02T the whole document.

Nomor Research Gmbh, et al., "UE Positioning Information for NTN Mobility", 3GPP Draft, 3GPP TSG RAN WG2 Meeting #105bis, R2-1904407_NTN_MobilityEnhancements, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019 (Apr. 6, 2019), XP051701709, 4 Pages, Retrieved from the Internet: URL:http://www.3gpp.org/ftp/Meetings%5F3GPP%5FSYNC/RAN2/Docs/R2%2D1904407%2Ezip, [retrieved on Apr. 6, 2019] the Whole Document.

QUALCOMM Incorporated: "Virtual Cell Solution for Mobility and Regulatory Support for Satellite Access in 5G", 3GPP Draft, SA WG2 Meeting #136, S2-1911058, 3rd Generation Partnership Project (3GPP), Mobile Competence Centre, 650, Route Des Lucioles, F-06921, Sophia-Antipolis Cedex, France, vol. SA WG2, No. Reno, Nevada, USA, Nov. 18, 2019-Nov. 22, 2019, Nov. 8, 2019 (Nov. 8,

(56) References Cited

OTHER PUBLICATIONS

2019), 9 Pages, XP051821168, Retrieved from the Internet: URL: https://ftp.3gpp.org/tsg_sa/WG2_Arch/TSGS2_136_Reno/Docs/S2-1911858.zip S2-1911058-TR 23.737-Virtual Cell solution.doc [retrieved on Nov. 8, 2019] the whole document.

Thales: "NTN TR 38.821 Chap 8 Corrections", 3GPP TSG RAN WG3 Meeting #104, 3GPP Draft; R3-192760 NTN TR 38.821 Chap 8 Corrections V2, 3rd Generation Partnership Project (3GPP), Mobile Competence Centre; 650, Route Des Lucioles; F-06921 Sophia-Antipolis Cedex; France, vol. RAN WG3, No. Reno; May 13, 2019-May 17, 2019, May 3, 2019 (May 3, 2019), 26 Pages, XP051712953, Retrieved from the Internet: URL: http://www.3gpp.org/ftp/tsg%5Fran/WG3%5Flu/TSGR3%5F104/Docs/R3%2D192760%2Ezip [retrieved on May 3, 2019] paragraph [08.3].

ZTE, et al., "Tracking Area Management and Paging Handling in NTN", 3GPP Draft, R3-190139, 3GPP TSG RAN WG3#103, Tracking Area Management and Paging Handling in NTN V5, 3rd Generation Partnership Project (3GPP), Mobile Competence Centre, 650, Route Des Lucioles, F-06921 Sophia-Antipolis C, vol. RAN WG3, No. Athens, Greece; Feb. 25, 2019-Mar. 1, 2019, Feb. 16, 2019 (Feb. 16, 2019), 13 Pages, XP051604086, Retrieved from the Internet: URL: http://www.3gpp.org/ftp/tsg%5Fran/WG3%5Flu/TSGR3%5F103/Docs/R3%2D190139%2Ezip [retrieved on Feb. 16, 2019] title, Chapters 1, 2, 8.3, the whole document.

Huawei: "Support of Location Reporting Function in NG-RAN", 3GPP Draft, 3GPP TSG-RAN3 Meeting #99bis, R3-182029, 3RD Generation Partnership Project (3GPP), Mobile Competence Centre, 650, Route Des Lucioles, F-06921 Sophia-Antipolis Cedex, France, vol. RAN WG3. No. Sanya, China, Apr. 16, 2018-Apr. 20, 2018 Apr. 15, 2018 (Apr. 15, 2018), XP051430187, 4 Pages, Retrieved from the Internet: URL:http://www.3gpp.org/ftp/Meetings%5F3GPP%5FSYNC/RAN3/Docs/ [retrieved on Apr. 15, 2018] Proposal 4.

Sakshi, P., et al., "A Survey on Energy Efficient Narrowband Internet of Things (NBIoT): Architecture, Application and Challenges", IEEE Access, vol. 7, 2018, (Current Version Feb. 14, 2019) pp. 16739-16776.

Thales., et al., "NR-NTN: TP for Chap 7.3 NR Modifications to Support NTN", 3GPP TSG RAN Meeting #80, RP-130658, La Jolla, USA, Jun. 11-Jun. 14, 2018, 37 Pages.

\* cited by examiner

Row wise ordering E→W, S→N: C1, C2, C3, C4, C5, C6, C7, C8, C9, C10, C11, C12, C13, C14, C15, C16, C17, C18, C19
Alternate row wise ordering E→W/W→E, S→N: C1, C2, C3, C4, C5, C6, C7, C8, C9, C10, C11, C12, C13, C14, C15, C16, C17, C18, C19

SYSTEMS AND METHODS FOR SUPPORTING SATELLITE ACCESS FROM MOBILE DEVICES TO PUBLIC LAND MOBILE NETWORKS

CLAIM OF PRIORITY UNDER 35 U.S.C. § 119

This application claims under 35 U.S.C. § 119 the benefit of and priority to U.S. Provisional Application No. 62/932,486, filed Nov. 7, 2019, and entitled "SYSTEMS AND METHODS FOR SUPPORT OF A 5G SATELLITE RADIO ACCESS TECHNOLOGY," U.S. Provisional Application No. 62/989,572, filed Mar. 13, 2020, and entitled "Methods Performed In User Equipment, Satellite Vehicles, Or Earth Stations For Enabling Third Generation Partnership Project (3GPP) Protocol Communications, Via Satellite Relay," U.S. Provisional Application No. 63/010,564, filed Apr. 15, 2020, and entitled "SYSTEMS AND METHODS FOR: SUPPORTING FIXED TRACKING AREAS AND FIXED CELLS FOR MOBILE SATELLITE WIRELESS ACCESS; HANDOVER OF MOBILE DEVICES, RADIO CELLS AND SPACE VEHICLES FOR MOBILE SATELLITE WIRELESS ACCESS; SUPPORTING SATELLITE ACCESS FROM MOBILE DEVICES TO PUBLIC LAND MOBILE NETWORKS; ASSISTING RADIO CELL ACQUISITION BY A MOBILE DEVICE FOR SATELLITE WIRELESS ACCESS," and U.S. Provisional Application No. 63/028,539, filed May 21, 2020, and entitled "SYSTEMS AND METHODS FOR. SUPPORTING FIXED TRACKING AREAS AND FIXED CELLS FOR MOBILE SATELLITE WIRELESS ACCESS; HANDOVER OF MOBILE DEVICES, RADIO CELLS AND SPACE VEHICLES FOR MOBILE SATELLITE WIRELESS ACCESS; SUPPORTING SATELLITE ACCESS FROM MOBILE DEVICES TO PUBLIC LAND MOBILE NETWORKS; ASSISTING RADIO CELL ACQUISITION BY A MOBILE DEVICE FOR SATELLITE WIRELESS ACCESS," all of which are assigned to the assignee hereof and are incorporated herein by reference in their entireties.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network either directly or via a base station. A 5G network could treat the satellite system as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a 5G satellite RAT may need different implementation and support than a 5G terrestrial RAT for providing common services to end users. It may then be preferable to both optimize, and to minimize the impact for, such different implementation and support.

One example of common services concerns provision of regulatory requirements such as emergency (EM) calls, Lawful Interception (LI) and Wireless Emergency Alerting (WEA). Supporting these common services using a satellite RAT should preferably have minimum new impact to a terrestrial 5G Core Network (5GCN) while still provided an equal or better level of service than a terrestrial 5G RAT.

Another common service concerns continuity of radio access by UEs to 5GCNs and to external entities accessed via 5GCNs. Since satellites in low and medium earth orbits have moving coverage areas, radio access by UEs may be subject to interruption. Means of mitigating or avoiding such interruption in an efficient manner may then be useful.

A further type of service concerns an ability to support access by UEs to 5GCNs in the same country as the UEs—e.g. in the case that a satellite coverage area spans an international border. Means to enable same country 5GCN access may then be desirable.

SUMMARY

Access, mobility management and regulatory services are supported for satellite access to a Fifth Generation (5G) core network (5GCN). Existing 5G network access procedures are modified to provide a User Equipment (UE) with space vehicle (SV) access to a 5GCN and provide mobility management, e.g., periodic registration. UE access to a Public Land Mobile Network (PLMN) is supported based on the country of the UE. The UE may obtain the country in which it is located and detect one or more available radio cells, which broadcast the identities of supported PLMNs. The identity of each supported PLMN indicates a country for the supported PLMN. The UE may select a serving PLMN based on the country of the UE and may select a radio cell based on the available radio cells that support the serving PLMN. The serving PLMN is accessed through the selected radio cell.

In one implementation, a method performed by a user equipment (UE) for supporting access by the UE via a space vehicle (SV) to a serving Public Land Mobile Network (PLMN), includes obtaining a country of the UE, wherein the country of the UE is based on a location of the UE;

detecting one or more first radio cells available to the UE, wherein each of the one or more first radio cells comprises one or more radio beams transmitted from one or more first SVs; receiving identities of supported PLMNs broadcast in the one or more first radio cells, wherein the identity of each supported PLMN indicates a country for the each supported PLMN; selecting the serving PLMN, wherein the serving PLMN is a PLMN for the country of the UE, and wherein the serving PLMN is included in the supported PLMNs; selecting a first radio cell of the one or more first radio cells available to the UE, wherein the first radio cell supports the serving PLMN; and accessing the serving PLMN using the first radio cell.

In one implementation, a user equipment (UE) configured to support access by the UE via a space vehicle (SV) to a serving Public Land Mobile Network (PLMN), includes a wireless transceiver configured to wirelessly communicate with a communication satellite; at least one memory; at least one processor coupled to the wireless transceiver and the at least one memory, wherein the at least one processor is configured to: obtain a country of the UE, wherein the country of the UE is based on a location of the UE; detect one or more first radio cells available to the UE, wherein each of the one or more first radio cells comprises one or more radio beams transmitted from one or more first SVs; receive identities of supported PLMNs broadcast in the one or more first radio cells, wherein the identity of each supported PLMN indicates a country for the each supported PLMN; select the serving PLMN, wherein the serving PLMN is a PLMN for the country of the UE, and wherein the serving PLMN is included in the supported PLMNs; select a first radio cell of the one or more first radio cells available to the UE, wherein the first radio cell supports the serving PLMN; and access the serving PLMN using the first radio cell.

In one implementation, a user equipment (UE) configured to support access by the UE via a space vehicle (SV) to a serving Public Land Mobile Network (PLMN), includes means for obtaining a country of the UE, wherein the country of the UE is based on a location of the UE; means for detecting one or more first radio cells available to the UE, wherein each of the one or more first radio cells comprises one or more radio beams transmitted from one or more first SVs; means for receiving identities of supported PLMNs broadcast in the one or more first radio cells, wherein the identity of each supported PLMN indicates a country for the each supported PLMN; means for selecting the serving PLMN, wherein the serving PLMN is a PLMN for the country of the UE, and wherein the serving PLMN is included in the supported PLMNs; means for selecting a first radio cell of the one or more first radio cells available to the UE, wherein the first radio cell supports the serving PLMN; and means for accessing the serving PLMN using the first radio cell.

In one implementation, a non-transitory storage medium including program code stored thereon, the program code is operable to configure at least one processor in a user equipment (UE) to support access by the UE via a space vehicle (SV) to a serving Public Land Mobile Network (PLMN), includes program code to obtain a country of the UE, wherein the country of the UE is based on a location of the UE; program code to detect one or more first radio cells available to the UE, wherein each of the one or more first radio cells comprises one or more radio beams transmitted from one or more first SVs; program code to receive identities of supported PLMNs broadcast in the one or more first radio cells, wherein the identity of each supported PLMN indicates a country for the each supported PLMN; program code to select the serving PLMN, wherein the serving PLMN is a PLMN for the country of the UE, and wherein the serving PLMN is included in the supported PLMNs: program code to select a first radio cell of the one or more first radio cells available to the UE, wherein the first radio cell supports the serving PLMN; and program code to access the serving PLMN using the first radio cell.

In one implementation, a method performed by a satellite Node B (sNB) for supporting access by a user equipment (UE) via a space vehicle (SV) to a serving Public Land Mobile Network (PLMN), includes controlling the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN; receiving a request to access a PLMN from the UE via one of the one or more radio cells of the sNB; obtaining a location of the UE; determining a country of the UE based on the location; and sending an indication of the country of the UE to the UE, wherein the indication of the country of the UE assists the UE to select the serving PLMN from the supported PLMNs based on the serving PLMN being for the country of the UE.

In one implementation, a satellite Node B (sNB) configured to support access by a user equipment (UE) via a space vehicle (SV) to a serving Public Land Mobile Network (PLMN), includes an external interface configured to communicate with network entities; at least one memory; at least one processor coupled to the external interface and the at least one memory, wherein the at least one processor is configured to: control the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN; receive a request to access a PLMN from the UE via one of the one or more radio cells of the sNB; obtain a location of the UE; determine a country of the UE based on the location; and send an indication of the country of the UE to the UE, wherein the indication of the country of the UE assists the UE to select the serving PLMN from the supported PLMNs based on the serving PLMN being for the country of the UE.

In one implementation, a satellite Node B (sNB) configured to support access by a user equipment (UE) via a space vehicle (SV) to a serving Public Land Mobile Network (PLMN), includes means for controlling the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN; means for receiving a request to access a PLMN from the UE via one of the one or more radio cells of the sNB; means for obtaining a location of the UE; means for determining a country of the UE based on the location; and means for sending an indication of the country of the UE to the UE, wherein the indication of the country of the UE assists the UE to select the serving PLMN from the supported PLMNs based on the serving PLMN being for the country of the UE.

In one implementation, a non-transitory storage medium including program code stored thereon, the program code is operable to configure at least one processor in a satellite Node B (sNB) to support access by a user equipment (UE)

via a space vehicle (SV) to a serving Public Land Mobile Network (PLMN), includes program code to control the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN; program code to receive a request to access a PLMN from the UE via one of the one or more radio cells of the sNB; program code to obtain a location of the UE; program code to determine a country of the UE based on the location; and program code to send an indication of the country of the UE to the UE, wherein the indication of the country of the UE assists the UE to select the serving PLMN from the supported PLMNs based on the serving PLMN being for the country of the UE.

In one implementation, a method performed by an Access and Mobility management Function (AMF) for supporting access by a user equipments (UE) via a space vehicle (SV) to a serving Public Land Mobile Network (PLMN), includes receiving a Non-Access Stratum (NAS) Registration Request message from the UE via the SV and a satellite NodeB (sNB), wherein the NAS Registration Request message is received with an indication of a fixed serving cell and a fixed tracking area (TA) for the UE; determining a plurality of allowed tracking areas (TAs) of the serving PLMN, wherein the UE is allowed to access the serving PLMN in each TA of the plurality of allowed TAs; and sending a NAS Registration Accept message to the UE via the sNB and the SV, wherein the NAS Registration Accept message includes identities and a geographic definition for the plurality of allowed TAs.

In one implementation, an Access and Mobility management Function (AMF) configured to support access by a user equipments (UE) via a space vehicle (SV) to a serving Public Land Mobile Network (PLMN), includes an external interface configured to communicate with network entities; at least one memory; at least one processor coupled to the external interface and the at least one memory, wherein the at least one processor is configured to: receive a Non-Access Stratum (NAS) Registration Request message from the UE via the SV and a satellite NodeB (sNB), wherein the NAS Registration Request message is received with an indication of a fixed serving cell and a fixed tracking area (TA) for the UE; determine a plurality of allowed tracking areas (TAs) of the serving PLMN, wherein the UE is allowed to access the serving PLMN in each TA of the plurality of allowed TAs; and send a NAS Registration Accept message to the UE via the sNB and the SV, wherein the NAS Registration Accept message includes identities and a geographic definition for the plurality of allowed TAs.

In one implementation, an Access and Mobility management Function (AMF) configured to support access by a user equipments (UE) via a space vehicle (SV) to a serving Public Land Mobile Network (PLMN), includes means for receiving a Non-Access Stratum (NAS) Registration Request message from the UE via the SV and a satellite NodeB (sNB), wherein the NAS Registration Request message is received with an indication of a fixed serving cell and a fixed tracking area (TA) for the UE; means for determining a plurality of allowed tracking areas (TAs) of the serving PLMN, wherein the UE is allowed to access the serving PLMN in each TA of the plurality of allowed TAs; and means for sending a NAS Registration Accept message to the UE via the sNB and the SV, wherein the NAS Registration Accept message includes identities and a geographic definition for the plurality of allowed TAs.

In one implementation, a non-transitory storage medium including program code stored thereon, the program code is operable to configure at least one processor in an Access and Mobility management Function (AMF) to support access by a user equipments (UE) via a space vehicle (SV) to a serving Public Land Mobile Network (PLMN), includes program code to receive a Non-Access Stratum (NAS) Registration Request message from the UE via the SV and a satellite NodeB (sNB), wherein the NAS Registration Request message is received with an indication of a fixed serving cell and a fixed tracking area (TA) for the UE; program code to determine a plurality of allowed tracking areas (TAs) of the serving PLMN, wherein the UE is allowed to access the serving PLMN in each TA of the plurality of allowed TAs; and program code to send a NAS Registration Accept message to the UE via the sNB and the SV, wherein the NAS Registration Accept message includes identities and a geographic definition for the plurality of allowed TAs.

Figure 1:
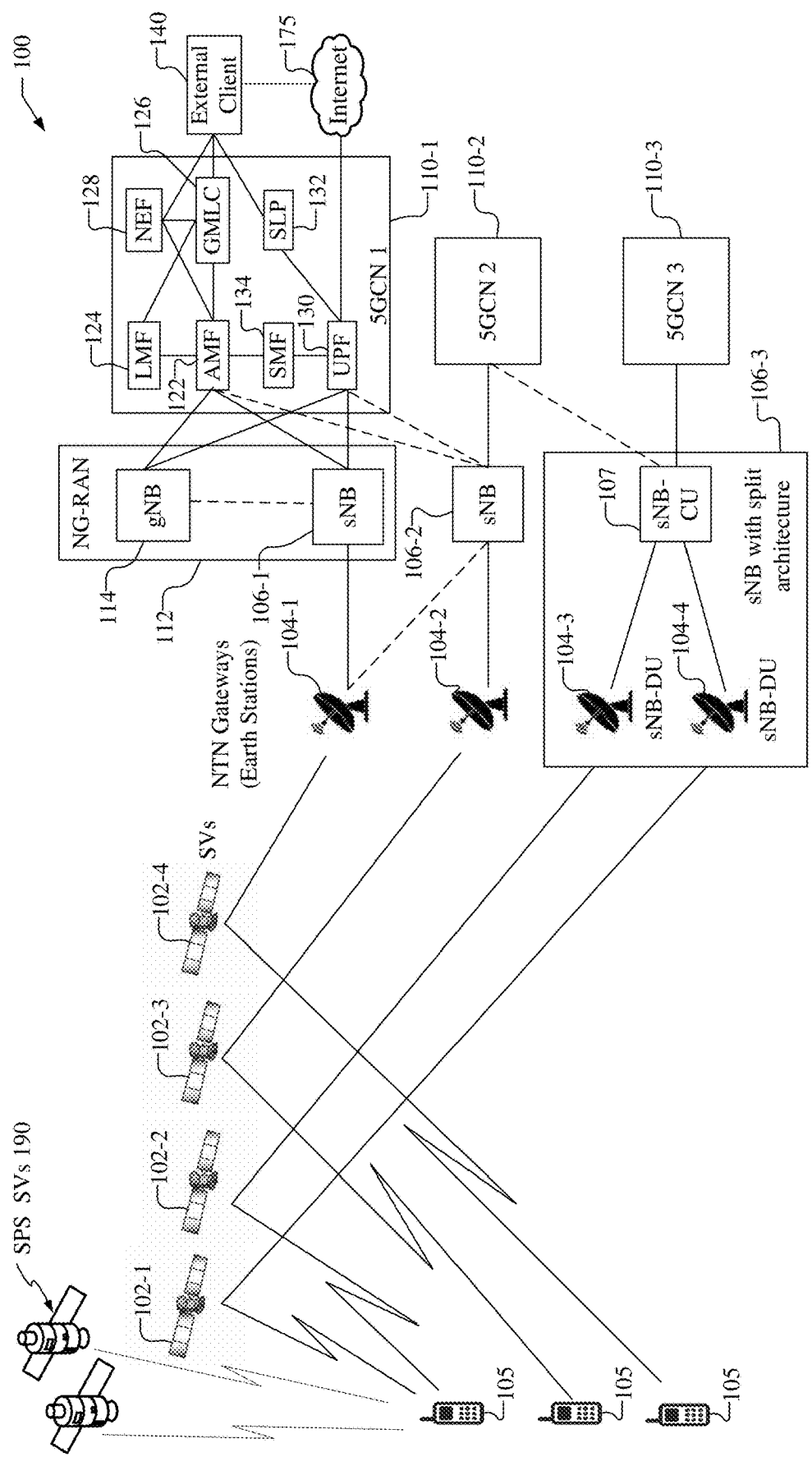
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or non-terrestrial network (NTN) gateway. The earth station in turn would connect to an element in a 5G Network such as a modified base station (e.g. without a terrestrial antenna) or a network node in a 5G Core Network (5GCN). This element would in turn provide access to other elements in the 5G Network and ultimately to entities external to the 5G Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas.

The use of 5G satellite access may provide other benefits. For example, 5G satellite access may reduce Mobile Network Operation (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome Internet blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

Mobile wireless access for a UE to a 5G core network (5GCN) may be supported using low Earth orbit (LEO) and Geostationary Earth Orbiting (GEO) satellites. In one implementation, UE access to a 5GCN via communication satellites is supported using fixed tracking areas (TAs) and fixed cells, which may be defined using a rectangular or hexagonal array of grid points. Fixed cells may be referred to as virtual cells or earth fixed cells. Fixed TAs may similarly be referred to as virtual TAs, earth fixed TAs or simply as TAs.

Alignment of fixed TAs and fixed cells may be problematic. For example, one concern may be an ability to exactly align the border of a cell or TA with the border of a country or some other area of significance (e.g. the border of a licensed coverage area for a 5GCN). Such alignment may be critical to ensuring that a UE near the border of a country will only access a 5GCN in the same country as the UE and not a 5GCN in a nearby country. Similarly, a UE may only be allowed to access a 5GCN within whose coverage area the UE is currently located and not a 5GCN with a nearby coverage area which does not include the location of the UE.

Solutions to these problems may be possible by defining fixed cells and fixed TAs using copious information and extra complexity. However, solutions that use a small amount of information and that reduce UE and network impacts could be more desirable.

In one solution, referred to herein as "SOLUTION 1", fixed cells and fixed TAs may be defined using grid points, but the definition of the fixed cells and fixed TAs may be independent and not require that each fixed cell belong to just one TA. Such a solution may simplify the definition of fixed cells and fixed TAs because it may allow the use of independent grid point arrays in the definition of each and, in the case of fixed TAs, may allow an alternative definition using polygons defined by the coordinates of a sequence of vertices. These definitions may be simple and, in the case of grid points, require only a small amount of information. The definitions may then enable a UE or a network to determine a current fixed TA and/or a current fixed cell for a UE based on a known UE geographic location and fairly simply. A current fixed cell or a current fixed TA for a UE may be subsequently used (e.g. by a 5GCN) to support regulatory services for a UE, such as EM calls, LI and/or WEA, in a similar manner as for UEs with 5G terrestrial access, and with minimal additional impact.

However, it may be desirable in some cases that a fixed cell belong uniquely to only one fixed TA. For example, at the border of a country, there may be a fixed cell whose coverage area includes part of a TA in one country and part of another TA in a different country. In such an instance, it may be preferable or critical that the fixed cell belong to only one of these TAs and one country (e.g. in order to avoid routing an emergency call to a PSAP in the wrong country). Accordingly, in one implementation of SOLUTION 1, cell coverage areas may be partitioned into separate portions, each of which belongs to only one TA. The resulting separate cell portions may then be treated as a new set of cells, with the required property of each belonging to only one TA. In one implementation, the cells may be identified by assigning each TA a color code, such that any pair of TAs with a common border or common vertex have different color codes. With this arrangement, a cell ID may be extended with a color code ID for any TA for which the cell and TA coverage areas overlap. The resulting extended cell ID may be treated as the ID for the cell portion (i.e. the new cell) which overlaps with the TA coverage area.

As an example of the implementation of SOLUTION 1, assume that a cell C has a coverage area that overlaps with the coverage areas of two TAs, denoted as TA1 and TA2. The ID for cell C would then be associated with TA1 and TA2. Now assume that C1 and C2 are two new cells whose coverage areas are the overlap of cell C with TA1 and TA2, respectively. Assume that the color codes for TA1 and TA2 are cc1 and cc2, respectively and that the cell ID for Cell C is C-ID, where cc1, cc2 and C-ID each represent bit strings. Extended cell IDs which are unique may be created by extending the bits string for the cell ID with the bit strings for the color codes, which produces extended cell LDs for cells C1 and C2 which are C-IDcc1 and C-Dcc2, respectively. Similar extended cell IDs may be created for other cells which overlap with two or more TAs. For cells which overlap with only one TA, the extension may be performed using just the color code for the one TA. The total number of bits in each extended cell ID may be arranged to equal a standard 5G cell ID size of 36 bits. The result can be a set of cells with unique extended cell IDs which belong to just one TA each. However, the definition of the cells and TAs has still been simplified by temporarily abandoning the one TA per cell principle.

With low earth orbit (LEO) SVs, an SV and radio cells supported by the SV may need to be handed off from a first earth station (ES) to a second ES as the SV ceases to have line of sight (LOS) communication with the first ES and starts to have LOS communication with the second ES. Any UEs currently accessing the SV might also need to continue accessing the SV during and after the handover. This problem is already solved for existing satellite telephone and data networks which do not emulate a cellular network. However, it may be desirable to support satellite access to 5G cellular networks in a manner which minimizes new impacts to UEs and existing 5G networks by making satellite access appear to be a new type of terrestrial RAT. For example, while radio cells supported by a LEO SV will be continually moving over the Earth's surface, terrestrial 5G networks are designed to use cells and tracking areas whose coverage areas never move. This adds an extra layer of complexity to support of SV and radio cell handover for which existing solutions were not defined. As an example of this extra complexity, the handover of an SV from a first ES to a second ES may also need to support handover to a new 5G base station and/or new 5G core network.

Implementations described later herein, and referred to as "SOLUTION 2", may support handover of both transparent SVs and regenerative SVs from a first earth station to a second earth station. Transparent SVs relay communications between fixed terrestrial 5G base stations (referred to as sNBs) and UEs. Regenerative SVs include the functional capability of either a whole sNB or part of an sNB and relay communication between a 5G Core Network (5GCN) and UEs. A handover of an SV may transfer an SV from one earth station to another and may also transfer the SV from one sNB to another sNB and/or from one 5GCN to another 5GCN. The handover may allow UEs to continue to access the SV before, during and after the handover with limited interruption of voice, data and signaling communication.

Another problem in supporting 5G satellite access to 5GCNs is that a radio coverage area of an SV may be very large and/or may be difficult to precisely control. Further the radio coverage area may move, for example with a LEO SV. Consequently, the radio coverage area of an SV may include parts of two or more countries at the same time. In this situation, two UEs in different countries may both be able to access the SV at the same time. Further, it may be required that signaling for each UE be routed to a 5GCN in the same country as the UE and not in a different country. Alternatively, it may be required that signaling be supported for UEs in only one country and that UEs in other countries not be allowed to access the SV. These requirements may be associated with how UEs are permitted (e.g. by national regulators) to access a 5G network using SVs. Solutions applicable to current 5G terrestrial access may not support these requirements as they are based on fixed cellular access with each cell belonging to one (known) country. Solutions for existing SV telephony and data access may also not be applicable because they do not support access to cellular networks in a manner compatible with terrestrial cellular access.

Implementations described later herein, and referred to as "SOLUTION 3", can provide a solution to the above problems and may reuse existing 5G network access procedures with only small impacts. The implementations can also support mobility management of UEs (e.g. periodic registration) which are accessing SVs with only small impacts to existing procedures.

In the description below, different aspects of SOLUTION 1 are described with reference primarily to FIGS. 7-22 and FIGS. 47-49. Different aspects of SOLUTION 2 are described with reference primarily to FIGS. 23-36 and FIG. 50. Different aspects of SOLUTION 3 are described with reference primarily to FIGS. 37 and 38 and FIGS. 51-57.

Another problem with SV access to core networks, such as a 5GCN, is that an SV may be accessible for only a limited time and a UE may be required to periodically handover to a new SV and/or a new terrestrial radio node. For example, with LEO SVs, an SV would typically be accessible from any fixed location for around 3 to 15 minutes, depending on the height of the SV and the perpendicular distance (measured over the Earth's surface) between the fixed location and the orbital plane of the SV. Following this period of accessibility, a UE that was accessing the SV, or just camped on a radio cell for the SV, would need to handover to another SV or camp on another SV in each case, respectively. Similarly, following a period of accessibility of an SV to an earth station, the SV itself and any UEs still accessing the SV would need to undergo handover (or transfer) to another earth station. However, sometimes handover or transfer of UEs to a new earth station may not be possible or may not be allowed, e.g., if the new earth station is in a different country than the country in which the UEs are located or connects to a different core network than the core network with which the UEs are registered. In cases such as these, the UEs would need to be handed off to a different SV before the SV itself is handed off or transferred to a new earth station. From the perspective of a UE, these handover or transfer events may be sudden and disruptive to communication, e.g., if a new SV cannot be found before the UE needs to cease access to a current SV. In addition, from a network perspective, the handover of a large numbers of UEs from one SV to another at about the same time may impose an unacceptable system load. Methods to avoid these consequences are therefore desirable.

In one implementation, as described herein, a solution may be based on predicting an SV orbital motion in advance. Knowing the future locations of an SV, it may be possible to determine in advance the duration of radio coverage by the SV for any location on the Earth and the duration of accessibility by the SV to any earth station. For example, determining the duration of radio coverage by an SV and the duration of accessibility by the SV to an earth station may take into account the radio cells supported by the SV including the coverage areas of these radio cells and whether steerable and directional antennas are used by the SV to maintain coverage for the same geographic area by a radio cell over an extended period. With this information, it may be possible to determine: (1) a period of time (e.g. start time and end time) during which an SV will be using a particular earth station; and (2) a period of time (e.g. start time and end time) during which a particular radio cell for an SV will be providing radio coverage for part or all of any fixed TA.

In instances where all UEs will be handed off from a current SV to a new (different) SV prior to the current SV itself being handed off to a new earth station, the current SV may provide an advance indication to UEs of the impending handover, based on the information in (1), i.e., the period of time during which an SV will be using a particular earth station. With this information, UEs in connected mode may search for other SVs (e.g. and provide measurements to assist handover) and UEs in idle mode may find another SV to camp on. Similarly, an SV may provide an advance indication to UEs in idle mode and located in a particular TA that radio cell coverage of the TA by the SV will cease at some imminent future time, as determined according to the information in (2), i.e., the period of time during which a particular radio cell for an SV will be providing radio coverage for part or all of a fixed network TA. With this information, the UEs may find another SV, before coverage from the current SV ceases.

In some implementations, the advance indications may be provided using System Information Blocks (SIBs) such as SIB1 or SIB2. For example, a SIB1 or SIB2 for a particular radio cell supported by an SV may include one or more of the radio cell remaining lifetime (e.g. a value in the range 0-1023 seconds); a list of TAs supported by the radio cell; and for each supported TA, a remaining lifetime of radio coverage of the TA by the radio cell; or a combination thereof. Such indications are not provided for terrestrial radio cells because the coverage areas do not move and terrestrial base stations are not themselves subject to handover. However, this extra information for UEs accessing a core network through SVs may be advantageous to avoid the type of problems described above.

FIG. 1 shows a diagram of a communication system 100 capable of supporting satellite access using 5G New Radio (NR) or some other wireless access type such as Code Division Multiple Access (CDMA), according to an embodiment. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an ES without demodulating or decoding the signals. Similarly, a transparent SV may receive an UL signal from an ES and redirect the signal DL to served UEs without demodulating or decoding the signal. However, the SV may frequency convert received signals and may amplify and/or filter received signals before transmitting the signals.

The communication system 100 comprises a number of UEs 105, a number of SVs 102-1 to 102-4 (collectively referred to herein as SVs 102), a number of Non-Terrestrial Network (NTN) gateways 104-1 to 104-4 (collectively referred to herein as NTN gateways 104) (sometimes referred to herein simply as gateways 104, earth stations 104, or ground stations 104), a number of gNBs capable of communication with UEs via SVs 102 referred to herein as satellite NodeBs (sNBs) 106-1 to 106-3 (collectively referred to herein as sNBs 106). It is noted that the term sNB refers in general to an enhanced gNB with support for SVs and may be referred to as a gNB (e.g. in 3GPP). The communication system 100 is illustrated as further including components of a number of Fifth Generation (5G) networks including 5G Core Networks (5GCNs) 110-1 to 110-3 (collectively referred to herein as 5GCNs 110). The 5GCNs 110 may be public land mobile networks (PLMN) that may be located in the same or in different countries. FIG. 1 illustrates various components within 5GCN1 110-1 and a Next Generation (NG) Radio Access Network (RAN) (NG-RAN) 112 that may operate with 5GCN1 110-1. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

The communication system 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components.

Permitted connections in the communication system 100 having the network architecture with transparent SVs illustrated in FIG. 1, allow an sNB 106 to access multiple Earth stations 104 and/or multiple SVs 102. One sNB 106 may also be shared by multiple PLMNs (5GCNs 110), which may all be in the same country or possibly in different countries, and one Earth station 104 may be shared by more than one sNB 106.

It should be noted that FIG. 1 provides only a generalized illustration of various components, any or all of which may be utilized as appropriate, and each of which may be duplicated or omitted as necessary. Specifically, although only three UEs 105 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, sNBs 106, NG-RAN 112, gNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite may be determined and precise navigation information including 3-dimensional position, velocity and time of day of the SPS receiver may then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx) and/or other positioning methods.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and sNBs 106. As illustrated by NG-RAN 112, the NG-RANs associated with the 5GCNs 110 may include one or more sNBs 106. The NG-RAN 112 may further include a number of terrestrial base stations, such as gNB 114. Pairs of terrestrial and/or satellite base stations, e.g., gNBs 114 and sNB 106-1 in NG-RAN 112 may be connected to one another using terrestrial links—e.g. directly as shown in FIG. 1 or indirectly via other gNBs 114 or sNBs 106 and communicate using an Xn interface. Access to the 5G network is provided to UEs 105 via wireless communication between each UE 105 and a serving sNB 106, via an SV 102 and an earth station 104. The sNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more sNBs 106 and/or gNBs 114 in NG-RAN 112—e.g. directly or indirectly via other sNBs 106, gNBs 114 and/or other ng-eNBs. An ng-eNB may provide LTE wireless access and/or evolved LTE (eLTE) wireless access to a UE 105.

An sNB 106 may be referred to by other names such as a gNB or a "satellite node" or "satellite access node." The sNBs 106 are not the same as terrestrial gNB 114, but may be based on a terrestrial gNB 114 with additional capability. For example an sNB 106 may terminate the radio interface and associated radio interface protocols to UEs 105 and may transmit DL signals to UEs 105 and receive UL signals from UEs 105 via SVs 102 and ESs 104. An sNB 106 may also support signaling connections and voice and data bearers to UEs 105 and may support handover of UEs 105 between different radio cells for the same SV 102, between different SVs 102 and/or between different sNBs 106. In some systems, an sNB 106 may be referred to as a gNB or as an enhanced gNB. SNBs 106 may be configured to manage moving radio beams (for LEO SVs) and associated mobility of UEs 105. The sNBs 106 may assist in the handover (or transfer) of SVs 102 between different Earth stations 104, different sNBs 106, and between different countries. The sNBs 106 may hide or obscure specific aspects of connected SVs 102 from the 5GCN 110, e.g. by interfacing to a 5GCN 110 in the same way or in a similar way to a gNB 114, and may avoid a 5GCN 110 from having to maintain configuration information for SVs 102 or perform mobility management related to SVs 102. The sNBs 106 may further assist in sharing of SVs 102 over multiple countries. The sNBs 106 may communicate with one or more earth stations 104, e.g., as illustrated by sNB 106-2 communicating with earth stations 104-2 and 104-1. The sNBs 106 may be separate from earth stations 104, e.g., as illustrated by sNBs 106-1 and 106-2, and earth stations 104-1 and 104-2. The sNBs 106 may include or may be combined with one or more earth stations 104, e.g., using a split architecture. For example, sNB 106-3 is illustrated with a split architecture, with an sNB central unit (sNB-CU) 107 and the earth stations 104-3 and 104-4 acting as Distributed Units (DUs). An sNB 106 may typically be fixed on the ground with transparent SV operation. In one implementation, one sNB 106 may be physically combined with, or physically connected to, one ES 104 to reduce complexity and cost.

The earth stations 104 may be shared by more than one sNB 106 and may communicate with UE 105 via the SVs 102. An earth station 104 may be dedicated to just one SVO and to one associated constellation of SVs 102 and hence may be owned and managed by the SVO. While earth stations 104 may be included within an sNB 106, e.g., as an sNB-DU within sNB 106-3, this may only occur when the same SVO or the same MNO owns both the sNB 106 and the included ESs 104. Earth stations 104 may communicate with SVs 102 using control and user plane protocols that may be proprietary to an SVO. The control and user plane protocols between earth stations 104 and SVs 102 may; (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR and LTE communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of a RAN location server function may be applicable to such other networks.

The sNBs 106 and gNBs 114 may communicate with an Access and Mobility Management Function (AMF) 122 in a 5GCN 110, which, for positioning functionality, may communicate with a Location Management Function (LMF) 124. For example, the sNBs 106 may provide an N2 interface to the AMF 122. An N2 interface between an sNB 106 and a 5GCN 110 may be the same as an N2 interface supported between a gNB 114 and a 5GCN 110 for terrestrial NR access by a UE 105 and may use the Next Generation Application Protocol (NGAP) defined in 3GPP Technical Specification (TS) 38.413 between an sNB 106 and the AMF 122. The AMF 122 may support mobility of the UE 105, including cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from the GMLC 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 120, SVs 190, gNBs 114 and assistance data provided to the UE 105, e.g. by LMF 124).

The Gateway Mobile Location Center (GMLC) 126 may support a location request for the UE 105 received from an external client 140 and may forward such a location request to the AMF 122 for forwarding by the AMF 122 to the LMF 124 or may forward the location request directly to the LMF 124. A location response from the LMF 124 (e.g. containing a location estimate for the UE 105) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 1 though only one of these connections may be supported by 5GCN 110 in some implementations.

A Network Exposure Function (NEF) 128 may be included in 5GCN 110. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet 175. The UPF 130 may be connected to sNBs 106 and gNBs 114. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs with the network architecture shown in FIG. 1 may impact the communication system as follows. The 5GCN 110 may treat a satellite RAT as a new type of RAT (e.g. having longer delay, reduced bandwidth and higher error rate). Consequently, while there may be some impact to Protocol Data Unit (PDU) session establishment and mobility management (MM) and connection management (CM) procedures, impacts to an AMF 122 (or LMF 124) may be small—e.g. such as providing pre-configured data for fixed tracking areas (TAs) and cells to a UE 105 during Registration. There may be no impact to the SVs 102.

The SVs 102 may be shared with other services (e.g. satellite TV, fixed Internet access) with 5G NR mobile access for UEs added in a transparent manner. This may enable legacy SVs 102 to be used and may avoid the need to deploy a new type of SV 102. Further, the sNBs 106 may be fixed and may be configured to support one country and one or more PLMNs in that country. The sNBs 106 may need to assist assignment and transfer of SVs 102 and radio cells between sNBs 106 and earth stations 104 and support handover of UEs 105 between radio cells, SVs 102 and other sNBs 106. Thus, the sNB 106 may differ from a terrestrial gNB 114. Additionally, a coverage area of an sNB 106 may be much larger than the coverage area of a gNB 114.

In some implementations, the radio beam coverage of an SV 102 may be large, e.g., up to or greater than 1000 kms7 across, and may provide access to more than one country. An earth station 104 may be shared by multiple sNBs (e.g., earth station 104-1 may be shared by sNBs 106-1 and 106-2), and an sNB 106 may be shared by multiple core networks in separate PLMNs located in the same country or in different countries (e.g., sNB 106-2 may be shared by 5GCN1 110-1 and 5GCN2 110-1, which may be in different PLMNs in the same country or in different countries).

Figure 2:
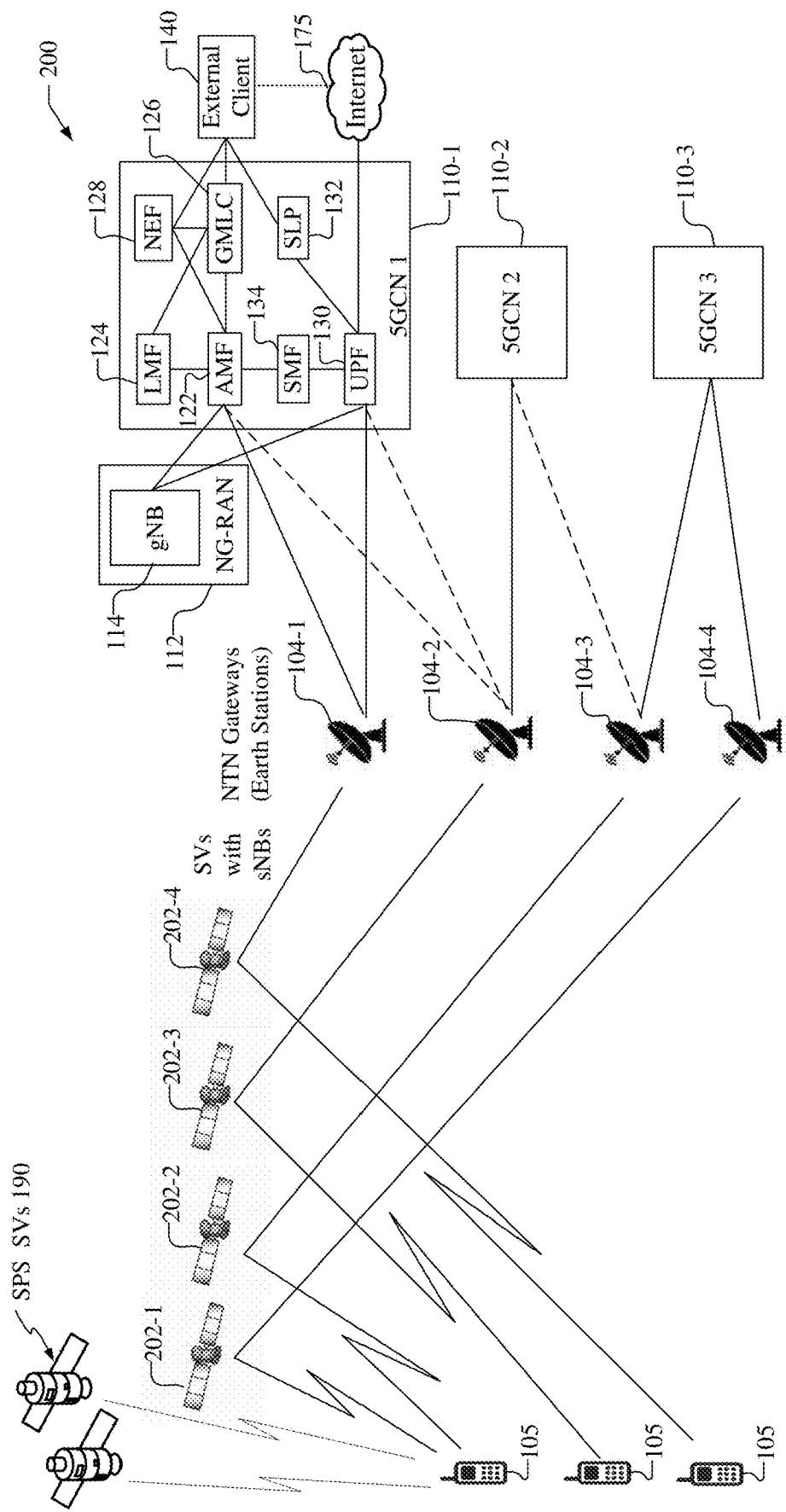
FIG. 2 shows a diagram of a communication system with a network architecture having regenerative SVs that is capable of supporting satellite access to a wireless network.

FIG. 2 shows a diagram of a communication system 200 capable of supporting satellite access using 5G New Radio (NR) or some other wireless access type such as Code Division Multiple Access (CDMA), according to an embodiment. The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board sNB 202 (or at least the functional capabilities of an sNB), and is sometimes referred to herein as an SV/sNB 202. Reference to an sNB 202 is used herein when referring to SV/sNB 202 functions related to communication with UEs 105 and 5GCNs 110, whereas reference to an SV 202 is used when referring to SV/sNB 202 functions related to communication with ESs 104 and with UEs 105 at a physical radio frequency level. However, there may be no precise delimitation of an SV 202 versus an sNB 202.

An onboard sNB 202 may perform many of the same functions as an sNB 106 as described previously. For example, an sNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. An sNB 202 may also support signaling connections and voice and data bearers to UEs 105 and may support handover of UEs 105 between different radio cells for the same sNB 202 and between different sNBs 202. The sNBs 202 may assist in the handover (or transfer) of SVs 202 between different Earth stations 104, different 5GCNs 110, and between different countries. The sNBs 202 may hide or obscure specific aspects of SVs 202 from the 5GCN 110, e.g. by interfacing to a 5GCN 110 in the same way or in a similar way to a gNB 114. The sNBs 202 may further assist in sharing of SVs 202 over multiple countries. The sNBs 202 may communicate with one or more earth stations 104 and with one or more 5GCNs 110 via the ESs 104. In some implementations, sNBs 202 may communicate directly with other sNBs 202 using Inter-Satellite Links (ISLs) (not shown in FIG. 2), which may support an Xn interface between any pair of sNBs 202.

With LEO SVs, an SV/sNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN2 110-2, and earth stations 104-3 and 104-4 are connected to 5GCN3 110-3. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2, and earth station 104-3 may be connected to both 5GCN2 110-2 and 5GCN3 110-3. The 5GCN 110 may need to be aware of SV 202 coverage areas in order to page UEs 105 and to manage handover. Thus, as may be seen, the network architecture with regenerative SVs may have more impact and complexity with respect to both sNBs 202 and 5GCNs 110 than the network architecture with transparent SVs 102 shown in FIG. 1.

Support of regenerative SVs with the network architecture shown in FIG. 2 may impact the communication system 200 as follows. The 5GCN 110 may be impacted if fixed TAs and fixed cells are not supported, since core components of mobility management and regulatory services, which are typically based on fixed cells and fixed TAs for terrestrial PLMNs, would have to be replaced by a new system (e.g. based on UE 105 location). If fixed TAs and fixed cells are supported, a 5GCN 110 (e.g. the AMF 122) may need to map any fixed TA to one or SVs 202 with current radio coverage of the TA when performing paging of a UE 105 that is located in this TA. This could require configuration in the 5GCN 110 of long term orbital data for SVs 202 (e.g. obtained from an SVO for SVs 202) and could add significant new impact to a 5GCN 110.

Legacy SVs could need a substantial software (SW) update to support sNB 202 functions, which may not be feasible. An SV 202 would also need to fully support all UEs 105 accessing the SV 202, which could be problematic with a legacy SV due to limited processing and storage capability. Hence, an SV 202 would probably need to comprise new hardware (HW) and SW rather than being based on a SW upgrade to an existing SV. A new SV/sNB 202 may need to support regulatory and other requirements for multiple countries. A GEO SV 202 coverage area would typically include several or many countries, whereas a LEO or medium earth orbit (MEO) SV 202 would typically orbit over many countries. Support of fixed TAs and fixed cells may then require that a SV/sNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/sNB 202 complexity and at the expense of more 5GCN 110 complexity. Additionally, SV/sNB 202 to SV/sNB 202 ISLs would typically change dynamically as relative SV/sNB 202 positions change, making Xn related procedures more complex.

Figure 3:
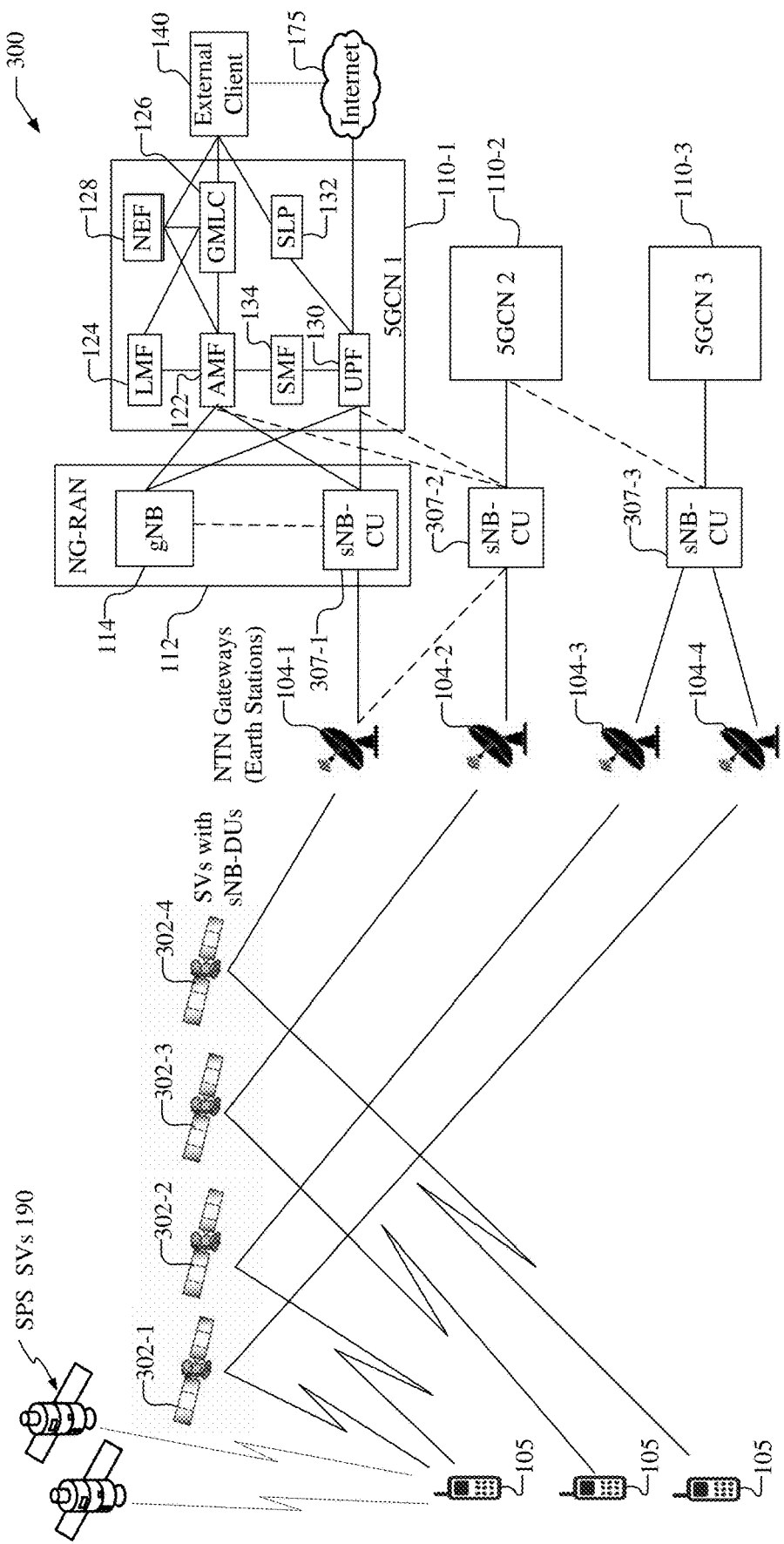
FIG. 3 shows a diagram of a communication system with a network architecture having regenerative SVs and a split satellite Node B (sNB) architecture that is capable of supporting satellite access to a wireless network.

FIG. 3 shows a diagram of a communication system 300 capable of supporting satellite access using 5G New Radio (NR) or some other wireless access type such as Code Division Multiple Access (CDMA), according to an embodiment. The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the sNBs. A regenerative SV 302, unlike a transparent SV 102, includes an on-board sNB Distributed Unit (sNB-DU) 302, and is sometimes referred to herein as an SV/sNB-DU 302. Reference to an sNB-DU 302 is used herein when referring to SV/sNB 302 functions related to communication with UEs 105 and sNB-CUs 307, whereas reference to an SV 302 is used when referring to SV/sNB-DU 302 functions related to communication with ESs 104 and with UEs 105 at a physical radio frequency level. However, there may be no precise delimitation of an SV 302 versus an sNB-DU 302.

Each sNB-DU 302 communicates with one ground based sNB-CU 307 via one or more ESs 104. One sNB-CU 307 together with the one or more sNB-DUs 302 which are in communication with the sNB-CU 307 performs functions, and may use internal communication protocols, which are similar to or the same as a gNB with a split architecture as described in 3GPP TS 38.401. Here an sNB-DU 302 corresponds to and performs functions similar to or the same as a gNB Distributed Unit (gNB-DU) defined in TS 38.401, while an sNB-CU 307 corresponds to and performs functions similar to or the same as a gNB Central Unit (gNB-CU) defined in TS 38.401. For example, an sNB-DU 302 and an sNB-CU 307 may communicate with one another using an F1 Application Protocol (F1AP) as defined in 3GPP TS 38.473 and together may perform some or all of the same functions as an sNB 106 or sNB 202 as described previously. To simplify references to different types of sNB is the description below, an sNB-DU 302 may sometimes be referred to an sNB 302 (without the "DU" label), and an sNB-CU 307 may sometimes be referred to an sNB 307 (without the "CU" label).

An sNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. An sNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of an sNB-DU 302 is partly controlled by the associated sNB-CU 307. One sNB-DU 302 may support one or more NR radio cells for UEs 105. An sNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. An sNB-CU 307 may also be split into separate control plane (sNB-CU-CP) and user plane (sNB-CU-UP) portions, where an sNB-CU-CP communicates with one or more AMFs 122 in one more 5GCNs 110 using the NGAP protocol and where an sNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. An sNB-DU 302 and sNB-CU 307 may communicate over an F1 interface to (a) support control plane signaling for a UE 105 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

An sNB-CU 307 may communicate with one or more other sNB-CUs 307 and/or with one more other gNBs 114 using terrestrial links to support an Xn interface between any pair of sNB-CUs 307 and/or between any sNB-CU 307 and any gNB 114.

An sNB-DU 302 together with an sNB-CU 307 may: (i) support signaling connections and voice and data bearers to UEs 105; (ii) support handover of UEs 105 between different radio cells for the same sNB-DU 302 and between different sNB-DUs 302; and (iii) assist in the handover (or transfer) of SVs 302 between different Earth stations 104, different 5GCNs 110, and between different countries. An sNB-CU 307 may hide or obscure specific aspects of SVs 302 from a 5GCN 110, e.g. by interfacing to a 5GCN 110 in the same way or in a similar way to a gNB 114. The sNB-CUs 307 may further assist in sharing of SVs 302 over multiple countries.

In communication system 300, the sNB-DUs 302 that communicate with and are accessible from any sNB-CU 307 will change over time with LEO SVs 302. With the split sNB architecture, a 5GCN 110 may connect to fixed sNB-CUs 307 which do not change over time and which may reduce difficulty with paging of a UE 105. For example, a 5GCN 110 may not need to know which SV/sNB-DUs 302 are needed for paging a UE 105. The network architecture with regenerative SVs 302 with a split sNB architecture may thereby reduce 5GCN 119 impact at the expense of additional impact to an sNB-CU 307.

Support of regenerative SVs 302 with a split sNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of RAT with longer delay, reduced bandwidth and higher error rate. Consequently, while there may be some impact to PDU session establishment and Mobility Management (MM) and Connection Management (CM) procedures, impacts to an AMF 122 (or LMF 124) may be small—e.g. such as providing pre-configured data for fixed TAs and fixed cells to a UE 105 during Registration. The impact on SV/sNB-DUs 302 may be less than the impact on SV/sNBs 202 (with non-split architecture), as discussed above in reference to FIG. 2. The SV/sNB-DU 302 may need to manage changing association with different (fixed) sNB-CUs 307. Further, an SV/sNB-DU 302 may need to manage radio beams and radio cells. The sNB-CU 307 impacts may be similar to sNB 106 impacts for a network architecture with transparent SVs 102, as discussed above, except for extra impacts to manage changing associations with different sNB-DUs 302 and reduced impacts to support radio cells and radio beams which may be transferred to sNB-DUs 302.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SDOs are widely known to the industry.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and sNBs 106/202/302/307 in one country may need to support UE 105 access from other countries. Sharing a beam over multiple countries may raise security issues for privacy of both data and voice. Further, sharing an SV beam over multiple countries may raise regulatory conflicts. For example, regulatory services including WEA, LI, and EM calls in a first country may need support from sNBs 106/202/307 and earth stations 104 in a second country that shares the same SV beam.

A first solution to complications raised by beam sharing amongst multiple countries may be to assign one beam to one country. The assignment of a beam to a single country additionally implies assigning each radio cell to one country. This solution may not preclude or prevent beam and radio cell coverage of additional countries, but can restrict UE access to a beam and associated radio cell to just UEs 105 in the country to which the beam and associated radio cell are assigned. A second solution for beam sharing over multiple countries could be to allow a 5GCN 110 in one country to support UEs 105 located in other countries where regulatory approval for this was obtained from the other countries. A third solution could be to share an sNB 106/202/307 among 5GCNs 110 located in different countries (e.g. as in the case of sNB 106-2, sNB 202-2 and sNB 307-2 shown in FIGS. 1-3), and to verify that each UE 105 accessing the sNB 106/202/307 is registered in and connected to a 5GCN 110 that is in the same country as the UE 105 or permitted to serve the country in which the UE 105 is located.

Figure 4:
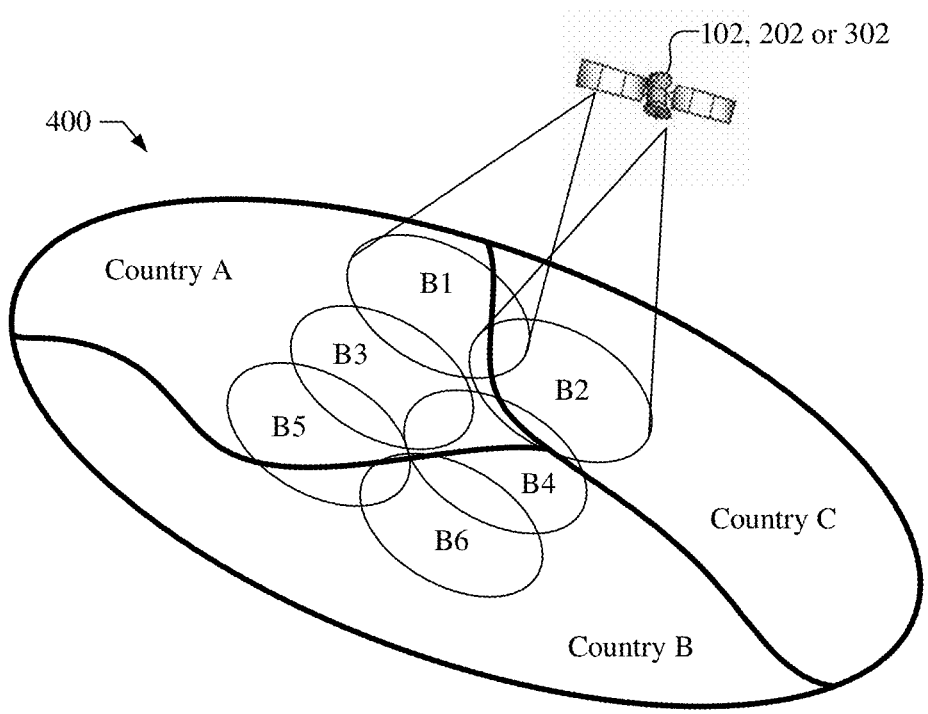
FIG. 4 illustrates a SV generating multiple beams over an area that includes multiple countries.

FIG. 4, byway of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country as for the first solution above, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay, or mostly stay, within one country, which is sometimes referred to as a "steerable beam". For example, beam coverage may move slowly within one country and then hop to a new country, e.g., after an SV 102, 202, 302 has transferred to a new earth station 104 or new sNB 106 or 307.

Figure 5:
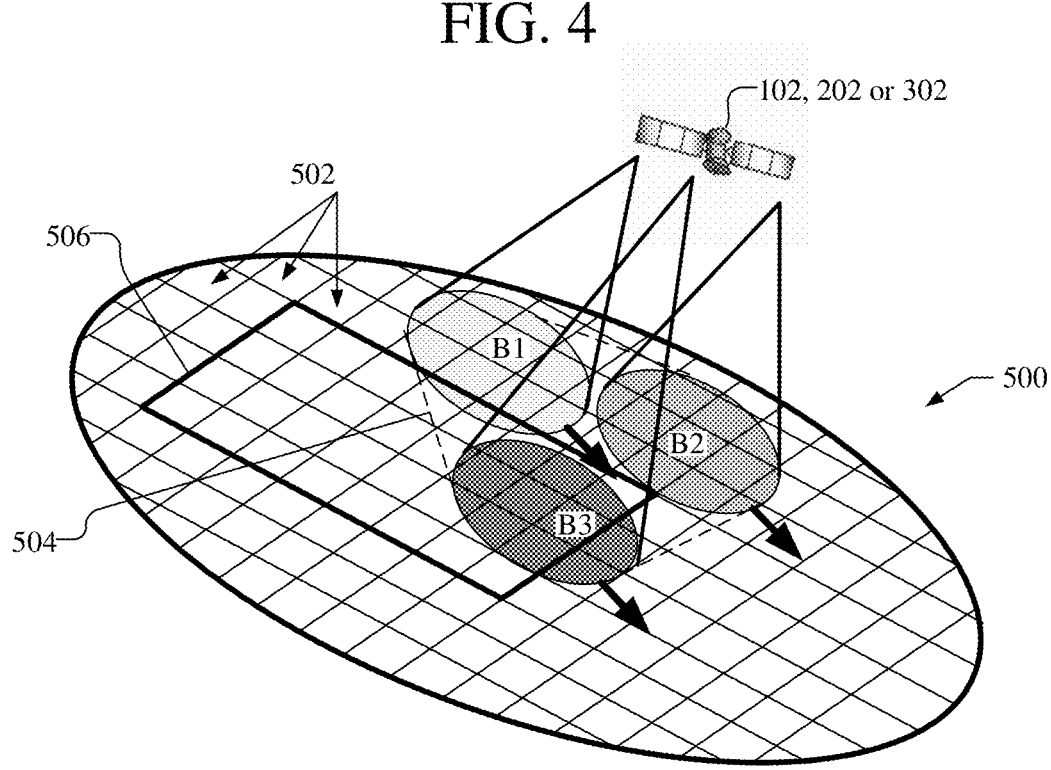
FIG. 5 illustrates radio cells produced by an SV over an area that includes a number of fixed cells.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202, 302 may overlap with many 5GCN terrestrial cells. When supporting satellite access to a wireless network, radio beams and radio cells produced by an SV 102, 202, 302 may be hidden from a 5GCN 110.

As illustrated in FIG. 5, an area 500 may include a number of Earth fixed cells 502, as well as fixed tracking areas (TAs) such as TA 506. Fixed cells are not "real cells," e.g., used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which typically changes with time for a LEO or MEO SV. A fixed cell 502 may be treated by a 5GCN 110 the same as a cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in communication systems 200, each radio cell may remain with the same SV 202 and may have a moving coverage area supporting different 5GCNs 110 at different times.

With transparent SVs 102 and regenerative SVs 302 for a split architecture as in communication system 300, each radio cell may be assigned to and controlled by one sNB 106 or 307 on behalf of one or more PLMNs in one country. For a GEO SV 102/302, the assignment to an sNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For an NGEO SV 102/302, the assignment might last for a short time, e.g., only 5-15 minutes. A non-permanent radio cell may then be transferred to a new sNB 106/307 as necessary (e.g. when access to the NGEO SV 102/302 is transferred to the new sNB 106/307). Each sNB 106/307, for example, may have a fixed geographic coverage area, e.g., comprising a plurality of fixed cells 502 and fixed TAs. A radio cell for a first NGEO SV 102/302 may be transferred from a first sNB 106/307 to a second sNB 106/307 when (or after) moving into the fixed coverage area of the second sNB 106/307. Prior to this transfer, UEs 105 accessing the radio cell in a connected state may be moved to a new radio cell for the first sNB 106/307 or could be handed off to the second sNB 106/307 as part of transferring the radio cell. An SV 102/302 may be accessed from only one sNB 106/307 or from multiple sNBs 106/307, possibly in different countries. In one implementation, an SV 102/302 may be assigned to multiple sNBs 106/307 by partitioning radio cells produced by the SV 102/302 among the different sNBs 106/307. Radio cells may then be transferred to new sNBs 106/307 (and to new countries) as the SV 102/302 moves or as traffic demands change. Such an implementation could be a form of a soft handoff in which SV 102/302 transfer from one sNB 106/307 to another sNB 106/307 occurs in increments of radio cells and not all at once.

Figure 6:
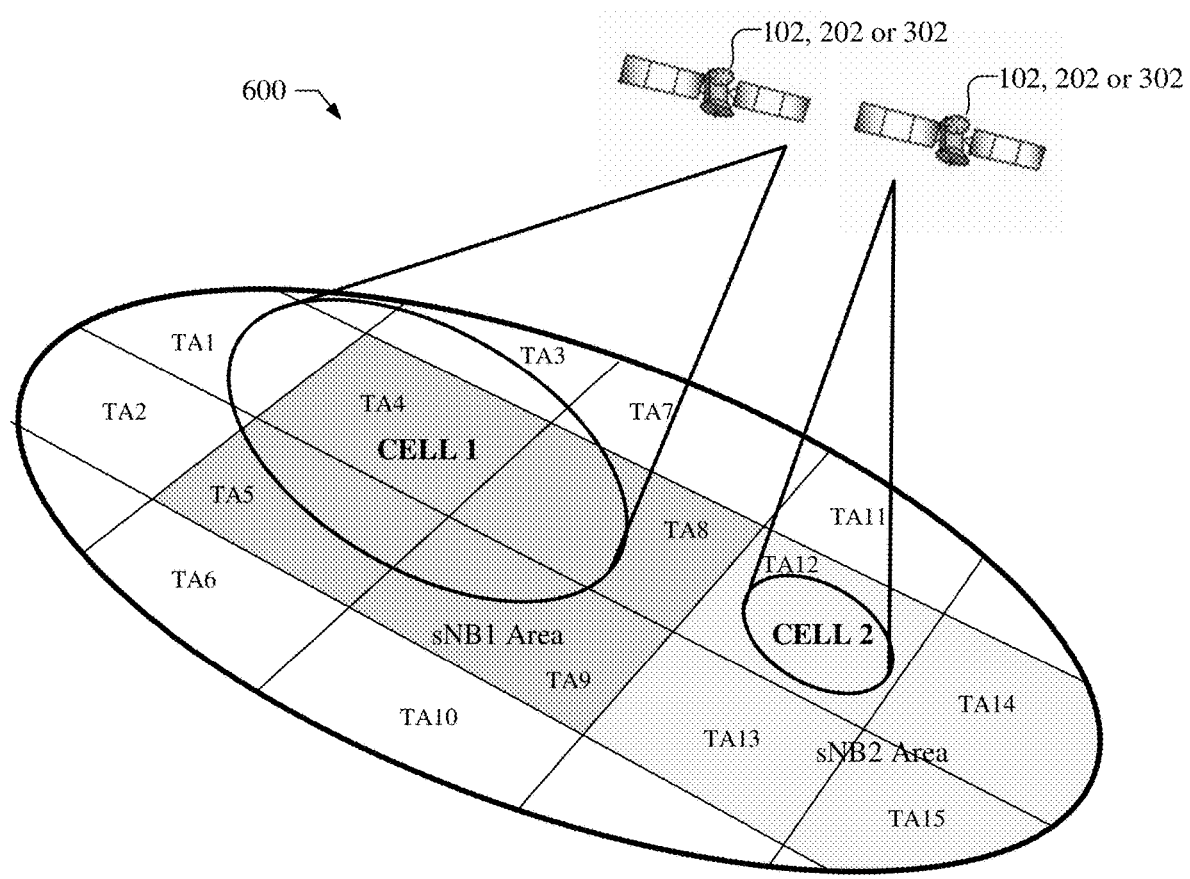
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA 15, wherein TA4, TA5, TA8, and TA9 are assigned to an sNB1 (which may be an sNB 106, sNB 202 or an sNB 307), and TA12, TA13, TA 14, and TA15 are assigned to an sNB2 (which may be another sNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of a TA comprises a Tracking Area Code (TAC)). For an NGEO SV, the supported PLMNs and TAs may change as radio cell coverage areas change. An sNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). An sNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA 12 only. The Cell 1 may be assigned to sNB1 (which has coverage of TA4, TA5, TA8, and TA9) and Cell 2 may be assigned to sNB2 (which has coverage of TA12, TA13, TA14, and TA15). Cell 1 and Cell 2 may be transferred from sNB1 to sNB2 or from sNB2 to sNB1 if the cell coverage area moves from one sNB area to another.

The coverage area for a fixed TA may be defined in a manner that is simple, precise, flexible and requires minimal signaling for conveyance to a UE 105 or sNB 106/202/307. A fixed TA area may be small enough to allow efficient paging by comprising an area supported by just a few radio cells (e.g. less than 20) and may also be large enough to avoid excessive UE registration (e.g. may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or sNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

Aspects of SOLUTION 1 are next discussed with reference to FIGS. 7 to 22. In some of these aspects, fixed cells and fixed TAs may be defined using grid points, but the definition of the fixed cells and fixed TAs may be independent and not require that each fixed cell belong to only one TA.

Figure 7:
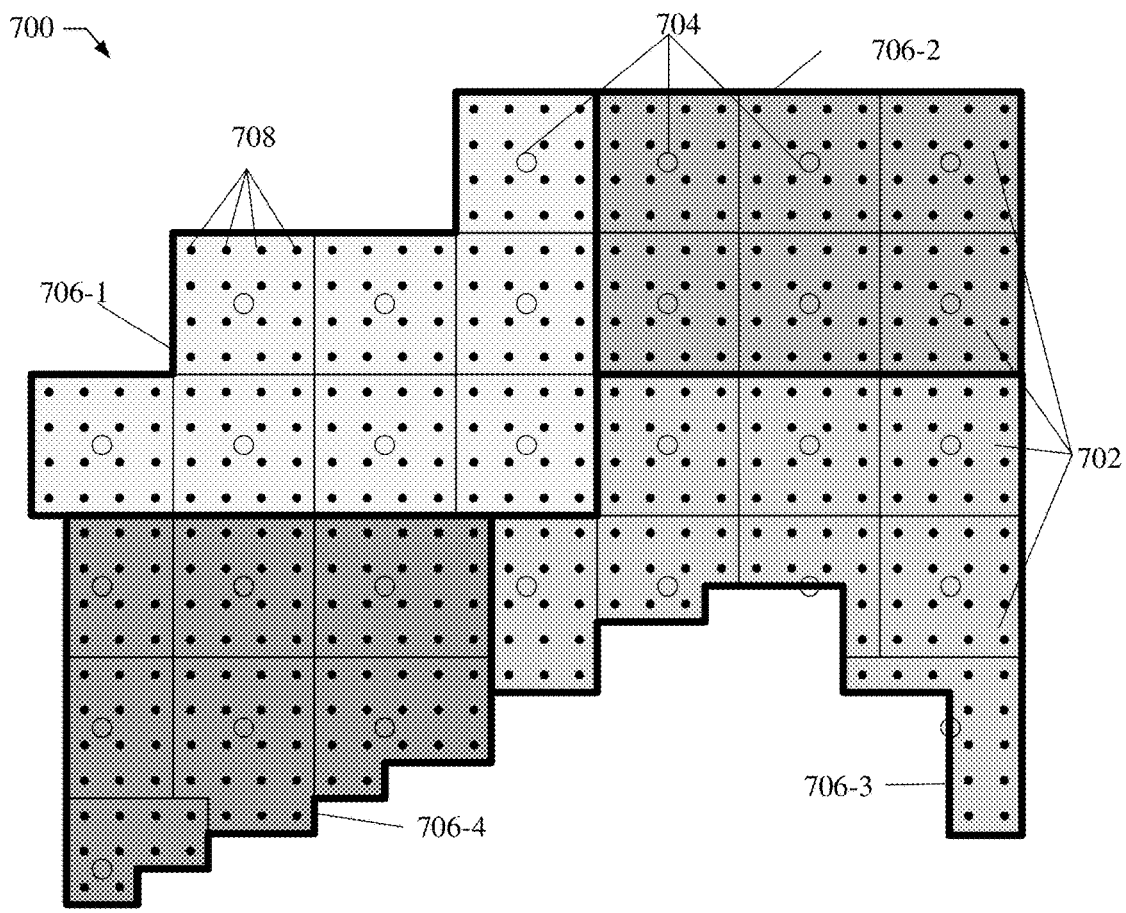
FIG. 7 is a diagram illustrating one implementation of defining a number of rectangular fixed cells and fixed TAs in a geographic area using a plurality of center cell grid points and an array of fine grid points.

FIG. 7 is a diagram illustrating a geographic area 700 that includes a number of fixed cells 702 defined by a plurality of cell center grid points 704, and further includes a plurality of fixed TAs 706-1, 706-2, 706-3, and 706-4, and fine grid points 708. As illustrated, the cell centers for the fixed cells 702 are defined by a rectangular coarse array of grid points 704. The shape and area of each fixed cell are based on the following definition, referred to as "Definition A": each fixed cell area includes all locations that are closer to the cell center grid point than to any other cell center grid point. With this definition, the resulting fixed cell areas are rectangular as shown in FIG. 7 with the cell center grid point for each fixed cell being located at the center of the fixed cell area. FIG. 7 includes a non-rectangular regular fixed TA 706-1 and a rectangular regular fixed TA 706-2. A regular fixed TA includes only complete fixed cell areas. FIG. 7 also includes irregular fixed TAs 706-3 and 706-4. Irregular fixed TAs include fractions of fixed cell areas. A fixed TA area may be defined by either the coarse grid points 704 or the fine grid points 708 that are included in the fixed TA area. For example, the fine grid points 708 may have, e.g. 10-50 meters grid point spacing which may allow a more precise definition of a TA area (e.g. for an irregular fixed TA). The irregular fixed TAs may be used when a precise TA boundary is needed, e.g., between two countries.

Figure 8:
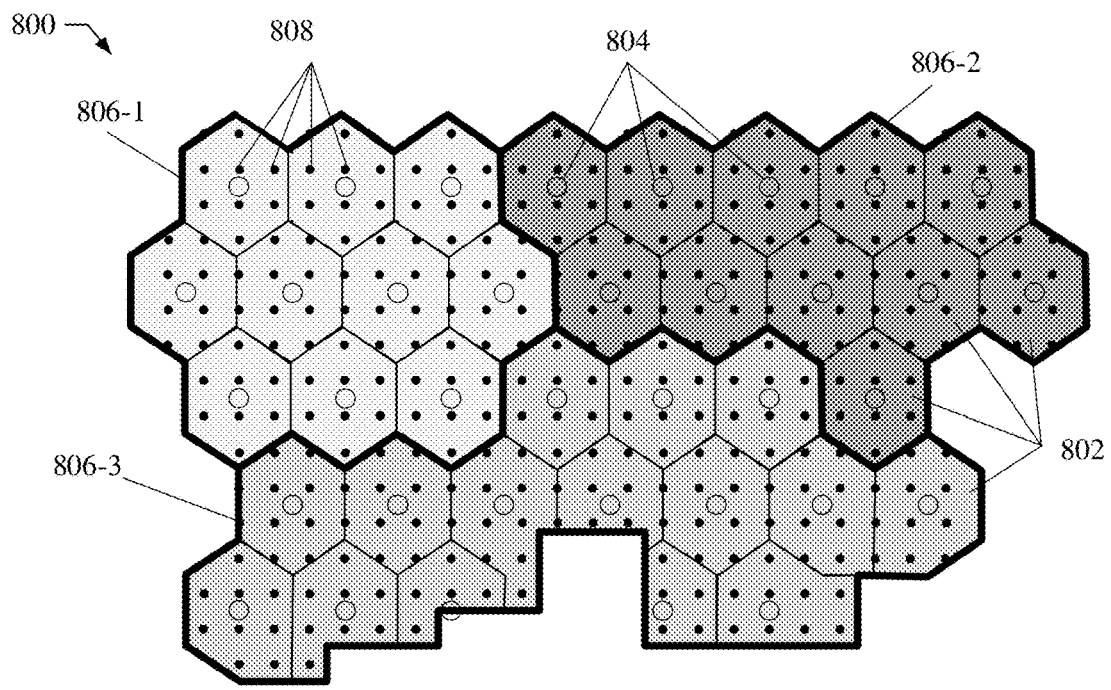
FIG. 8 is a diagram illustrating one implementation of defining a number of hexagonal fixed cells and fixed TAs in a geographic area using a plurality of center cell grid points and an array of fine grid points.

FIG. 8 is a diagram illustrating a geographic area 800 that includes a number of hexagonal fixed cells 802 defined by a plurality of cell center grid points 804, and further includes a plurality of fixed TAs 806-1, 806-2, and 806-3, and fine grid points 808. As illustrated, the cell center grid points 804 for the fixed cells 802 are defined by rows and columns that are alternately offset from one another by half of the inter-cell center distance. The resulting cell areas, according to the previous Definition A, are then hexagonal rather than rectangular. The use of hexagonal fixed cells 802, rather than rectangular cells as in FIG. 7, may provide a closer approximation to real terrestrial cell areas, which may be useful, e.g., to enable more accurate cell ID based location or more controlled WEA Alert broadcasting. FIG. 8 includes regular fixed TAs 806-1 and 806-2 and an irregular fixed TA 806-3. The regular fixed TAs 806-1 and 806-2 include only complete (hexagonal) fixed cell areas. The irregular fixed TA 806-3 includes fractions and/or extensions of hexagonal fixed cell areas. An irregular fixed TA area may be defined by specifying included fine grid points and included whole fixed cells.

Figure 9:
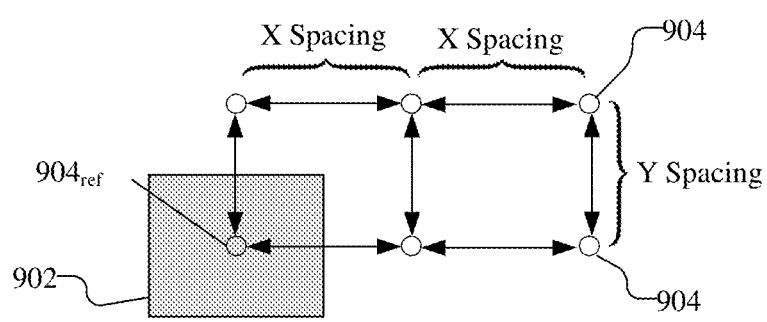
FIG. 9 illustrates a number of cell center grid points and a rectangular fixed cell.

Cell center grid points, such as cell center grid points 704 and 804 in FIGS. 7 and 8, may be defined via X and Y spacing and a reference latitude and longitude. FIG. 9, by way of example, illustrates a number of cell center grid points 904 for rectangular cells and one rectangular fixed cell 902. The cell center grid points 904 may be defined based on an X spacing and a Y spacing, where the X and Y directions are orthogonal and may be aligned with a line of latitude (East-West) and a line of longitude (North-South), respectively. The spacing may then be defined in units of arc seconds (e.g. units of 0.1 arc sec which equals around 3 meters). A reference latitude and longitude may be provided for one "reference cell center" grid point, e.g., grid point $904_{ref}$ which may be at an extreme North East, North West, South East or South West corner (e.g. a South West corner in the example in FIG. 9) of the cell center array.

Figure 10:
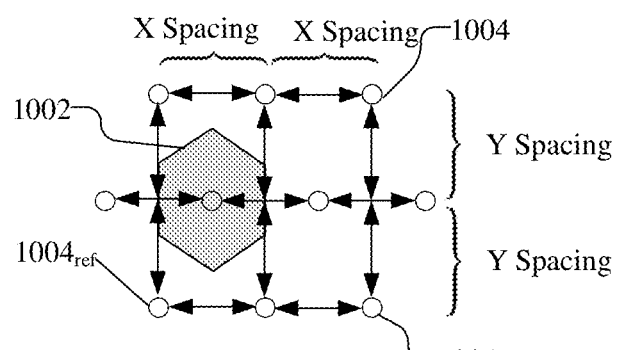
FIG. 10 illustrates a number of cell center grid points and a hexagonal fixed cell.

FIG. 10 illustrates a number of cell center grid points 1004 defining hexagonal fixed cells and one example hexagonal fixed cell 1002. The cell center grid points 1004 may be in a hexagonal array, e.g., with rows (or columns) offset by half a spacing unit as illustrated in FIG. 10, and may be defined based on an X spacing and a Y spacing, as well as a latitude and longitude for a reference cell center grid point $1004_{ref}$. Additionally, the orientation (East-West vs North-South) of the X (or Y) spacing may be defined.

In some implementations, a Z spacing, e.g., vertical spacing, may also be defined to in order to define 3D fixed cells. For example, the lowest cell center grid points may be at the local ground level. Higher cell center grid points may then be used to define fixed cells above ground level and to provide separate cell IDs that may be used for aerial vehicles, such as drones.

Fine grid points may be defined as the same manner as cell center grid points 904 or 1004, but with a smaller X spacing and/or Y spacing. Fine grid points may be arranged in a rectangular array, e.g., as illustrated in FIG. 9, but in some implementations may be arranged in a hexagonal array, as illustrated in FIG. 10.

In some implementations, grid points, such as cell center grid points 904 and 1004, or fine grid points may be restricted to aligning a subset of grid points with lines of latitude and longitude for either integer (non-fractional) degrees or integer degrees plus integer minutes, e.g., to simplify the definition of the grid points. The X and Y spacing are then each defined as an exact divisor of one degree or one minute. For example, if X spacing and Y spacing are defined in units of 0.1" (0.1 seconds), an X spacing or Y spacing may be assigned a value of N units, where N exactly divides 600 (one minute) or 36000 (one degree). By aligning a subset of grid points with lines of latitude and longitude, all the grid points may be defined using a single parameter to define the spacing plus one Boolean parameters to define whether the alignment is to degrees or to minutes. For example, with a value of N=2000 and an alignment with degrees, a subset of grid points would have a latitude and longitude of the form (x, y), where x and y both comprise an integer number of degrees, with remaining grid points successively spaced at X and Y intervals of 200" between these.

Figure 11:
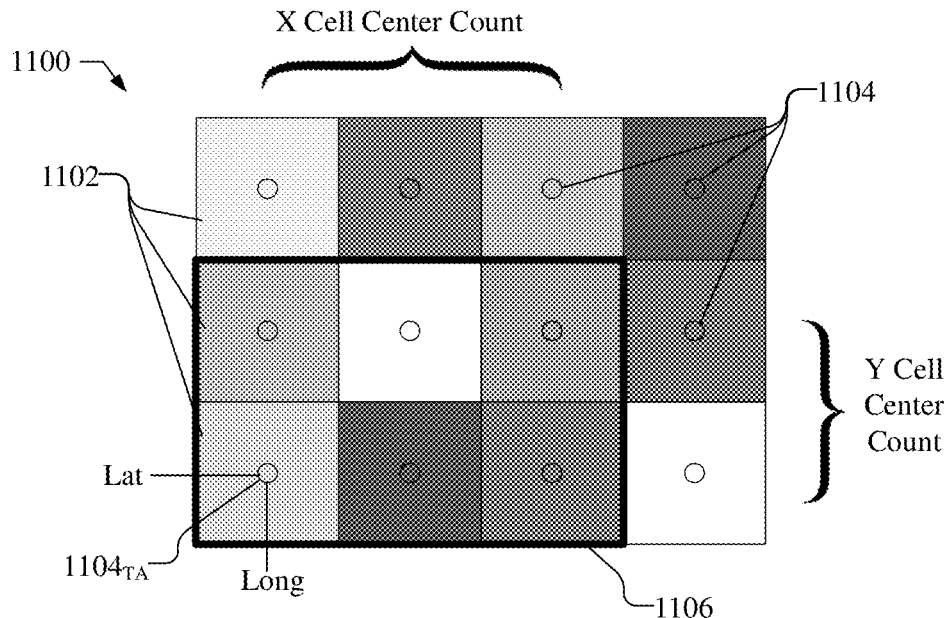
FIG. 11 is a diagram illustrating one implementation of specifying a number of rectangular fixed cells and a fixed TA defined in a geographic area by a plurality of center cell grid points.

FIG. 11 is a diagram illustrating a geographic area 1100 with a number of fixed cells 1102 defined by a plurality of rectangular grid points 1104. FIG. 11, further illustrates a regular fixed TA 1106 with bold lines. As illustrated in FIG. 11, grid points 1104 may be defined in rows and columns and may be specified, e.g., by latitude and longitude, as described previously. Each grid point 1104 defines a fixed cell 1102. Based on the Definition A above, the area of a fixed cell 1102 associated with a grid point G may be defined as including any location L that is closer to grid point G than to any other grid point. As illustrated, the resulting fixed cells 1102 in FIG. 11 are rectangular or square. In one implementation, a regular fixed TA may be defined based on the fixed cells 1102. A regular fixed TA includes only complete fixed cell areas, i.e., the border of a regular fixed TA will coincide with the borders of one or more fixed cells. As illustrated in FIG. 11, a regular fixed TA may be defined based on an X cell center count and a Y cell center count and a latitude and longitude of one cell center to define a square or rectangular fixed TA. For example, the regular fixed TA 1106 may be defined based on the X cell center count (i.e., count 3) and the Y cell center count (i.e., count 2) and the latitude and longitude of grid point 1104$_{TA}$.

Figure 12:
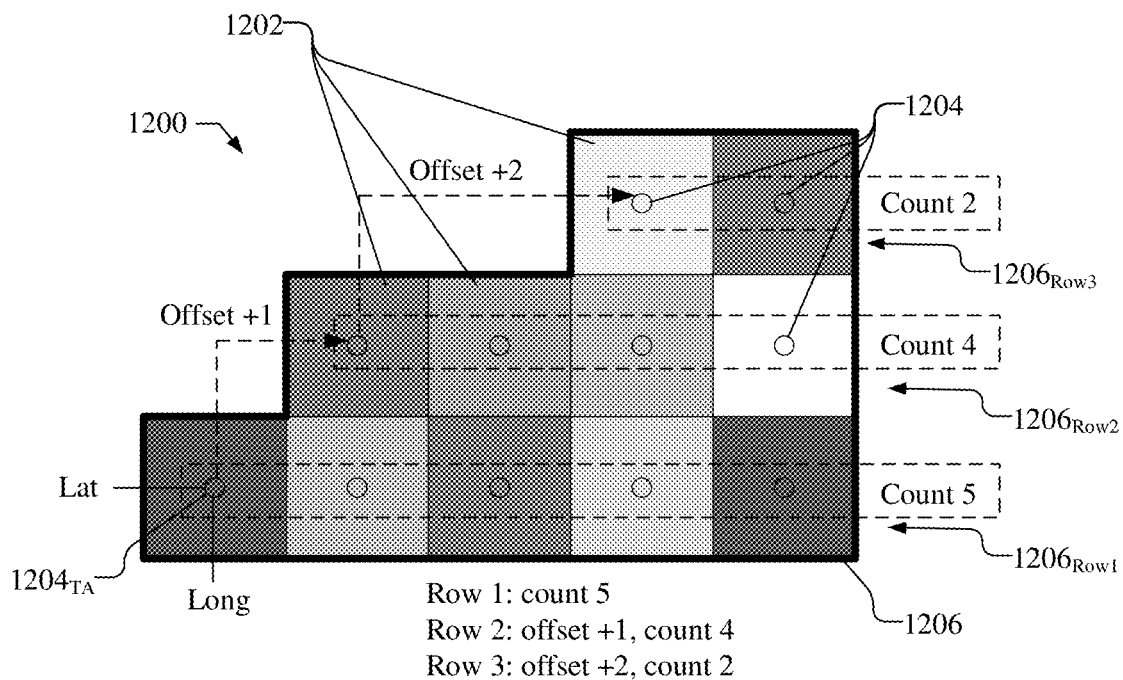
FIG. 12 is a diagram illustrating one implementation of specifying a number of rectangular fixed cells and a fixed TA defined in a geographic area by a plurality of center cell grid points.

FIG. 12 is a diagram illustrating a geographic area 1200 with a number of fixed cells 1202 defined by a plurality of grid points 1204 and a regular fixed TA 1206 with bold lines. As described in FIGS. 7, 9 and 11, the grid points 1204 may be defined in rows and columns, e.g., specified by latitude and longitude, where each grid point 1204 defines a square or rectangular fixed cell 1202. A non-rectangular, regular fixed TA may be defined based on the fixed cells 1202 that it contains by defining row (or column) cell center counts and offsets and the latitude and longitude of one cell center. For example, as illustrated in FIG. 12, the fixed TA 1206 may be defined based on the latitude and longitude of grid point 1204$_{TA}$, a cell center count in a first row 1206$_1$ (i.e., count 5), an offset and cell center count in a second row 1206$_2$ (i.e., offset+1, count 4), and an offset and cell center count in a third row 1206$_3$ (i.e., offset+2, count 2).

Figure 13:
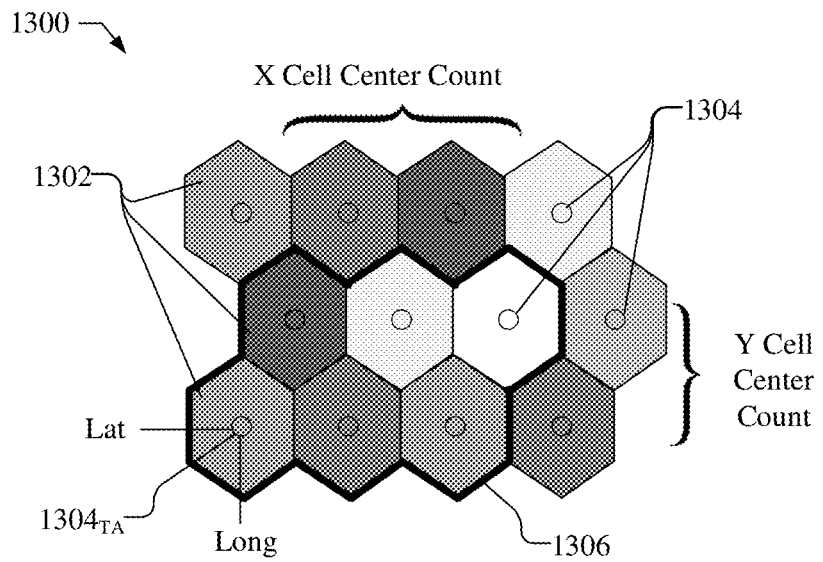
FIG. 13 is a diagram illustrating one implementation of specifying a number of hexagonal fixed cells and a fixed TA defined in a geographic area by a plurality of center cell grid points.

FIG. 13 is a diagram illustrating a geographic area 1300 with a number of fixed cells 1302 defined by a plurality of hexagonal grid points 1304 and a regular fixed TA 1306 with bold lines. As described in FIGS. 8 and 10, the grid points 1304 may be defined in rows and columns, e.g., specified by latitude and longitude, in a hexagonal array so that each grid point 1304 defines a hexagonal fixed cell 1302. A regular fixed TA may be defined based on the fixed cells 1302 by defining the fixed TA based on a X cell center count and a Y cell center count and a latitude and longitude of one cell center with a convention that hexagonal offsets include an extra half grid spacing in an East direction for rows or North direction for columns. For example, the regular fixed TA 1306 may be defined based on the X cell center count (i.e., count 3) and the Y cell center count (i.e., count 2) and the latitude and longitude of grid point 1304$_{TA}$, with the convention that alternate rows are offset by one half grid spacing in an East direction.

Figure 14:
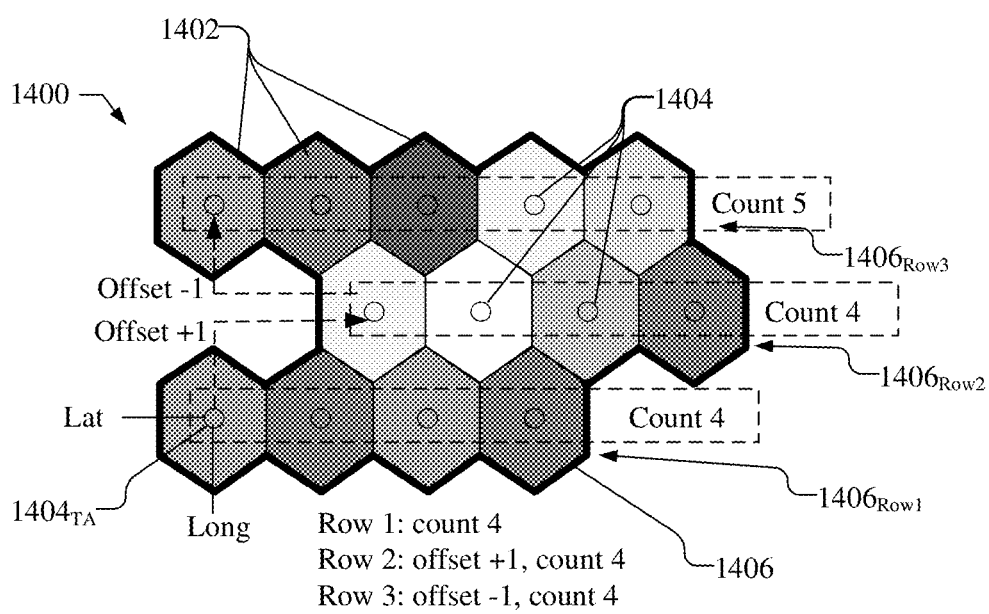
FIG. 14 is a diagram illustrating one implementation of specifying a number of hexagonal fixed cells and a fixed TA defined in a geographic area by a plurality of center cell grid points.

FIG. 14 is a diagram illustrating a geographic area 1400 with a number of hexagonal fixed cells 1402 defined by a plurality of grid points 1404 and a regular fixed TA 1406 with bold lines. As described in FIGS. 8 and 10, the grid points 1404 may be defined in rows and columns, e.g., specified by latitude and longitude, in a hexagonal array so that each grid point 1404 defines a hexagonal fixed cell 1402. A regular fixed TA may be defined based on the fixed cells 1402 by defining row (or column) cell center counts and offsets and the latitude and longitude of one cell center with a convention that hexagonal offsets include an extra half grid spacing in an East direction for rows or North direction for columns. For example, as illustrated in FIG. 14, the fixed TA 1406 may be defined based the latitude and longitude of grid point 1404$_{TA}$, a cell center count in a first row 1406$_{Row1}$ (i.e., count 4), an offset and cell center count in a second row 1406$_{Row2}$ (i.e., offset+1, count 4), and an offset and cell center count in a third row 1406$_{Row3}$ (i.e., offset −1, count 5), with the convention that each offset includes an additional half grid spacing in the East direction.

In the case of a regular fixed TA having one or more rows (or columns) in which cell centers are missing, e.g., non-consecutive fixed cells in a row are in the fixed TA, counts may be provided of alternate included and non-included cell centers. In addition, or as an alternative, a bit map may be used to define a regular fixed TA. For example, a bit map for a fixed TA may be provided that defines the fixed TA based on include cell centers (bit=1) and non-included cell centers (bit=0).

In addition to regular fixed TAs, irregular fixed TAs may also be used. An irregular fixed TA is not limited to complete fixed cell areas and may include fractions of fixed cell areas. An irregular fixed TA may be used, for example, where a precise TA boundary is needed, e.g., between 2 countries. An irregular fixed TA may be defined using an array of additional grid points, sometimes referred to herein as a fine grid point array. An irregular fixed TA may still be related to fixed cells in terms of defining or configuring which fixed cells are completely included in a fixed TA and which fixed cells are only partially included the fixed TA.

Figure 15:
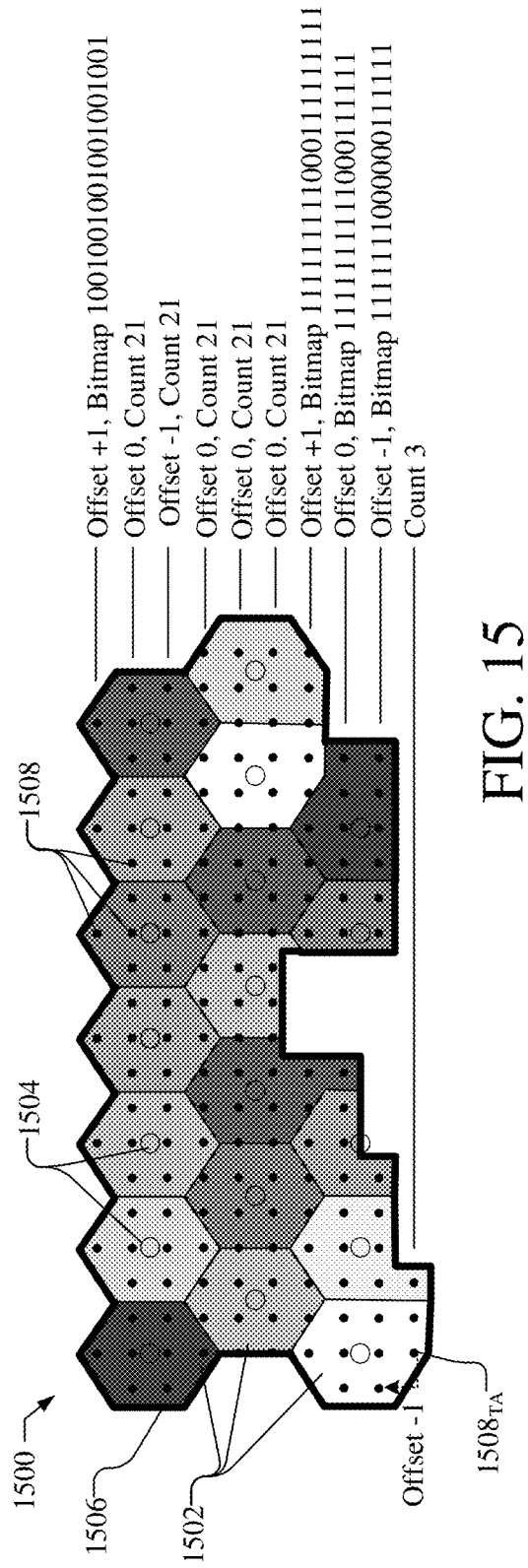
FIG. 15 is a diagram illustrating one implementation of specifying a number of hexagonal fixed cells and a fixed TA defined in a geographic area by a plurality of center cell grid points and an array of fine grid points.

FIG. 15, for example, is a diagram illustrating a geographic area 1500 with a number of fixed cells 1502 defined by a plurality of center cell grid points 1504. Additionally, the geographic area 1500 includes fine grid points 1508 in an array. The fine grid points, for example, have a smaller grid point spacing than the center cell grid points 1504. The geographic area 1500 includes an irregular fixed TA 1506, illustrated with bold lines, that is defined by the fine grid point array. As illustrated, the irregular fixed TA 1506 may include fractions of fixed cells 1502. Similar to regular fixed TAs, an irregular fixed TA may be defined using row (or column) grid point counts and offsets, along with a latitude and longitude of one grid point. With irregular fixed TAs, however, fine grid points 1508 may be used to define the fixed TA instead of cell center grid points 1504 as used with regular fixed TAs. FIG. 15, for example, illustrates the irregular fixed TA 1506 as being defined based on the latitude and longitude of fine grid point 1508$_{TA}$, and for each row of fine grid points, an offset (for rows other than the first row) and either a fine grid point count or a bit map representation, where bit=1 to indicate the inclusion of a fine grid point and bit=0 to indicate exclusion of a fine grid point.

As illustrated, the perimeter of the irregular fixed TA 1506 may extend out by one half of a fine grid point spacing from the outermost defined grid points. The cell center grid points 1504 that are on the perimeter of or within the TA area are defined as belonging to the irregular fixed TA 1506. In some implementations, an irregular fixed TA may be defined as the union of a regular fixed TA (defined via cell centers) and smaller irregular fixed TAs (defined by fine grid points) to reduce data size. In another alternative, an irregular fixed TA may be defined as a polygon (sequence of straight line segments) by defining the vertices of the TA, e.g., using the latitude and longitude of fine grid points 1508.

Figure 16:
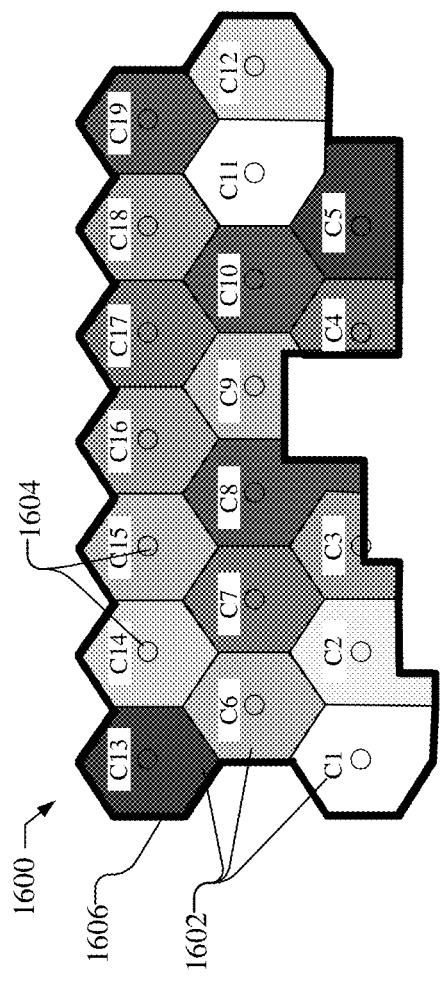
FIG. 16 is a diagram illustrating one implementation of specifying a number of hexagonal fixed cells and an irregular fixed TA defined in a geographic area by a plurality of center cell grid points.

FIG. 16 is a diagram illustrating a geographic area 1600 with a number of fixed cells 1602 defined by a plurality of center cell grid points 1604 and with an irregular fixed TA 1606, illustrated with bold lines. FIG. 16 illustrates a technique for assigning identities to fixed cells with a reduced amount of signaling. The fixed cells in FIG. 16 are each labelled (as C1, C2, C3 etc.) for the purpose of illustration, though these labels do not form part of the cell identities being assigned. In a first step, the fixed cells included in a fixed TA are implicitly ordered according to some known or defined convention. In a second step, identities are assigned to the fixed cells based on their implicit ordering. For the first step, FIG. 16 shows two examples of cell ordering (row wise ordering and alternate row wise ordering), as shown by the two alternative orderings of the cell labels in FIG. 16, but other orderings are also possible. For the second step, cell identities may be assigned consecutively, for example, as:

CellID=TABase Value+Cell sequence number where the TA Base Value is an initial cell identity for the first cell in the TA allows and the Cell sequence number is the position of each cell in the cell ordering (0, 1, 2, 3 etc.). Alternatively, cell IDs may be individually specified via a sequence c1, c2, c3, c4 etc., where the cell ID c1 is assigned to each cell with sequence number i.

For an irregular fixed TA, e.g., as illustrated in FIG. 16, cells inside the fixed that are adjacent to the fixed TA border (e.g. cells C1, C2, C3, C4, C5, C6, C8, C9, C11, C12, C13, C14, C15, C16, C17, C18, C19 in FIG. 16) may be flagged to assist in the determination of whether UE is inside or outside the fixed TA. The flags, for example, may be provided as a bit map based on the cell ordering. For a UE known to be inside such a flagged cell, more precise location of the UE may be used to determine whether the UE is actually inside the TA, as described below in association with FIG. 18.

Figure 17:
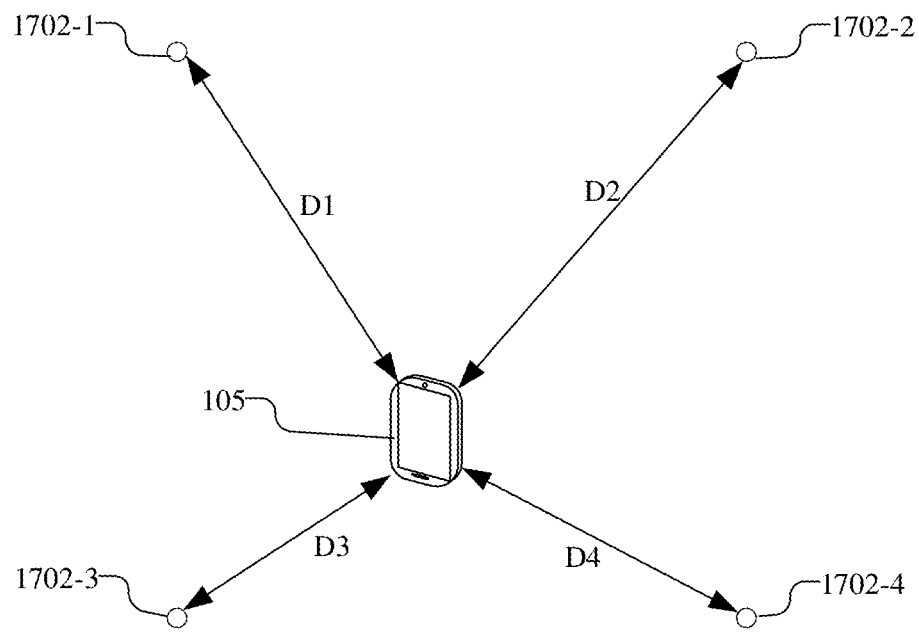
FIG. 17 shows a number of cell center grid points and a UE and illustrates determining the closest cell center grid point for fixed cell determination.

FIG. 17 shows a number of cell center grid points 1702-1, 1702-2, 1702-3, and 1702-4 and a UE 105 and illustrates fixed serving cell and TA determination for a regular TA. As illustrated, the UE 105 is a distance D1 from grid point 1702-1, a distance D2 from grid point 1702-2, a distance D3 from grid point 1702-3, and a distance D4 from grid point 1702-4. The serving cell center grid point may be defined to be the cell center grid point closest to the UE 105. As illustrated in FIG. 17, D3 is less than D1, D2, or D4, and accordingly, grid point 1702-3 is the serving cell center grid point. Typically, the location of UE 105 would be determined (e.g. by UE 105 using GNSS measurements) and then the distances to nearby cell center grid points are determined (e.g. by UE 105) based on known locations for the cell center grid points. Based on the fixed serving cell, the associated regular fixed TA may then be determined (e.g. by UE 105) based on the TA which include the fixed serving cell.

Figure 18:
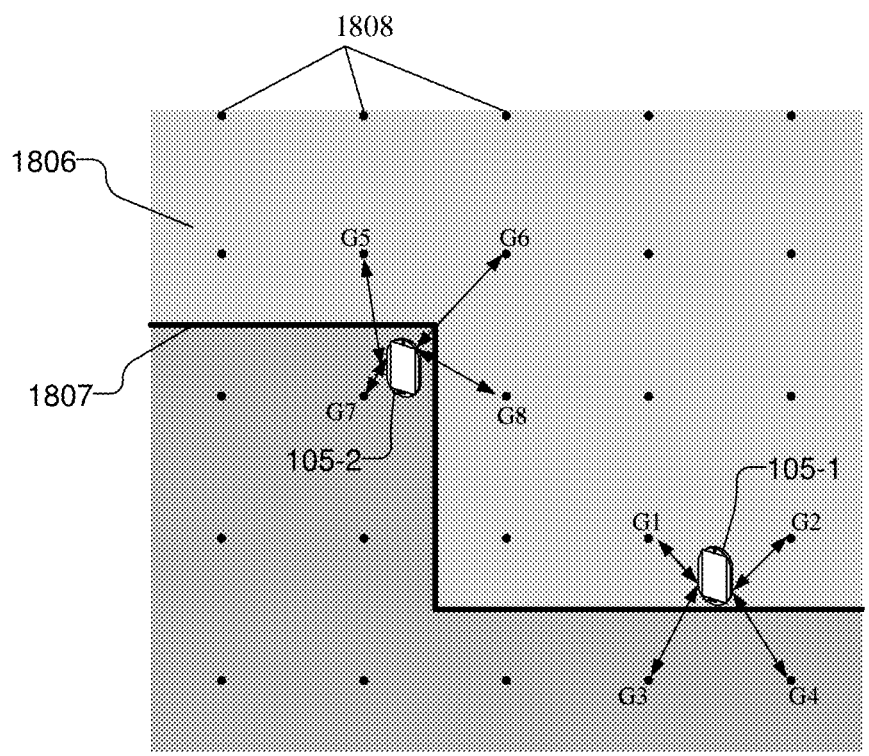
FIG. 18 shows a number of fine grid points and an irregular fixed TA and illustrates determining the closest grid point for fixed TA determination.

FIG. 18 shows a number of fine grid points 1808 and an irregular fixed TA 1806, and two UEs 105-1 and 105-2, and illustrates determination of an irregular fixed TA. Here, the UE 105 or network may first determine the closest cell center grid point within the irregular fixed TA as described for FIG. 17. If the closest cell center grid point indicates proximity to the TA boundary, e.g., boundary 1807, the UE 105 or network may determine whether the UE 105 is inside or outside the fixed TA from either the closest fine grid point when fine grid points are defined or whether the UE 105 is inside or outside a polygon definition for a fixed TA. For example, as illustrated in FIG. 18, the UE 105-1 is inside the fixed TA 1806 as the closest fine grid point G1 belongs to the fixed TA 1806. The UE 105-2, however, is outside the fixed TA 1806 as the closest fine grid point G7 does not belong to the fixed TA 1806.

Figure 19:
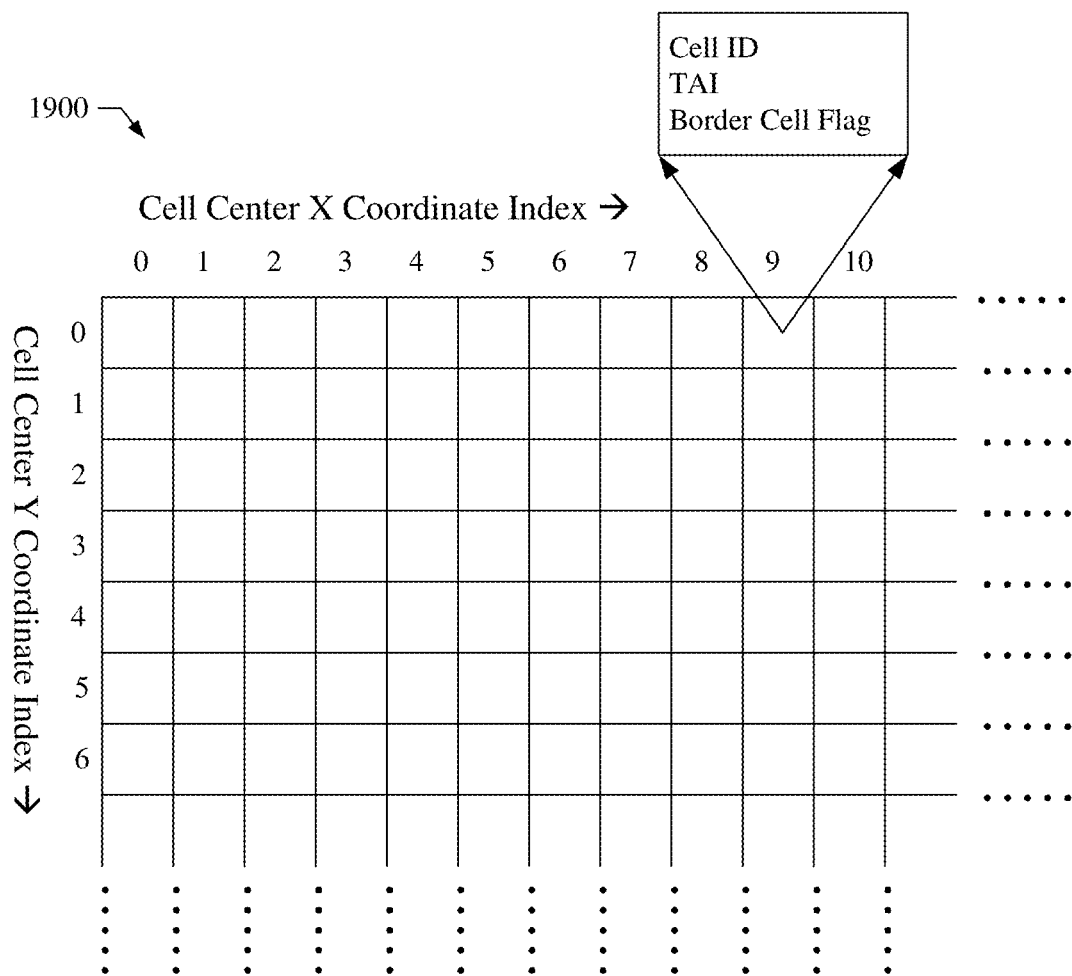
FIG. 19 illustrates an example of a table that includes a compressed description of fixed cell and fixed TA information.

Information descriptive of fixed cells and fixed TAs may be transferred to a UE 105 (or sNB 106/202/307) in a compressed form to reduce signaling. To reduce later processing, the information may be expanded, after being received by a UE 105 (or sNB 106/202/307) into a table indexed by cell center X and Y coordinate indices. FIG. 19 illustrates an example of a table 1900 that is indexed by a cell center X coordinate index and a cell center Y coordinate index. A reference cell center (e.g., $1104_{T4}$, $1204_{T4}$, $1304_{T4}$, or $1404_{T4}$) is used for the origin (<0,0> where X=0 and Y=0) and subsequent cell centers either East or West and either South or North of this receive increasing X and Y indices. Stored information for each cell (having particular a pair of cell center X and Y indices) may include either a "not applicable" indication if the cell is not part of any TA or a Cell ID, Tracking Area Identifier (TAI) and an indication for an irregular TA as to whether the cell is adjacent to a TA border. To determine a serving cell for a UE 105, a location for the UE 105 may first be obtained and then converted to X and Y coordinate indices by determining the closed X coordinate and closest Y coordinate based on known location coordinates for the array of cell centers (e.g. as further described below for FIG. 20). Serving cell information for the UE 105 including serving cell ID and TA may then be obtained by a simple table lookup.

Figure 20:
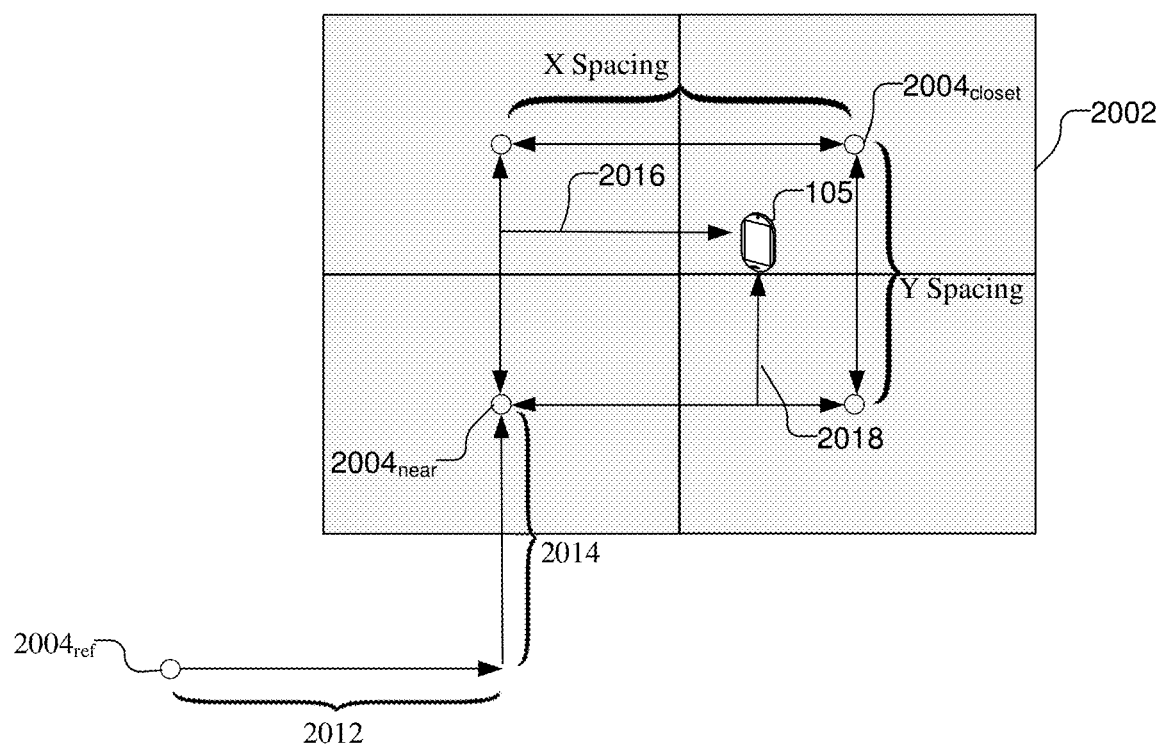
FIG. 20 shows a number of grid points and one implementation of determining a closest grid point based on location of a user equipment (UE).

FIG. 20 shows a number of grid points 2002, which may be cell centers or fine grid points and a UE 105 and illustrates one implementation of the determination of a closest (e.g. serving) cell center or fine grid point. The location of the UE 105 may be determined (e.g. using GNSS) in terms of latitude and longitude, which may be converted into cell coordinate indices by subtracting a latitude and longitude, respectively, for a reference cell center $2004_{ref}$ and then dividing by a Y (latitude) and X (longitude) spacing, respectively. For example, an X cell coordinate index 2012 may be determined as:

$$X \text{ cell coordinate index} = \left\lfloor \frac{UE \text{ Longitude} - \text{Reference Longitude}}{X \text{ Spacing}} \right\rfloor, \quad \text{Eq. 1}$$

and a Y cell coordinate index 2014 may be determined as:

$$Y \text{ cell coordinate index} = \left\lfloor \frac{UE \text{ Latitude} - \text{Reference Latitude}}{Y \text{ Spacing}} \right\rfloor, \quad \text{Eq. 2}$$

The X and Y cell coordinate indices define a nearby cell center grid point, e.g., grid point $2004_{near}$, which may or may not be the closest grid point to the UE 102. The X and Y coordinate offsets for the UE 102 from this nearby cell center grid point $2004_{near}$ may also be obtained via modulo operations. For example, the X cell center offset 2016 may be determined as:

$X$cell center offset=(UE Longitude-Reference Longitude)mod $X$spacing,     Eq. 3 and the Y cell center offset 2018 may be determined as:

$Y$cell center offset=(UE Latitude-Reference Latitude) mod $Y$spacing,     Eq. 4

The determined X and Y offsets may be used to determine the coordinate indices of the closest cell center grid point $2004_{closest}$, which is the cell center for the fixed cell 2002 within which the UE 102 is located. For example, if the determined X offset is greater than half the X spacing, the X cell coordinate index is increased by one and similarly, if the determined Y offset is greater than half the Y spacing, the Y cell coordinate index is increased by one, to define the closest cell center grid point $2004_{closest}$.

For hexagonal fixed cells, alternate shifting of cell centers by one half the spacing needs to be take into account for the offset calculation. A UE 105 or sNB 106/202/307 may perform a simple table lookup to obtain the cell related information, e.g., using a table similar to that shown in FIG. 19. Determination of a closest fine grid points employ the same techniques as in FIG. 20 but using the fine grid point spacings and reference latitude and longitude.

The previous definitions, techniques and their examples in which fixed TAs and fixed cells are associated with one another by requiring (or assuming) that each fixed cell belongs to only one fixed TA, similar to terrestrial cells and TAs, may lead to some complexity in defining fixed cells and fixed TAs and identifying a fixed serving cell and associated fixed TA for a UE 105 with satellite access.

Accordingly, in some implementations, fixed TAs and fixed cells are defined independently of one another, which may provide a simplified solution. In one implementation, the cell identifier for each fixed cell may be defined using latitude and longitude coordinates of a UE 105. Thus, a serving cell ID for a UE 105 (e.g., in a non-access stratum (NAS) message or a session initiation protocol (SIP) message) is replaced by the location of the UE 105 (e.g., latitude and longitude coordinates (lat/long)). This means that fixed cells are no longer pre-defined but are represented by locations. The use of a UE 105 lat/long in place of a cell ID will impact 5GCN 110 features that make use of a serving cell ID (e.g., for routing of an EM call or broadcast of a WEA alert).

In another implementation, referred to as implementation I1, the cell identifier for each fixed cell may be defined by coarsened latitude and longitude coordinates of the UE 105, e.g., pseudo lat/long. For example, the UE 105 latitude and longitude may be expressed as signed binary fractions (e.g. of 90° for latitude or 180° for longitude) and coarsened by either truncating less significant binary digits or rounding less significant binary digits in order to fit into a predetermined number of bits, e.g., 36 bits. The coarsened lat/long may be unique both within a PLMN and worldwide, and accordingly, may be used as a fixed cell ID. The use of a coarsened lat/long as a fixed cell ID could enable fixed cell IDs to be retained and treated either as cell IDs or as coarse UE locations. If the coarsened lat/long is to remain unique worldwide, the precision of each of the latitude and longitude coordinates (after coarsening) may be around 75 meters, e.g., for latitude and longitude each expressed using 18 bits, which would mean a minimum UE location error (when a cell ID is used as a location) of around 100 meters. However, with lat/long restricted to a smaller geographic region, location error may be reduced by a factor of 2 or 4 or more, e.g., to around 25 meters for the US.

Cell IDs defined by coarsened latitude and longitude coordinates, as just described, would define locations of a rectangular array of grid points (e.g. as shown in FIG. 11). When rounding of location coordinates is used to fit into a predetermined number of bits, which may be equivalent to applying Definition A described previously, cell areas would be rectangular with the location of each cell ID being at the center of the associated cell area. With truncation of location coordinates to fit into a predetermined number of bits, cell areas would also be rectangular but with the location of each cell ID being at one corner of the associated cell area.

In another implementation, referred to herein as implementation I2, fixed cells may be defined using a rectangular or hexagonal grid point array of cell centers as described in FIGS. 7-19. For example, each grid point in an array of grid points may define one fixed cell and has one associated cell identifier. Definition A described previously may be used, whereby a fixed cell includes a coverage area of locations that are closer to a location of the grid point for that fixed cell than to a location of any other grid point in the array of grid points. Two or more alternative arrays may be defined with different grid point spacings to define fixed cells of different sizes, e.g., closer spaced grid points may be used for small fixed cells for urban and suburban areas and wider spaced grid points may be used for larger fixed cells for rural and other sparsely populated areas.

In implementation 12, fixed TAs may be defined using a fine grid point array, e.g., as described in FIGS. 7, 8, 9, 10, 15 and 20. The definition of each fixed TA may be based on fine grid points and may not make use of fixed cells or an array fixed cell centers. Alternatively, in implementation 12, a fixed TA may be defined as a polygon (e.g., by defining the lat/long for a sequence of vertices of the fixed TA) or as some other geometric shape such as circle or ellipse. In implementation 12, fixed TAs may also be defined using a mixture of different shapes.

In implementation 12, the definitions of fixed cells and fixed TAs are allowed to be independent of one another. A consequence is that a fixed cell may not wholly lie inside just one fixed TA but may overlap with two or more TAs. This independence may make definition simpler. For example, if a fixed TA is defined as an irregular polygon, attempting to define a large number of fixed cells that must all be wholly included within the TA could be complex. But if fixed cells are defined separately from fixed TAs, the complexity disappears. Although this means that some fixed cells may not each be part of just one fixed TA, this may not matter since global cell IDs may not contain a TA identity (TAI) and may thus not be required to identify a unique TA. Instead, fixed cell IDs and TAIs may be used for their respective purposes without mutual conflict (e.g. to support paging and mobility in the case of TAIs and regulatory services and approximate location of a UE 105 in the case of fixed cell IDs).

However, if it is preferred to define and identify fixed cells which are each wholly within a single fixed TA, the independent definition of fixed cells and fixed TAs as just described for Implementation I2 may be extended. This may be done by defining fixed cell IDs as having two components—a base ID corresponding to an initial independent definition of a "base cell" (e.g. a rectangle or hexagon for a regular array of grid points) and a color code which is appended to the base ID and corresponds to a fixed TA within which a portion of the base cell is included.

Figure 21A:
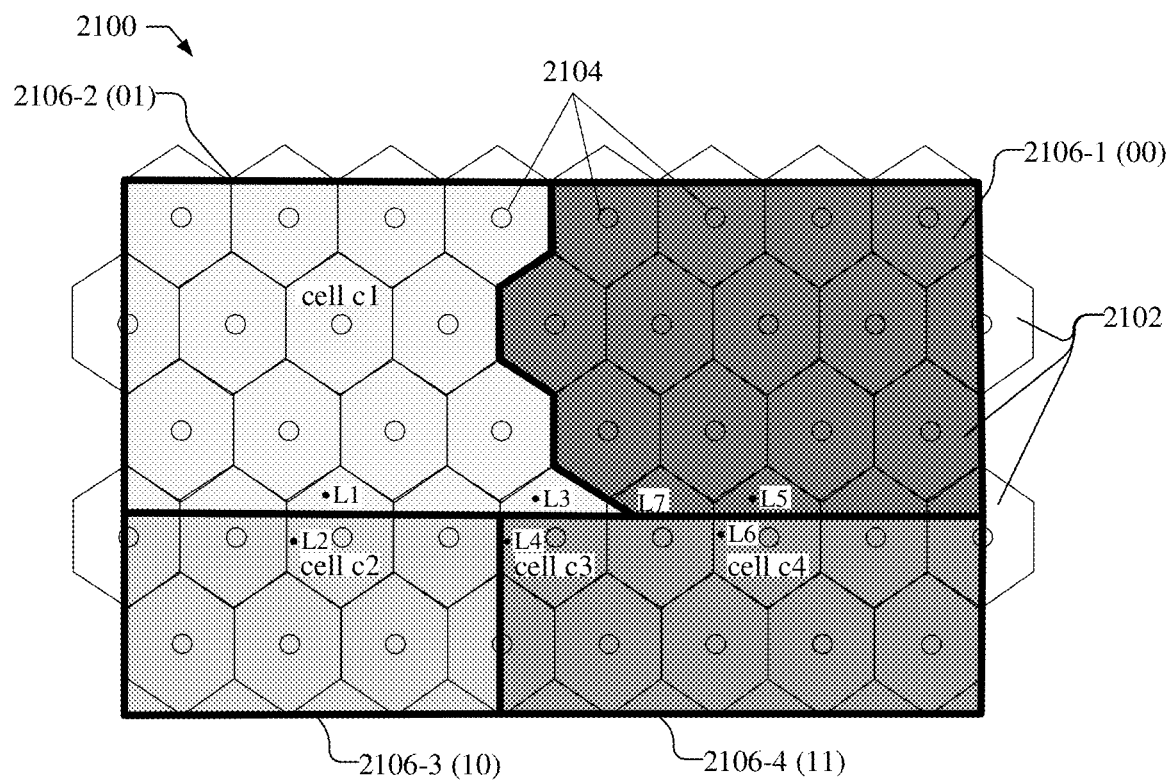
FIGS. 21A and 21B are diagrams illustrating implementations of independently defining fixed cells and fixed TAs in a geographic area in which TA color codes are used to define unique cell portions.
Figure 21B:
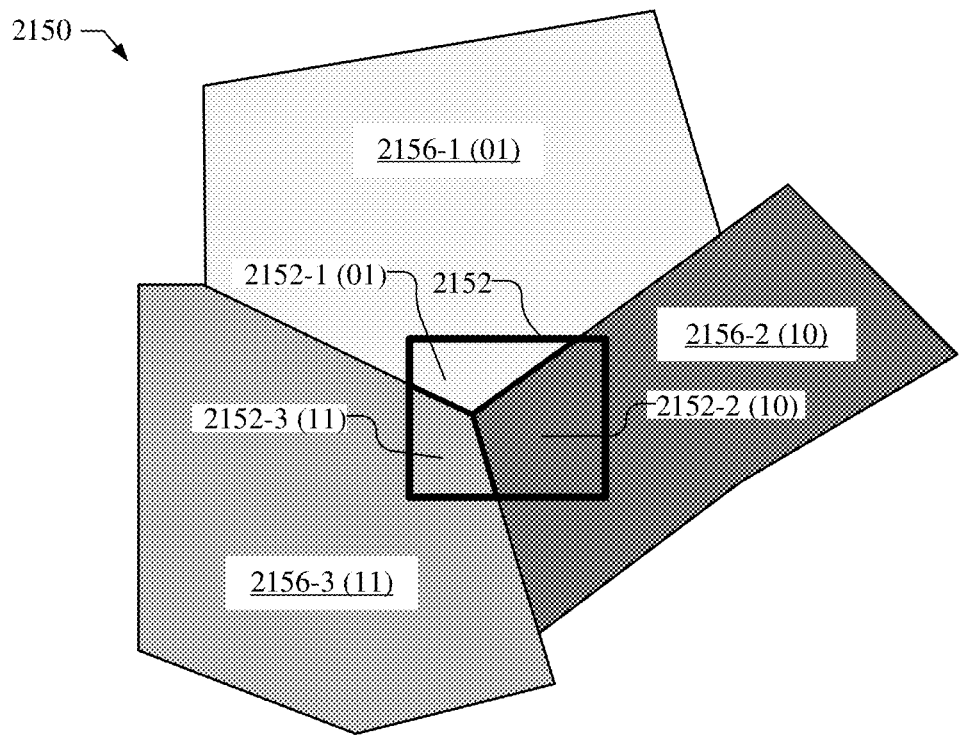

FIGS. 21A and 21B provide an illustration of Implementation I2 in which TA color codes are used to define unique cell portions and unique cell IDs. Unless specified otherwise, FIGS. 21A and 21B may be jointly referred to as FIG. 21.

FIG. 21B illustrates a geographic region 2150 that includes a rectangular base cell 2152 that overlaps with three separate fixed TAs 2156-1, 2156-2 and 2156-3 (collectively referred to as TAs 2156). By way of example, the three TAs 2156 may be color coded with three colors using 2 bits, e.g., TA 2156-1 is coded binary 01 (green), TA 2156-2 is coded binary 10 (yellow), and TA 2106-3 is coded binary 11 (red). The base cell 2152 is split into three separate cell portions 2152-1, 2152-2, and 2152-3, which may each be assigned a unique cell ID by adding (e.g. appending or prepending) the color code of each TA to an ID for the base cell 2152. To illustrate this for FIG. 21B, assume that the base cell 2152 has an ID cccccc, where cccccc represents a bit string with (for example) 34 bits. Cell portion 2152-1 can then have a cell ID cccccc01, cell portion 2152-2 can have a cell ID cccccc10, and cell portion 2152-3 can have a cell ID cccccc11. These new cells IDs are all distinct and have (in this example) 36 bits which can happen to be the size of a cell ID defined for 5G NR.

In a more general case, the serving cell ID for any UE 105 could be determined from both a base cell in which the UE 105 is located (e.g. the rectangular cell 2152 in FIG. 21B) and the TA in which the UE 105 is located (e.g. TA 2156-1, 2156-2, or 2156-3 in FIG. 21B). The color codes could enable a unique cell ID for the UE 105 as long as no two fixed TAs that share part of the same boundary or the same vertex have the same color code and as long as base cells are small enough to overlap with no more than one common vertex for the fixed TAs.

With a further (optional) restriction that no more than three fixed TAs share a common vertex (which means in general that the three fixed TAs will also share part of a common boundary), then the requirement of having different color codes becomes equivalent to coloring a map with no two adjacent countries sharing the same color. This corresponds to the well known Four Color Theorem, which states that four colors are enough. Hence, with these restrictions, four TA color codes (requiring just 2 bits) could be enough to generate unique cell IDs, which is a reason for using the term "color code".) In this case, base cell IDs may comprise 34 bits as in the example for FIG. 21B—leading to normal 36 bit cell IDs as used for 5G NR when extended with the 2 bit color code.

As an example of implementation I2, basic fixed cell IDs may be defined (independently of TAs) using 34 bits, which are used whenever a fixed serving TA does not need to be known. For example, the 34 bit cell IDs may be used to approximate a location of a UE 105 based on a location for a fixed serving cell, or to route an EM call to a PSAP associated with a serving cell ID. A 2 bit color code associated with a fixed TA in which a UE 105 is located may be appended to a basic fixed cell ID for a serving cell for the UE 105, resulting in a 36 bit ID for the portion of the fixed serving cell that is located inside the fixed TA. The 36 bit fixed cell ID may be used for signaling (e.g., included in Radio Resource Control (RRC) and NGAP messages) and may be used to determine a fixed TA for the UE 105 and/or to identify the serving cell portion for the UE 105 that is inside the fixed TA.

FIG. 21A provides another illustration of a geographic area 2100 that includes a number of fixed cells 2102 and a number of fixed TAs 2106-1, 2106-2, 2106-3, and 2106-4 (collectively referred to as fixed TAs 2106), which are defined independently of each other. The fixed cells 2102, for example, may be defined based on a plurality of cell center grid points 2104, or based on other techniques, such as defining a cell identifier based on coarsened location coordinates of the UE 105. As illustrated in FIG. 21A, the cell centers 2104 may be defined by rows and columns that are alternately offset from one another by half of the inter-cell center distance, resulting in hexagonal fixed cells 2102.

The boundaries of the fixed TAs 2106 (shown by the bold lines) are defined independently from the fixed cells 2102 and only partially align with fixed cell boundaries. For example, the fixed TAs 2106 may be defined based on an array of fine grid points (such as that illustrated in FIG. 15) or based on a sequence of vertices of the fixed TAs 2106. The fixed TAs are color coded with four colors using two bits. As illustrated, some fixed cells 2102 overlap with two or three fixed TAs 2106, such as fixed cells c2, c3, and c4.

Each fixed TA 2106 may be assigned a distinct 24 bit tracking area code (TAC) and a 2 bit color code. Each fixed cell 2102 may be assigned a distinct 34 bit cell identity, e.g., which may include an sNB identity. A 36 bit unique cell identity (ID) may be obtained by combining the 34 bit fixed cell ID with the 2 bit fixed TA color code. Combining the fixed cell ID and the fixed TA color code results in two or more unique cell IDs for fixed cells 2102 that overlap two or more fixed TAs, which may be treated as identifying separate fixed cells. A 2 bit color code may suffice provided only 3 fixed TAs share a common vertex, e.g. as at location L7. When 4 or more fixed TAs share a common vertex, a 3 (or 4) bit color code may be used.

Byway of example, the fixed TAs 2106 in FIG. 21B may be color coded with four colors using 2 bits, e.g., fixed TA 2106-1 is 00 (blue), fixed TA 2106-2 is 01 (green), fixed TA 2106-3 is 10 (yellow), and fixed TA 2106-4 is 11 (red). The fixed cells 2102 may be each assigned a 34 bit cell identity (cid), e.g., fixed cell c1 is assigned <cid1>, fixed cell c2 is assigned <cid2>, fixed cell c3 is assigned <cid3>, and fixed cell c4 is assigned <cid4>, where each of <cid1>, <cid2>, <cid3> and <cid4> represents a sequence of 34 bits. By combining a 34 bit fixed cell identity with a 2 bit color code for a fixed TA, the following 36 bit unique cell IDs are generated for a UE 105 at different locations in different fixed cells as indicated in Table 1.

TABLE 1

| UE 105 Location and Cell | 36 Bit Unique Cell ID |
| --- | --- |
| Any Location in Cell c1 | <cid1>01 |
| Location L1 in Cell c2 | <cid2>01 |
| Location L2 in Cell c2 | <cid2>10 |
| Location L3 in Cell c3 | <cid3>01 |
| Location L4 in Cell c3 | <cid3>11 |
| Location L5 in Cell c4 | <cid4>00 |
| Location L6 in Cell c4 | <cid4>11 |

Figure 22:
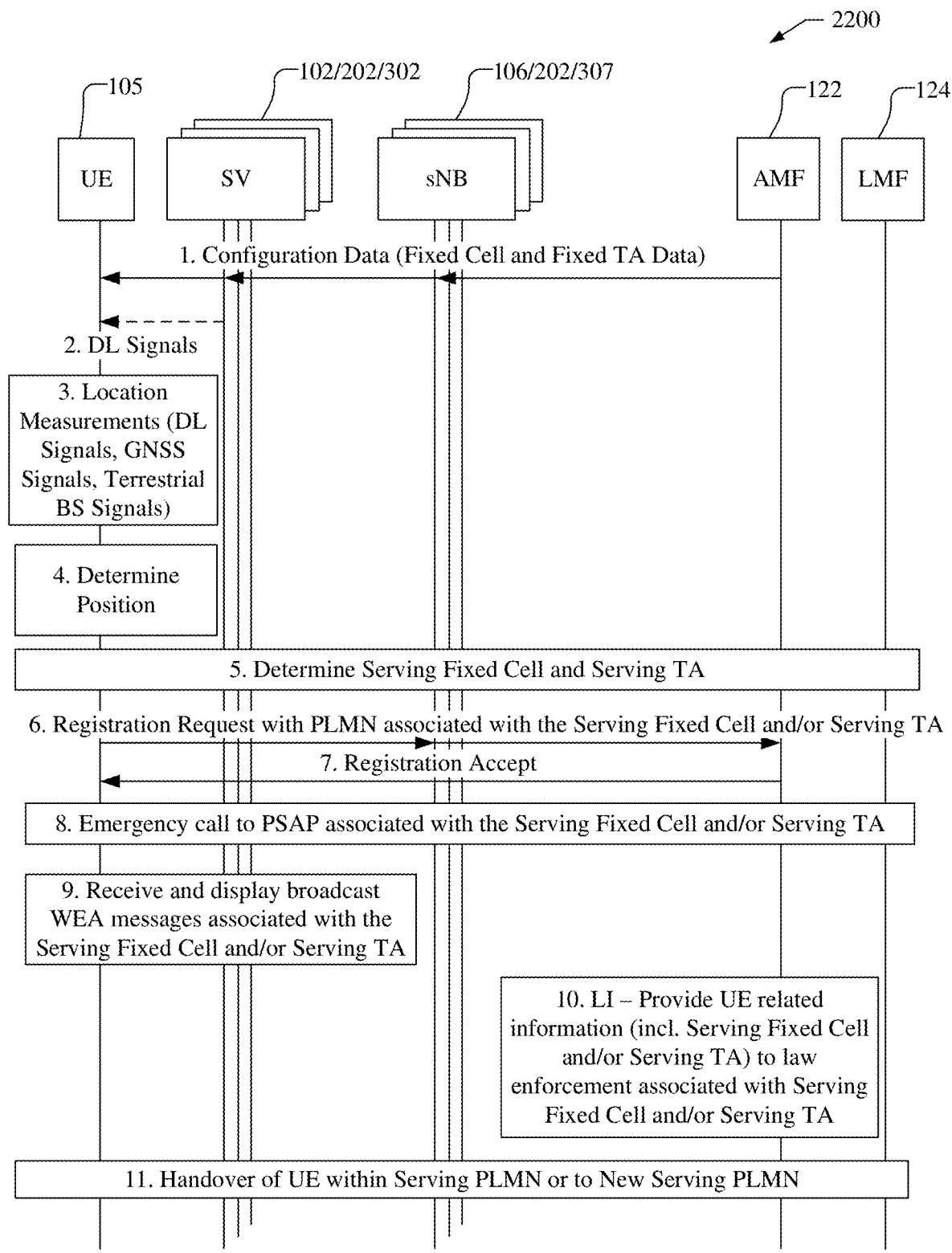
FIG. 22 shows a signaling flow that illustrates various messages sent to support UE access to a serving public land mobile networks (PLMN) through SVs using fixed cells and fixed TAs that are independently defined.

FIG. 22 shows a signaling flow 2200 that illustrates use of fixed TAs and fixed cells to support network access by, and services for, a UE 105 according to the implementations described above, including Implementation I1 and Implementation I2. FIG. 22 shows various messages sent between components of a communication network, such as communication networks 100, 200, and 300 depicted in FIGS. 1, 2, and 3, respectively FIG. 22 illustrates a procedure for a UE 105 to access a serving PLMN through SVs 102/202/302 and sNBs 106/202/307. The sNBs 106/202/307 are illustrated as separate from the SVs 102/202/302 for clarity, but it should be understood that an sNB 106/202/307, or a portion of an sNB 106/202/307, may be included within an SV 102/202/302. For example, an sNB 202 would typically be part of an SV 202, and an sNB 307 (or sNB-CU 307) would typically be in communication with one or more sNB-DUs 302 that are part of SVs 302.

At stage 1 in FIG. 22, configuration data is transmitted from an AMF 122 to a UE 105 via an sNB 106/202/307 and an SV 102/202/302, e.g., using broadcast or unicast. For example, in the case of the unicast, UE 105 may send a NAS Registration Request message to AMF 122, and AMF 122 may return a NAS Registration Accept message to UE 105 which includes the configuration data. The configuration data includes, for example, configuration information related to fixed cells and/or fixed TAs in the wireless coverage of the SV 102/202/302 and that is associated with a serving PLMN for UE 105. As discussed above, for example, the fixed cells and/or fixed TAs may be defined as fixed geographic areas and may be defined independently of each other. Each fixed cell is assigned a cell identifier and each fixed TA is assigned a tracking area code (TAC) and an optional color code, where adjacent fixed TAs are assigned different color codes. The configuration information for the fixed cells may include locations of grid points in an array of grid points and cell identifiers associated with the array of grid points, e.g., where each grid point defines a fixed cell and has one associated cell identifier. A fixed cell includes a coverage area of locations that are closer to the grid point for that fixed cell than to any other grid point. Similarly, the configuration information for the fixed TAs may include locations of grid points in an array of grid points and tracking area codes and color codes associated with the array of grid points, e.g., where each grid point defines a fixed TA and has one associated TA code and one optional associated color code. A fixed TA may include a coverage area of locations that are closer to a location of the grid point for that fixed TA than to any other grid point. Alternatively, the configuration information for a fixed TA may include locations of vertices for a plurality of polygons and tracking area codes and optional color codes associated with the plurality of polygons. Each polygon in the plurality of polygons may define a fixed TA and has an associated TA code and optional associated color code, and the fixed TA includes a coverage area of locations contained within the polygon.

At stage 2, the UE 105 may receive DL signals from one more SVs 102/202/302.

At stage 3, the UE 105 may obtain location measurements from the DL signals from SVs 102/202/302 from stage 2. The UE 105 may additionally or alternatively obtain location measurements from DL signals received from GNSS SVs 190 and/or terrestrial base stations (BSs) such as gNB 114.

At stage 4, the UE 105 may obtain its position based on the location measurements. The UE 105, for example, may determine its position using a UE based positioning method or a UE assisted positioning method. With a UE based positioning method, the UE 105 computes a location of the UE 105 (e.g. with the help of assistance data received from a location server such as LMF 124 or broadcast by SVs 102/202/302). With a UE assisted positioning method, the UE 105 may send the location measurements to a location server (e.g. LMF 124) for computation of a location estimate for UE 105, which may be returned by the location server to UE 105.

At stage 5, a fixed serving cell and/or a fixed serving TA in which the UE 105 is located is determined by the UE 105 and/or by one more network entities including sNB 106/202/307, AMF 122, and LMF 124, based on the position of the UE obtained at stage 4 and the configuration information for the fixed cells and the fixed TA. For example, as discussed above for FIGS. 17, 18 and 20, a grid point closest to the UE 105 location may be used to determine a fixed serving cell and/or a serving TA. Alternatively, the location of the UE 105 may be converted to X and Y coordinate indices and used to look up a serving cell and serving TA code in a table, as described for FIG. 19. A network entity (e.g. the UE 105, an sNB 106/202/307 or AMF 122) may generate a unique PLMN identifier (e.g. a unique cell ID) for the fixed serving cell using the cell identifier for the fixed serving cell and, optionally, the color code for the fixed serving TA in which the UE 105 is located, as described for FIG. 21.

At stage 6, the UE 105 sends a Registration Request message through an SV 102/202/302 and a serving sNB 106/202/307 to the AMF 122 of a PLMN that is associated with the fixed serving cell and/or the fixed serving TA in which the UE 105 is located, as determined at stage 5. The association of the PLMN to the fixed serving cell and/or the fixed serving TA may be part of the configuration data received at stage 1.

At stage 7, the AMF 122 returns a Registration Accept message to the UE 105 through sNB 106/202/307 and SV 102/202/302. Stages 4-7 may be repeated to re-register with the same PLMN or register with a different PLMN, e.g., if the UE 105 moves to a new serving TA for the same PLMN or moves to a new serving TA that is associated with a different PLMN.

At stage 8, the UE 105 may make an emergency call to a PSAP associated with the fixed serving cell and/or fixed serving TA in which the UE 105 is located. For example, the UE 105 may include the unique PLMN identifier (e.g. a unique cell ID for the fixed serving cell), as determined at stage 5, in a SIP INVITE request that is sent to the PLMN through the SV 102/202/302 and sNB 106/202/307. The serving 5GCN 110, illustrated with AMF 122 and LMF 124 in FIG. 22 may then route the EM call to a PSAP associated with the unique PLMN identifier.

At stage 9, the UE 105 may receive and display broadcast WEA messages associated with the fixed serving cell and/or the fixed serving TA, e.g., based on the unique PLMN identifier determined at stage 5. For example, the sNB 106/202/307 and SV 102/202/302 may broadcast a WEA message associated with the unique PLMN identifier. Alternatively, the sNB 106/202/307 and SV 102/202/302 may broadcast a list of applicable WEA message IDs for each unique PLMN identifier, e.g., in the DL signals of stage 2, and may also provide the WEA messages separately, and the UE 105 may display the appropriate WEA message(s) based on the unique PLMN identifier.

At stage 10, the AMF 122 may provide UE related information, including the unique PLMN identifier for the UE 105, to law enforcement associated with the fixed serving cell or fixed serving TA. If the UE 105 moves into a new fixed cell or new fixed TA and reports the movement to the PLMN, the AMF 122 may provide the updated UE information to law enforcement associated with the new fixed cell or new fixed TA.

At stage 11, a handover of UE 105 within the serving PLMN or to a new serving PLMN may be performed, based on movement of UE 105 to a new fixed serving cell and/or a new fixed serving TA.

To support paging of a UE 105 in the same way as for terrestrial NR access, each sNB 106 (with transparent mode) or sNB-CU 307 (with regenerative mode with split architecture) may have a defined and well known service area comprising one or more fixed TAs. This may not preclude supporting the same fixed TA by two or more sNBs 106 or two or more sNB-CUs 307 or having some variation in the current radio coverage area of an sNB 106/307 due to variation in the radio beams coverage of SVs 102/302 controlled by the sNB 106/307. But it may preclude sNBs 106/307 from shifting support between different fixed TAs at different times.

With a well-defined association between fixed TAs and sNBs 106/307, a serving AMF 122 may direct a paging request for a UE 105 only to those sNBs 106/307 supporting the current fixed TA for the UE 105 just as for paging of a UE from certain gNBs 114 in the case of terrestrial NR access.

SNBs 106 (or sNB-CUs 307) may also broadcast, in a SIB for each supported radio cell, the fixed TA(s) currently supported by that radio cell. This may assist a UE 105 in determining its current fixed TA as well indicating to a UE 105 whether a registration is needed for a change of TA.

The support of fixed TAs by sNBs 106 or sNB-CUs 307 may mean that at least fixed TA areas must be known by sNBs 106 or sNB-CUs 307 in order to determine the fixed TA(s) supported by each radio cell and to maintain radio cell coverage within the supported fixed TA(s) only.

A serving AMF 122 may provide a geographic definition of the fixed TAs allowed for a UE 105 and associated fixed cells as part of Registration. This data may be pre-configured in an AMF 122 and may not need to be interpreted or processed—making support quite simple.

A UE 105 with a location capability may periodically determine its current fixed TA and current fixed serving cell. The current fixed TA may be used to determine when a new registration is needed, e.g., if a UE 105 moves outside of its allowed set of fixed TAs. The current fixed serving cell may be used to support regulatory services as described elsewhere herein and may also be included for mobile originating services where defined in order to provide location information to the network (e.g., a 5GCN 110 and/or NG-RAN 112).

For a UE 105 without a location capability, an sNB 106 or sNB-CU 307 may determine a current fixed TA and possibly a current fixed cell from the current radio cell and radio beam used by a UE 105. This may be enough to support UE 105 access though regulatory services may be provided less precisely.

Aspects of SOLUTION 2, which may be used to support transfer of both transparent SVs and regenerative SVs from a first earth station to a second earth station, are next discussed with reference to FIGS. 23 to 36.

An orbiting SV 102/202/302 that is in a LEO or MEO will typically communicate with an ES 104 (or possibly several ESs 104) that is in Line Of Sight (LOS) to the SV 102/202/302. The SV 102/202/302 may remain in communication with the ES 104 for a period P and over an orbital distance D that depends on the height of the SV 102/202/302 above ground level, the perpendicular distance of the ES 104 from the orbital plane of the SV 102/202/302, as measured over the surface of the Earth, and the minimum angle of elevation of the SV 102/202/302 as seen from the ES 104 for which communication remains possible. A typical minimum angle of elevation may be around 10 degrees and a typical SV 102/202/302 height for a LEO orbit may be around 600 to 1200 kilometers. Under these conditions, the period of communication P may be in the range of 5 to 15 minutes and the associated orbital distance D may be in the range of 2000 to 6500 kilometers for an ES 104 that is within 2500 kilometers (for an SV height of 1200 kilometers) or 1500 kilometers (for an SV height of 600 kilometers) of the SV 102/202/302 orbital plane. Following the period of communication P, the SV 102/202/302 would need to be transferred to a new ES 104 (or several new ESs 104). Alternatively, signaling related to radio cells supported by the SV 102/202/302 might be transferred one at a time or in batches to a new ES 104 in order to avoid transfer of all the signaling for the SV 102/202/302 at the same time, which might be more disruptive to UEs 105 currently accessing the SV 102/202/302. In either case, however, the transfer of an SV 101/202/302 and/or of radio cells for the ES 102/202/302 from one ES 104 to another ES 104 may be disruptive to UEs 105 currently accessing the SV 102/202/302 due to a need to reestablish a new SV-ES radio link and reestablish signaling connections for the UEs 105.

Static radio cell planning may be used for terrestrial networks and possibly GEO SVs 102/202/302. For example, the location, coverage, capacity, operating times and other parameters of radio cells for terrestrial networks and possibly GEO SVs 102/202/302 may be defined and reevaluated periodically (e.g., monthly) and may remain fixed between successive evaluations.

Dynamic radio cell planning may be used for networks of LEO (and MEO) SVs 102/202/302. For transparent SVs 102, a radio cell definition may remain fixed only for short periods, e.g., for a time period during which a radio cell is supported by the same earth station 104 and/or by the same sNB 106. For example, radio beams supported by an SV 102 could remain static and might be assigned to radio cells for a period during which the radio cells are supported by the same ES 104 and same sNB 106. When an SV 102 or signaling for an SV 102 is transferred to a new ES 104 and possibly a new sNB 106, the static radio beams might be transferred to support a new set of radio cells, thereby also changing the radio cells. This may lead to short term radio cells with lifetimes of the order of a few minutes (e.g. 5 to 15 minutes).

For regenerative SVs 202 and 302, radio cell definitions may remain fixed for longer periods, although the locations and countries in the radio cells' coverage areas may change.

An SVO may need to develop a global (or regional) radio cell plan based on known SV 102/202/302 orbits and MNO demands in different countries and regions at different times of day and days of the week. The radio cell plan may have location, time and SV dimensions, with radio cells being defined for each SV 102/302/302 for each of different time periods and for each of different location areas. For example, the plan may define radio cells for each SV 102/202/302 for a sequence of times (and associated locations of the SV), e.g., taking into account the transfer of each SV 102/202/302 between earth stations 104 and transfer of access to the SV 102/202/302 between sNBs 106/202/307 and/or between 5GCNs 110. The definition of each radio cell may include defining constituent radio beams, radio beam directions, frequencies, bandwidth, Physical Cell IDs (PCIs), power, etc. The plan may be used to predetermine transfers of radio cells and SVs 102/202/302 between earth stations (ESs) 104 and sNBs 106/202/307. For example, an SVO operation and maintenance (O&M) server may deliver information to ESs 104, SVs 102/202/302 and sNBs 106/202/307 to assist in transferring radio cells and SVs 102/202/302 between earth stations ES and sNBs 106/202/307. The information may indicate when the transfer needs to occur and may provide other information regarding the transfers including identifying and defining the radio cells and SVs 102/202/302. For example, the information may be provided for a period of 1-30 days in advance.

As discussed below, handovers (also referred to as transfers), for both transparent SVs 102 and regenerative SVs 202/302, may transfer an SV 102/202/302 from one earth station 104 to another and may also transfer the SV 102/202/302 from one sNB 106/202/307 to another sNB 106/202/307 and/or from one 5GCN 110 to another 5GCN 110. The handovers may allow UEs 105 to continue to access the SV 102/202/302 before, during and after the handover with limited interruption of voice, data and signaling communication using the same the radio cells, which may comprise one or more radio beams supported by the SV 102/202/302. In one implementation, a handover may occur without requiring UEs 105 to change radio cells. For example, signaling may be transported between a first plurality of UEs 105 and a Core Network, e.g., a 5GCN 110, at a first time, during which the signaling is transported via the SV 102/202/302, a first earth station 104 and a first network node, such as an sNB 106, an SV-sNB 202, an SV-sNB-DU 302, or an sNB-CU 307. The signaling is transported between the SV 102/202/302 and the first plurality of UEs 105 using a first plurality of radio cells. The signaling, for example, may include user plane signaling and control plane signaling, e.g., where the user plane signaling includes signaling for data and voice connections between the UEs 105 and external entities, and the control plane signaling includes signaling for connections and associations between the UEs 105 and entities in the Core Network (e.g., such as AMF 122 and SMF 134). At a second time, the transport of the signaling between the first plurality of UEs 105 and the Core Network may cease. Subsequently, the transport of signaling between the first plurality of UEs 105 and the Core Network is enabled via the SV 102/202/302, a second earth station 104 and a second network node, which may be the same network node (e.g., an sNB 106, sNB 202, sNB-CU 307 or sNB-DU 302), or different than the first network node, where the signaling is transported between the SV 102/202/302 and the first plurality of UEs 105 using the first plurality of radio cells.

In some implementations, the handover may occur with some UEs 105 changing radio cells. For example, signaling may be transported between a second plurality of UEs 105 and the Core Network at the first time, during which the signaling is transported via the SV 102/202/302, the first earth station 104 and the first network node and is transported (between the SV 102/202/302 and the second plurality of UEs 105) using a second plurality of radio cells. The second plurality of UEs 105 may be handed over to a third plurality of radio cells supported by one or more new SVs 102/202/302 that are different from the SV 102/202/302 before the second time, i.e., before the transport of the signaling between the second plurality of UEs 105 and the Core Network ceases. Signaling is transported between the second plurality of UEs 105 and the Core Network after the second time, with the signaling being transported via the one or more new SVs 1023/202/302 using the third plurality of radio cells.

Figure 23:
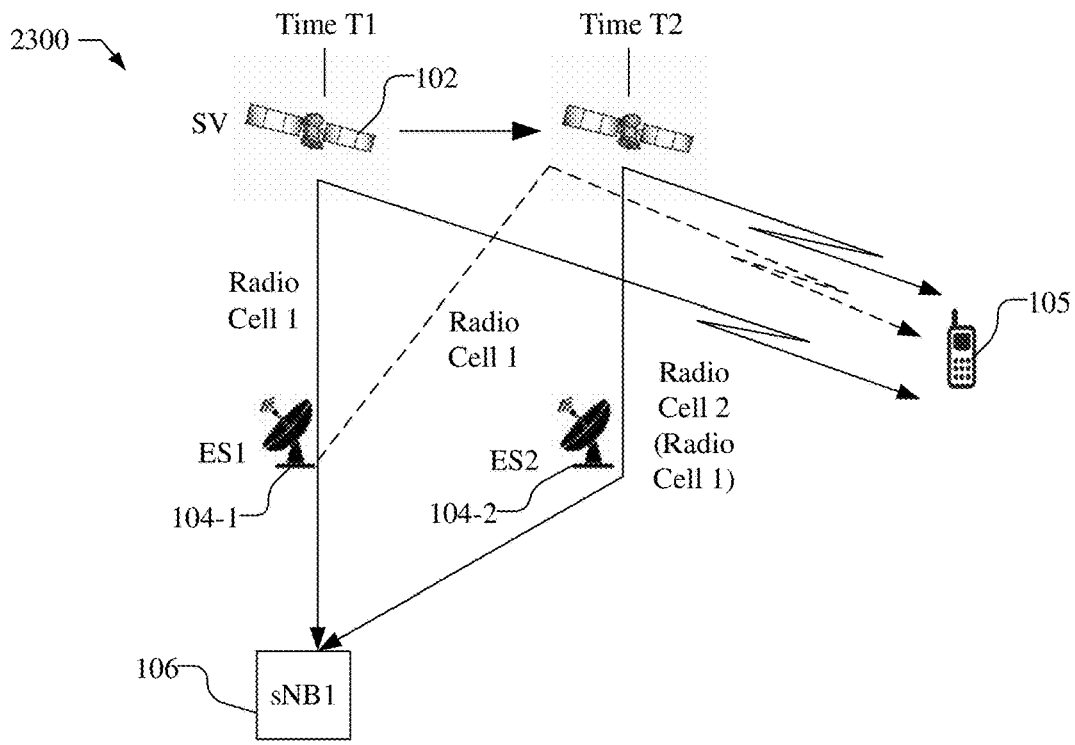
FIG. 23 is a block diagram illustrating a communication system and intra-sNB radio cell transfer between earth stations for a transparent SV.

FIG. 23 is a block diagram illustrating a communication system 2300 using transparent SVs, including entities such as those illustrated in FIG. 1. The communication system 2300, for example, includes an sNB1, which may be sNB 106, a first earth station ES1 and a second earth station ES2, which may be earth stations 104-1 and 104-2, a space vehicle SV, such as a transparent SV 102, and a UE 105. While only one UE 105 is illustrated, it should be understood that a plurality of UEs using one or more radio cells may be part of communication system 2300. As illustrated, the same SV 102 is shown at a time T1 and at a later time T2. FIG. 23 illustrates a procedure for intra-sNB radio cell and/or SV transfer between the earth stations ES1 and ES2 for a transparent LEO SV, such as SV 102.

As illustrated, signaling for a radio cell 1 from SV 102 may pass through earth station ES1 from time T1 to time T2. The radio cell 1 may include one or more radio beams supported by the SV 102. At time T2, signaling for radio cell 1 is transferred from earth station ES1 to earth station ES2, i.e., the signaling between UE 105 and a 5GCN 110 (not shown) through the earth station ES1 ceases, and is established through earth station ES2. For example, the SV 102 may no longer be accessible from earth station ES1 at time T2, thus, requiring the transfer to earth station ES2. If the SV 102 is restricted to transferring data and signaling from and to only one earth station at a time, all radio cells for the SV 102 would be transferred to earth station ES2 at or around time T2, which may be equivalent to transferring (or handing over) the entire SV 102 (or all signaling for the SV 102) from ES1 to ES2. The signaling for radio cell 1 may include user plane signaling and control plane signaling for one or more UEs 105 accessing radio cell 1, where the user plane signaling includes signaling for data and voice connections between each of the UEs 105 and external entities, and where the control plane signaling includes signaling for connections and associations between each of the UEs 105 and entities in a serving 5GCN 110.

Various transfer options may be employed for the intra-sNB radio cell transfer. In one implementation, the radio cell may be changed at transfer. For example, radio cell 1 may be "switched off" at or just before time T2, and a new radio cell (radio cell 2) may be started (initialized) at or just after time T2 using earth station ES2. The radio cell 2, for example, may differ from radio cell 1 in one or more aspects. For example, radio cell 2 may include at least one of a different physical cell identity (PCI), a different global cell identity (e.g. a different radio cell ID), one or more different radio beams, one or more different radio beam directions, one or more different frequency bands, one or more different bandwidths, or a combination thereof. All UEs previously accessing radio cell 1 may be handed off to other radio cells, i.e., a handover procedure may be performed to transfer the UE 105 to another radio cell (and another SV 102 if necessary) prior to the intra-sNB radio cell transfer at time T2.

In another implantation, the radio cell may continue, i.e., remain unchanged after transfer, in which case radio cell 2 may be the same as radio cell 1. For example, as illustrated in FIG. 23, radio cell 1 may be transferred to earth station ES2 at time T2, but may continue unchanged via earth station ES2 except for, e.g., a change in signal timing and possibly a short period of no transmission. If the radio cell continues, some or all of the UEs previously accessing radio cell 1 may remain with radio cell 1 following radio cell transfer. For example, UE 105 may remain with the radio cell 1 following the radio transfer to the earth station ES2 at time T2.

Figure 24:
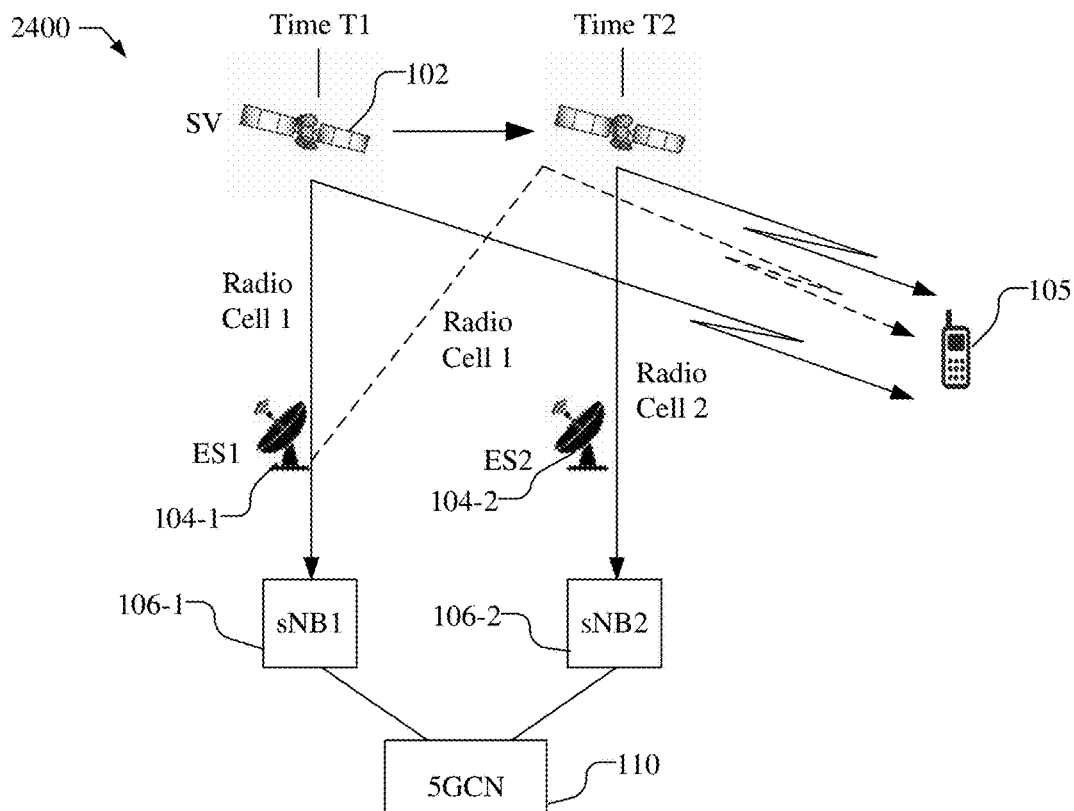
FIG. 24 is a block diagram illustrating a communication system and inter-sNB radio cell transfer between earth stations for a transparent SV.

FIG. 24 is a block diagram illustrating a communication system 2400 using transparent SVs, including entities such as those illustrated in FIG. 1. Communication system 2400 is similar to communication system 2300, and may include a first sNB1 and second sNB2, which may be sNB 106-1 and sNB 106-2, a first earth station ES1 and a second earth station ES2, which may be earth stations 104-1 and 104-2, a transparent space vehicle SV, such as SV 102, a 5G core network, e.g., 5GCN 110, in communication with both sNB1 and sNB2, and a UE 105. As illustrated, the same SV 102 is shown at time T1 and at time T2. FIG. 24 illustrates a procedure for inter-sNB radio cell (or SV) transfer between earth stations ES1 and ES2 for transparent LEO SVs, such as SV 102.

The inter-sNB radio cell transfer may be similar to the intra-sNB radio cell transfer discussed above in FIG. 23, but includes a change of radio cell support from sNB1 to sNB2 at time T2. Thus, at time T2 signaling for a radio cell 1 from SV 102 is transferred from earth station ES1 and sNB1 to earth station ES2 and sNB2. As illustrated, the core network, 5GCN 110 remains unchanged after the radio cell transfer at time T2.

Due to the change of sNB from sNB1 to sNB2 at time T2, the continuation of the radio cell at sNB2 after time T2 may not be performed (e.g. may not be feasible). Thus, the radio cell may be changed at transfer, i.e., radio cell 1 would be changed to a different radio cell 2 at sNB2 at time T2. For example, the radio cell 2 may have a different physical cell ID and/or a different global cell ID than radio cell 1, e.g. a global cell ID for radio cell 2 may include a cell ID that includes an ID for sNB2, while a global cell ID for radio cell 1 may include a cell ID that includes an ID for sNB1. All of the UEs previously accessing radio cell 1 may be handed off to other radio cells, and other SVs 102 if necessary, prior to the radio cell transfer at time T2. This means that a UE 105 may not need to be transferred along with the radio cell at time T2.

Figure 25:
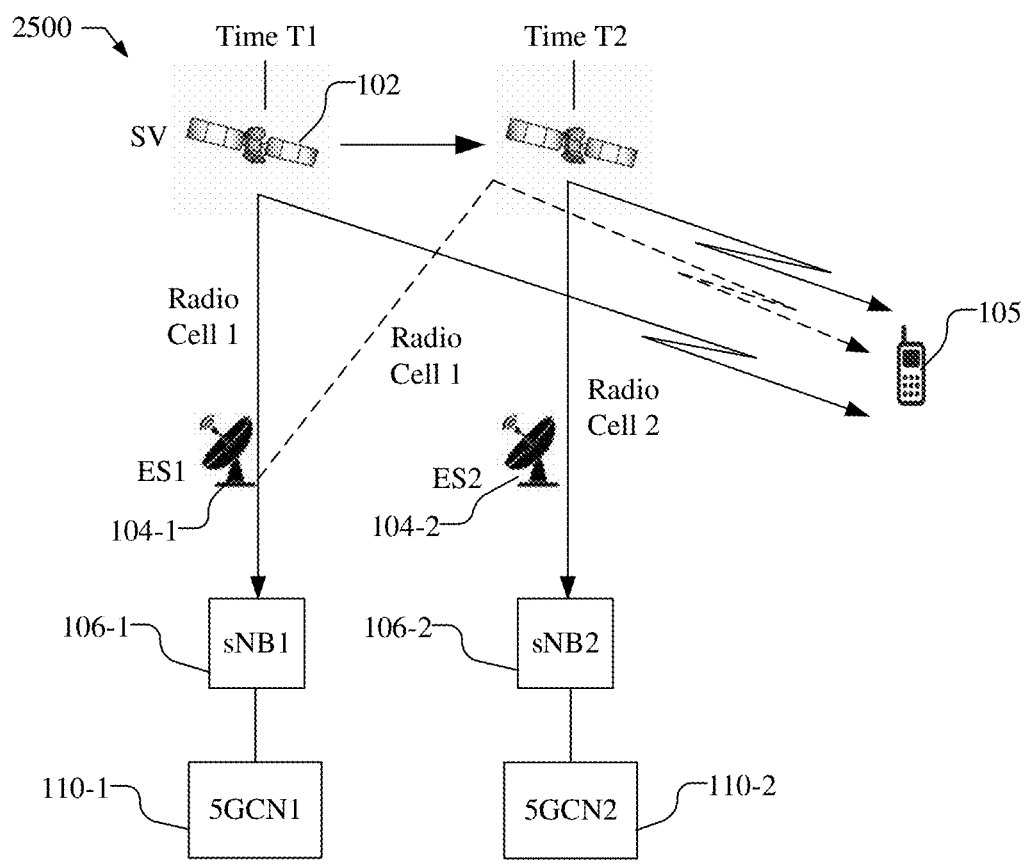
FIG. 25 is a block diagram illustrating a communication system and inter-PLMN radio cell transfer between earth stations for a transparent SV.

FIG. 25 is a block diagram illustrating a communication system 2500 using transparent SVs including entities such as those illustrated in FIG. 1. The communication system 2500, is similar to communication systems 2300 and 2400, and may include a first sNB1 and a second sNB2, which may be sNB 106-1 and sNB 106-2, a first earth station ES1 and a second earth station ES2, which may be earth stations 104-1 and 104-2, a transparent space vehicle SV, such as SV 102, two 5G core networks 5GCN1 and 5GCN2, which may be 5GCN 110-1 and 5GCN 110-2, that are respectively associated with sNB1 and sNB2, and a UE 105. As illustrated, the same SV 102 is shown at time T1 and at time T2. FIG. 25 illustrates a procedure for inter-PLMN radio cell transfer between earth stations ES1 and ES2 for transparent LEO SVs, such as SV 102.

The inter-PLMN radio cell transfer may be similar to the inter-sNB radio cell transfer discussed above in FIG. 24, but includes a change of core networks, e.g., 5GCN1 and 5GCN2 along with the change from sNB1 to sNB2 at time T2. Thus, at time T2 signaling for a radio cell 1 from SV 102 is transferred from earth station ES1, sNB1 and associated 5GCN1 to earth station ES2, sNB2, and associated 5GCN2. By way of example, in one scenario, the locations of sNB1 and sNB2 may be in different countries, thus, prompting a change in the core network at the time of transfer. In another scenario, there may be different licensed coverage areas for 5GCN1 and 5GCN2 again prompting a change in the core network at the time of transfer.

Due to the change of both sNB and 5GCN, continuation of the radio cell at sNB2 after transfer is typically not feasible. Accordingly, radio cell 1 is changed to a different radio cell 2 at sNB2 when the transfer occurs at time T2. All UEs previously accessing radio cell 1 may be handed off to other radio cells, and others SVs 102 if necessary, that are associated with 5GCN1 prior to radio cell transfer at time T2.

For intra-sNB transfer, e.g., as illustrated in FIG. 23, and possibly for inter-sNB transfer, e.g., as illustrated in FIG. 24, continuation of a radio cell may be possible. Continuation of a radio cell may allow some or all UEs that were previously accessing the radio cell to remain with the radio cell following the transfer. If continuation of the radio cell is employed, all of these UEs would need to reacquire the radio cell at about the same time, i.e., around the transfer time T2 shown in FIGS. 23 and 24, which may load the system.

In one implementation (referred to as implementation I3) for continuing a radio cell on behalf of a plurality of UEs 105, which continue to access the radio cell following a transfer of the radio cell as shown in FIGS. 23 and 24, NR physical layer cell timing (referred to as "NR timing" or just as "timing") for the radio cell after the transfer at time T2 may be determined, e.g., calculated by the sNB1 shown in FIGS. 23 and 24, based on known, calculated or measured propagation and transmission delays for sNB to ES, ES to SV, and SV to UE links. For example, the timing may be determined based on a known orbital position of the SV 102, and known, measured or calculated propagation and transmission delays for signaling links between: sNB1 and ES; ES1 and SV 102; sNB1 (or sNB2) and ES2; ES2 and SV 102; and SV 102 and the plurality of UEs. The new NR timing and the time at which it will occur (e.g. time T2) may be provided to each UE 105 in the plurality of UEs 105 by the sNB (e.g., sNB1) prior to the radio cell transfer at time T2. For example, the new NR timing may be provided relative to the previous NR timing as an offset (e.g. an addition or subtraction) to the previous timing. Knowledge of the new NR timing for the radio cell after the transfer at time T2 may enable each of the plurality of UEs 105 to quickly acquire and access the radio cell after time T2, which may avoid or reduce loss or delay of signaling content. Alternatively, in another implementation (referred to as implementation I4), NR timing for the radio cell following transfer may be aligned with the NR timing prior to transfer by avoiding any (significant) change in timing after the radio cell transfer at time T2. This alignment may use the new NR timing determined as described above to calculate a timing correction for the new NR timing which is implemented at the sNB1 or sNB2 at time T2 to cancel out the change in NR timing which would otherwise have occurred at time T2. In this case, the plurality of UEs 105 may not need to be informed of a change in NR timing and may continue to access the radio cell after time T2 without any significant change in their timing. Additionally or alternatively, in another implementation (referred to as implementation I5), a timing advance (TA) for each UE 105 in the plurality of UEs 105 that is applicable after the transfer at time T2 may be determined, e.g., calculated by the sNB1, and may be provided to each UE 105 prior to transfer at time T2.

One or more of implementations I3, I4 and I5 may enable transfer of an RRC signaling link for each UE 105 in the plurality of UEs 105 to the radio cell following transfer of an SV 102 at time T2 and with a brief interruption at the PHY, MAC and RLC layers and with the RLC layer being used to reestablish signaling and data communication for each UE 105 when there is a temporary loss of signaling. In some implementations where the RRC signaling link for a UE 105 cannot be transferred to the radio cell after time T2, the UE 105 may need to reestablish an RRC signaling connection with the sNB1 or sNB2 following radio cell transfer in a manner similar to handover of a UE to a new radio cell.

A change of radio cell may be used for intra-sNB transfer, e.g., as illustrated in FIG. 23, inter-sNB transfer, e.g., as illustrated in FIG. 24, and inter-PLMN transfer, as illustrated in FIG. 25. With a change of radio cell, the new radio cell 2 in FIGS. 23-25 differs from the original radio cell 1. A change of a radio cell may provide an opportunity to change radio cell parameters, such as the cell coverage area, cell ID, cell frequencies and bandwidth. UEs 105 may be offloaded gradually from the radio cell a short time before transfer, e.g., using a standard handoff procedure. In some implementations, radio cells may have a lifetime of up to 5-15 minutes, due to use of the same sNB 106 and same earth station 104, and, thus, UE 105 handoff operations due to radio cell transfer may be relatively infrequent compared to UE 105 handoff due to movement of the radio cell itself while supported by the same earth station 104. For example, for a moving radio cell, e.g., a radio cell produced without using a steerable SV antenna, the handoff interval for any UE 105 may be in the range 6-140 seconds, making a moving radio cell the predominate cause of handover for any UE 105.

Figure 26:
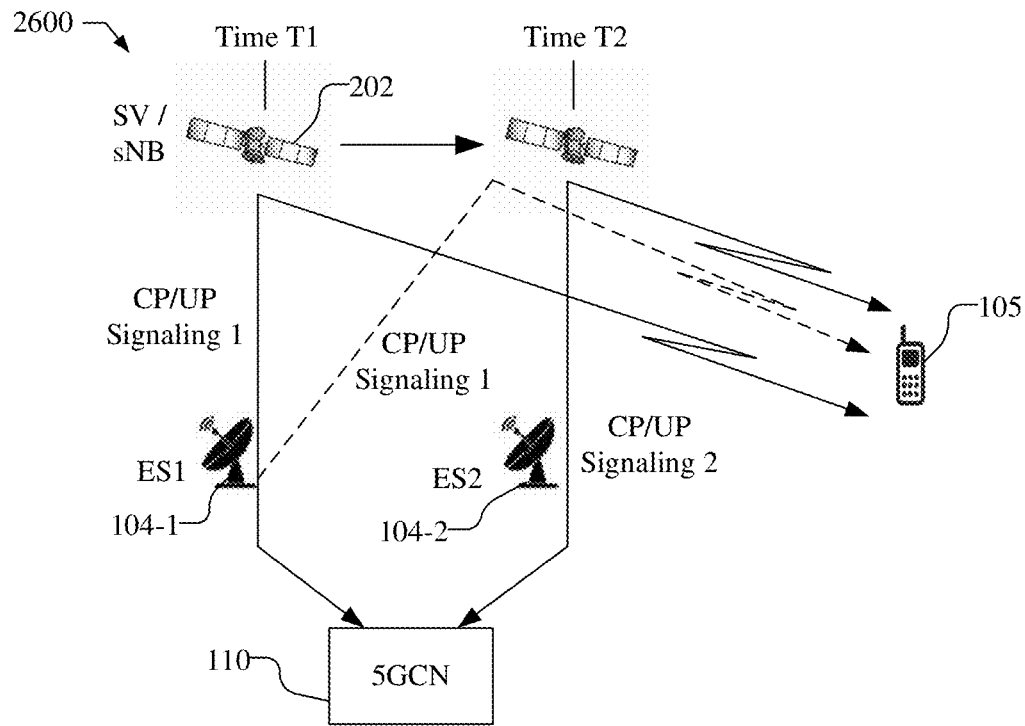
FIG. 26 is a block diagram illustrating a communication system and transfer of a regenerative SV between earth stations with no change in core network.

FIG. 26 is a block diagram illustrating a communication system 2600 applicable to regenerative SVs with a non-split architecture, including entities such as those illustrated in FIG. 2. Communication system 2600 may include a first earth station ES1 and a second earth station ES2, which may be earth stations 104-1 and 104-2, a 5G core network, e.g., 5GCN 110, that is in communication with both earth stations ES1 and ES2, a space vehicle SV/sNB that includes an sNB, such as SV 202 that includes an sNB 202, and a UE 105. While only one UE 105 is illustrated, it should be understood that a plurality of UEs using one or more radio cells may be part of communication system 2300. As illustrated, the same SV/sNB 202 is illustrated at a time T1 and at a later time T2. FIG. 26 illustrates a procedure for transfer of regenerative SVs, such as SV/sNB 202, between earth stations ES1 and ES2, where there is no change in the 5GCN.

All radio cells terminate in the SV/sNB 202, and accordingly, transfer of individual radio cells from ES1 to ES2 does not occur since the radio cells are not defined on links to and from ES1 and ES2. Accordingly, in one implementation, signaling applicable to all radio cells, including all CP/UP signaling carried by the SV/sNB 202, may be transferred from earth station ES1 to earth station ES2 at time T2. A 5GCN 110 feeder link thus also changes at time T2 from earth station ES1 to earth station ES2. UEs previously accessing SV/sNB 202, e.g., UE 105, may continue to access the SV/sNB 202 after time T2 as the NR radio interface between the UEs and SV/sNB 202 is not impacted. Thus, the UE 105 may experience only a brief period of delay at the transfer time T2. If the AMF 122, SMF 134 and UPF 130 for each UE 105 remains the same following the transfer at time T2, the UE 105 may continue to communicate via the SV/sNB 202 without changing radio cells. If, however, the AMF 122, SMF 134 and/or UPF 130 for a UE 105 needs to change, then the UE 105 may be handed off to a different radio cell (or the same radio cell) at or prior to the time T2 using an explicit handoff procedure which may allow for change of the AMF 122, SMF 134 and/or UPF 130.

Figure 27:
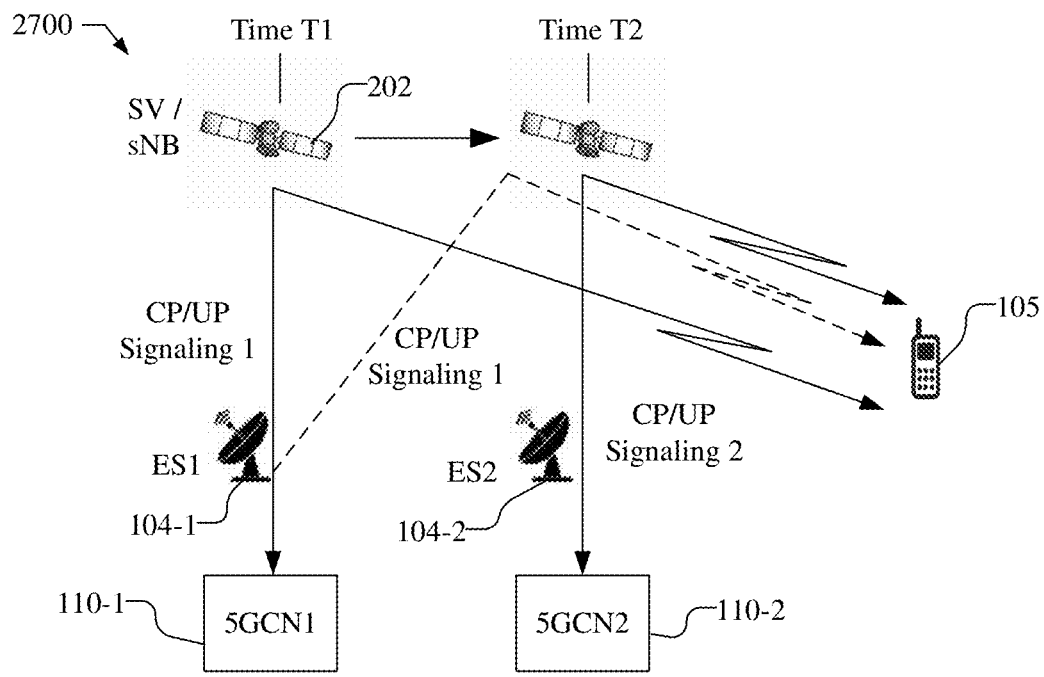
FIG. 27 is a block diagram illustrating a communication system and transfer of a regenerative SV between earth stations with a change in core network.

FIG. 27 is a block diagram illustrating a communication system 2700 applicable to regenerative SVs with a non-split architecture, including entities such as those illustrated in FIG. 2. Communication system 2700 is similar to communication system 2600, but includes a first 5G core network 110, e.g., 5GCN1, associated with earth station ES1 and a second 5G core network 110, e.g., 5GCN2, associated with earth station ES2. FIG. 27 illustrates a procedure for transfer of regenerative SVs, such as SV/sNB 202, between earth stations ES1 and ES2, where there is a change of 5GCN 110.

As illustrated in FIG. 27, at transfer time T2, the CP/UP signaling carried by the SV/sNB 202 is transferred from earth station ES1 and 5GCN1 to earth station ES2 and 5GCN2. Thus, in the procedure illustrated in FIG. 27, transfer of UEs along with the SV/sNB is no longer possible. In one implementation, the SV/sNB 202 may initiate handoff of all UEs to other radio cells (and other SV/sNBs 202) prior to the transfer to earth station ES2 at time T2. In one example, the SV/sNB 202 may also release the NG interface to the first 5GCN1 and setup a new NG interface to the second 5GCN2.

Figure 28:
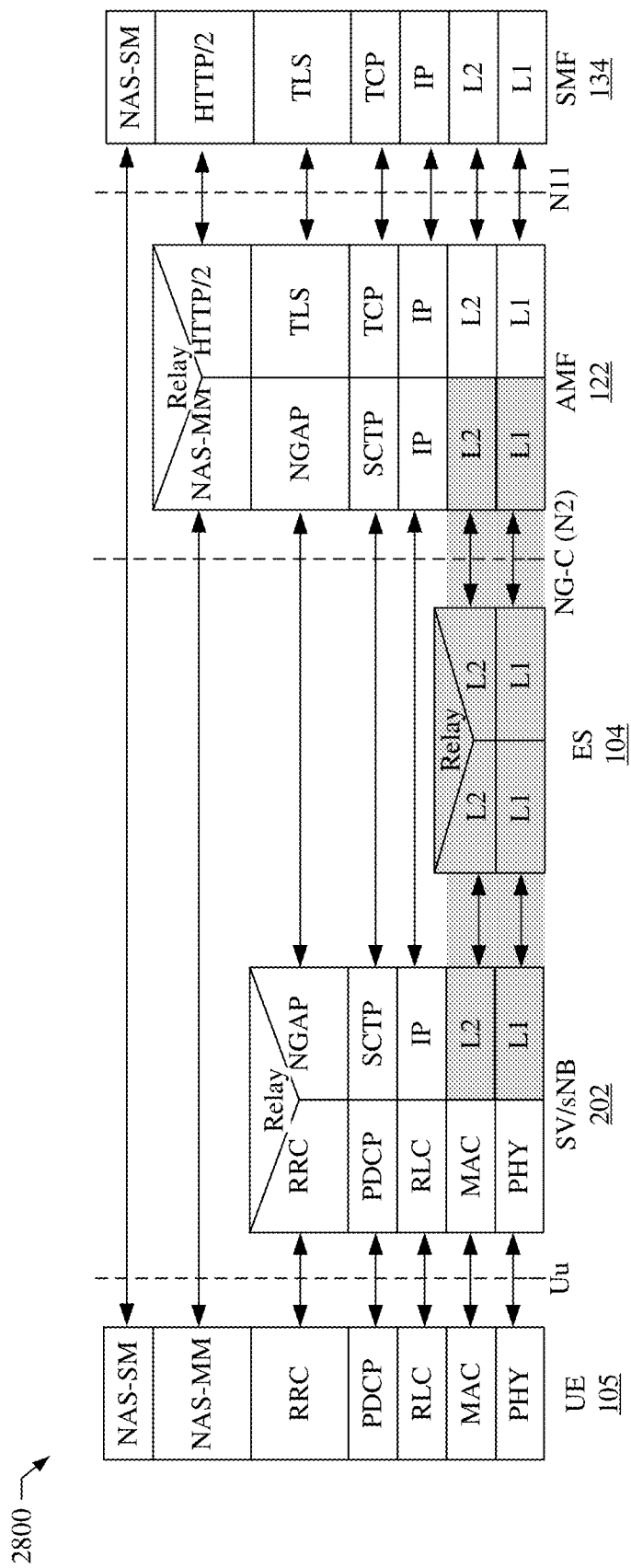
FIG. 28 is a block diagram illustrating control plane protocol layering between a UE, a regenerative SV, an earth station, and a core network.
Figure 29:
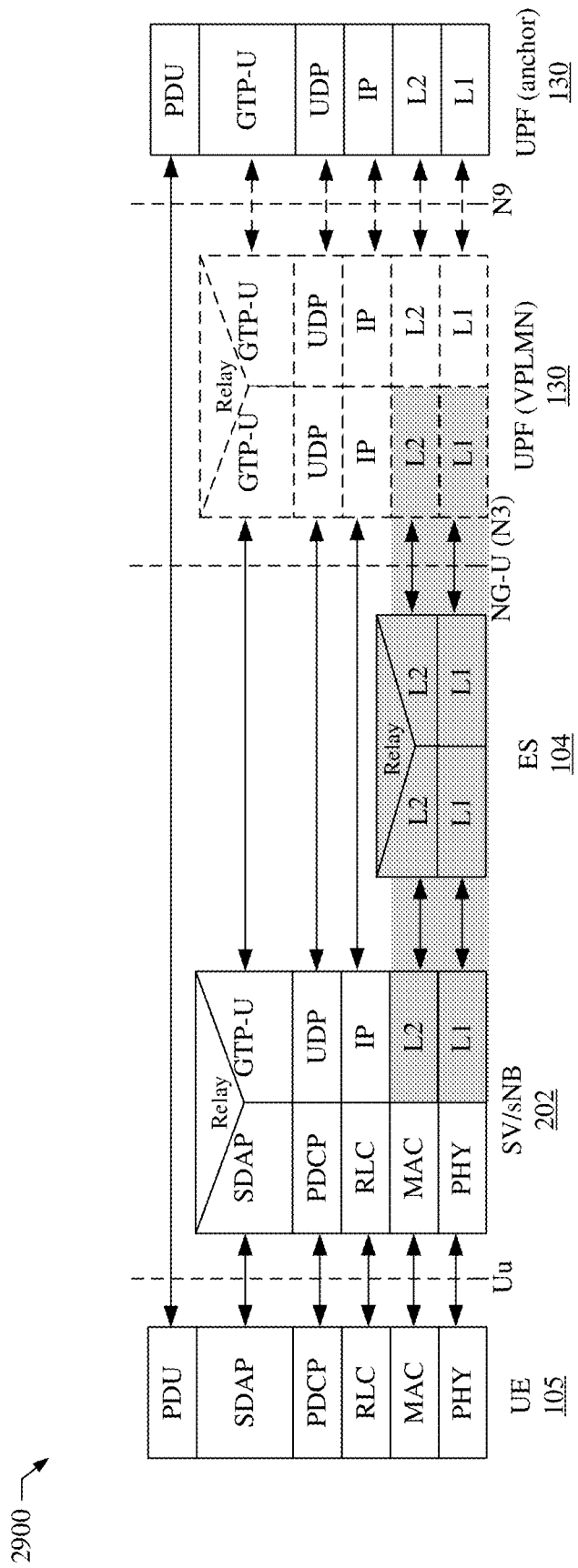
FIG. 29 is a block diagram illustrating user plane protocol layering between a UE, a regenerative SV, an earth station, and a core network.

FIG. 28 is a block diagram illustrating control plane protocol layering 2800, and FIG. 29 is a block diagram illustrating user plane protocol layering 2800 applicable to the CP/UP signaling 1 and CP/UP signaling 2 shown in FIG. 26 before and after transfer of the CP/UP signaling. The control plane (CP) protocol layering 2800 is illustrated between UE 105, SV/sNB 202, earth station 104 (which may be ES1 or ES2), and 5GCN, illustrated by AMF 122 and SMF 134, with the earth station 104 acting as a Level 2 Relay, although it could alternatively act as a Level 1 relay (in which case the L2 level shown in FIG. 28 for ES 104 would not be present). The user plane (UP) protocol layering 2900 is illustrated between UE 105, SV/sNB 202, earth station 104, and 5GCN 110, illustrated with UPF (VPLMN) 130, and UPF (anchor) 130 in a home network for UE 105, with earth station 104 acting as a Level 2 Relay, although it could alternatively act as a Level 1 relay (in which case the L2 level shown in FIG. 29 for ES 104 would not be present).

FIGS. 28 and 29 may apply to the transfer of signaling for SV/sNB 202 shown in FIG. 26, with correspondence of the UE 105 and SV/sNB 202 shown in the figures, with AMF 122, SMF 134 and UPF (VPLMN) 130 in FIGS. 28 and 29 being part of 5GCN 110 in FIG. 26, and with UPF (anchor) 130 in FIG. 29 being part of a home 5GCN 110 for UE 105 (not shown in FIG. 26). If UE 105 is not roaming, UPF (VPLMN) 130 in FIG. 29 may be absent and is hence shown using dashed lines. Additionally, ES 104 in FIGS. 28 and 29 may correspond to ES1 in FIG. 26 prior to time T2 and to ES2 in FIG. 26 at and after time T2. The protocol layering shown in FIGS. 28 and 29 corresponds to that defined by 3GPP for NR (e.g. in TS 23.501 and TS 28.300) as is well known to those with ordinary expertise.

In FIG. 28 both the UE 105 and sNB 202 CP interactions with the 5GCN 110 are shown (superimposed). The earth station 104 may act as a Level 1 relay or Level 2 relay (as shown) for both CP and UP. For relaying through the earth station 104, non-3GPP protocols may be used at L1 and L2, as indicated with shading.

When the SV/sNB 202 is transferred to a new earth station 104 (i.e. to ES2 in FIG. 26) and if the 5GCN 110, illustrated as AMF(s) 122, SMF(s) 134, and UPF(s) 130 in FIGS. 28 and 29, remains unchanged for all UEs accessing the SV/sNB 202 which are also being transferred, then all protocol layers shown in FIGS. 28 and 29 may remain unaffected except for L1 and L2 through the earth station 104, indicated with shading. In implementations where the earth station 104 acts as an L1 relay, L2 data links between the SV/sNB 202 and 5GCN 110 may employ error correction to avoid duplication and/or loss of signaling data. In implementations where the earth station 104 acts as an L2 relay, old L2 links for the old earth station (ES1) may be released and new L2 links for the new earth station (ES2) may be setup.

Thus, in FIG. 26, where the CP/UP signaling is transported via the SV/sNB 202 in regenerative mode, the earth stations ES1 and ES2 may act as Level 1 relays. After the transfer at time T2, data links may be transferred from earth station ES1 to earth station ES2, where each data link may include a Level 2 connection between the sNB 202 in the SV/sNB 202 and the 5GCN 110. The signaling for each data link may be transported through the earth station ES1 at a Level 1 prior to the transfer time T2 and transported through the earth station ES2 at a Level 1 after the transfer time T2.

In another implementation, the earth stations ES1 and ES2 may act as Level 2 relays. For example, immediately prior to the transfer time T2, data links between the sNB 202 in the SV/sNB 202 and the 5GCN 110 may be released, where the data links transport signaling, and each data link includes a Level 2 connection between the sNB 202 in the SV/sNB 202 and the earth station ES1 and a concatenated Level 2 connection between the earth station ES1 and the 5GCN 110. At the transfer time T2, a Level 1 transport of signaling between the sNB 202 in the SV/sNB 202 and the 5GCN 110 is transferred from the earth station ES1 to the earth station ES2. Immediately after the transfer time T2, data links between the sNB 202 in the SV/sNB 202 and the 5GCN 110 are established, where the data links transport signaling and include a Level 2 connection between the sNB 202 in the SV/sNB 202 and the earth station ES2 and a concatenated Level 2 connection between the earth station ES2 and the 5GCN 110. Each data link after the transfer at time T2 may correspond to a data link prior to the transfer.

Figure 30:
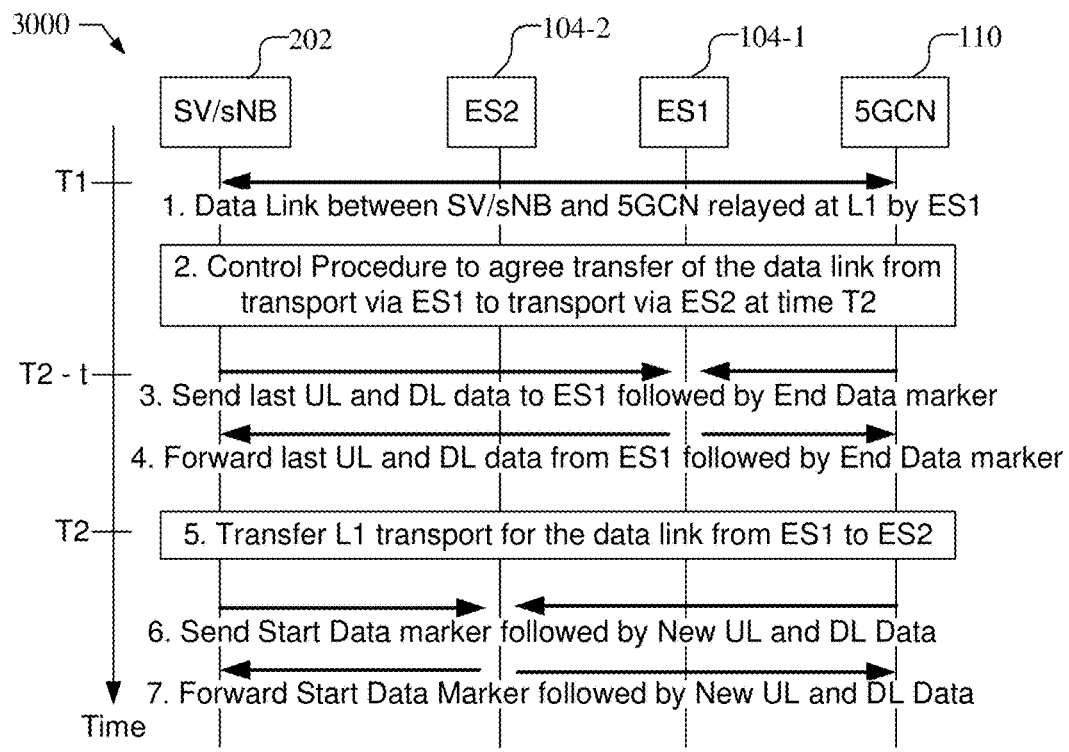
FIG. 30 shows a signaling flow illustrating various messages sent between entities of a communication network for the transfer of regenerative SVs between earth stations acting as L1 Relays.

FIG. 30 shows a signaling flow 3000 that illustrates the transfer of data links for SV/sNB 202 at the transfer time T2 discussed for FIGS. 26, 28 and 29, and includes an SV/sNB

202, a first earth station ES1 104-1, a second earth station ES2 104-2, and 5GCN 110 that may correspond to like numbered entities in FIGS. 26, 28 and 29. Moreover, 5GCN 110 in FIG. 30 may correspond to any of AMF 122 or either of UPFs 130 in FIGS. 28 and 29. The signaling flow 3000 illustrates the transfer of a data link for earth stations acting as L1 Relays, and specifically, how an L2 data link for either UP or CP protocol layering may be transferred when an SV/sNB 202 is transferred between earth stations ES1 104-1 and ES2 104-2 with the earth stations acting as L1 relays. The SV/sNB 202, earth stations ES1 104-1 and ES2 104-2, and 5GCN 110 (e.g., AMF 122 or UPF 130) are assumed to be synchronized to a common time with around 1 millisecond (ms) accuracy in order to enable transfer of signaling in a precisely time coordinated manner.

At stage 1 in FIG. 30, at time T1, a data link between the SV/sNB 202 and the 5GCN 110 is present and is relayed at L1 by the earth station 104-1.

At stage 2, a control procedure is performed by SV/sNB 202 and the 5GCN 110 (e.g. AMF 122 or UPF 130) to agree to the transfer of the data link from transport via earth station 104-1 to transport via earth station 104-2 at time T2. The control procedure may be performed using signaling between SV/sNB 202, the ESs 104-1 and 104-2 and the 5GCN 110 (e.g. AMF 122 or UPF 130) at the L2 level and/or at other protocol levels.

At stage 3, at time T2-$t$, the SV/sNB 202 and the 5GCN 110 each send a last UL and DL portion of signaling data, respectively, to the earth station 104-1 followed by an End Data marker in each case, which may be, e.g., an L2 control frame or a sequence of L2 control frames. In this context, UL signaling data refers to signaling that is sent by one or more UEs 105 to 5GCN 110 (e.g. AMF 122 or UPF 130) via SV/sNB 202 and ES 104-1 or ES 104-2, and DL signaling data refers to signaling that is sent by 5GCN 110 (e.g. AMF 122 or UPF 130) to one or more UEs 105 via SV/sNB 202 and ES 104-1 or ES 104-2. The time T2, for example, may correspond to the time of transfer of the SV/sNB 202 in FIG. 26. The time period $t$, may slightly exceed the end to end transport delay between the SV/sNB 202 and 5GCN 110 at L2, which may be calculated or measured.

At stage 4, the last UL and DL portions of signaling data are forwarded to the 5GCN 110 and SV/sNB 202, respectively, by the earth station 104-1 followed by the End Data markers.

At stage 5, at time T2, the L1 transport for the data link is transferred from earth station 104-1 to earth station 104-2 (e.g. as agreed and coordinated at stage 2).

At stage 6, the SV/sNB 202 and 5GCN 110 (e.g. AMF 122 or UPF 130) each send a Start Data marker to the earth station 104-2 followed by new UL and DL data.

At stage 7, the Start Data markers are forwarded by the earth station 104-2 to the SV/sNB 202 and 5GCN 110 followed by the new UL and DL data.

Resumption of data transfer after time T2 at stages 6 and 7 may lead to a time period $t$ during which no UL or DL data is sent and received, which may cause an extra delay $t$ in signaling transfer for higher protocol levels. In an optimization to reduce or eliminate most of this extra delay, the SV/sNB 202 and 5GCN 110 (e.g., AMF 122 or UPF 130) may each start to receive data via earth station 104-2 at time T2, but may each start to send data via earth station 104-2 (e.g. at stage 6 and 7) at time T2−$t^*$, where $t^*$ is the lesser of $t$ and the calculated end to end transmission delay via earth station 104-2.

Figure 31:
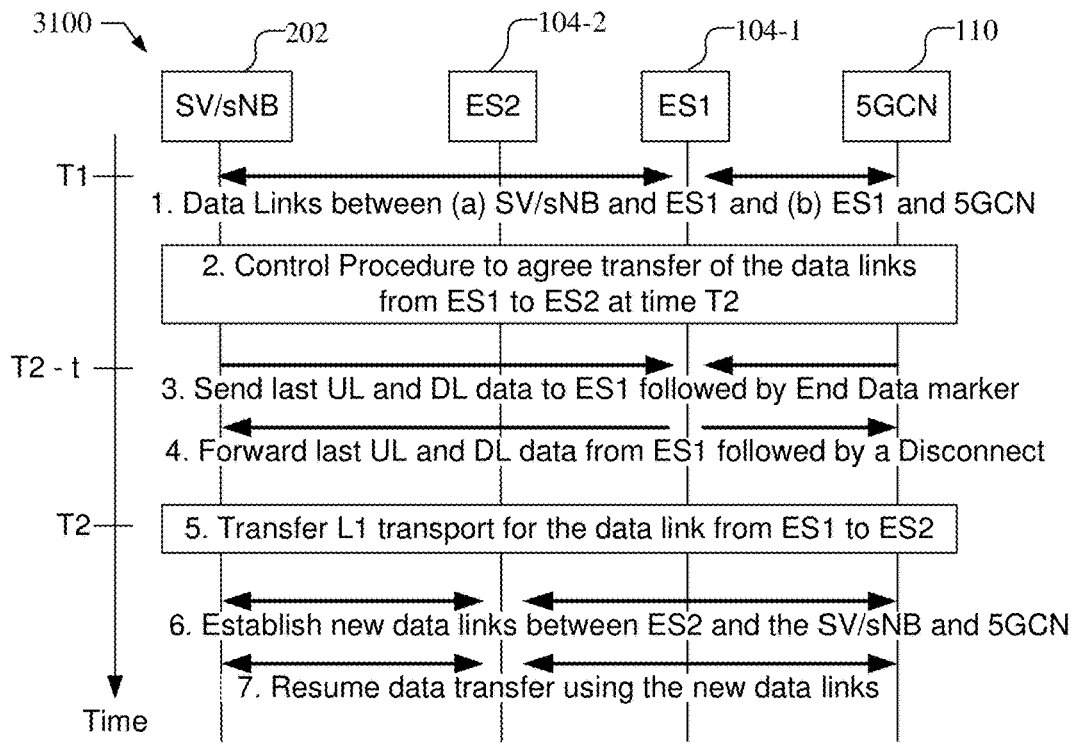
FIG. 31 shows a signaling flow illustrating various messages sent between entities of a communication network for the transfer of regenerative SVs between earth stations acting as L2 Relays.

FIG. 31 shows a signaling flow 3100 that illustrates the transfer of data links for SV/sNB 202 at the transfer time T2 discussed for FIGS. 26, 28 and 29, and includes an SV/sNB 202, a first earth station ES1 104-1, a second earth station ES2 104-2, and 5GCN 110 that may correspond to like numbered entities in FIGS. 26, 28 and 29. Moreover, 5GCN 110 in FIG. 30 may correspond to any of AMF 122 or either of UPFs 130 in FIGS. 28 and 29. The signaling flow 3100 illustrates the transfer of a data link for earth stations acting as L2 Relays, and specifically, how a pair of concatenated L2 data links for either UP or CP protocol layering may be transferred when an SV/sNB 202 is transferred between earth stations ES1 104-1 and ES2 104-2 with the earth stations acting as L2 relays. The SV/sNB 202, earth stations 104-1 and 104-2, and 5GCN 110 (e.g., AMF 122, UPF 130) are assumed to be synchronized to a common time with around 1 ms accuracy in order to enable transfer of signaling in a precisely time coordinated manner.

At stage 1 in FIG. 31, at time T1, one or more data links between the SV/sNB 202 and earth station 104-1 and concatenated data links between earth station 104-1 and the 5GCN 110 (e.g., AMF 122, UPF 130) are present and carry signaling data for UEs 105 which access SV/sNB 202. For each data link DL1 between the SV/sNB 202 and earth station 104-1, there is one concatenated data link DL2 between the earth station 104-1 and the 5GCN 110 (e.g., AMF 122, UPF 130), such that data transferred from SV/sNB 202 to earth station 104-1 over DL1 is forwarded by ES 104-1 to 5GCN 110 over DL2, and data transferred from 5GCN 110 to earth station 104-1 over DL2 is forwarded by ES 104-1 to SV/sNB 202 over DL1. FIG. 31 shows how just one pair of concatenated data links (e.g. DL1 and DL2) are transferred from ES 104-1 to ES 104-2, but may be repeated to support the transfer of any number of pairs of concatenated data links.

At stage 2, a control procedure is performed by SV/sNB 202, the ESs 104-1 and 104-2 and the 5GCN 110 (e.g. AMF 122 or UPF 130) to agree to the transfer of the pair of concatenated data links from earth station 104-1 to earth station 104-2 at time T2. The control procedure may be performed using signaling between SV/sNB 202, the ESs 104-1 and 104-2 and the 5GCN 110 (e.g. AMF 122 or UPF 130) at the L2 level and/or at other protocol levels.

At stage 3, at time T2-$t$, the SV/sNB 202 and the 5GCN 110 each send a last UL and DL portion of signaling data, respectively, to the earth station 104-1 (over each of the data links) followed by an End Data marker in each case, which may be, e.g., an L2 control frame or a sequence of L2 control frames. In this context (e.g. as in FIG. 30), UL signaling data refers to signaling that is sent by one or more UEs 105 to 5GCN 110 (e.g. AMF 122 or UPF 130) via SV/sNB 202 and ES 104-1 or ES 104-2, and DL signaling data refers to signaling that is sent by 5GCN 110 (e.g. AMF 122 or UPF 130) to one or more UEs 105 via SV/sNB 202 and ES 104-1 or ES 104-2. The time T2 may correspond to the time of transfer of the SV/sNB 202 in FIG. 26. The time $t$, may slightly exceed the end to end transport delay between the SV/sNB 202 and 5GCN 110 at L2, which may be calculated or measured.

At stage 4, the last UL and DL portions of signaling data and the End Data markers are relayed by the earth station 104-1 to the 5GCN 110 and SV/sNB 202, respectively. The ES 104-1 then sends a Disconnect frame to each of 5GCN 110 and SV/sNB 202 to release both data links.

At stage 5, at time T2, L transport between 5GCN 110 and SV/sNB 202 is transferred from earth station 104-1 to earth station 104-2.

At stage 6, which may occur at time T or immediately after, the earth station 104-2, the SV/sNB 202 and 5GCN 110 establish a new pair of concatenated data links between SV/sNB 202 and earth station 104-2 and between earth station 104-2 and the 5GCN 110 (e.g. as agreed and coordinated at stage 2).

At stage 7, the signaling data transfer between 5GCN 110 and SV/sNB 202 resumes on the new pair of concatenated data links, e.g., between the SV/sNB 202 and earth station 104-2 on one data link and between earth station 104-2 and the 5GCN 110 on a second (concatenated) data link.

Resumption of data transfer at or just after time T2 at stages 6 and 7 may lead to a time period t during which no UL or DL data is sent and received, which may lead to an extra delay t in signaling transfer for higher protocol levels. Optimization may be possible if the SV/sNB 202 is able to access both earth stations 104-1 and 104-2 for a short period prior to time T2 to allow data transmission via earth station 104-2 to start at time T−t* as for the L1 relay optimization described for FIG. 30.

Figure 32:
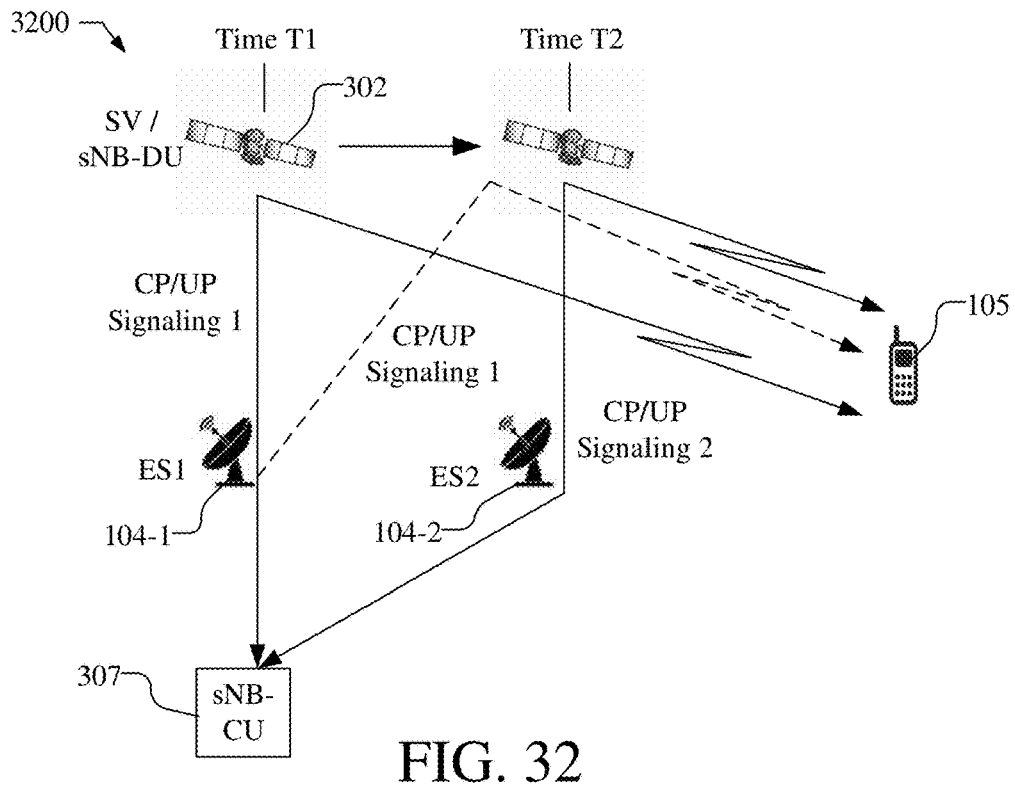
FIG. 32 is a block diagram illustrating a communication system and transfer of a regenerative SV between earth stations with a split architecture and with no change in a core network or in a Central Unit.

FIG. 32 is a block diagram illustrating a communication system 3200 applicable to regenerative SVs with a split architecture, including entities such as those illustrated in FIG. 3. Communication system 3200 may include a first earth station ES1 and a second earth station ES2, which may be earth stations 104-1 and 104-2, an sNB-CU, such as sNB-CU 307, that is in communication with both earth stations ES1 and ES2, a space vehicle SV/sNB-DU that includes an sNB-DU, such as SV/sNB-DU 302, and a UE 105. While only one UE 105 is illustrated, it should be understood that a plurality of UEs using one or more radio cells may be part of communication system 3200. As illustrated, the same SV/sNB-DU 302 is illustrated at a time T1 and at a later time T2. FIG. 32 illustrates a procedure for transfer of regenerative SVs with a split architecture, such as SV/sNB-DU 302, between earth stations ES1 and ES2, where there is no change in the sNB-CU.

As illustrated in FIG. 32, the feeder link to access the combined SV/sNB-DU 302 changes at time T2 from earth station 104-1 to earth station 104-2. If the earth stations 104-1, 104-2 act as L1 or L2 relays for an interface (e.g. an F1 interface) between sNB-DU 202 and sNB-CU 307, then UEs, such as UE 105, may remain with the SV/sNB-DU 302 with a brief delay in signaling and data transfer at protocol levels above L2. The procedures for regenerative SVs 202 illustrated by signaling flows 3000 and 3100 in FIGS. 30 and 31 may be used to stop and restart CP and UP data and signaling transfer over the F1 interface when the SV/sNB 302 transfer occurs. Specifically, signaling flows 3000 and 3100 may be applicable, as described previously, when SV/sNB 202 is replaced by SV/sNB-DU 302 and 5GCN 110 is replaced by sNB-CU 307 in these signaling flows.

Figure 33:
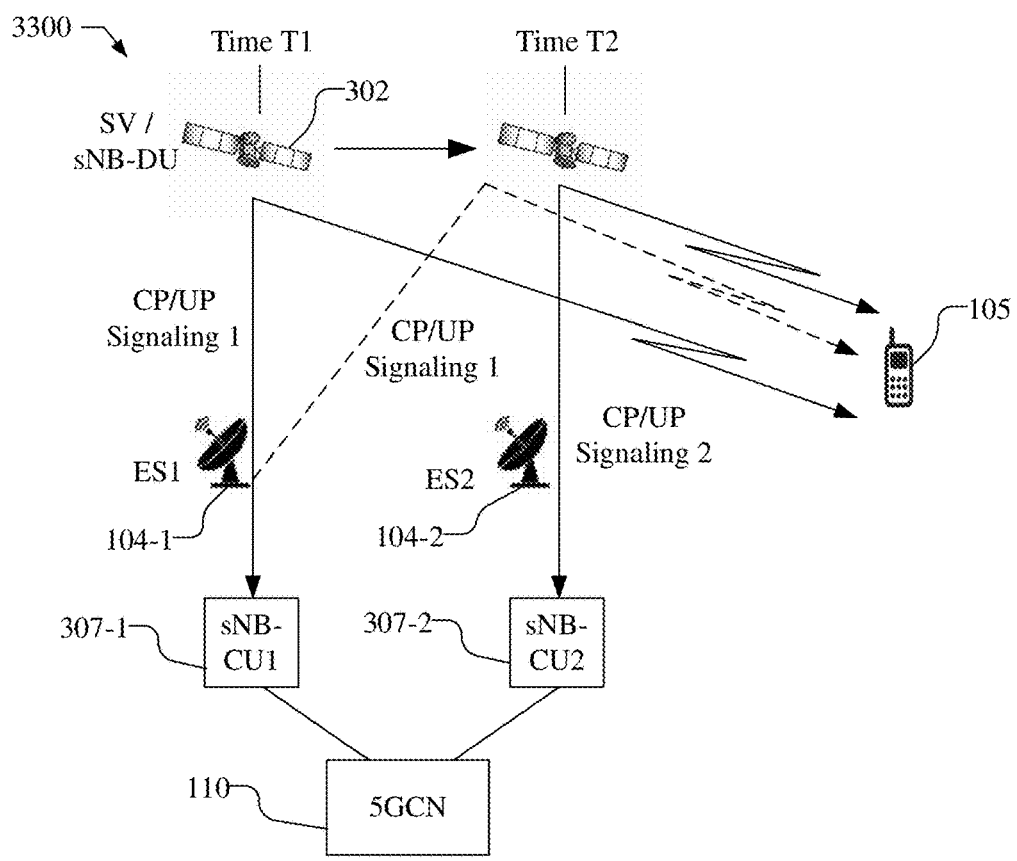
FIG. 33 is a block diagram illustrating a communication system and transfer of a regenerative SV between earth stations with a split architecture and with no change in a core network but with a change of Central Unit.

FIG. 33 is a block diagram illustrating a communication system 3300 applicable to regenerative SVs with a split architecture, including entities such as those illustrated in FIG. 3. Communication system 3300 is similar to communication system 3200, but includes a first sNB-CU1, which may be sNB-CU 307-1, that is associated with earth station ES1 and a second sNB-CU2, e.g., which may be sNB 307-2, that is associated with earth station ES2, and both of which are associated with the same 5G core network 5GCN, e.g., which may be 5GCN 110. FIG. 33 illustrates a procedure for transfer of regenerative SVs with a split architecture, such as SV/sNB-DU 302, between earth stations ES1 and ES2, where there is a change of sNB-CU.

In one implementation, the SV/sNB-DU 302 may initiate handoff of all UEs that are accessing SV/sNB-DU 302 prior to the transfer to earth station 104-2 at time T2. In another implementation, a modified handoff procedure may be used, as discussed below, to allow some or all UEs, e.g., a UE 105, to remain with the SV-sNB-DU 302 and a current radio cell for each of the UEs. In both implementations, the SV/sNB-DU 302 may release an F1 interface to the old sNB-CU1 at or just before time T2 and set up a new F1 interface to the new sNB-CU2 at or just after time T2.

Figure 34:
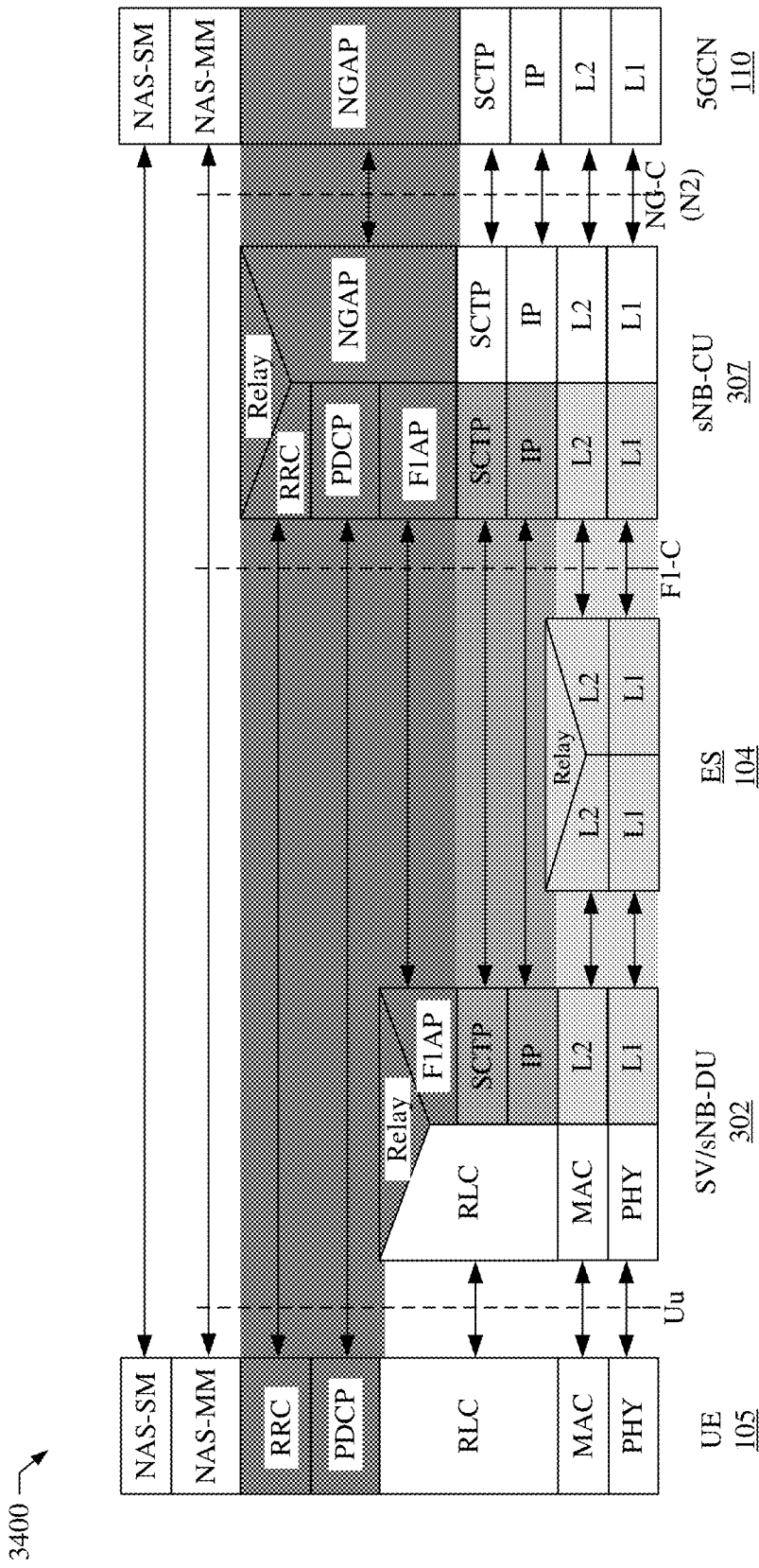
FIG. 34 is a block diagram illustrating control plane protocol layering between a UE, a regenerative SV, an earth station, and a core network with a split architecture.
Figure 35:
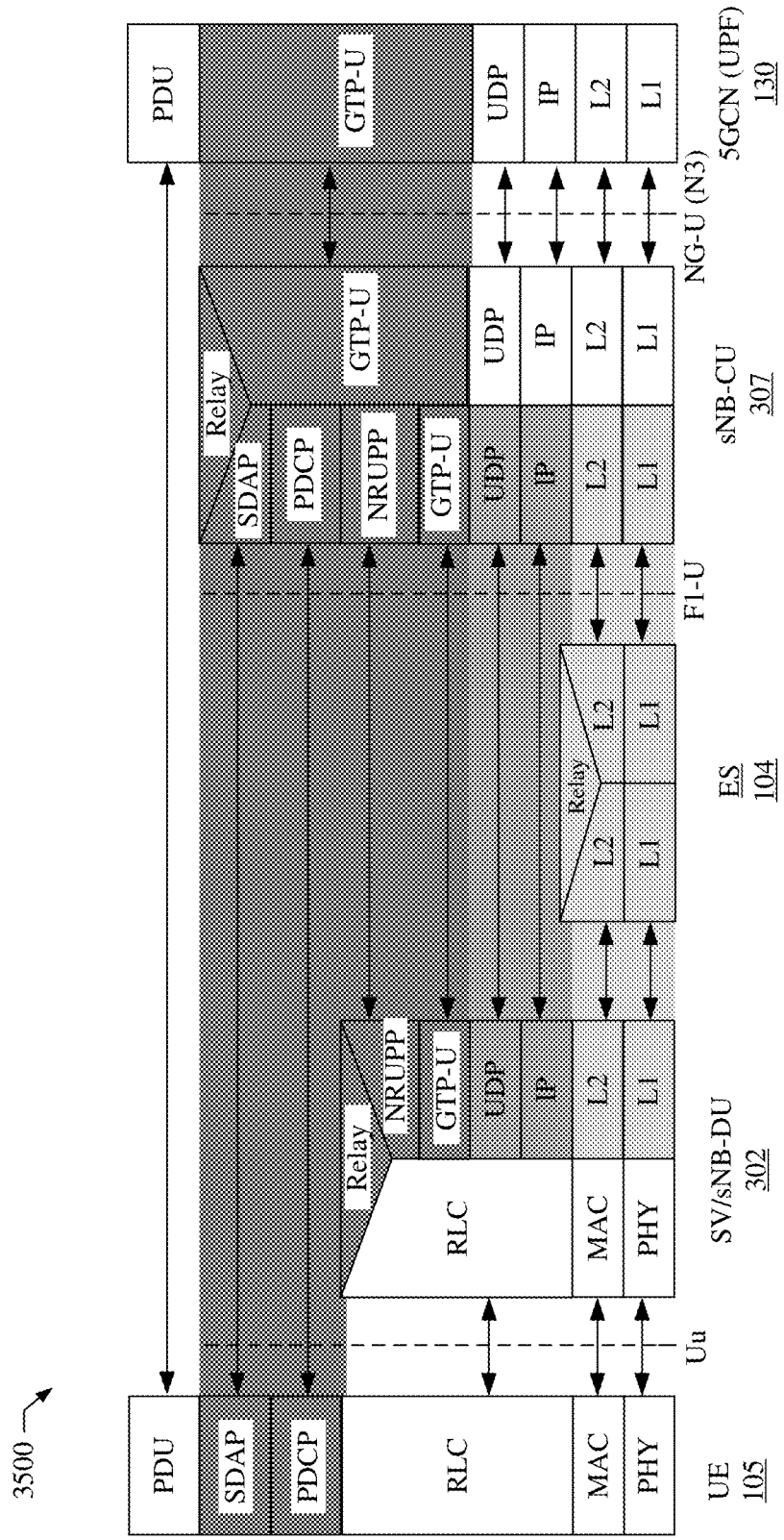
FIG. 35 is a block diagram illustrating user plane protocol layering between a UE, a regenerative SV, an earth station, and a core network with a split architecture.

FIG. 34 is a block diagram illustrating control plane protocol layering 3400, and FIG. 35 is a block diagram illustrating user plane protocol layering 3500 applicable to the CP/UP signaling 1 and CP/UP signaling 2 shown in FIGS. 32 and 33 before and after transfer of the CP/UP signaling. The control plane (CP) protocol layering 3400 is illustrated between UE 105, SV/sNB-DU 302, earth station 104 (which may be ES1 or ES2), sNB-CU 307, and 5GCN 110 (which may be AMF 122 or SMF 130), with the earth station 104 acting as a Level 2 Relay, although it may alternatively act as a Level 1 relay (in which case the L2 level shown in FIG. 34 for ES 104 would not be present). The user plane (UP) protocol layering 3500 is illustrated between UE 105, SV/sNB-DU 302, earth station 104, and 5GCN, illustrated with UPF 130, with the earth station 104 acting as a Level 2 Relay, although it could alternatively act as a Level 1 relay (in which case the L2 level shown in FIG. 35 for ES 104 would not be present). The CP and UP protocol layering in FIGS. 34 and 35 is shown with L1 or L2 relaying through the earth station with light shading.

FIGS. 34 and 35 may apply to the transfer of signaling for SV/sNB-DU 302 shown in FIGS. 32 and 33, with correspondence of the UE 105 and SV/sNB-DU 302 shown in the figures. Additionally, ES 104 in FIGS. 34 and 35 may correspond to ES1 in FIGS. 32 and 33 prior to time T2 and to ES2 in FIGS. 32 and 33 at and after time T2. Similarly, sNB-CU 307 in FIGS. 34 and 35 may correspond to sNB-CU 307 in FIG. 32, to sNB-CU1 307-1 in FIG. 33 prior to time T and to sNB-CU2 307-2 in FIG. 33 at and after time T2. The protocol layering shown in FIGS. 34 and 35 corresponds to that defined by 3GPP for NR (e.g. in TS 23.501, TS 28.300 and TS 38.401) is well known to those with ordinary expertise.

In an implementation where the SV/sNB-DU 302 is transferred to a new earth station 104-2 and if the sNB-CU 307 remains unchanged for all UEs being transferred as in FIG. 32, all protocol layers may remain unaffected except for L1 and L2 through the earth station, shown with light shading. The SV/sNB-DU 302 transfer may then be relatively simple and may be similar that for the regenerative non-split architecture case described above with reference to FIGS. 30 and 31.

In an implementation where the SV/sNB-DU 302 is transferred to a new earth station 104-2 and is also transferred to a new sNB-CU 307-2 as in FIG. 33, then a modified handoff procedure may be needed for UEs which continue to access the SV/sNB-DU 302 and same radio cells after the transfer at time T2. The modified handoff procedure may: (a) release old non-UE associated links and old non-UE associated connections between the sNB-DU 302 and the old sNB-CU1 307-1; and (b) establish new non-UE associated links and new non-UE associated connections between the sNB-DU 302 and the new sNB-CU2 307-2, for the protocol layers illustrated with light shading and medium shading, which comprise L1, L2, IP, UDP and SCTP (defined in IETF RFC 3286). The modified handoff procedure may also release old UE associated connections and tunnels and establish new UE associated connections and tunnels between the UE 105, sNB-DU 302, 5GCN 110, old sNB-CU1 307-1 and new sNB-CU2 307-2, for the protocol layers illustrated with dark shading which comprise RRC (defined in 3GPP TS 38.331), PDCP (defined in 3GPP TS 38.323), F1AP (defined in 3GPP TS 38.473), SDAP (defined in 3GPP TS 37.324), NRUPP (defined in 3GPP TS 38.425), NGAP (defined in 3GPP TS 38.413) and GTP-U (defined in 3GPP TS 29.281).

Thus, in FIGS. 32 and 33, where the signaling (e.g. CP and UP signaling) is transported via the SV/sNB-DU 302 in regenerative mode, the sNB-DU 302 communicates with an sNB-CU (e.g. sNB-CU 307 in FIG. 32 and sNB-CU1 307-1 in FIG. 33) to transport the signaling to a 5GCN (e.g. 5GCN 110) before the transfer at time T2 and may communicate with the same sNB-CU (e.g. sNB-CU 307 in FIG. 32) or a different sNB-CU (e.g. sNB-CU2 307-2 in FIG. 33) to transport signaling to the same 5GCN after the transfer at time T2. In an implementation where the same sNB-CU is used to transport signaling before and after transfer time T2, e.g., as illustrated in FIG. 32, the earth stations ES1 and ES2 may act as Level 1 relays, and data links from earth station ES1 may be transferred to ES2 at the transfer time T2. Each data link may include a Level 2 connection between the sNB-DU and the sNB-CU, and each data link is transported through the earth station ES1 at a Level 1 prior to the transfer time T2 and is transported through the earth station ES2 at a Level 1 after the transfer time T2.

In another implementation in which the same sNB-CU is used to transport signaling before and after transfer time T2, e.g., as illustrated in FIG. 32, the earth stations ES1 and ES2 may act as Level 2 relays. For example, immediately prior to the transfer time T2, data links between a network node (which may be an sNB-DU, such as sNB-DU 302, or an sNB-CU such as sNB-CU 307 in FIG. 32 or sNB-CU 307-1 in FIG. 33) and the other of the sNB-DU and the sNB-CU may be released, where the data links transport signaling, and each data link includes a Level 2 connection between the network node and the earth station ES1 and a concatenated Level 2 connection between the earth station ES1 and the other of the sNB-DU and the sNB-CU. At the transfer time T2, a Level 1 transport of signaling between the network node and the other of the sNB-DU and the sNB-CU may be transferred from the earth station ES1 to the earth station ES2. Immediately after the transfer time T2, data links between the network node and the other of the sNB-DU and the sNB-CU may be established. The data links transport signaling and include a Level 2 connection between the network node and the earth station ES2 and a concatenated Level 2 connection between the earth station ES2 and the other of the sNB-DU and the first sNB-CU. Each data link after the transfer at time T2 corresponds to a data link prior to the transfer.

In an implementation in which different sNB-CUs (e.g. sNBs-CUs 307-1 and 307-2) are used to transport signaling before and after transfer time T2, e.g., as illustrated in FIG. 33, the transport of signaling between the UEs and the 5GCN after the transfer time T2 via the SV 302 may be enabled by performing a modified handover procedure for each UE (e.g. UE 105). For example, the modified handover procedure for each UE may include one or more of the following. Non-UE associated links and connections between the sNB-DU (e.g. sNB-DU 302) and a first sNB-CU (e.g. sNB-CU 307-1 in FIG. 33) may be released immediately before the transfer time T2, where signaling for the non-UE associated links and connections is transported between the sNB-DU and the first sNB-CU via the earth station ES1 at a Level 1 or a Level 2. Non-UE associated links and connections between the sNB-DU and a second sNB-CU (e.g. sNB-CU 307-2 in FIG. 33) may be established immediately after the transfer time T2, where signaling for the non-UE associated links and connections is transported between the sNB-DU and the second sNB-CU via the earth station ES2 at a Level 1 or a Level 2. UE associated connections and tunnels between the sNB-DU, the first sNB-CU and the 5GCN may be released immediately before the transfer time T2, where signaling for the UE associated connections and tunnels is transported between the sNB-DU and the first sNB-CU using the non-UE associated links and connections. UE associated connections and tunnels between the UEs, sNB-DU, the second sNB-CU and the 5GCN may be established immediately after the transfer time T2, where signaling for the UE associated connections and tunnels is transported between the sNB-DU and the second sNB-CU via the earth station ES2 using the non-UE associated links and connections. The non-UE associated links and connections may include use of one or more of an Internet Protocol (IP), a User Datagram Protocol (UDP) and a Stream Control Transmission Protocol (SCTP). The UE associated connections and tunnels may include use of one or more of a GPRS Tunneling Protocol (GTP), F1 Application Protocol (F1AP), Packet Data Convergence Protocol (PDCP), Service Data Protocol (SDAP), Radio Resource Control (RRC) protocol, Next Generation Application Protocol (NGAP) and NR User Plane Protocol (NRUPP).

Figure 36A:
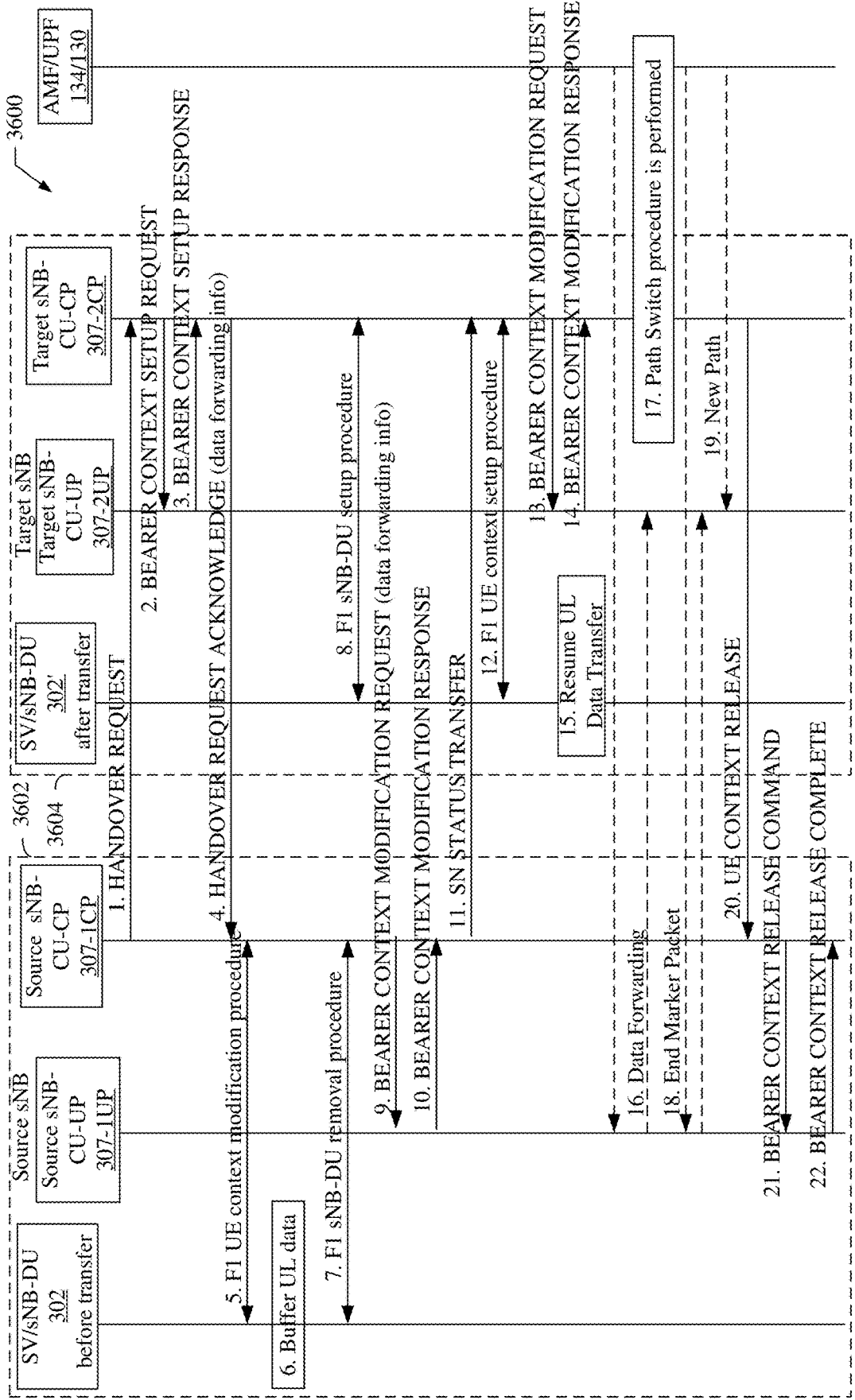
FIG. 36A shows a signaling flow illustrating various messages sent between entities of a communication network for the transfer of regenerative SVs between earth stations and between Central Units with a split architecture.

FIG. 36A shows a signaling flow 3600 that illustrates various messages sent between components of a communication system, such as communication systems 300 and 3300 depicted in FIGS. 3 and 33. The signaling flow 3600 illustrates a modified handover procedure to support transfer of a UE 105 from a previous "source" sNB-CU (e.g. sNB-CU 1307-1 in FIG. 33) to a new "target" sNB-CU (e.g. sNB-CU2 307-2 in FIG. 33) when a serving SV/sNB-DU for the UE 105 (e.g. SV/sNB-DU 302 in FIG. 33) is transferred from a previous ES (e.g. ES1 104-1 in FIG. 33) to a new ES (e.g. ES2 104-2 in FIG. 33). The signaling flow 3600 includes: (i) a source sNB 3602 that includes the SV/sNB-DU before transfer (referred to as SV/sNB-DU 302), a source sNB-CU-User Plane (UP) 307-1UP, and a source sNB-CU-Control Plane (CP) 307-1CP; (ii) a target sNB 3604 that includes the SV/sNB-DU after transfer (referred to as SV/sNB-DU 302'), a target sNB-CU-UP 307-2UP, and a target sNB-CU-CP 307-2CP; and (iii) an AMF/UPF 122/130 being accessed by the UE 105. An sNB-CU-UP for example, is a logical node hosting a user plane part of the PDCP protocol for an sNB-CU and the SDAP protocol for the sNB-CU. The sNB-CU-UP may terminate an E1 interface connected with an sNB-CU-CP and an F1-U interface connected with an sNB-DU. An sNB-CU-CP is a logical node hosting the RRC and the control plane part of the PDCP protocol for the sNB-CU. The sNB-CU-CP terminates an E1 interface connected with the sNB-CU-UP and an F1-C interface connected with an sNB-DU.

The stages described below for FIG. 36A may be similar or identical to those used for terrestrial NR access by a UE 105 to support handover of the UE 105, referred to as "normal NR handover", from one gNB to another gNB, each using a split architecture. Differences (for the modified handover procedure) to normal NR handover may arise for satellite NR access when a UE 105 continues to access the same sNB-DU when both the sNB-DU and the UE 105 are transferred to a new sNB-CU. The differences to normal NR handover are described below.

At stage 1 in FIG. 36A, the source sNB-CU-CP 307-1CP may send a HANDOVER REQUEST message to the target sNB-CU-CP 307-2CP to request handover of the UE 105 (which is not shown in FIG. 36A) to the target sNB-CU 307-2.

At stage 2, the sNB-CU-CP 307-2CP sends a BEARER CONTEXT SETUP REQUEST message to the sNB-CU-UP 307-2UP containing address information to setup a bearer context for UE 105 in the sNB-CU-UP 307-2UP.

At stage 3, the sNB-CU-UP 307-2UP responds with a BEARER CONTEXT SETUP RESPONSE message containing address information for an F1-U interface to the SV/sNB-DU 302' and for an NG-U interface to the UPF 130.

Following stage 3 for normal NR handover, an F1 UE context setup would be performed between a target gNB-CU-CP and a target gNB-DU. This procedure is deferred to stage 12 here because the target SV/sNB-DU 302' does not become accessible from the target sNB-CU-CP 307-2CP until after stage 8 in the modified handover procedure in FIG. 36A.

At stage 4, the target sNB-CU-CP 307-2CP responds to the source sNB-CU-CP 307-2CP with an HANDOVER REQUEST ACKNOWLEDGE message.

At stage 5, the F1 UE Context Modification procedure is performed to stop UL data transfer at the SV/sNB-DU 302 and for a change of association from the sNB-CU 307-1. An indication (e.g. a Handover command) may also sent to the UE 105 by the SV/sNB-DU 302. Different to normal NR handover, this indication indicates that handover is occurring to a new sNB-CU 307-2 but without change to the sNB-DU 302 and that protocol levels above RLC (e.g. PDCP, SDAP and RRC) will need to be resumed or restarted by the UE 105 and/or by new sNB-CU 307-2. Different to normal NR handover, UE 105 does not then send a Random Access request to an sNB-DU (e.g. sNB-DU 302) to change a radio cell and instead remains on a current radio cell. In some implementations, the indication is not sent to the UE 105 by the SV/sNB-DU 302 and instead support of higher layer protocol interaction with UE 105 (e.g. using PDCP, SDAP and RRC) is transferred from sNB-CU 307-1 to sNB-CU 307-2 with sNB-CU 307-2 then instigating a reset or restart for one or more the higher layer protocols and/or sending an indication (e.g. an RRC message) to UE 105 indicating the transfer.

At stage 6, the SV/sNB-DU 301-1 buffers UL data received from the UE 105. This stage may differ from a normal NR handover.

At stage 7, which differs from a normal NR handover for terrestrial gNBs 114, the SV/sNB-DU 302 performs an F1 sNB-DU (or gNB-DU) removal procedure to remove all signaling association with source sNB-CU 307-1, which occurs just prior to transfer of the SV/sNB-DU 302 to the new earth station ES2 and target sNB-CU 307-2.

At stage 8, which differs from a normal NR handover for terrestrial gNBs 114, the SV/sNB-DU 302' performs an F1 sNB-DU (or gNB-DU) setup procedure, to establish a new signaling association with the target sNB-CU 307-2, which occurs just after the transfer of the SV/sNB DU to the new earth station and target sNB-CU 307-2.

In stages 9 and 10, the sNB-CU-UP 307-1UP and sNB-CU-CP 307-1CP perform a bearer context modification procedure for the UE 105 (sNB-CU-CP 307-1CP initiated) to enable the gNB-CU-CP 307-1CP to retrieve the PDCP UL/DL status for UE 105 and to exchange data forwarding information for the bearer for UE 105.

At stage 11, the source gNB-CU-CP 307-1CP sends an SN STATUS TRANSFER message to the target gNB-CU-CP 307-2CP.

At stage 12, the SV/sNB-DU 302' and target sNB-CU-CP 307-2CP perform an F1 UE context setup procedure for change of association of UE 105 to the target sNB-CU 307-2.

At stage 13, the target sNB-CU-CP 307-2CP sends a BEARER CONTEXT MODIFICATION REQUEST message containing address information for F1-U and PDCP status for UE 105.

At stage 14, the target sNB-CU-UP 307-2UP responds with a BEARER CONTEXT MODIFICATION RESPONSE message.

At stage 15, which may differ from a normal NR handover for terrestrial gNBs 114, the SV/sNB-DU 302' resumes UL data transfer for UE 105.

At stage 16, data forwarding for UE 105 may be performed from the source gNB-CU-UP 307-1UP to the target gNB-CU-UP 307-2UP.

At stages 17-19, a Path Switch procedure is performed to update address information for the NG-U interface for UE 105 towards the core network.

At stage 20, the target gNB-CU-CP 307-2CP sends an UE CONTEXT RELEASE message for UE 105 to the source gNB-CU-CP 307-1CP.

At stages 21 and 22, the source sNB-CU-UP 307-1UP and source sNB-CU-CP 307-1CP perform a bearer context release procedure.

A regenerative SV, such as SV/sNB 202 or SV/sNB-DU 302, may avoid any change and any significant interruption to radio cell UL or DL signaling by allowing each UE 105 to continue accessing a serving radio cell when the SV is transferred from one ES 104 to another ES 104, as described previously. Therefore, UEs 105 may continue with the same radio cell, as long as a serving 5GCN 110 is not changed. As discussed above, for a regenerative SV with a non-split architecture, such as SV/sNB 202, the continuation of a radio cell by a UE 105 with continuation of the same 5GCN 110 results in control and L1/L2 impacts to the SV/sNB 202 and the 5GCN 110. For a regenerative SV with split architecture, such as SV/sNB-DU 302, the continuation of a radio cell by a UE 105 with continuation of the same 5GCN 110 results in control and L1/L2 impacts to the SV/sNB-DU 302 and sNB-CU 307 if the sNB-CU 307 remains unchanged. A modified UE handover procedure may be used, as discussed above, that affects the SV/sNB-DU 302, the sNB-CUs 307 and possibly the UE 105 but not 5GCN 110 if the sNB-CU 307 is changed. The lack of any 5GCN 110 impact for a regenerative SV with split architecture may be desirable for an MNO, if an SVO owns and manages SVs and sNBs.

When there is a change of a radio cell following transfer of an SV 102/202/302 from one ES 104 to another ES 104, UEs 105 previously accessing the SV 102/202/302 may be offloaded gradually from their previous radio cells (e.g., a short time before the SV transfer) using standard UE handoff procedures. In some implementations, radio cells may have a lifetime of up to 5-15 minutes and, thus, the handoff operations caused by SV and radio cell transfer may be relatively infrequent compared to UE handoff due to movement of the radio cell itself while supported by the same earth station. For example for a moving radio cell, e.g., a radio cell produced without using a steerable SV antenna, the handoff interval may be in the range 6-140 seconds for LEO SVs, making a moving radio cell a predominate cause of handover.

Figure 36B:
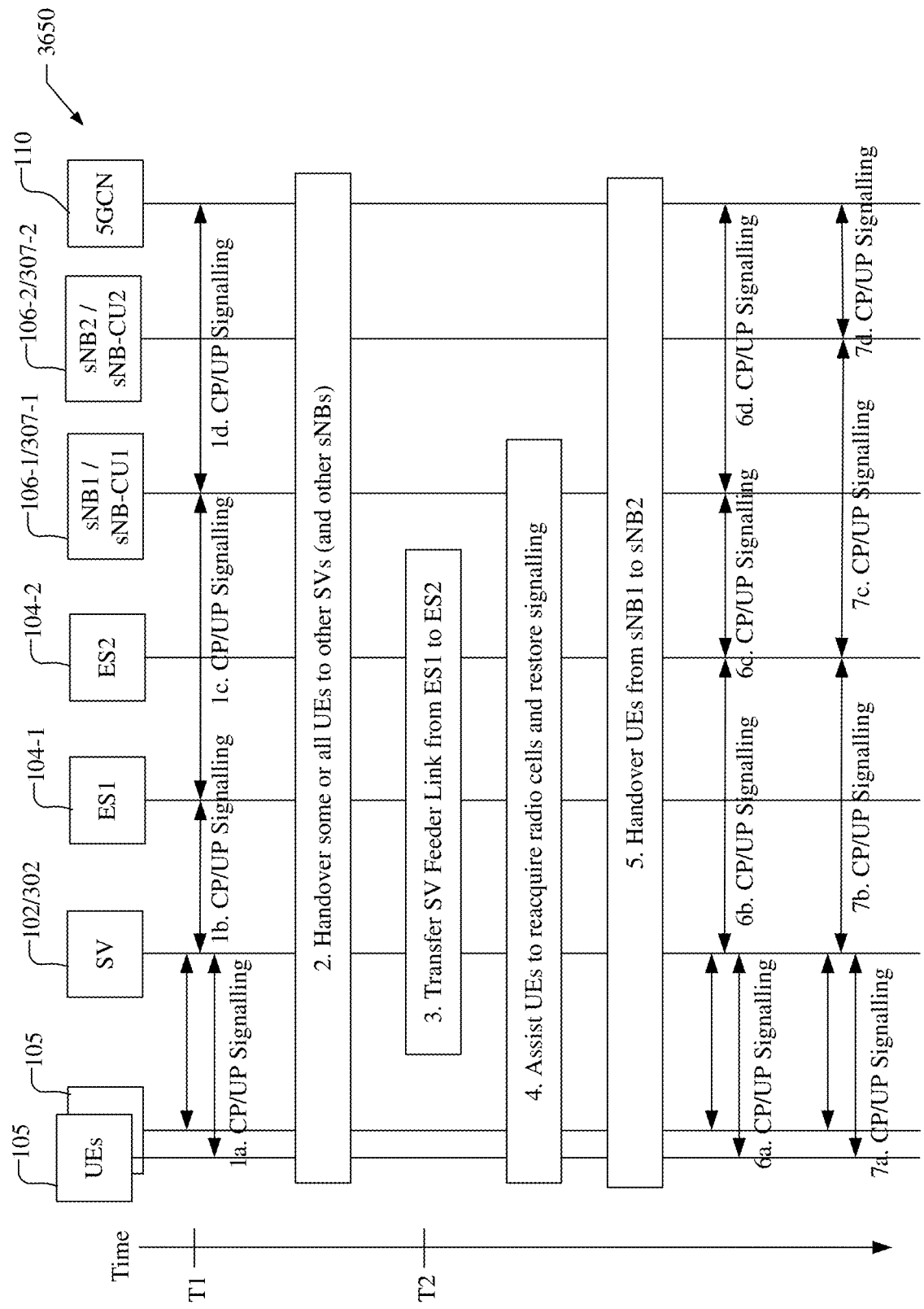
FIG. 36B shows a signaling flow illustrating a high level procedure to support UEs which are accessing radio cells supported by a transparent or regenerative SV when the SV is transferred between earth stations.

FIG. 36B shows a signaling flow 3650 that shows a high level procedure to support UEs 105 which are accessing radio cells supported by an SV 102/302 when the SV 102/302 is transferred from an ES1 104-1 to an ES2 104-2 as in FIGS. 23 and 24 and FIGS. 32 and 33, where there may or may not be a change of sNB 106 or sNB-CU 307. The procedure avoids disruption of signaling and data/voice transfer to these UEs.

In stages 1a-1d of FIG. 36B, at time T, user plane (UP) and control plane (CP) signaling for UEs 105 is transported between a 5GCN 110 and each UE 105 via the SV 102/302, ES1 104-1, and sNB1 106-1 or sNB-CU1 307-1.

At stage 2 of FIG. 36B, prior to time T2, sNB1 106-1 or sNB-CU1 307-1 initiates a handover of some or all UEs 105 to radio cells supported by other SVs. If all UEs 105 are handed over, stages 4-7 do not occur.

At stage 3, at time T2, the feeder link from ES1 104-1 to the SV 102/302 is transferred to ES2 104-2.

At stage 4, if sNB1 106-1 or sNB-CU1 307-1 is not changed, UEs 105 not handed over at stage 2 may be assisted to reacquire current serving radio cells. This may not be needed with regenerative SV mode with a split architecture, e.g., as illustrated in FIG. 3, because the sNB-DU 302 (which is part of the SV 302) may continue to support UE access at the Layer 1, MAC and RLC levels.

At stage 5, if SV 102/302 control is moved from sNB1 106-1 or sNB-CU1 307-1 to sNB2 106-2 or sNB-CU2 307-2, respectively, as part of the transfer at stage 3, a handover procedure is used to transfer CP and UP signaling links and sessions for UEs 105 not handed over at stage 2 from sNB1 106-1 or sNB-CU1 307-1 to sNB2 106-2 or sNB-CU2 307-2, respectively. The handover procedure may be a subset of an existing handover procedure in which UEs 105 are not required to access new radio cells. For example, the procedure shown in FIG. 36A may be used in the case of an SV 302 transfer from sNB-CU1 307-1 to sNB-CU2 307-2. Because an existing (or modified) procedure is used at stage 5, there may be no new impact to the 5GCN 110. If transparent SV mode is used, e.g., as illustrated in FIG. 1, UEs 105 may also be assisted by sNB1/sNB-CU1 106-1 to reacquire their current serving radio cells as part of stage 5, which may look to UEs 105 like a handover procedure to new radio cells.

At stages 6a-6d, when there is no change to sNB1/sNB-CU 106-1/307-1, user plane (UP) and control plane (CP) signaling for UEs 105 still accessing the SV 102/302 is transported between the 5GCN 110 and each UE 105 via the SV 102/302, ES2 104-2, and sNB1 106-1 or sNB-CU1 307-1.

At stages 7a-7d, when there is a change to sNB1/sNB-CU1 106-1/307-1, user plane (UP) and control plane (CP) signaling for UEs 105 still accessing the SV 102/302 is transported between the 5GCN 110 and each UE 105 via the SV 102/302, ES2 104-2, and sNB2 106-2 or sNB-CU2 307-2.

Aspects of SOLUTION 3 to support and reuse existing 5G network access procedures with only small impacts are next discussed with reference to FIGS. 37 and 38.

The configuration of sNBs 106, 202 and 307 may occur during an initial setup procedure. For example, information related to countries, PLMNs, fixed TAs and fixed cells that need to be supported by an sNB 106/202/307 may be configured in the sNB 106/202/307 in advance using O&M and/or by an attached 5GCN 110 during an NG Setup procedure when the sNB 106/202/307 is first connected to the 5GCN 110.

Initial access to a serving PLMN by a UE 105 may be efficiently supported by a serving sNB 106/202/307. For example, an sNB 106/202/307 may broadcast (e.g. using one or more SIBs) detailed information for some or all fixed cells and/or some or all fixed TAs currently supported by the sNB 106/202/307, or currently supported by a particular radio cell for the sNB 106/202/307, to enable a UE 105 to determine a fixed serving cell, a fixed serving TA and/or a serving PLMN before initiating access to the serving PLMN. Broadcasting this type of detailed information, however, would consume SV bandwidth, add to latency and add extra impact to sNBs 106/202/307 and UEs 105. A more efficient solution, however, is for a serving sNB 106/202/307 to determine a UE 105's country and fixed serving cell and/or fixed serving TA at initial access from a UE 105, based on a UE 105 provided or sNB 106/202/307 determined location for the UE 105. Detailed information for fixed TAs within which the UE 105 is allowed to move (without triggering a new Registration) and constituent fixed cells for these TAs may then be provided to the UE 105 by a serving AMF 122 at a NAS level.

In a connection management (CM) idle state, a UE 105 may periodically obtain its own location and may map the location to a fixed TA (e.g. using information for fixed TAs provided by a serving AMF 122 as described above) to determine when to perform a new registration. If the UE 105 is in a CM connected state, the UE 105 may undergo intra-sNB or inter-sNB handover to change a radio cell, and possibly change an SV, due to mobility of the UE 105 and/or movement of the radio cell or the SV.

Figure 37A:
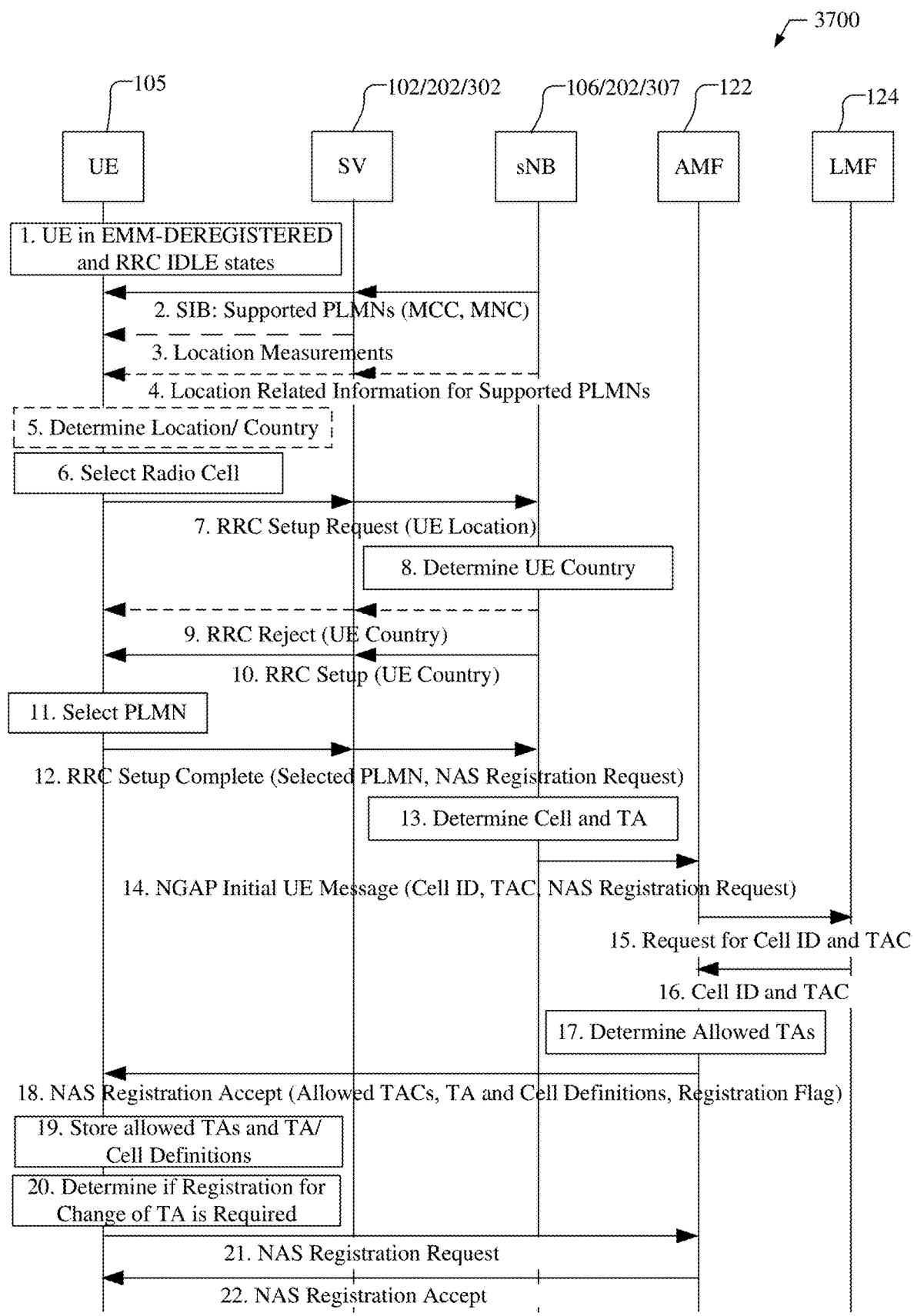
FIG. 37A shows a signaling flow illustrating various messages sent between entities of a communication network for a procedure for initial core network access by a UE.

FIG. 37A shows a signaling flow 3700 that illustrates various messages sent between components of a communication network in a procedure for initial PLMN access by a UE 105 to enable a UE 105 to access a PLMN is the same country as the UE 105. The communication network may be part of communication system 100, 200 or 300 for FIG. 1, 2 or 3, respectively, and is illustrated as including a UE 105, an SV 102/202/302, an sNB 106/202/307, an AMF 122, and an LMF 124. It should be understood that the sNB 106/202/307 or an element of the sNB 106/202/307 may be included within the SV 102/202/302. For example, with an SV 202, an sNB 202 would be completely included within the SV 202 as described for FIG. 2. Alternatively, with an SV 302, an sNB 307 (also referred to as an sNB-CU) would be terrestrial and physically separate from the SV 302, but the SV 302 would include an sNB-DU 302 as described for FIG. 3.

At stage 1 in FIG. 37A, the UE 105 is in a 5G Mobility Management (5GMM) DEREGISTERED state and RRC IDLE state.

At stage 2, the UE 105 may detect radio cells from one or more radio beams transmitted by one or more SVs, including the SV 102/202/302. The sNB 106/202/307 may control SV 102/202/302 to broadcast system information blocks (SIBs) in one or more radio cells of the sNB 106/202/307. The SIBs may indicate one or more PLMNs (referred to as supported PLMNs) supported by the sNB 106/202/307 in each radio cell for the sNB 106/202/307. The PLMNs may each be identified in a SIB by a mobile country code (MCC) and a mobile network code (MNC), where the MCC indicates a country for each identified PLMN (i.e. a country to which each identified PLMN belongs—e.g. a country in which the PLMN is located or is allowed to operate).

At stage 3, which is optional, the UE 105 obtains location related measurements, e.g., for DL signals received from the SV 102/202/302, from other SVs 102/202/302, from gNBs 114 (not shown), from navigation SVs 190 (not shown), or from some combination of these.

At stage 4, which is optional, the UE 105 may receive location related information for the supported PLMNs broadcast (e.g. in one or more SIBs) in the one or more radio cells from the sNB 106/202/307 via the SV 102/202/302. For example, the location related information for the supported PLMNs may comprise geographic definitions for fixed cells of each supported PLMN, geographic definitions for fixed tracking areas of each supported PLMN, or both, and possibly geographic information for a country or countries (e.g. information defining a border or borders of one or more countries).

At stage 5, the UE 105 may optionally determine the location of the UE 105 from the location related measurements from stage 3 if stage 3 occurs. UE 105 may optionally determine the UE 105 country in which the UE 105 is located using the determined location and the location related information received at stage 4 if stage 4 occurs. In some implementations, to assist country determination at stage 5, geographic information for a country or countries (e.g. information defining a border or borders of one or more countries) may be pre-configured in a UE 105 or may be obtained by a UE 105 from a home PLMN at some previous time.

At stage 6, UE 105 selects a radio cell. In one implementation, referred to as implementation I6, if the UE 105 did not determine the UE 105 country at stage 5, the UE 105 may first select a PLMN (referred to as a preferred PLMN), where the PLMN is a preferred PLMN in the supported PLMNs indicated at stage 2 in the one or more radio cells of the sNB 106/202/307. The UE 105 may then select the radio cell at stage 6 based on the radio cell indicating support for the preferred PLMN. In another implementation, referred to as implementation I7, if the UE 105 did determine the UE 105 country at stage 5, the UE 105 may first select a PLMN (referred to as the selected PLMN), where the PLMN is in the supported PLMNs indicated at stage 2 in the one or more radio cells of the sNB 106/202/307 and belongs to the UE 105 country. The selected PLMN may also be a preferred PLMN for UE 105. The UE 105 may then select the radio cell at stage 6 based on the radio cell indicating support for the selected PLMN.

At stage 7, UE 105 may send to the sNB 106/202/307 via the SV 102/202/302 and using the selected radio cell an RRC Setup Request message (e.g. after having performed a random access procedure to obtain initial access to the selected radio cell). If the location and/or country of the UE 105 is obtained at stage 5, the UE may include the location and/or country in the RRC Setup Request message.

At stage 8, if the location and country are not included at stage 7 (e.g. with implementation I6), sNB 106/202/307 may determine a location for UE 105, e.g., from a beam coverage area of the selected radio cell to approximate the UE 105 location. The beam coverage area, for example, may be inferred from a known location of the SV 102/202/302 and a beam direction and angular range. The sNB 106 may further determine the UE 105 country, e.g., based on the UE 105 location. In some implementations, the location determination and location mapping to a country may be performed by a Location Management Component (LMC) which may be part of, attached to, or reachable from, sNB 106/202/307. At stage 8, if the location and/or country are included at stage 7 (e.g. with implementation I7), sNB 106/202/307 may determine and/or verify the location and country for UE 105 in a manner similar to that described for the determination of the location and country. The sNB 106/202/307 may then determine whether the country of the UE 105 (e.g. as received at stage 7 and/or determined or verified at stage 8) is supported by the sNB 106/202/307.

At stage 9, the sNB 106/202/307 may return an RRC Reject to UE 105 if the country of UE 105 is not supported. The RRC Reject may indicate the country (e.g. using an MCC) that the UE 105 is located in. If an RRC Reject is received, the UE 105 may restart at stage 6 using the provided country (or may first verify the provided country as at stage 5 and then restart at stage 6).

At stage 10, the sNB 106/202/307 may return an RRC Setup carrying an indication of the country (e.g. where the indication is an MCC), e.g., if the sNB 106/202/307 verified or determined the country at stage 8.

At stage 11, if a country is received at stage 10, the UE 105 selects a supported PLMN (referred to below as the selected PLMN) for the provided country. The selected PLMN may be one the supported PLMNs indicated at stage 2 in the one or more radio cells of the sNB 106/202/307 and belongs to the UE 105 country. Alternatively, the selected PLMN may be selected as a supported PLMN for a radio cell of a different sNB 106/202/307 (referred to below as "the sNB 106/202/307") and belongs to the UE 105 country. The selected PLMN may also be a preferred PLMN for UE 105. If a country is not received at stage 10 or is received at stage 10 and is the same as a country determined at stage 5 (e.g. with implementation I7), UE 105 may continue to use a PLMN selected at stage 6 as the selected PLMN (i.e. where the selected PLMN belongs to the country of the UE 105). The selected PLMN is also referred to as a serving PLMN below since the selected PLMN acts as a serving PLMN for UE 105 following stage 18.

At stage 12, UE 105 sends an RRC Setup Complete to the sNB 106/202/307 and includes an indication (e.g. MCC and MNC) of the selected PLMN and a Non-Access Stratum (NAS) Registration Request message. UE 106 may also include a location of UE 105, e.g. as determined at stage 5, if UE 105 selects the selected PLMN for a radio cell of a different sNB 106/202/307 at stage 11.

At stage 13, the sNB 106/202/307, or an embedded or attached LMC, may determine a fixed serving cell and/or a fixed serving TA for UE 105, e.g., by mapping a UE 105 location that was received at stage 7 or stage 12 or verified or determined at stage 8, to a Cell ID and/or TAC, for the selected PLMN indicated at stage 12.

At stage 14, the sNB 106/202/307 forwards the NAS Registration Request with an indication of the fixed serving cell and/or fixed serving TA if determined at stage 13 (e.g., the Cell ID and TAC) to an AMF 122, e.g., in an NG Application Protocol (NGAP) Initial UE message. In some implementations, the AMF 122 or LMF 124 may perform the fixed cell and/or fixed TA (Cell ID and/or TAC) determination (and possibly location of the UE 105), in which case the NAS Registration Request or NGAP Initial UE message may include a UE location or UE location information instead of the Cell ID and TAC at stage 14.

At stage 15, the AMF 122 may send a request for the fixed cell and/or fixed TA (Cell ID and/or TAC) for the selected PLMN to the LMF 124 if the sNB 106/202/307 did not determine the Cell ID and TAC in stage 13.

At stage 16, the LMF 124 may provide the AMF 122 with the fixed cell and/or fixed TA (Cell ID and/or TAC) for the selected PLMN.

At stage 17, the AMF 122 may map the location of the UE 105 to an identity of the fixed serving cell and/or an identity of the fixed TA, if not performed by the sNB 106/202/307 or the LMF 124. At stage 17, the AMF 122 also determines allowed TAs (TACs) for the UE 105 in the selected PLMN, where the UE 105 is allowed to access the selected PLMN in each TA of the allowed TAs without needing to perform another Registration with the selected PLMN. AMF 122 may perform other actions at stage 17 associated with Registration of a UE 105 such as authenticating the UE 105 and registering the UE 105 in a home Unified Data Management (UDM) (not shown) and UE 105 and AMF 122 may perform additional actions associated with an initial registration after stage 19 which are not shown here but are well known in the art.

At stage 18, the AMF 122 returns a NAS Registration Accept message to UE 105 via sNB 106/202/307 that includes the allowed fixed TAs (referred to here as TAs) (TACs) and location information such as geographic definitions of the allowed TAs and constituent fixed cells for the allowed TAs. For example, the geographic definitions of the allowed TAs and constituent fixed cells may be defined using grid points and/or polygons as described above for SOLUTION 1. A Registration flag may also be included in the NAS Registration Accept message to indicate if the UE 105 is or is not required to perform a registration with the serving PLMN for a change of TA after detecting that the UE 105 is no longer in any of the allowed TAs.

At stage 19, the UE 105 stores the allowed TAs, the geographic definitions of the allowed TAs and constituent fixed cells and the Registration flag (if included) to allow later determination of a current TA and current fixed cell.

As part of stage 19, UE 105 may access the serving PLMN to obtain or enable various services. For example, UE 105 may: (i) determine a current location of the UE 105 (e.g. as at stages 3 and 5); (ii) map the current location to one of the allowed TAs stored at stage 19 and/or to one of the constituent fixed cells for an allowed TA based on the geographic definitions of the allowed TAs and/or constituent fixed cells; and (iii) include an indication of the allowed TA and/or an indication of the constituent fixed cell in a message sent to the serving PLMN. For example, the indication of the allowed TA, the indication of the constituent fixed cell or both may enable a service for the UE or by the serving PLMN. As an example, the message may be a Session Initiation Protocol (SIP) INVITE message sent to establish an emergency call for the UE 105 and the indication of the constituent fixed cell may correspond to a fixed serving cell for the UE 105 and the service may comprise routing the SIP INVITE message to a PSAP to help establish the emergency call. Alternatively, the message may be a SIP or NAS message and the service may comprise provision of lawful interception LI in which information for the UE 105 is sent to an LI client.

At stage 20 in FIG. 37A, which may occur some time period after stage 19 (e.g. a few seconds to an hour or more later), the UE 105 may determine if registration is required for a change of TA. For example, the UE 105 may detect one or more new radio cells (e.g. each comprising one or more radio beams) from one or more SVs that are different than SV 102/202/302, where each of the new radio cells indicates support for the serving PLMN. The UE 105 may receive an indication of supported TAs (e.g. TACs) of the serving PLMN broadcast (e.g., in SIBs) in the new radio cells. The UE 105 may determine that registration is required with the serving PLMN for a change of TA, based at least in part on the allowed TAs stored at stage 19 and the supported TAs indicated at stage 20. For example, registration may always be required with the serving PLMN for a change of TA if the TAs supported by the new radio cells do not include any TA in the allowed TAs received at stage 18 and stored in stage 19. Conversely, registration may not be required for some conditions C1 if the supported TAs supported by the new radio cells include at least one of the allowed TAs received at stage 18 and stored in stage 19 and that is supported by one or more of the new radio cells. As an example of the conditions C1, registration may not be required if the NAS Registration Accept message from stage 18 includes an indication (e.g. the Registration flag) allowing the UE 105 to access the serving PLMN using a radio cell supporting at least one of the allowed TAs when the UE is not located in any of the allowed TAs. In another implementation, the UE 105 may determine if registration is required by determining a current location of the UE 105 and determining whether the current location of the UE is inside any allowed TA received at stage 18 and stored in stage 19. Registration may be required (e.g. when conditions C1 do not apply) when the current location of the UE 105 is not inside any allowed TA or when the current location of the UE is inside an allowed TA but the allowed TA is not included in the TAs supported by the new radio cells. Conversely, registration may not be required when the current location of the UE is inside an allowed TA and the allowed TA is included in the TAs supported by the new radio cells. Registration may additionally be required, e.g., if the NAS Registration Accept message at stage 18 includes an indication (e.g. the Registration flag) requiring the UE to perform registration for a change of TA with the serving PLMN when the UE is not located inside any of the allowed TAs.

At stage 21 which is conditional, a NAS registration request for the change of TA may be transmitted to the AMF 122 by the UE 105 using one of the new radio cells from a different SV when the UE determines the UE 105 is required to perform the registration with the serving PLMN for the change of TA. In some implementations, the UE 105 may camp on the one of the new radio cells without performing the registration with the serving AMF 122 for the change of TA, e.g., when the UE 105 is in an idle state and when the UE 105 determines that registration is not required. The UE may access the serving AMF 122 using one of the new radio cells without performing the registration with the serving AMF 122 for the change of TA, when the UE is in a connected state and when the UE determines that registration is not required.

At stage 22 which is conditional, a NAS Registration Accept may be returned by the AMF 122 to UE 105 if the Registration Request was transmitted in stage 21.

Figure 37B:
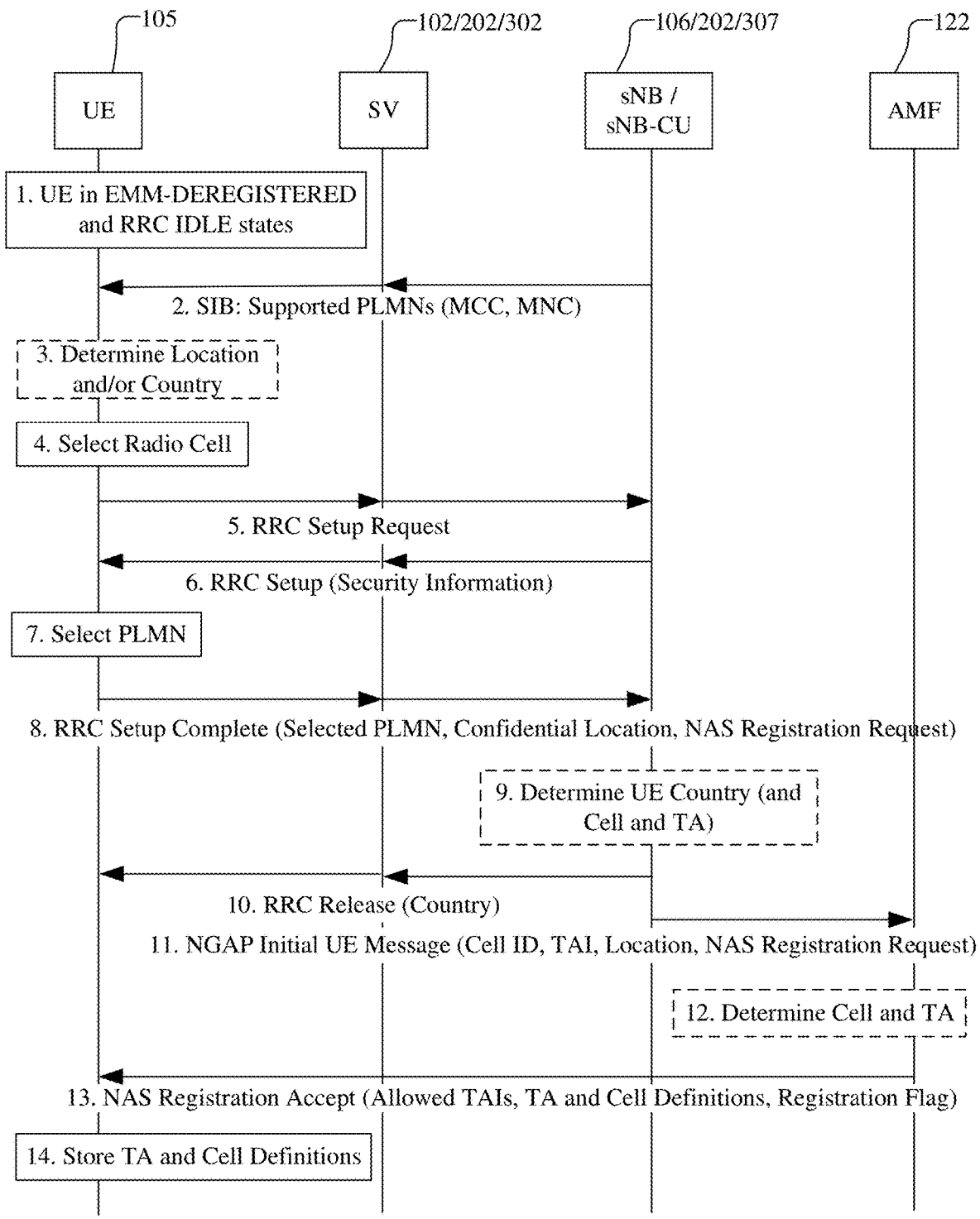
FIG. 37B shows another signaling flow illustrating various messages sent between entities of a communication network for a procedure for initial core network access by a UE.

FIG. 37B shows a signaling flow 3750 that illustrates various messages sent between components of a communication network in a procedure for initial PLMN access by a UE 105 to enable a UE 105 to access a PLMN is the same country as the UE 105. Signaling flow 3750 is a variant of signaling flow 3700 for FIG. 37A in which UE 105 location information can be more protected and some RRC message impacts may be reduced or avoided. As discussed above, it is normally required that when a UE initially accesses a PLMN that the PLMN is in the same country as the UE. The procedure illustrated in FIG. 37B is based on existing PLMN initial access procedures as described in Third Generation Partnership Project (3GPP) Technical Specification (TS) 38.300 and 3GPP TS 23.502. The main differences are use of a UE location capability to provide a current UE location to an sNB or sNB-CU 106/202/307 and an ability of an sNB or sNB-CU 106/202/307 to determine whether the UE 105 location is inside the country supported by the sNB or sNB-CU 106/202/307.

At stage 1 of FIG. 37B, the UE 105 starts off in EMM-DEREGISTERED and RRC IDLE states.

At stage 2, the sNB or sNB-CU 106/202/307 broadcasts (via an SV 102/202/302) an indication of supported PLMNs (e.g. MCC-MNC) in each radio cell. The sNB or sNB-CU 106/202/307 may also indicate in a SIB whether a UE 105 location will be needed at stage 8 (or may provide conditions for inclusion of a UE 105 location at stage 8 such as for initial PLMN access) and may include security information described below for stage 6 such as public key(s) and an indication of ciphering algorithm(s). For example, for a radio cell well inside the interior of a country, UE 105 location may not be requested unless needed to determine a fixed TA and fixed serving cell (e.g. at stage 9). An indication of location requirement at stage 2 may provide more time for a UE 105 to obtain a location than an indication at stage 6.

At stage 3, the UE 105 determines the UE 105 location (e.g. via GNSS) if the UE 105 is location capable and may determine the corresponding country. Performing this stage may continue if needed up until stage 8.

At stage 4, the UE 105 selects a radio cell (and an associated SV 102/202/302) which supports a preferred PLMN and the UE country if already known (e.g., if determined at stage 3).

At stage 5, the UE 105 sends an RRC Setup Request to an sNB or sNB-CU 106/202/307 supporting the radio cell selected at stage 4 to request an RRC signaling connection. The UE 105 may include a confidential location (also referred to as a ciphered location or concealed location) at stage 5 if the RRC Setup Request may be extended. This could reduce signaling in the case that the UE 105 is not in the correct country, although it could also require broadcasting all of the security information at stage 2.

At stage 6, the sNB or sNB-CU 106/202/307 returns an RRC Setup message. If the radio cell being accessed by the UE 105 has a coverage area which spans more than one country (e.g. crosses an international border) or if a UE 105 location is needed to determine a fixed TA and fixed serving cell for the UE, the sNB or sNB-CU 106/202/307 includes a request for the location of the UE 105 and provides security information if not provided at stage 2 that may include a public ciphering key and an indication of a ciphering algorithm.

At stage 7, the UE 105 selects a preferred PLMN from among the PLMNs indicated at stage 2. If PLMNs for only one country are indicated at stage 2, UE 105 could assume that it is in the same country as these PLMNs and could select one of these PLMNs as the preferred PLMN. Alternatively, if UE 105 determines a country at stage 3, UE 105 may select a preferred PLMN at stage 7 that is either in the country determined at stage 3 or allowed to serve the country determined at stage 3.

At stage 8, the UE 105 sends an RRC Setup Complete message indicating the selected PLMN and including a NAS Registration Request. If location was requested at stage 6 or indicated at stage 2, the UE 105 may include the location determined at stage 3. The location may be included in a confidential form by ciphering, e.g. using a public ciphering key and ciphering algorithm indicated at stage 2 or stage 6. The determination and encoding of the confidential location may reuse some of the functionality used to support a Subscription Concealed Identifier (SUCI) as described in 3GPP TS 23.003.

At stage 9, if a location was requested (at stage 2 or stage 6) and included at stage 8, the sNB or sNB-CU 106/202/307 deciphers the confidential location received at stage 8, e.g. using a private key (corresponding to the public key used by the UE 105). If country verification is needed, the sNB or sNB-CU 106/202/307 maps the location to a country and verifies the country is supported by the sNB or sNB-CU 106/202/307 and matches the country for the selected PLMN. The sNB or sNB-CU 106/202/307 may also or instead map the UE location to a Cell ID (for a fixed cell) and/or TAI (for a fixed TA) for the selected PLMN (e.g. if the sNB or sNB-CU 106/202/307 has been configured with fixed cell and fixed TA information). When a UE 105 location is not provided at stage 8, the sNB or sNB-CU 106/202/307 may use the radio cell coverage area for the UE 105 as an approximate location (e.g. in order to determine a fixed TA or to forward a location at stage 10).

At stage 10, if the UE country determined at stage 9 is not supported by the sNB or sNB-CU 106/202/307 (or does not march the country for the selected PLMN), the sNB or sNB-CU 106/202/307 returns an RRC Release to the UE 105 and includes the country determined at stage 9 and/or an indication that the PLMN selected for stage 9 does not match the country of the UE 105. The UE 105 may then restart PLMN selection at either stage 3 (e.g. in order to verify the UE 105 country) or stage 4.

At stage 11, if the UE 105 is in the correct country, the sNB or sNB-CU 106/202/307 forwards the Registration Request to an AMF 122 for the selected PLMN and includes the Cell ID and/or TAI if obtained at stage 9 or the location obtained at stage 9 otherwise.

At stage 12, if no Cell ID and TAI were included at stage 11, the AMF 122 (or an associated LMF 124) determines a cell ID and/or TAI (for a fixed cell and/or fixed TA) from the location received at stage 11.

At stage 13, the AMF 122 returns one or more allowed TAIs to the UE 105 and geographic definitions of the associated fixed TAs and/or constituent fixed cells for the associated fixed TAs (e.g. using grid points). A Registration flag may also be included to indicate if the UE is required to perform a registration for a change of TA. Registration for a change of TA may be referred to as "location tracking" because UE 105 can then be required to track its location in order to determine when a change of TA has occurred. With location tracking, a UE 105 may periodically map its current location to a fixed TA based on the fixed TA geographic definitions received at stage 13 and to perform a new registration if no longer within an allowed TA. Without location tracking, a UE 105 need not determine a current TA periodically and may assume presence in an allowed TA so long as the UE 105 can access a radio cell that supports at least one allowed TA. This option enables the AMF 122 to page the UE 105 (via an allowed TA) even when the UE 105 moves out of an allowed TA and reduces the amount of location support needed from the UE 105. For a UE 105 which is not location capable, the geographic definitions of the fixed TAs and constituent fixed cells would not need to be provided by the AMF 122 at stage 13.

At stage 14, the UE 105 stores the fixed TA and/or fixed cell geographic definitions (if provided) to allow later determination of a current fixed TA and current fixed serving cell (e.g. to enable registration in a new TA and regulatory services dependent on a current serving cell).

In CM IDLE and RRC IDLE states, a UE 105 may select and camp on any suitable radio cell which indicates support for an allowed TA for the registered PLMN. Selection of a new radio cell for a different SV and/or different sNB or sNB-CU 106/202/307 may occur (e.g. when coverage by a previous radio cell starts to disappear) so long as the new radio cell supports an allowed TA.

Paging may operate as for a terrestrial NR access, with an AMF 122 sending a paging message to one or more sNBs 106/202 (or sNB-CUs 307) which broadcast the paging message over all radio cells which support the fixed TAs allowed for the UE 105.

If location tracking is not required (see stage 13 in FIG. 37B), a UE 105 may continue to access a radio cell for a serving PLMN which advertises support for at least one allowed fixed TA for the UE 105.

If location tracking is required (see step 13 of FIG. 37B), a location capable UE 105 periodically obtains a current UE location and verifies presence in an allowed fixed TA. As described above, TA boundaries may be precisely aligned with the border of a country or may simply be defined within a country to ensure that when a UE 105 verifies being inside an allowed TA, the UE 105 is also located inside the associated country.

If the UE 105 is no longer in an allowed TA (and therefore possibly no longer in a previous country) or cannot access a radio cell supporting an allowed TA, the UE 105 performs a new registration, which may use the same procedure as in FIG. 37A or FIG. 37B or a subset of this procedure.

Support for a UE 105 without location capability may be possible, e.g. as described for stage 8 in FIG. 37A. For example, a current radio beam coverage area for a UE 105 may be used by an sNB 106/202/307 to determine a UE 105 country and a fixed serving TA. While support for location of a UE 105 using a current radio beam coverage area may not always be reliable, there are alternatives that may be used to avoid or reduce erroneous outcomes. In one implementation, a radio beam coverage area may be directed by an SV 102/202/302 (e.g. using a steerable antenna array) primarily within one country with either zero or low coverage of adjacent countries. A UE 105 able to access a radio cell using such a radio beam may then be assumed to be within the country associated with the radio beam (or associated with the radio cell if all radio beams for the radio cell are directed into the same country). This implementation may be suitable for regions, such as the European Union with common regulations. In another implementation, a UE 105 with no location capability may be prohibited from accessing a radio cell whose coverage area spans more than one PLMN or more than one country, which may be suitable, e.g., in large countries except near borders. For example, a flag may be broadcast by an sNB 106/202/307 (e.g. using a SIB) within each radio cell supported by the sNB 106/202/307. The flag may indicate whether a UE 105 without a location capability is allowed to access a PLMN associated with the radio cell. If the flag indicates that access is not allowed, a UE 105 without a location capability may refrain from initial access to the associated PLMN, though possibly may be allowed to access the PLMN if already registered with the PLMN. The flag may be set to indicate that access is not allowed when the radio cell has a coverage area spanning more than one country or more than one PLMN coverage area.

In another implementation, a UE 105 may periodically interact with an sNB 106/202/302 or an AMF 122 to obtain or verify the UE 105 location and current fixed serving TA. A RAN procedure may be used when the UE is in CM Idle state or periodic Registration may be enhanced for AMF 122 or LMF 124 determination. This implementation may reduce the likelihood of errors, but at the expense of more signaling by a UE 105 and PLMN.

When a UE 105 is in or has just entered a CM idle state, the UE 105 may select and then camp on a suitable or acceptable radio cell. For example, the UE 105 may be aware of allowed TAs following the latest Registration of the UE 105 in which allowed TAs are indicated to the UE 105, e.g. as described for stage 18 of FIG. 37A. The UE 105 may then select and camp on a suitable radio cell that indicates support for an allowed TA for the serving (and registered) PLMN. Selection of a new radio cell (e.g. for a different SV 102/202/302 and/or different sNB 106/202/307) may occur so long as the radio cell supports an allowed TA as previously indicated by the serving PLMN. A radio cell for a LEO or MEO SV may broadcast information (e.g. carrier frequency and beam angles) for other radio cells whose coverage areas will later move into the current coverage area of the radio cell. This may assist a UE 105 that is currently accessing or camping on the radio cell to find and access a new radio cell (e.g. one of the other radio cells) after the coverage area of the radio cell has moved away from the current UE 105 location. Paging of a UE 105 may operate as for terrestrial NR access—e.g. with an AMF 122 sending a paging message to one or more sNBs 106/202/307, which each sNB 106/202/307 broadcasting the paging message over all radio cells controlled by the sNB 106/202/307 that support any of the TAs allowed for the UE 105.

As discussed in stages 20-22 for FIG. 37A, registration may be performed by a UE 105 for a change of allowed TA. A UE 105 with a location capability, for example, may periodically determine its current location and maps the location to a fixed TA. If the registration flag discussed for stages 18 and 20 of FIG. 37A indicates registration is required for a change of TA, the UE 105 may perform a new registration after detecting that the UE 105 is no longer located inside an allowed TA. If the Registration flag indicates that registration is not required for a change of TA, the UE 105 may not be required to perform a Registration after detecting that it is no longer inside an allowed TA, e.g., as long as the UE 105 remains camped on a radio cell that supports an allowed TA. In this case, for example, the UE 105 may perform a registration when no suitable radio cell is found for any allowed TA. Registration for a change of TA, for example, may not be used when the current UE 105 location is distant from a country or PLMN border. The Registration for a change of TA may operate similarly to Registration for initial PLMN access (e.g. as described for stages 21 and 22 of FIG. 37A) except that the radio cell selected by the UE 105, e.g., at stage 20 of FIG. 37A, needs to support the current serving PLMN.

As discussed above, a UE 105 access to a core network, e.g., 5GCN 110, via an SV 102/202/302 may require UE 105 handovers to new SVs 102/202/302 and SV 102/202/302 transfers or handovers to new earth stations 104. For example, a LEO SV 102/202/302 may be accessible from a fixed ground location for around 2 to 15 minutes, depending on the height of the SV 102/202/302 and the perpendicular distance (measured over the Earth's surface) between the fixed location and the orbital plane of the SV 102/202/302. Following a period of accessibility to an SV 102/202/302 by a UE 105, a UE 105 accessing the SV 102/202/302, or simply camped on a radio cell for the SV 102/202/302, may be required to handover to another SV 102/202/302 or to camp on a radio cell for another SV 102/202/302, respectively. Similarly, following a period of accessibility by an SV 102/202/302 to an earth station 104, the SV 102/202/302 itself and any UEs 105 still accessing the SV 102/202/302 may be required to undergo handover (or transfer) to another earth station 104. Further, after the transfer of the SV 102/202/302 to another earth station 104, characteristics of each radio cell supported by the SV 102/202/302, including a coverage area and radio cell ID, may change. In addition, a radio cell for an SV 102/202/302 may move (e.g. continuously or at discrete intervals), e.g., if the SV 102/202/302 does not include a steerable directional antenna, and accordingly may support a particular fixed TA for only part of a time interval during which the SV 102/202/302 is accessing the same earth station 104. From the perspective of a UE 105, these handover and transfer events may be sudden and disruptive to communication, e.g., if a new SV 102/202/302 cannot be found before the UE 105 needs to cease access to a current SV 102/202/302. In addition, from a network perspective, the handover of a large numbers of UEs 105 from one SV 102/202/302 to another at about the same time may impose an unacceptable system load.

In one implementation, based on knowledge of future orbital locations of an SV 102/202/302, a duration of radio coverage by the SV 102/202/302 for any location on the Earth and a duration of accessibility to the SV 102/202/302 by any earth station 104 may be determined in advance (e.g. by an O&M server). For example, the determination of the duration of radio coverage by the SV 102/202/302 for any location may take into account the radio cells supported by the SV 102/202/302 including the coverage areas of these radio cells and whether steerable directional antennas are used to maintain coverage for the same geographic area by a radio cell over an extended period. Similarly, the determination of the duration of accessibility to the SV 102/202/302 by an earth station 104 may take into account the orbit and the orbital positions of the SV 102/202/302 and the position of the ES 104 relative to this orbit. With this information, it may be possible to determine: 1) a period of time (e.g. start time and end time) during which an SV 102/202/302 will be accessing a particular earth station 104; and 2) a period of time (e.g. start time and end time) during which a particular radio cell for an SV 102/202/302 will be providing radio coverage for part or all of the geographic area of a given fixed TA. Information related to the time during which an SV 102/202/302 will access a particular earth station 104 and/or the time during which a particular radio cell for an SV 102/202/302 will provide radio coverage to a current location of a UE 105 may be provided to a UE 105 accessing or camped on the SV 102/202/302.

For example, in instances where all UEs 105 will be handed off from a current SV 102/202/302 to a new (different) SV 102/202/302, the UEs 105 may be provided with an advance indication of the impending handover based on a period of time during which an SV 102/202/302 will be accessing a particular earth station 104. Similarly, the UEs 105 may be provided with an advance indication that radio cell coverage of any fixed TA by the SV 102/202/302 will cease at some imminent future time based on a period of time during which a particular radio cell for the SV 102/202/302 will be providing radio coverage for part or all of the fixed TA. With this information, the UEs 104 may find another SV 102/202/302, before coverage from the SV 102/202/302 ceases.

A duration of radio coverage by a particular radio cell for a current coverage area of the radio cell may be referred to as a "lifetime of the radio cell", and a remaining duration of the radio coverage (at any particular time during the radio coverage) may be referred to as a "remaining lifetime of the radio cell". Similarly, a duration of radio coverage by a particular radio cell for part or all of a geographic area of a particular fixed TA may be referred to as a "lifetime of the radio cell for support of the TA" or as a "lifetime of the TA", and a remaining duration of the radio coverage (at any particular time during the radio coverage) may be referred to as a "remaining lifetime of the radio cell for support of the TA" or as a "remaining lifetime of the TA".

In one implementation, to avoid UEs 105 camping on or continuing to access a radio cell whose lifetime is nearly complete or whose lifetime for support of some TAs is almost complete, an SV 102/202/302 may provide advance indication(s) to UEs 105 that are accessing the radio cell of a remaining lifetime for the radio cell and/or a remaining lifetime for the radio cell for support of each of one or more TAs. In some implementations, the advance indication(s) may be provided using System Information Blocks (SIBs) such as SIB1 or SIB2. For example, a SIB1 or SIB2 for a particular radio cell supported by an SV 102/202/302 may include parameters such as: the remaining lifetime of the radio cell (e.g. 0-1023 seconds or 0-255 seconds); a list of TAs supported by the radio cell; and for each supported TA, the remaining lifetime of the radio cell for each supported TA; or a combination thereof.

After receiving an indication of the remaining lifetime of the radio cell and/or the remaining lifetime of the radio cell for each supported TA, a UE 105 in idle state may start to look for another radio cell supporting an allowed TA some time before the remaining lifetime of the radio cell and/or the remaining lifetime(s) of the radio cell for allowed TA(s) will expire. Similarly, a UE in connected state may prepare for handover by looking for and obtaining measurements for other radio cells before the remaining lifetime of the radio cell and/or the remaining lifetime(s) of the radio cell for allowed TA(s) will expire.

Radio cells may also broadcast information to help a UE 105 acquire anew radio cell (e.g. from another SV 102/202/302) whose radio coverage will move into an area supported by a current radio cell for the UE 105. Such new radio cells might not be detected by a UE 105 in advance because their radio coverage might not yet support the current location of the UE 105. However, if a UE 105 knows when a coverage of a new radio cell will start (e.g. by being provided with a list of new radio cells that will support or partially support a particular fixed TA and the times at which the coverages will start), the UE 105 may attempt to acquire one of these new radio cells after a coverage is expected to start.

Figure 38:
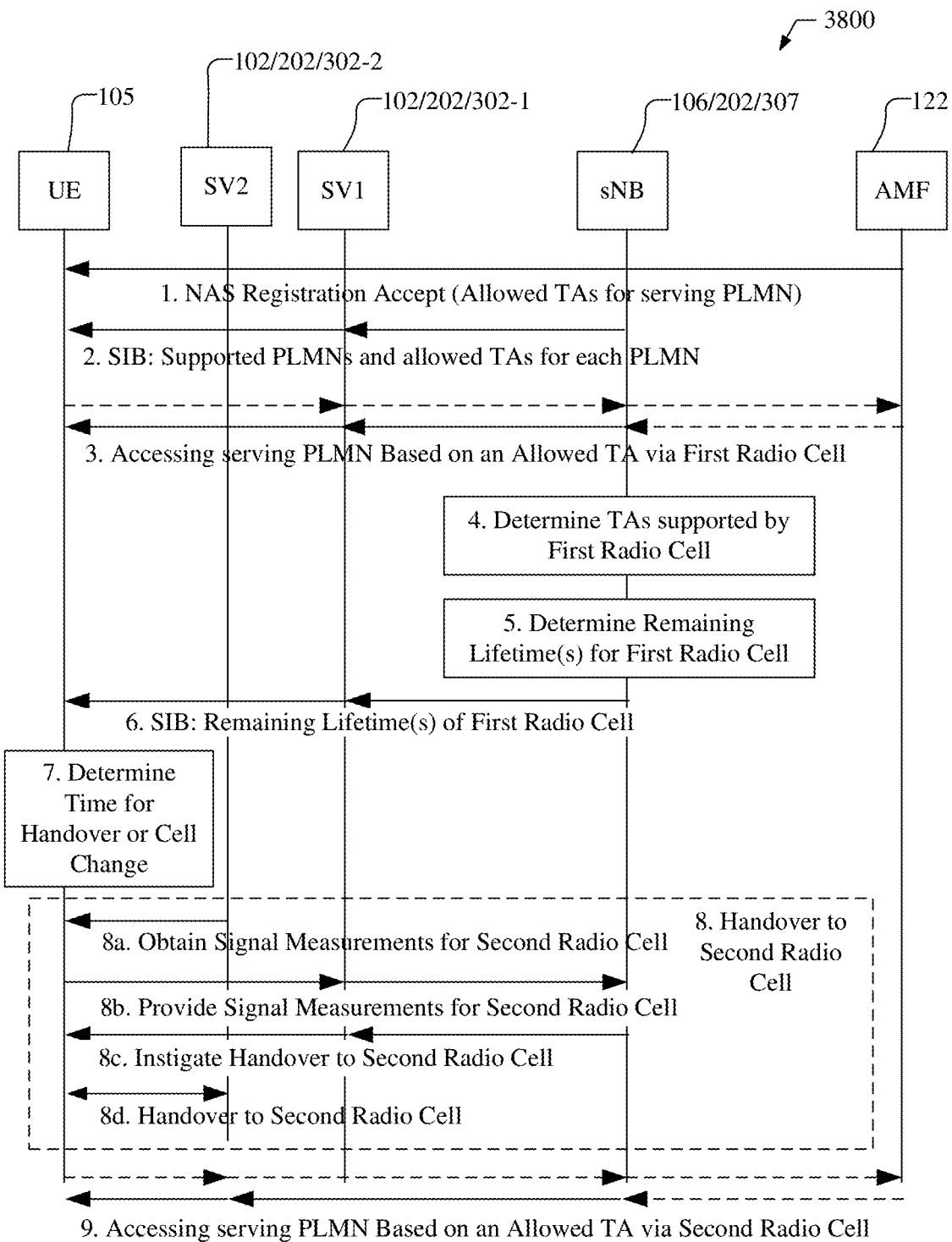
FIG. 38 shows a signaling flow illustrating various messages sent between entities of a communication network for an indication of a duration of service.

FIG. 38 shows a signaling flow 3800 that illustrates various messages sent between components of a communication network in a procedure for providing an indication of a remaining lifetime of a current radio cell (e.g. for support of a fixed TA), as discussed above. The communication network may be part of communication system 100, 200 or 300 for FIG. 1, 2 or 3, respectively, and is illustrated as including a UE 105, a first SV1 102/202/302-1 and a second SV2 102/202/302-2 (sometimes collectively referred to as SVs 102/202/302), an sNB 106/202/307, and an AMF 122. The SVs 102/202/302 may be used in a transparent mode (e.g. may be SVs 106), a regenerative mode with a non-split architecture (e.g. may be SVs 202) or in a regenerative mode with a split architecture (e.g. may be SVs 302), e.g., as discussed in FIGS. 1-3. For example, the sNB 106/202/307 may be terrestrial (e.g., may be an sNB 106 in FIG. 1) when the SVs 102/202/302 are used in the transparent mode. The sNB 106/202/307 may be part of each SV 102/202/302 when the SVs 102/202/302 are used in the regenerative mode with the non-split architecture, as illustrated in FIG. 2, in which case there would be two sNBs 202 each part of one of the SVs 102/202/302. The sNB 106/202/307 may be terrestrial and may comprise an sNB-CU 307, as discussed for sNB-CU 307 in FIG. 3, when the SVs 102/202/302 are used in the regenerative mode with the split architecture.

At stage 1 in FIG. 38, the AMF 122 for a serving PLMN for UE 105 may provide the UE 105 with a NAS Registration Accept message with one or more allowed TAs (TACs) for the serving PLMN, e.g., as discussed in stage 18 of FIG. 37A and for stage 13 of FIG. 37B. The NAS Registration Accept message, for example, may optionally include an indication that the UE 105 may access the serving PLMN via a radio cell supporting an allowed TA for the UE 105 when the UE 105 is not located in an allowed TA.

At stage 2, the sNB 106/202/307 may provide the UE 105 via the SV1 102/202/302-1 with a broadcast system information block (SIB) indicating supported PLMNs for a first radio cell for the sNB 106/202/307 to which the UE 105 is connected (or camped on) and supported TAs for each supported PLMN.

At stage 3, the UE 105 may access the serving PLMN via the SV1 102/202/302-1, sNB 106/202/307, and AMF 122, based on the allowed TAs via the first radio cell. For example, the UE 105 may determine whether the UE 105 is located inside an allowed TA and determine whether the first radio cell supports the serving PLMN and the allowed TA. The UE 105 may access the serving PLMN via the first SV1 102/202/302-1 and the first radio cell for the first SV1 102/202/302-1 when the UE 105 determines the UE 105 is located inside the allowed TA and the UE 105 determines the first radio cell supports the serving PLMN and the allowed TA. In another example, the UE 105 may determine whether the first radio cell supports the serving PLMN and an allowed TA and may receive an indication that the UE 105 may access the serving PLMN when the UE 105 is not located in an allowed TA, e.g., as discussed at stage 1. The UE 105 may access the serving PLMN via the first SV1 102/202/302-1 and the first radio cell when the UE 105 determines the serving PLMN and an allowed TA are supported by the first radio cell (e.g. and when the UE is either located inside an allowed TA or not located inside an allowed TA).

At stage 4, the sNB 106/202/307 may determine one or more TAs (assumed to be fixed) supported by the first radio cell. The one or more TAs may belong to a plurality of PLMNs supported by the first radio cell. For example, the sNB 106/202/302 may determine TAs currently supported by the first radio cell based on TAs with geographic areas overlapping with a coverage area of the first radio cell, where the overlap between the geographic area of each TA of the TAs and the coverage area of the first radio cell satisfies one or more predetermined criteria for each TA. For each TA, the criteria, for example, may include inclusion of the geographic area of the TA within the coverage area of the first radio cell, inclusion of the coverage area of the first radio cell within the geographic area of the TA, an overlap of the coverage area of the first radio cell with the geographic area of the TA that exceeds a predetermined threshold, or some combination of these, e.g. as discussed for FIG. 6.

At stage 5, the sNB 106/202/307 may determine a remaining lifetime for the first radio cell, e.g., an amount of time until there is a change of the first radio cell. The change of the first radio cell may include, for example, a change of an earth station 104 used by the sNB 106/202/307 to exchange signaling for the first radio cell either with the SV1 for the first radio cell when SV1 comprises an SV 102 or 302 or with a 5G core network (e.g. AMF 122 in a 5GCN 110) when SV1 comprises an SV 202 (and thus also includes the sNB 202); a change in timing for the first radio cell; a change in carrier frequency for the first radio cell; a change in bandwidth for the first radio cell; a change in coverage area for the first radio cell; a change to radio beams used by the first radio cell; a change in a cell identity for the first radio cell; a cessation of support by the first radio cell for one or more TAs belonging to one or more PLMNs supported by the first radio cell; a termination of support for the first radio cell by the sNB 106/202/307; or any combination of these. The sNB 106/202/307 may also or instead determining a remaining lifetime for each TA in the one or more TAs supported by the radio cell as determined at stage 4, where the remaining lifetime for each TA is an amount of time until the radio cell ceases support for that TA. For example, the radio cell may be considered to cease support for any TA when the overlap between the geographic area of that TA and the coverage area of the radio cell no longer satisfies the particular criteria for that TA discussed for stage 4.

At stage 5, the sNB 106/202/307 may use knowledge of the future (e.g. orbital) locations of the SV1 102/202/302-1 to determine the duration of radio coverage of the first radio cell, e.g., based on the coverage area of the first radio cell and whether SV1 102/202/302-1 includes a steerable directional antenna to maintain coverage for a same geographic area. The sNB 106/202/307 may accordingly determine a period of time (e.g. start time and end time) during which the SV1 102/202/302-1 will be using a particular earth station 104 (not shown) and/or a period of time (e.g. start time and end time) during which the first radio cell will be providing radio coverage for part or all of a TA. The sNB 106/202/307 may use this information to determine the remaining lifetime for the first radio cell and/or the remaining lifetime of each TA.

At stage 6, the sNB 106/202/307 generates a SIB, e.g., a SIB type 1 (SIB1) or a SIB type 2 (SIB2), and includes the remaining lifetime for the first radio cell and/or the remaining lifetimes for TAs supported by the first radio cell and broadcasts the SIB to the UE 105 via the SV1 102/202/302-1. For example, the remaining lifetime for the first radio cell may indicate an interval a time until a change in the first radio cell will occur, and/or may include an interval of time for each TA in a plurality of TAs supported by the first radio cell indicating when each TA will no longer be supported by the radio cell.

At stage 7, the UE 105 may determine when to perform a cell change or a handover from the first radio cell to a different radio cell and to access the serving PLMN via a SV2 102/202/302-2 using a different radio cell based on the remaining lifetime for the first radio cell and/or the remaining lifetimes of one or more TAs received at stage 6. For example, the UE 105 may begin the cell change or handover process a predetermined time before the expiration of the remaining lifetime for the first radio cell and/or the remaining lifetimes of one or more TAs received at stage 6.

At stage 8 the cell change or handover to a second radio cell is performed. The cell change may be performed when the UE 105 is in an idle state, e.g., as discussed at stage 8a. The handover may be performed when the UE 105 is in a connected state, as discussed at stages 8a, 8b, 8c, and 8d.

At stage 8a, the UE 105 may obtain signal measurements for a second radio cell from second SV2 102/202/302-2. The signal measurements for the second radio cell, for example, may indicate support for the serving PLMN and an allowed TA for UE 105, and may include a SIB broadcast with the remaining lifetime for the second radio cell, similar to the SIB broadcast for the first radio cell discussed in stage 6. If the UE 105 is in an idle state, the UE 105 may select the second radio cell to camp on prior to the change of the first radio cell, e.g., based in part on a remaining lifetime for the second radio cell being greater than the remaining lifetime for the first radio cell, or based on a remaining lifetime for an allowed TA supported by the second radio cell being greater than the remaining lifetime for any allowed TA supported by the first radio cell.

At stage 8b, if the UE 105 is in a connected state, the UE 105 may provide the signal measurements, for the second radio cell to the sNB 106/202/307 via the first SV1 102/202/302-1.

At stage 8c, the sNB 106/202/307 instigates handover of UE 105 to the second radio cell via signaling through the first SV1 102/202/302-1. For example, sNB 106/202/307 may instigate the handover based in part on the signal measurements and the remaining lifetime for the second radio cell being greater than the remaining lifetime for the first radio cell or a remaining lifetime for an allowed TA for UE 106 supported by the second radio cell being greater than the remaining lifetime for any allowed TA for UE 105 supported by the first radio cell.

At stage 8d, the handover to the second radio cell via the second SV2 102/202/302-2 is performed.

At stage 9, the UE 105 may access the serving PLMN via the SV2 102/202/302-2, sNB 106/202/307, and AMF 122, via the second radio cell. The access may be as described for stage 3 with the second radio cell and SV2 102/202/302-2 replacing the first radio cell and SV1 102/202/302-1.

Figure 39:
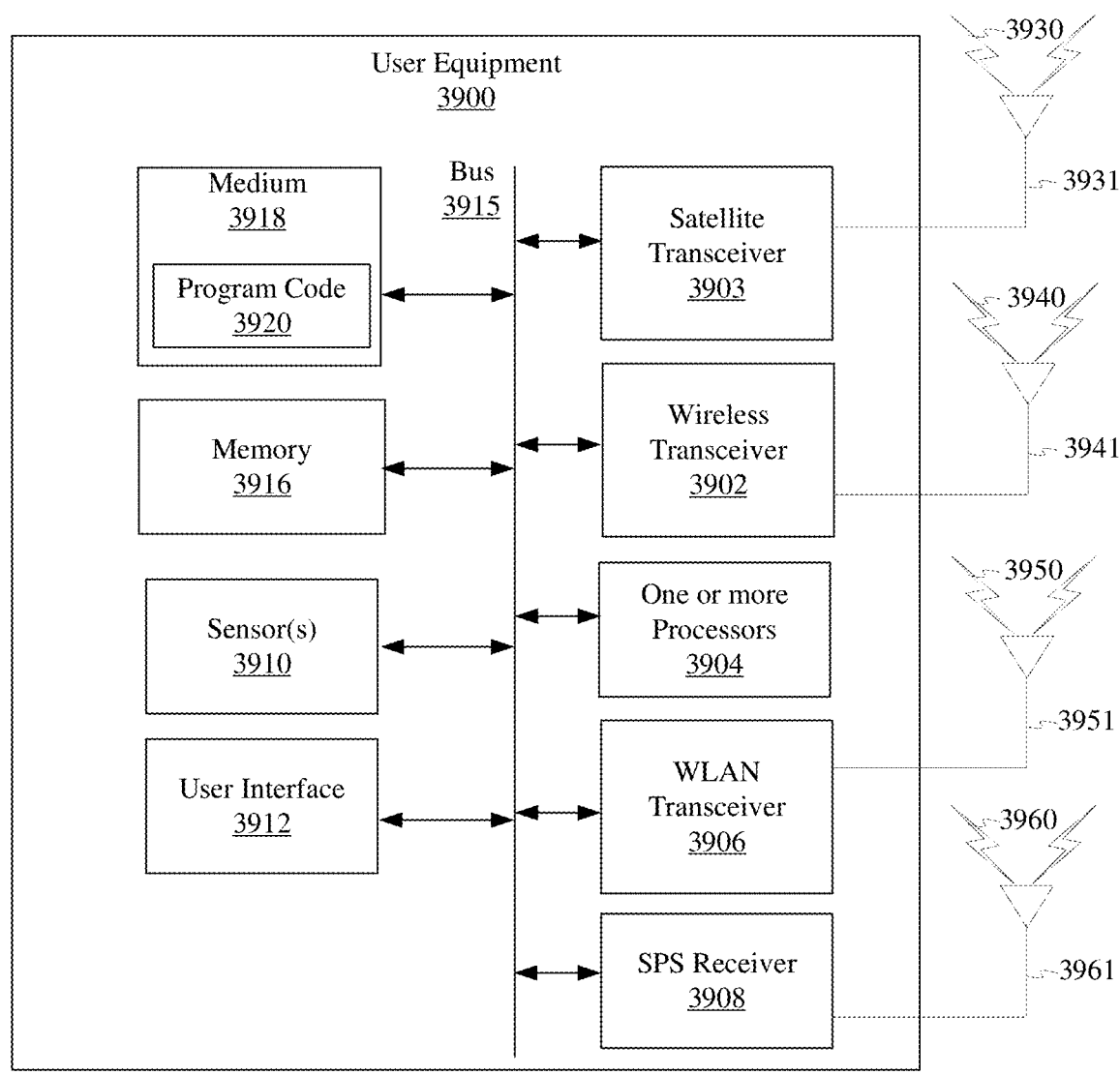
FIG. 39 is a diagram illustrating an example of a hardware implementation of a UE configured to access a serving PLMN through SVs as discussed herein.

FIG. 39 is a diagram illustrating an example of a hardware implementation of UE 3900, such as UE 105 shown in FIGS. 1, 2, and 3. The UE 3900 may perform the process flows 4700, 5100, 5600, and 5700 of FIGS. 47, 51, 56 and 57. The UE 3900 may include, e.g., hardware components such as a satellite transceiver 3903 to wirelessly communicate directly with a SV 102, 202, 302, via signals 3930 that are sent and received using wireless antenna 3931, e.g., as shown in FIGS. 1, 2, and 3. The UE 3900 may further include wireless transceiver 3902 to wirelessly communicate directly with terrestrial base stations in an NG-RAN 112, via signals 3940 that are sent and received using wireless antenna 3941, e.g., base stations such as gNB 114 or an ng-eNB. In some implementations, satellite transceiver 3903 and wireless transceiver 3902 may be combined—e.g. may be the same transceiver. The UE 3900 may also include additional transceivers, such a wireless local area network (WLAN) transceiver 3906, that may send and receive signals 3950 using antenna 3951, as well as an SPS receiver 3908 for receiving and measuring signals 3960 using antenna 3961, from SPS SVs 190 (shown in FIGS. 1, 2, and 3). In some implementations, one or more of wireless antennas 3931, 3941, 3951 and 3961 may be the same antenna. In some implementations, the UE 3900 may receive data from a satellite, e.g., via satellite transceiver 3903, and may respond to a terrestrial base station, e.g., via wireless transceiver 3902, or via WLAN transceiver 3906. Thus, UE 3900 may include one or more transmitters, one or more receivers or both, and these may be integrated, discrete, or a combination of both. The UE 3900 may further include one or more sensors 3910, such as cameras, accelerometers, gyroscopes, electronic compass, magnetometer, barometer, etc. The UE 3900 may further include a user interface 3912 that may include e.g., a display, a keypad or other input device, such as virtual keypad on the display, through which a user may interface with the UE 3900. The UE 3900 further includes one or more processors 3904, memory 3916, and non-transitory computer readable medium 3918, which may be coupled together with bus 3915. The one or more processors 3904 and other components of the UE 3900 may similarly be coupled together with bus 3914, a separate bus, or may be directly connected together or coupled using a combination of the foregoing.

The one or more processors 3904 may be implemented using a combination of hardware, firmware, and software. For example, the one or more processors 3904 may be configured to perform the functions discussed herein by implementing one or more instructions or program code 3920 on a non-transitory computer readable medium, such as medium 3918 and/or memory 3916. In some embodiments, the one or more processors 3904 may represent one or more circuits configurable to perform at least a portion of a data signal computing procedure or process related to the operation of UE 3900.

The medium 3918 and/or memory 3916 may store instructions or program code 3920 that contain executable code or software instructions that when executed by the one or more processors 3904 cause the one or more processors 3904 to operate as a special purpose computer programmed to perform the techniques disclosed herein (e.g. such as the process flows 4700, 5100, 5600, and 5700 of FIGS. 47, 51, 56 and 57). As illustrated in UE 3900, the medium 3918 and/or memory 3916 may include one or more components or modules that may be implemented by the one or more processors 3904 to perform the methodologies described herein. While the components or modules are illustrated as software in medium 3918 that is executable by the one or more processors 3904, it should be understood that the components or modules may be stored in memory 3916 or may be dedicated hardware either in the one or more processors 3904 or off the processors.

A number of software modules and data tables may reside in the medium 3918 and/or memory 3916 and be utilized by the one or more processors 3904 in order to manage both communications and the functionality described herein. It should be appreciated that the organization of the contents of the medium 3918 and/or memory 3916 as shown in UE 3900 is merely exemplary, and as such the functionality of the modules and/or data structures may be combined, separated, and/or be structured in different ways depending upon the implementation of the UE 3900.

The methodologies described herein may be implemented by various means depending upon the application. For example, these methodologies may be implemented in hardware, firmware, software, or any combination thereof. For a hardware implementation, the one or more processors 3904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 3900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 3918 or memory 3916 and executed by one or more processors 3904, causing the one or more processors 3904 to operate as a special purpose computer programmed to perform the techniques disclosed herein. Memory may be implemented within the one or processors 3904 or external to the one or more processors 3904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 3900 may be stored as one or more instructions or code on a non-transitory computer-readable storage medium such as medium 3918 or memory 3916. Examples of storage media include computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise RAM, ROM, EEPROM, CD-ROM or other optical disk storage, magnetic disk storage, semiconductor storage, or other storage devices, or any other medium that may be used to store desired program code in the form of instructions or data structures and that may be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 3900 may be provided as signals on transmission media included in a communication apparatus. For example, a communication apparatus comprising part or all of UE 3900 may include a transceiver having signals indicative of instructions and data. The instructions and data are stored on non-transitory computer readable medium 3918 or memory 3916, and are configured to cause the one or more processors 3904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 40:
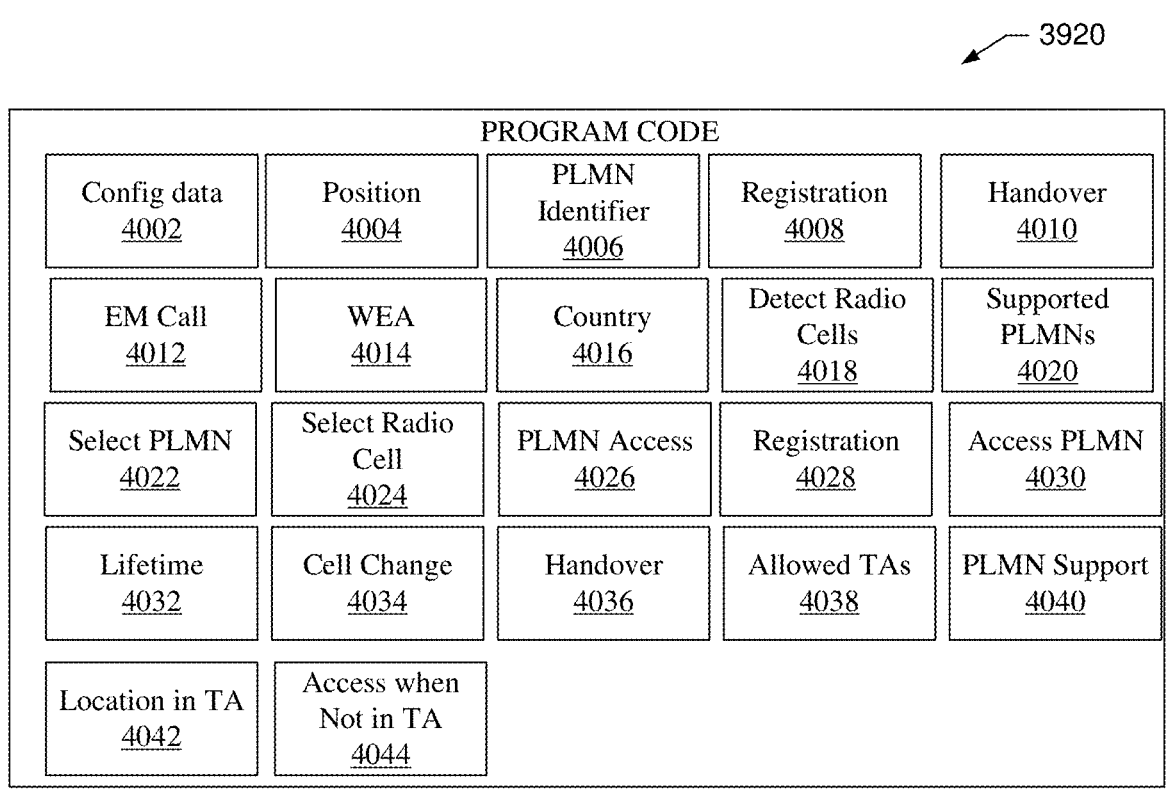
FIG. 40 is a diagram illustrating an example of one or more components or modules of program code that when implemented by the one or more processors in the UE configures the UE to access a serving PLMN through SVs as discussed herein.

FIG. 40 is a diagram illustrating an example of a one or more components or modules of program code 3920 that may be stored in the medium 3918 and/or memory 3916 of the UE 3900, that when implemented by the one or more processors 3904, cause the one or more processors to perform the methodologies described herein. While the components or modules are illustrated as software in medium 3918 and/or memory 3916 that is executable by the one or more processors 3904, it should be understood that the components or modules may be firmware or dedicated hardware either in the one or more processors 3904 or off the processors.

As illustrated, the program code 3920 stored on medium 3918 and/or memory 3916 may include a configuration data module 4002 that that when implemented by the one or more processors 3904 configures the one or more processors 3904 to receive configuration data from a network node via a communication satellite via the satellite transceiver 3903. The configuration data may include information for fixed cells and fixed tracking areas in wireless coverage of the communications satellite and associated with the serving PLMN, wherein the fixed cells and the fixed tracking areas are defined as fixed geographic areas and wherein the fixed cells and the fixed tracking area are defined independently of each other. As discussed above, for example, the fixed cells and fixed TAs are defined as fixed geographic areas and are defined independently of each other. Each fixed cell is assigned a cell identifier and each fixed TAs is assigned a tracking area code and a color code, where adjacent fixed TAs are assigned different color codes. The configuration information for the fixed cells may include locations of grid points in an array of grid points and cell identifiers associated with the array of grid points, e.g., where each grid point defines a fixed cell and has one associated cell identifier.

The program code 3920 stored on medium 3918 and/or memory 3916 may include medium 3918 and/or memory 3916 may include a position module 4004 that when implemented by the one or more processors 3904 configures the one or more processors 3904 to obtain a position of the UE, e.g., using signal measurements from one or more of communication satellites, e.g., received by satellite transceiver 3903, Global Navigation Satellite System (GNSS) satellites received by SPS transceiver 3908, or terrestrial base stations received by wireless transceiver 3902 or a combination thereof.

The program code 3920 stored on medium 3918 and/or memory 3916 may include a PLMN identifier module 4006 that when implemented by the one or more processors 3904 configures the one or more processors 3904 to generate a unique PLMN identifier for the fixed serving cell using the cell identifier for the fixed serving cell and the color code for the fixed serving tracking area in which the UE is located, wherein the service operation is performed based on the unique PLMN identifier.

The program code 3920 stored on medium 3918 and/or memory 3916 may include a registration module 4008 that when implemented by the one or more processors 3904 configures the one or more processors 3904 to perform a registration with a serving core network in a serving PLMN associated with the serving virtual cell and/or serving TA in which the UE is located via the satellite transceiver 903.

The program code 3920 stored on medium 3918 and/or memory 3916 may include a handover module 4010 that when implemented by the one or more processors 3904 configures the one or more processors 3904 to perform a handover from one satellite to another or from one PLMN to another.

The program code 3920 stored on medium 3918 and/or memory 3916 may include an EM call module 4012 that when implemented by the one or more processors 3904 configures the one or more processors 3904 to initiate an emergency call to a public safety answering point (PSAP) associated with the serving virtual cell and/or TA, e.g., using the unique PLMN identifier.

The program code 3920 stored on medium 3918 and/or memory 3916 may include a WEA module 4014 that when implemented by the one or more processors 3904 configures the one or more processors 3904 to support Wireless Emergency Alerting (WEA) associated with the serving virtual cell and/or TA.

The program code 3920 stored on medium 3918 and/or memory 3916 may include a country module 4016 that when implemented by the one or more processors 3904 configures the one or more processors 3904 to obtain the country of the UE based on the location of the UE, e.g., by determining the country based on the location of the UE based on a determined location of the UE and location related information for supported PLMNs, or by receiving an indication of the country from an sNB in response to a request to access a PLMN, which may include the location of the UE as determined by the UE.

The program code 3920 stored on medium 3918 and/or memory 3916 may include a detect radio cell module 4018 that when implemented by the one or more processors 3904 configures the one or more processors 3904 to detect radio cells that are available to the UE that include one or more radio beams transmitted from an SV.

The program code 3920 stored on medium 3918 and/or memory 3916 may include a supported PLMNs module 4020 that when implemented by the one or more processors 3904 configures the one or more processors 3904 to receive identities of supported PLMNs that are broadcast in one or more first radio cells, the identity of each supported PLMN indicates a country for the PLMN, and location related information for the supported PLMNs, such as the geographic definition for fixed cells of the each supported PLMN, geographic definition for fixed tracking areas of the each supported PLMN or both.

The program code 3920 stored on medium 3918 and/or memory 3916 may include a select PLMN module 4022 that when implemented by the one or more processors 3904 configures the one or more processors 3904 to select a serving PLMN that is a PLMN for the country of the UE and is included in the supported PLMNs.

The program code 3920 stored on medium 3918 and/or memory 3916 may include a select radio cell module 4024 that when implemented by the one or more processors 3904 configures the one or more processors 3904 to select a radio cell from available radio cells that support the serving PLMN.

The program code 3920 stored on medium 3918 and/or memory 3916 may include a PLMN access module 4026 that when implemented by the one or more processors 3904 configures the one or more processors 3904 to access the serving PLMN using the selected radio cell, e.g., by exchanging signaling with the serving PLMN via the SV and a serving sNB. For example, the one or more processors 3904 may be configured to send a request to access a PLMN. The one or more processors 3904 may be configured to send to an sNB a location of the UE as part of a request to access a PLMN. The one or more processors 3904 may be configured to receive security information from a sNB and to cipher the location of the UE based on the security information, and send the ciphered location of the UE to the sNB as part of the request to access the PLMN. The one or more processors 3904 may be configured to send the request to access the PLMN in a RRC Setup Request or an RRC Setup Complete message and may receive the country of the UE from a sNB in an RRC Setup message or an RRC Reject message. The one or more processors 3904, for example, may be configured to map a current location to an allowed TA and/or fixed cell and provide an indication of the allowed TA and/or fixed cell to the serving PLMN to enable a service for the UE by the serving PLMN.

The program code 3920 stored on medium 3918 and/or memory 3916 may include a registration module 4028 that when implemented by the one or more processors 3904 configures the one or more processors 3904 to register with the serving PLMN. For example, the one or more processors 3904, may be configured to send an NAS Registration request message, e.g., in a RRC Setup Complete message, to a network node and receive a NAS Registration Accept message, that may include allowed TAs for the serving PLMN and identities and a geographic definition for a plurality of fixed cells of the serving PLMN. The one or more processors 3904 may be configured to re-register with the serving PLMN for a change of TA. For example, the one or more processors 3904 may be configured to determine if supported TAs identified by newly detected radio cells, which support the PLMN are included in previously received allowed TAs for the serving PLMN. Registration may be performed for a change of TA using the newly detected radio cell, e.g., if the NAS Registration Accept messaged indicates, e.g., with a Registration flag that it is required. The UE may camp on the newly detected radio cell without registration for the change of TA, e.g., if the UE is in an idle state and registration is not required. The UE may access the serving PLMN using the newly detected radio cell without registration for the change of TA, e.g., if the UE is in a connected state and registration is not required. In another example, the one or more processors may be configured to determine whether a current location of the UE is inside any allowed TA. The UE may register for the change of TA when the current location is not inside any allowed TA or when the current location of the UE is inside an allowed TA and the allowed TA is not included in the plurality of supported TAs. The UE may not be required to register for the change of TA if the current location of the UE is inside any allowed TA and the allowed TA is included in a supported TAs, and the newly detected radio cell indicates support for the allowed TA.

The program code 3920 stored on medium 3918 and/or memory 3916 may include an access PLMN module 4030 that when implemented by the one or more processors 3904 configures the one or more processors 3904 to access a serving PLMN via a radio cell for a SV before and after a handover or cell change. The one or more processors 3904 may be configured to access the serving PLMN via the SV and the radio cell for the SV if it is determined that the UE is located inside the allowed TA and it is determined that the radio cell supports the serving PLMN and the allowed TA. The one or more processors 3904 may be configured to access the serving PLMN via the SV and the radio cell when it is determined that the serving PLMN and the allowed TA are supported by the radio cell and when the UE is either located inside the allowed TA or not located inside the allowed TA, if an indication is received that the UE may access the serving PLMN via the SV and the radio cell for the SV when the UE is not located in the allowed TA.

The program code 3920 stored on medium 3918 and/or memory 3916 may include an lifetime module 4032 that when implemented by the one or more processors 3904 configures the one or more processors 3904 to receive a remaining lifetime for a radio cell broadcast by a SV in a SIB, such as a SIB1 or SIB2, in the first radio cell. The remaining lifetime may be an amount of time until a change of the radio cell, which may include a change of an earth station used to exchange signaling for the radio cell between the first SV and a satellite NodeB (sNB) for the radio cell, a change in timing for the radio cell; a change in carrier frequency for the radio cell; a change in bandwidth for the radio cell; a change in coverage area for the radio cell; a change to radio beams used by the radio cell; a change in a cell identity for the radio cell; a cessation of support by the radio cell for one or more tracking areas for one or more PLMNs supported by the radio cell; or a termination of support for the radio cell by the sNB for the radio cell. The one or more processors 3904 may be configured to receive a remaining lifetime for the allowed TA in the radio cell, e.g., where the remaining lifetime is broadcast by a SV in a SIB for the radio cell, and the remaining lifetime is an amount of time until the radio cell ceases support for the allowed TA.

The program code 3920 stored on medium 3918 and/or memory 3916 may include a cell change module 4034 that when implemented by the one or more processors 3904 configures the one or more processors 3904 to perform a cell change to a different radio cell before a change of a radio cell, based on the remaining lifetime of the radio cell, and the new radio cell indicating support for the serving PLMN and the allowed TA. The one or more processors 3904 may be configured to select a new radio cell prior to the cell change, when the UE is in an idle state, based in part on a remaining lifetime for the new radio cell being greater than the remaining lifetime for a current radio cell. The one or more processors 3904 may be configured to perform a cell change to a new radio cell before a radio cell ceases support for an allowed TA, e.g., based on the remaining lifetime of the allowed TA in the radio cell, wherein the new radio cell is different to the radio cell, and the new radio cell indicates support for the serving PLMN and the allowed TA. The one or more processors 3904 may be configured to select the new radio cell prior to the cell change based in part on a remaining lifetime for the allowed TA in the new radio cell which is greater than the remaining lifetime for the allowed TA in the first radio cell.

The program code 3920 stored on medium 3918 and/or memory 3916 may include a handover module 4036 that when implemented by the one or more processors 3904 configures the one or more processors 3904 to perform a handover to a different radio cell before a change of a radio cell, based on the remaining lifetime of the radio cell and the new radio cell indicating support for the serving PLMN and the allowed TA. The one or more processors 3904 may be configured, when in a connected stated, to obtain signal measurements for a new radio cell prior to the handover, and send the signal measurements to a satellite NodeB (sNB) for the current radio cell, wherein the sNB instigates the handover based in part on the signal measurements and a remaining lifetime for the new radio cell being greater than the remaining lifetime for the current radio cell. The one or more processors 3904 may be configured to perform a handover to a new radio cell before a radio cell ceases support for an allowed TA, e.g., based on the remaining lifetime of the allowed TA in the radio cell, wherein the new radio cell is different to the radio cell, and the new radio cell indicates support for the serving PLMN and the allowed TA. The one or more processors 3904 may be configured, when in a connected stated, to obtain signal measurements for the new radio cell prior to the handover, and send the signal measurements to a satellite NodeB (sNB) for the first radio cell, wherein the sNB instigates the handover based in part on the signal measurements and a remaining lifetime for the allowed TA in the new radio cell which is greater than the remaining lifetime for the allowed TA in the first radio cell.

The program code 3920 stored on medium 3918 and/or memory 3916 may include an allowed TAs module 4038 that when implemented by the one or more processors 3904 configures the one or more processors 3904 to receive an indication of an allowed tracking area (TA) for a serving PLMN from the serving PLMN, the UE being allowed to access the serving PLMN based on the allowed TA.

The program code 3920 stored on medium 3918 and/or memory 3916 may include a PLMN support module 4040 that when implemented by the one or more processors 3904 configures the one or more processors 3904 to receive an indication in an available radio cell for a SV for support for a serving PLMN and allowed TA for by the radio cell.

The program code 3920 stored on medium 3918 and/or memory 3916 may include a location in TA module 4042 that when implemented by the one or more processors 3904 configures the one or more processors 3904 to determine whether the UE is located inside an allowed TA.

The program code 3920 stored on medium 3918 and/or memory 3916 may include an access when not in TA module 4044 that when implemented by the one or more processors 3904 configures the one or more processors 3904 to access the serving PLMN via the SV and the radio cell for the SV when the UE is not located in the allowed TA.

Figure 41:
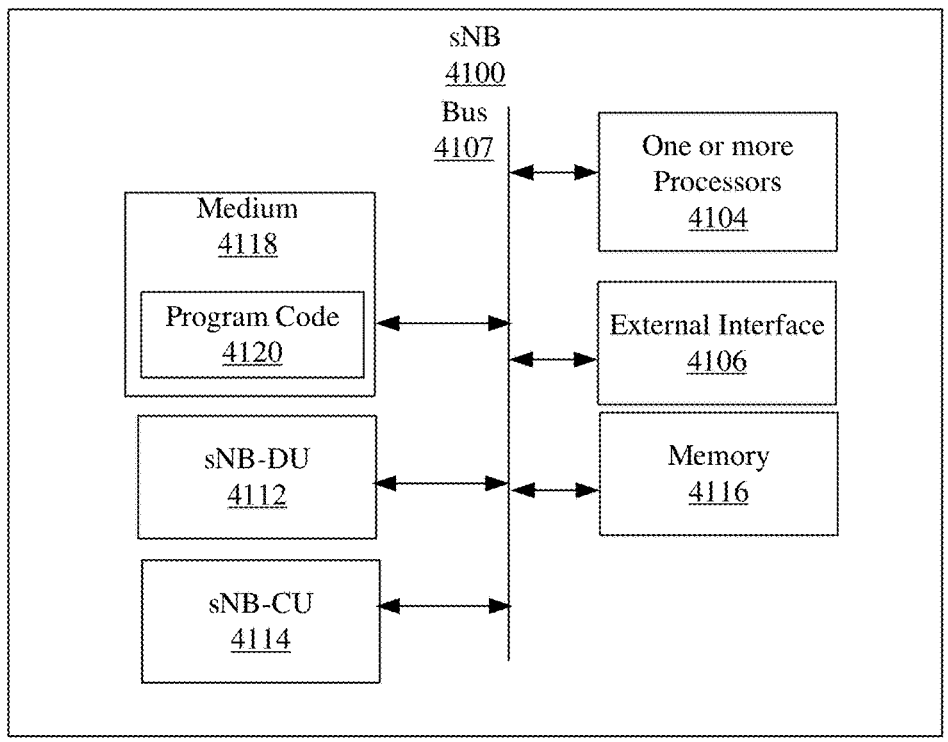
FIG. 41 is a diagram illustrating an example of a hardware implementation of a satellite NodeB (sNB) configured to support UE access to a serving PLMN through SVs as discussed herein.

FIG. 41 is a diagram illustrating an example of a hardware implementation of a satellite node B (sNB) 4100. sNB 4100 may correspond to any of: (i) sNB 106, sNB-DU 104-3 or 104-4 or sNB-CU 107 illustrated in FIG. 1; (ii) sNB 202 in the SV 202 illustrated in FIG. 2; or (iii) sNB-DU 302 in the SV 302 or sNB-CU 307 illustrated in FIG. 3. The sNB 4100 may perform the process flows 4800, 5000, 5200, 5400, and 5500 of FIGS. 48, 50, 52, 54, and 55. The sNB 4100 may include, e.g., hardware components such as an external interface 4106, which may comprise one or more wired and/or wireless interfaces capable of connecting to and directly communicating with one or more entities in a core network in a PLMN, such as AMF 122 or UPF 130 in 5GCN 110 shown in FIGS. 1-3, and earth stations 104, as well as other sNBs, UEs 105 (e.g. when sNB 4100 is part of an SV 202 or SV 302) and to other elements in a wireless network directly or through one or more intermediary networks and/or one or more network entities, as shown in FIGS. 1, 2, and 3. The external interface 4106 may include one or more antennas (not shown in FIG. 41) to support a wireless interface and/or a wireless backhaul to elements in the wireless network. The sNB 4100 further includes one or more processors 4104, memory 4116, and non-transitory computer readable medium 4118, which may be coupled together with bus 4107. The sNB 4100 is illustrated as including an sNB-DU 4112 and/or sNB-CU 4114 (e.g. in the case that sNB 4100 corresponds to sNB 106-3 in FIG. 1, an sNB 202 in FIG. 2, or an sNB-DU 302 or sNB-CU 307 in FIG. 3), which may be hardware components or implemented by specifically configured one or more processors 4104. One or both of sNB-DU 4112 and sNB-CU 4114 may not be present, e.g. when sNB 4100 corresponds to just an sNB-DU (e.g. sNB-DU 302) or to just an sNB-CU (e.g. sNB-CU 307) or when sNB 4100 does not use a split architecture.

The one or more processors 4104 may be implemented using a combination of hardware, firmware, and software. For example, the one or more processors 4104 may be configured to perform the functions discussed herein by implementing one or more instructions or program code 4120 on a non-transitory computer readable medium, such as medium 4118 and/or memory 4116. In some embodiments, the one or more processors 4104 may represent one or more circuits configurable to perform at least a portion of a data signal computing procedure or process related to the operation of sNB 4100.

The medium 4118 and/or memory 4116 may store instructions or program code 4120 that contain executable code or software instructions that when executed by the one or more processors 4104 cause the one or more processors 4104 to operate as a special purpose computer programmed to perform the techniques disclosed herein (e.g. such as the process flows 4800, 5000, 5200, 5400, and 5500 of FIGS. 48, 50, 52, 54, and 55). As illustrated in sNB 4100, the medium 4118 and/or memory 4116 may include one or more components or modules that may be implemented by the one or more processors 4104 to perform the methodologies described herein. While the components or modules are illustrated as software in medium 4118 that is executable by the one or more processors 4104, it should be understood that the components or modules may be stored in memory 4116 or may be dedicated hardware either in the one or more processors 4104 or off the processors.

A number of software modules and data tables may reside in the medium 4118 and/or memory 4116 and be utilized by the one or more processors 4104 in order to manage both communications and the functionality described herein. It should be appreciated that the organization of the contents of the medium 4118 and/or memory 4116 as shown in sNB 4100 is merely exemplary, and as such the functionality of the modules and/or data structures may be combined, separated, and/or be structured in different ways depending upon the implementation of the sNB 4100.

The methodologies described herein may be implemented by various means depending upon the application. For example, these methodologies may be implemented in hardware, firmware, software, or any combination thereof. For a hardware implementation, the one or more processors 4104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of sNB 4100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 4118 or memory 4116 and executed by one or more processors 4104, causing the one or more processors 4104 to operate as a special purpose computer programmed to perform the techniques disclosed herein. Memory may be implemented within the one or processors 4104 or external to the one or more processors 4104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by sNB 4100 may be stored as one or more instructions or code on a non-transitory computer-readable storage medium such as medium 4118 or memory 4116. Examples of storage media include computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise RAM, ROM, EEPROM, CD-ROM or other optical disk storage, magnetic disk storage, semiconductor storage, or other storage devices, or any other medium that may be used to store desired program code in the form of instructions or data structures and that may be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for sNB 4100 may be provided as signals on transmission media included in a communication apparatus. For example, a communication apparatus comprising part or all of sNB 4100 may include a transceiver having signals indicative of instructions and data. The instructions and data are stored on non-transitory computer readable media, e.g., medium 4118 or memory 4116, and are configured to cause the one or more processors 4104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 42:
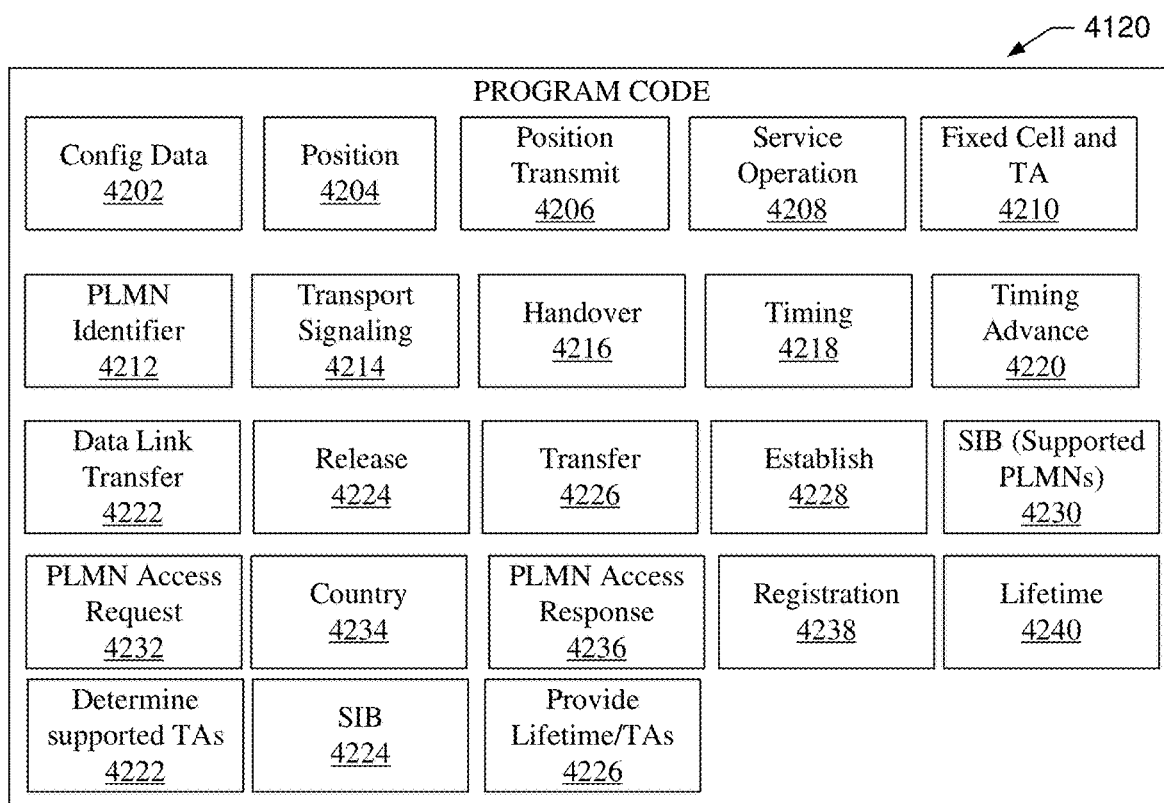
FIG. 42 is a diagram illustrating an example of one or more components or modules of program code that when implemented by the one or more processors in the sNB configures the sNB to support UE access to a serving PLMN through SVs as discussed herein.

FIG. 42 is a diagram illustrating an example of a one or more components or modules of program code 4120 that may be stored in the medium 4118 and/or memory 4116 of the sNB 4100, that when implemented by the one or more processors 4104, cause the one or more processors to perform the methodologies described herein. While the components or modules are illustrated as software in medium 4118 and/or memory 4116 that is executable by the one or more processors 4104, it should be understood that the components or modules may be firmware or dedicated hardware either in the one or more processors 4104 or off the processors.

As illustrated, the program code 4120 stored on medium 4118 and/or memory 4116 may include a configuration data module 4202 that that when implemented by the one or more processors 4104 configures the one or more processors 4104 to transmit configuration data to the UE via the external interface 4106, and/or to receive configuration data from a network node via the external interface 4106. The configuration data comprising information for fixed cells and fixed tracking areas in wireless coverage of the communications satellite and associated with the serving PLMN, wherein the fixed cells and the fixed tracking areas are defined as fixed geographic areas and wherein the fixed cells and the fixed tracking area are defined independently of each other.

The program code 4120 stored on medium 4118 and/or memory 4116 may include a position module 4204 that when implemented by the one or more processors 4104 configures the one or more processors 4104 to receive a position for the UE, via the external interface 4106, e.g., in a request from the UE to access the PLMN, or to determine the position of the UE based on a coverage area of a radio cell or radio beam of the sNB used by the UE.

The program code 4120 stored on medium 4118 and/or memory 4116 may include a position transmit module 4206 that when implemented by the one or more processors 4104 configures the one or more processors 4104 to transmit the position of the UE to a network entity, via the external interface 4106.

The program code 4120 stored on medium 4118 and/or memory 4116 may include a service operation module 4208 that when implemented by the one or more processors 4104 configures the one or more processors 4104 to enable a service operation, e.g., WEA, L1 or EN, for the UE by a serving core network for the serving PLMN based on at least one of the fixed serving cell and the fixed serving tracking area, e.g., using the external interface 4106.

The program code 4120 stored on medium 4118 and/or memory 4116 may include a fixed cell and TA module 4210 that when implemented by the one or more processors 4104 configures the one or more processors 4104 to determine a fixed serving cell and a fixed serving tracking area in which the UE is located based on the position of the UE and the configuration information for the fixed cells and the fixed tracking areas.

The program code 4120 stored on medium 4118 and/or memory 4116 may include a PLMN identifier module 4212 that when implemented by the one or more processors 4104 configures the one or more processors 4104 to generate a unique PLMN identifier for the fixed serving cell using the cell identifier for the fixed serving cell and the color code for the fixed serving tracking area in which the UE is located, wherein the service operation is performed based on the unique PLMN identifier.

The program code 4120 stored on medium 4118 and/or memory 4116 may include a transport signaling module 4214 that when implemented by the one or more processors 4104 configures the one or more processors 4104 to transport signaling using the external interface 4106, between UEs and core network, e.g., before and after transfer, where the signaling is transported via an SV and earth stations, and is transported between the SV and the UEs using radio cells.

The program code 4120 stored on medium 4118 and/or memory 4116 may include a handover module 4216 that when implemented by the one or more processors 4104 configures the one or more processors 4104 to handover the signaling from a first earth station to a second earth station, e.g., by ceasing the transport of signaling via the first earth station and to enable transport of the signaling via the second earth station.

The program code 4120 stored on medium 4118 and/or memory 4116 may include a timing module 4218 that when implemented by the one or more processors 4104 configures the one or more processors 4104 to determine a timing for each radio cell and to provide the timing of a serving radio cell to each UE before the transfer to a new earth station. The one or more processors 4104 may be configured to determine the timing, for example, based on (i) a known orbital position of the SV, and (ii) known or measured propagation and transmission delays for: signaling links between the sNB and the first earth station, signaling links between the first earth station and the SV; signaling links between the sNB and the second earth station; signaling links between the second earth station and the SV; and signaling links between the SV and the UEs.

The program code 4120 stored on medium 4118 and/or memory 4116 may include a timing advance module 4220 that when implemented by the one or more processors 4104 configures the one or more processors 4104 to determine a timing advance for each UE, the timing advance applicable after the transfer to a new earth station, and provide the timing advance to each UE before the transfer.

The program code 4120 stored on medium 4118 and/or memory 4116 may include a data link transfer module 4222 that when implemented by the one or more processors 4104 configures the one or more processors 4104 to transfer a plurality of data links from a first earth station to a second earth station. The data links in the plurality of data links may comprise a Level 2 connection between the sNB and the core network or between the sNB-DU and the sNB-CU, and the signaling for each data link in the plurality of data links may be transported through the earth stations at a Level 1 prior to and after the transfer.

The program code 4120 stored on medium 4118 and/or memory 4116 may include a release module 4224 that when implemented by the one or more processors 4104 configures the one or more processors 4104 to release, prior to a transfer between earth stations, data links between the sNB and the core network or between the sNB-DU and the sNB-CU. The plurality of data links transporting the signaling, and each data link in the first plurality of data links may comprise a Level 2 connection between the sNB and the first earth station and a concatenated Level 2 connection between the first earth station and the core network or a Level 2 connection between the sNB-DU or the sNB-CU and the first earth station and a concatenated Level 2 connection between the first earth station and the other of the sNB-DU and the sNB-CU. The one or more processors may be further configured to release non-UE associated links and connections and/or UE associated connections and tunnels between the sNB-DU and the sNB-CU, and core network, immediately before transfer, wherein signaling for the non-UE associated links and connections is transported between the sNB-DU and the sNB-CU via the first earth station at a Level 1 or a Level 2, and signaling for the UE associated connections and tunnels is transported between the sNB-DU and the sNB-CU using the non-UE associated links and connections.

The program code 4120 stored on medium 4118 and/or memory 4116 may include a transfer module 4226 that when implemented by the one or more processors 4104 configures the one or more processors 4104 to transfer from a first earth station to a second earth station, a Level 1 transport of signaling between the sNB and the core network or between the sNB-DU or the sNB-CU and the other of the sNB-DU and the sNB-CU.

The program code 4120 stored on medium 4118 and/or memory 4116 may include an establish module 4228 that when implemented by the one or more processors 4104 configures the one or more processors 4104 to establish after the transfer data links between the sNB and the core network or between the sNB-DU or the sNB-CU and the other of the sNB-DU and the sNB-CU. The data links transporting the signaling, and may comprise a Level 2 connection between the sNB and the new earth station and a concatenated Level 2 connection between the new earth station and the core network or a Level 2 connection between the sNB-DU or the sNB-CU and the new earth station and a concatenated Level 2 connection between the second earth station and the other of the sNB-DU and the sNB-CU. The one or more processors may be further configured to establish non-UE associated links and connections or UE associated connections and tunnels between the sNB-DU and the sNB-CU and the core network immediately after the transfer, wherein signaling for the non-UE associated links and connections is transported between the sNB-DU and the second sNB-CU via the new earth station at a Level 1 or a Level 2, and signaling for the UE associated connections and tunnels is transported between the sNB-DU and the sNB-CU via the new earth station using the non-UE associated links and connections.

The program code 4120 stored on medium 4118 and/or memory 4116 may include an SIB (supported PLMNS) module 4230 that when implemented by the one or more processors 4104 configures the one or more processors 4104 to control an SV to broadcast system information blocks (SIBs) in each of one or more radio cells of the sNB, the SIBs including identities of supported PLMNs for the sNB and the identity of each supported PLMN indicates a country for the each supported PLMN. The identity of the supported PLMNS may include a MCC and an MNC. The one or more processors 4104 may be further configured to send security information to the UE, with which the UE may cipher its location.

The program code 4120 stored on medium 4118 and/or memory 4116 may include a PLMN access request module 4232 that when implemented by the one or more processors 4104 configures the one or more processors 4104 to receive a request to access a PLMN from an UE via one of the radio cells of the sNB. The PLMN access request may be an RRC Setup Request or an RRC Setup Complete message.

The program code 4120 stored on medium 4118 and/or memory 4116 may include a country module 4234 that when implemented by the one or more processors 4104 configures the one or more processors 4104 to obtain a location of the UE and determine the country of the UE based on the location. For example, the one or more processors 4104 may be configured to receive the location of the UE from the UE in the request to access the PLMN. The one or more processors 4104 may be configured to decipher the location received from the UE when the UE ciphers the location using security information provided by the sNB. The one or more processors 4104 may be configured to determine the location based on a coverage area of the one of the one or more radio cells of the sNB or a coverage area for a radio beam of the one of the one or more radio cells of the sNB, wherein the radio beam is used by the UE to send the request to access the PLMN to the sNB.

The program code 4120 stored on medium 4118 and/or memory 4116 may include a PLMN access response module 4236 that when implemented by the one or more processors 4104 configures the one or more processors 4104 to send to the UE the country of the UE. The one or more processors 4104 may be configured to provide an PLMN access response, such as an RRC Setup message or RRC Setup Reject message, which may include the country of the UE. The one or more processors 4104, for example, may be configured to determine whether the country of the UE is supported by the sNB and send an RRC Setup message if the country is supported or RRC Setup Reject messaged if the country is not supported.

The program code 4120 stored on medium 4118 and/or memory 4116 may include a registration module 4238 that when implemented by the one or more processors 4104 configures the one or more processors 4104 to assist in registration of the UE with a serving PLMN. For example, the one or more processors 4104 may be configured to receive an NAS Registration Request message, e.g., in an RRC Setup Complete messaged from the UE, which may include an indication of a selected PLMN, and to send an NGAP Initial UE message to an AMF of the selected PLMN that includes an indication of the fixed serving cell and fixed TA for the UE, which may be the location of the UE or identities of the fixed serving cell and fixed TA. The one or more processors 4104 may be configured to map the location of the UE to an identity of the fixed serving cell and an identity of the fixed TA.

The program code 4120 stored on medium 4118 and/or memory 4116 may include a lifetime module 4240 that when implemented by the one or more processors 4104 configures the one or more processors 4104 to determine a remaining lifetime for a radio cell controlled by the sNB, wherein the remaining lifetime is an amount of time until a change of the radio cell. The remaining lifetime may be an amount of time until a change of the radio cell, which may include a change of an earth station used to exchange signaling for the radio cell between the first SV and a satellite NodeB (sNB) for the radio cell, a change in timing for the radio cell; a change in carrier frequency for the radio cell, a change in bandwidth for the radio cell; a change in coverage area for the radio cell; a change to radio beams used by the radio cell, a change in a cell identity for the radio cell; a cessation of support by the radio cell for one or more tracking areas for one or more PLMNs supported by the radio cell; or a termination of support for the radio cell by the sNB for the radio cell.

The program code 4120 stored on medium 4118 and/or memory 4116 may include a determine supported TAs module 4242 that when implemented by the one or more processors 4104 configures the one or more processors 4104 to determine a plurality of tracking areas (TAs) currently supported by a radio cell controlled by the sNB, wherein the plurality of TAs belong to a plurality of PLMNs supported by the radio cell. The one or more processors 4104 may be configured to determine TAs with geographic areas overlapping with a coverage area of the radio cell, and where the overlap between the geographic area of each TA of the TAs and the coverage area of the radio cell satisfies one or more criteria for each TA of the TAs. The criteria for each TA for example may comprise: inclusion of the geographic area of the each TA within the coverage area of the radio cell; inclusion of the coverage area of the radio cell within the geographic area of the each TA; an overlap of the coverage area of the radio cell with the geographic area of the each TA which exceeds a threshold for the each TA; or some combination of these.

The program code 4120 stored on medium 4118 and/or memory 4116 may include an SIB module 4244 that when implemented by the one or more processors 4104 configures the one or more processors 4104 to generating a system information block (SIB), e.g., a type 1 SIB or a type 2 SIB, indicating the remaining lifetime of the radio cell and/or indicating each of a plurality of TAs supported by a radio cell controlled by the sNB and the remaining lifetime for each TA in the plurality of TAs.

The program code 4120 stored on medium 4118 and/or memory 4116 may include a provide lifetime/TA module 4246 that when implemented by the one or more processors 4104 configures the one or more processors 4104 to broadcast the remaining lifetime of the radio cell and/or the TAs supported by radio cell controlled by the sNB and the remaining lifetime for each TA, via using an SV for the radio cell. For example, the one or more processors 4104 may be configured to broadcast the SIB generated by the SIB module 4244.

Figure 43:
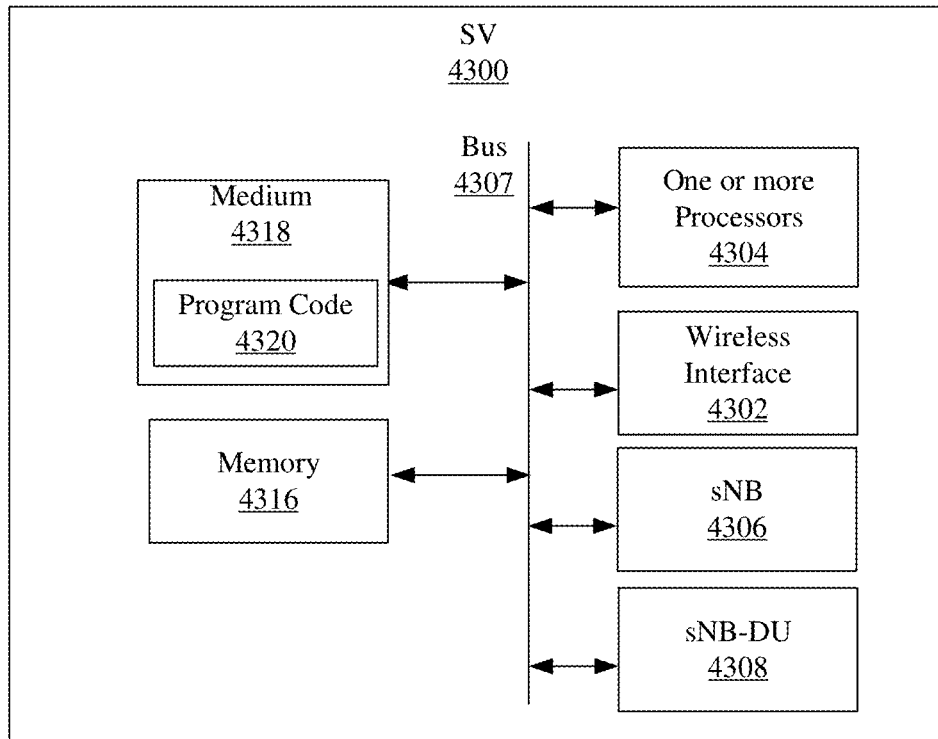
FIG. 43 is a diagram illustrating an example of a hardware implementation of an SV configured to support UE access to a serving PLMN through SVs as discussed herein.

FIG. 43 is a diagram illustrating an example of a hardware implementation of an SV 4300, e.g., SV 102, 202, or 302, shown in FIGS. 1, 2, and 3, that is configured to be in wireless communication with one or more UEs 105 and earth stations 104. In some cases (e.g. when SV 4300 corresponds to SV 202 in FIG. 2), SV 4300 may be in communication with one or more other SVs 4300. The SV 4300 includes, e.g., hardware components such as a wireless transceiver 4302 capable of directly communicating with UEs 105, as well as earth stations 104. In some implementations, the SV 4300 may include an sNB 4306, e.g., if the SV 4300 is a hardware implementation of SV 202 shown in FIG. 2. In another implementation, the SV 4300 may include an sNB-DU 4308, e.g., if the SV 4300 is a hardware implementation of SV 302 shown in FIG. 3. The sNB 4306 or sNB 4308 may be hardware implementation or a software implementation and may include structure and perform functions as described in FIGS. 41 and 42. The satellite 4300 includes one or more processors 4304, memory 4316, and non-transitory computer readable medium 4118, which may be coupled together with bus 4307, along with sNB 4306 or sNB-DU 4308 if implemented in hardware.

The one or more processors 4304 may be implemented using a combination of hardware, firmware, and software. For example, the one or more processors 4304 may be configured to perform the functions discussed herein by implementing one or more instructions or program code 4320 on a non-transitory computer readable medium, such as medium 4318 and/or memory 4316. In some embodiments, the one or more processors 4304 may represent one or more circuits configurable to perform at least a portion of a data signal computing procedure or process related to the operation of SV 4300.

Figure 48:
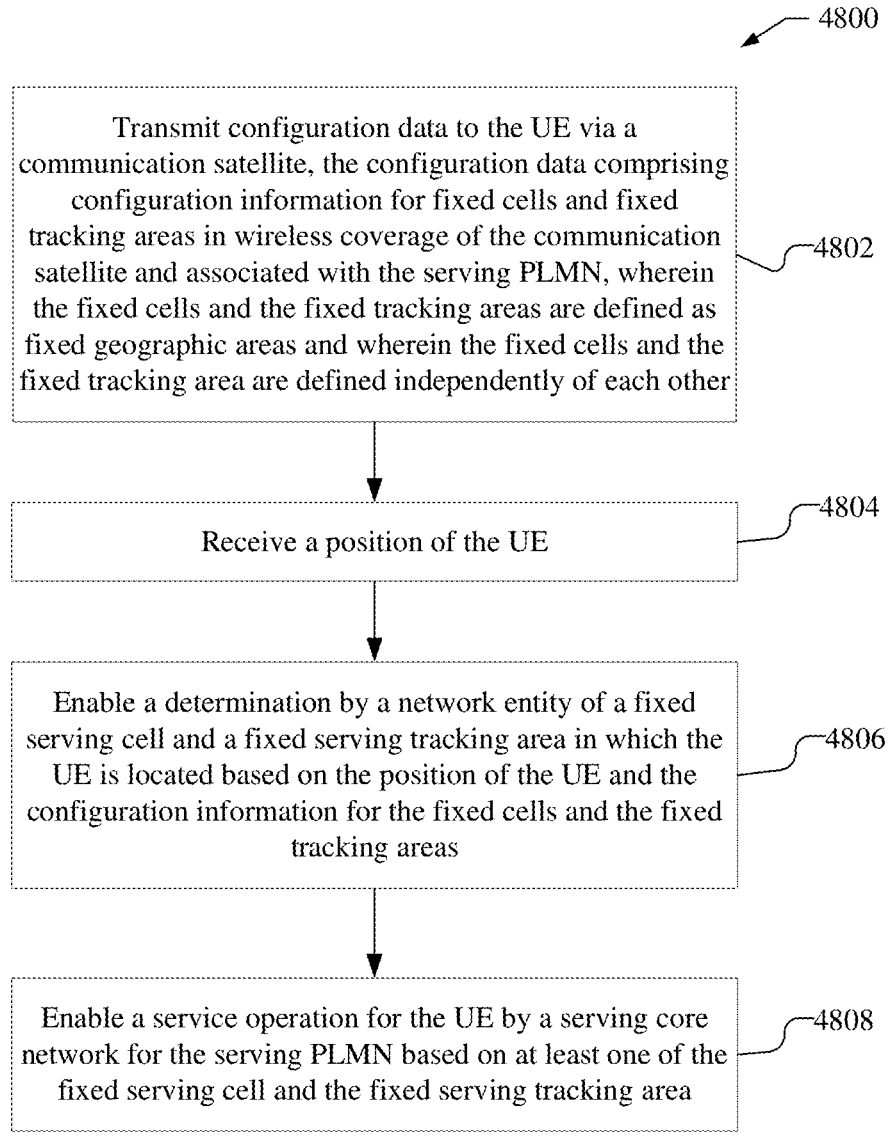
FIG. 48 is a flowchart of an example procedure performed by a network node to support UE access to a serving PLMN through SVs as discussed herein.

The medium 4318 and/or memory 4316 may store instructions or program code 4320 that contain executable code or software instructions that when executed by the one or more processors 4304 cause the one or more processors 4304 to operate as a special purpose computer programmed to perform the techniques disclosed herein (e.g. such as the process flow 4800 of FIG. 48). As illustrated in SV 4300, the medium 4318 and/or memory 4316 may include one or more components or modules that may be implemented by the one or more processors 4304 to perform the methodologies described herein. While the components or modules are illustrated as software in medium 4318 that is executable by the one or more processors 4304, it should be understood that the components or modules may be stored in memory 4316 or may be dedicated hardware either in the one or more processors 4304 or off the processors.

A number of software modules and data tables may reside in the medium 4318 and/or memory 4316 and be utilized by the one or more processors 4304 in order to manage both communications and the functionality described herein. It should be appreciated that the organization of the contents of the medium 4318 and/or memory 4316 as shown in SV 4300 is merely exemplary, and as such the functionality of the modules and/or data structures may be combined, separated, and/or be structured in different ways depending upon the implementation of the SV 4300.

The methodologies described herein may be implemented by various means depending upon the application. For example, these methodologies may be implemented in hardware, firmware, software, or any combination thereof. For a hardware implementation, the one or more processors 4304 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of SV 4300 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 4318 or memory 4316 and executed by one or more processors 4304, causing the one or more processors 4304 to operate as a special purpose computer programmed to perform the techniques disclosed herein. Memory may be implemented within the one or processors 4304 or external to the one or more processors 4304. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by SV 4300 may be stored as one or more instructions or code on a non-transitory computer-readable storage medium such as medium 4318 or memory 4316. Examples of storage media include computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise RAM, ROM, EEPROM, CD-ROM or other optical disk storage, magnetic disk storage, semiconductor storage, or other storage devices, or any other medium that may be used to store desired program code in the form of instructions or data structures and that may be accessed by a computer: disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for SV 4300 may be provided as signals on transmission media included in a communication apparatus. For example, a communication apparatus comprising part or all of SV 4300 may include a transceiver having signals indicative of instructions and data. The instructions and data are stored on non-transitory computer readable media, e.g., medium 4318 or memory 4316, and are configured to cause the one or more processors 4304 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 44:
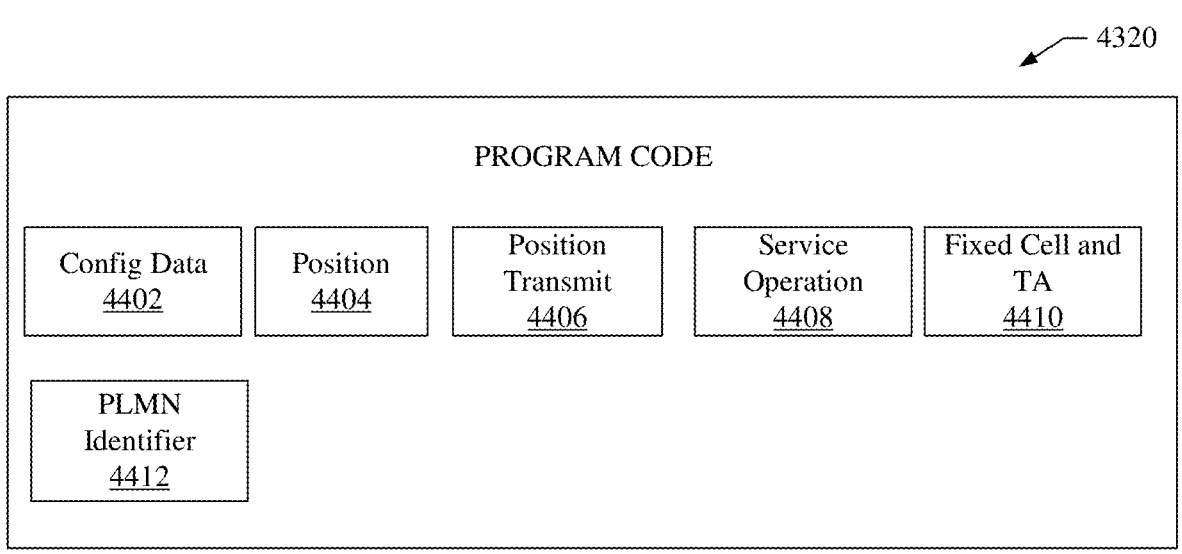
FIG. 44 is a diagram illustrating an example of one or more components or modules of program code that when implemented by the one or more processors in the SV configures the SV to support UE access to a serving PLMN through SVs as discussed herein.

FIG. 44 is a diagram illustrating an example of a one or more components or modules of program code 4320 that may be stored in the medium 4318 and/or memory 4316 of the SV 4300, that when implemented by the one or more processors 4304, cause the one or more processors to perform the methodologies described herein. While the components or modules are illustrated as software in medium 4318 and/or memory 4316 that is executable by the one or more processors 4304, it should be understood that the components or modules may be firmware or dedicated hardware either in the one or more processors 4304 or off the processors.

As illustrated, the program code 4320 stored on medium 4318 and/or memory 4316 may include a configuration data module 4402 that that when implemented by the one or more processors 4304 configures the one or more processors 4304 to transmit configuration data to the UE via the external interface 4306, and/or to receive configuration data from a network node via the external interface 4306. The configuration data comprising information for fixed cells and fixed tracking areas in wireless coverage of the communications satellite and associated with the serving PLMN, wherein the fixed cells and the fixed tracking areas are defined as fixed geographic areas and wherein the fixed cells and the fixed tracking area are defined independently of each other.

The program code 4320 stored on medium 4318 and/or memory 4316 may include a position module 4404 that when implemented by the one or more processors 4304 configures the one or more processors 4304 to receive a position for the UE, via the external interface 4306.

The program code 4320 stored on medium 4318 and/or memory 4316 may include a position transmit module 4406 that when implemented by the one or more processors 4304 configures the one or more processors 4304 to transmit the position of the UE to a network entity, via the external interface 4306.

The program code 4320 stored on medium 4318 and/or memory 4316 may include a service operation module 4408 that when implemented by the one or more processors 4304 configures the one or more processors 4304 to enable a service operation, e.g., WEA, L1 or EN, for the UE by a serving core network for the serving PLMN based on at least one of the fixed serving cell and the fixed serving tracking area, e.g., using the external interface 4306.

The program code 4320 stored on medium 4318 and/or memory 4316 may include a fixed cell and TA module 4410 that when implemented by the one or more processors 4304 configures the one or more processors 4304 to determine a fixed serving cell and a fixed serving tracking area in which the UE is located based on the position of the UE and the configuration information for the fixed cells and the fixed tracking areas.

The program code 4320 stored on medium 4318 and/or memory 4316 may include a PLMN identifier module 4412 that when implemented by the one or more processors 4304 configures the one or more processors 4304 to generate a unique PLMN identifier for the fixed serving cell using the cell identifier for the fixed serving cell and the color code for the fixed serving tracking area in which the UE is located, wherein the service operation is performed based on the unique PLMN identifier.

Figure 45:
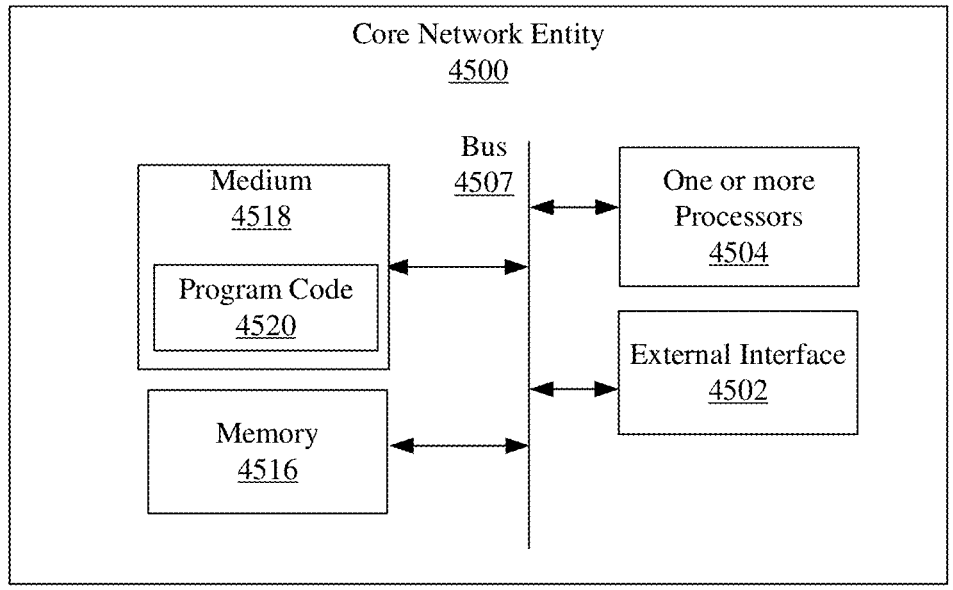
FIG. 45 is a diagram illustrating an example of a hardware implementation of a core network entity, such as an access and mobility management function (AMF) or a Location Management Function (LMF) configured to support UE access to a serving PLMN through SVs as discussed herein.

FIG. 45 is a diagram illustrating an example of a hardware implementation of a core network entity 4500 in a serving PLMN, e.g., such as AMF 122 or LMF 124, shown in FIGS. 1, 2, and 3, which sometimes may be referred to herein as AMF 4500 or LMF 4500. The core network entity 4500 includes, e.g., hardware components such as an external interface 4502 configured to be in direct communication with an sNB 106, sNB 307, earth station 104, LMF 124 and/or other core network entities, when the core network entity 4500 is an AMF, or configured to communicate with AMF 122 and other core network entities, when the core network entity 4500 is an LMF. The core network entity 4500 includes one or more processors 4504, memory 4516, and non-transitory computer readable medium 4118, which may be coupled together with bus 4507.

The one or more processors 4504 may be implemented using a combination of hardware, firmware, and software. For example, the one or more processors 4504 may be configured to perform the functions discussed herein by implementing one or more instructions or program code 4520 on a non-transitory computer readable medium, such as medium 4518 and/or memory 4516. In some embodiments, the one or more processors 4504 may represent one or more circuits configurable to perform at least a portion of a data signal computing procedure or process related to the operation of core network entity 4500.

Figure 49:
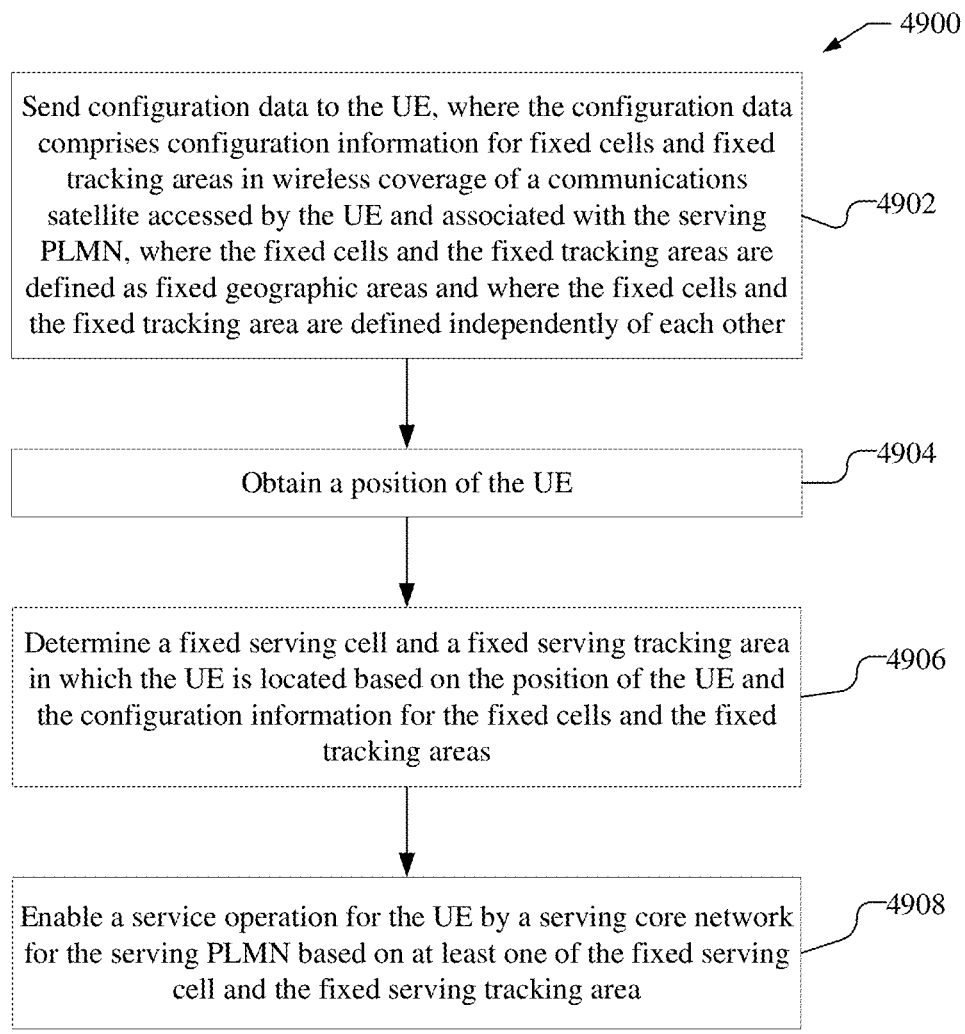
FIG. 49 is a flowchart of an example procedure performed by a network entity to support UE access to a serving PLMN through SVs as discussed herein.
Figure 53:
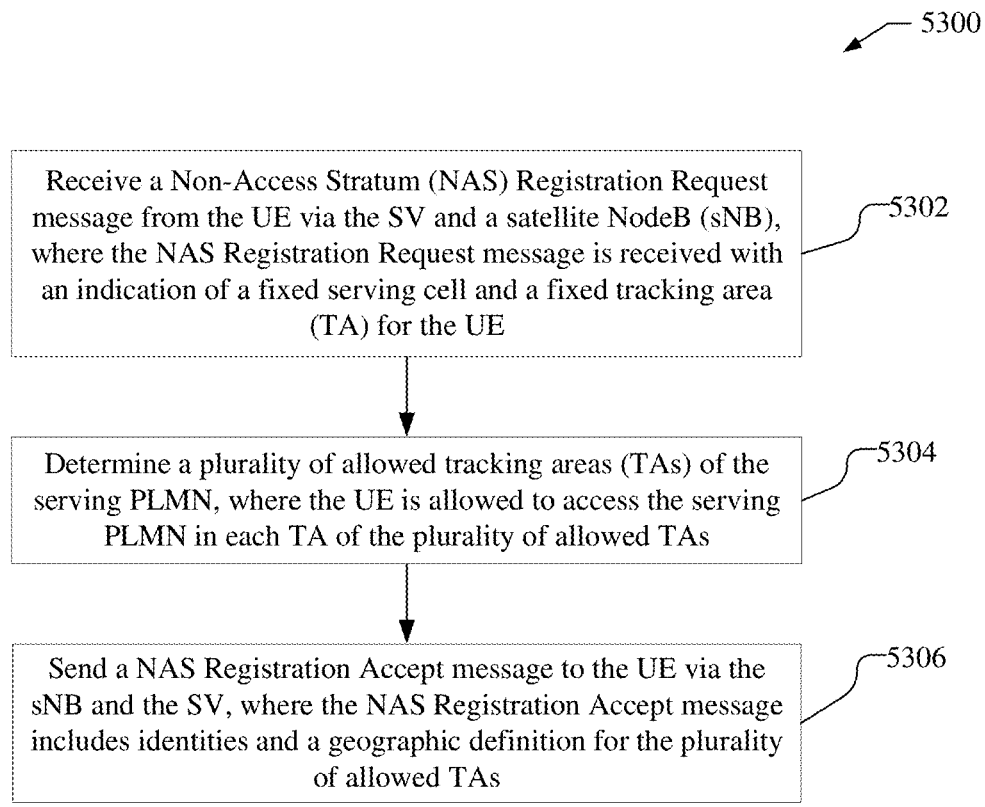
FIG. 53 shows a flowchart of an example procedure performed by an Access and Mobility management Function (AMF) for supporting access by a UE via a SV to a serving PLMN.

The medium 4518 and/or memory 4516 may store instructions or program code 4520 that contain executable code or software instructions that when executed by the one or more processors 4504 cause the one or more processors 4504 to operate as a special purpose computer programmed to perform the techniques disclosed herein (e.g. such as the process flows 4800, 4900, and 5300 of FIGS. 48, 49, and 53). As illustrated in core network entity 4500, the medium 4518 and/or memory 4516 may include one or more components or modules that may be implemented by the one or more processors 4504 to perform the methodologies described herein. While the components or modules are illustrated as software in medium 4518 that is executable by the one or more processors 4504, it should be understood that the components or modules may be stored in memory 4516 or may be dedicated hardware either in the one or more processors 4504 or off the processors.

A number of software modules and data tables may reside in the medium 4518 and/or memory 4516 and be utilized by the one or more processors 4504 in order to manage both communications and the functionality described herein. It should be appreciated that the organization of the contents of the medium 4518 and/or memory 4516 as shown in core network entity 4500 is merely exemplary, and as such the functionality of the modules and/or data structures may be combined, separated, and/or be structured in different ways depending upon the implementation of the core network entity 4500.

The methodologies described herein may be implemented by various means depending upon the application. For example, these methodologies may be implemented in hardware, firmware, software, or any combination thereof. For a hardware implementation, the one or more processors 4504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of core network entity 4500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 4518 or memory 4516 and executed by one or more processors 4504, causing the one or more processors 4504 to operate as a special purpose computer programmed to perform the techniques disclosed herein. Memory may be implemented within the one or processors 4504 or external to the one or more processors 4504. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by core network entity 4500 may be stored as one or more instructions or code on a non-transitory computer-readable storage medium such as medium 4518 or memory 4516. Examples of storage media include computer-readable media encoded with a data structure and computer-readable media encoded with a computer program. Computer-readable media includes physical computer storage media. A storage medium may be any available medium that may be accessed by a computer. By way of example, and not limitation, such computer-readable media may comprise RAM, ROM, EEPROM, CD-ROM or other optical disk storage, magnetic disk storage, semiconductor storage, or other storage devices, or any other medium that may be used to store desired program code in the form of instructions or data structures and that may be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for core network entity 4500 may be provided as signals on transmission media included in a communication apparatus. For example, a communication apparatus comprising part or all of core network entity 4500 may include a transceiver having signals indicative of instructions and data. The instructions and data are stored on non-transitory computer readable media, e.g., medium 4518 or memory 4516, and are configured to cause the one or more processors 4504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 46:
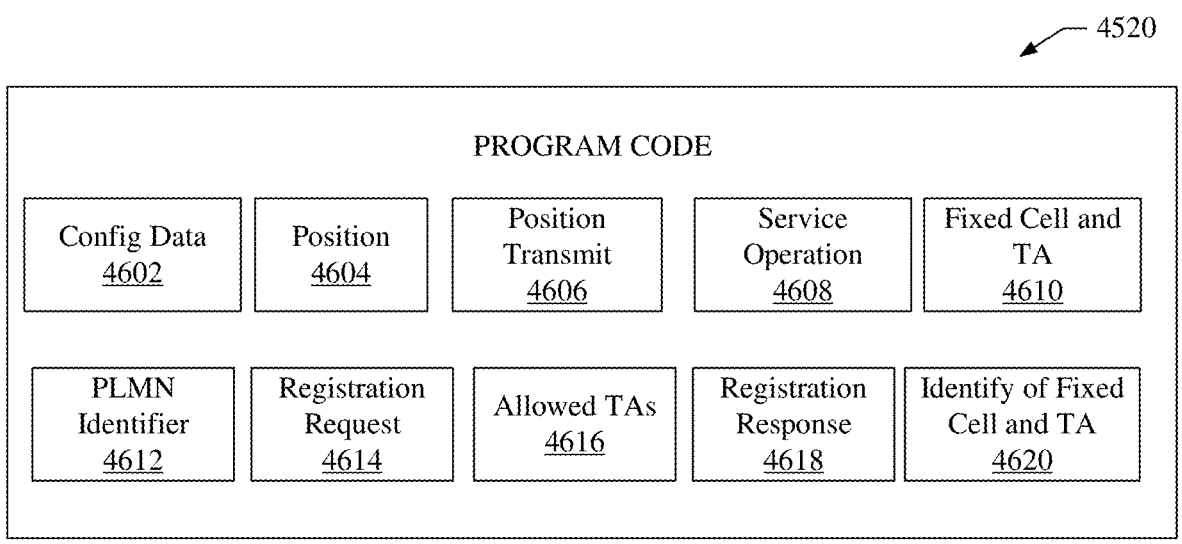
FIG. 46 is a diagram illustrating an example of one or more components or modules of program code that when implemented by the one or more processors in the core network entity configures the core network entity to support UE access to a serving PLMN through SVs as discussed herein.

FIG. 46 is a diagram illustrating an example of a one or more components or modules of program code 4520 that may be stored in the medium 4518 and/or memory 4516 of the core network entity 4500, that when implemented by the one or more processors 4504, cause the one or more processors to perform the methodologies described herein. While the components or modules are illustrated as software in medium 4518 and/or memory 4516 that is executable by the one or more processors 4504, it should be understood that the components or modules may be firmware or dedicated hardware either in the one or more processors 4504 or off the processors.

As illustrated, the program code 4520 stored on medium 4518 and/or memory 4516 may include a configuration data module 4602 that that when implemented by the one or more processors 4504 configures the one or more processors 4504 to transmit configuration data to the UE via the external interface 4506, and/or to receive configuration data from a network node via the external interface 4506. The configuration data comprising information for fixed cells and fixed tracking areas in wireless coverage of the communications satellite and associated with the serving PLMN, wherein the fixed cells and the fixed tracking areas are defined as fixed geographic areas and wherein the fixed cells and the fixed tracking area are defined independently of each other.

The program code 4520 stored on medium 4518 and/or memory 4516 may include a position module 4604 that when implemented by the one or more processors 4504 configures the one or more processors 4504 to receive a position for the UE, via the external interface 4506.

The program code 4520 stored on medium 4518 and/or memory 4516 may include a position transmit module 4606 that when implemented by the one or more processors 4504 configures the one or more processors 4504 to transmit the position of the UE to a network entity, via the external interface 4506.

The program code 4520 stored on medium 4518 and/or memory 4516 may include a service operation module 4608 that when implemented by the one or more processors 4504 configures the one or more processors 4504 to enable a service operation, e.g., WEA, L1 or EN, for the UE by a serving core network for the serving PLMN based on at least one of the fixed serving cell and the fixed serving tracking area, e.g., using the external interface 4506.

The program code 4520 stored on medium 4518 and/or memory 4516 may include a fixed cell and TA module 4610 that when implemented by the one or more processors 4504 configures the one or more processors 4504 to determine a fixed serving cell and a fixed serving tracking area in which the UE is located based on the position of the UE and the configuration information for the fixed cells and the fixed tracking areas.

The program code 4520 stored on medium 4518 and/or memory 4516 may include a PLMN identifier module 4612 that when implemented by the one or more processors 4504 configures the one or more processors 4504 to generate a unique PLMN identifier for the fixed serving cell using the cell identifier for the fixed serving cell and the color code for the fixed serving tracking area in which the UE is located, wherein the service operation is performed based on the unique PLMN identifier.

The program code 4520 stored on medium 4518 and/or memory 4516 may include a registration request module 4614 that when implemented by the one or more processors 4504 configures the one or more processors 4504 to receive a Non-Access Stratum (NAS) Registration Request message from the UE via the SV and a satellite NodeB (sNB), the NAS Registration Request message including an indication of a fixed serving cell and a fixed tracking area (TA) for the UE, which may be the identities of the fixed serving cell and fixed TA or may be the location of the UE.

The program code 4520 stored on medium 4518 and/or memory 4516 may include an allowed TAs module 4616 that when implemented by the one or more processors 4504 configures the one or more processors 4504 to determine a plurality of allowed tracking areas (TAs) of the serving PLMN, wherein the UE is allowed to access the serving PLMN in each TA of the plurality of allowed TAs.

The program code 4520 stored on medium 4518 and/or memory 4516 may include a registration response module 4618 that when implemented by the one or more processors 4504 configures the one or more processors 4504 to send a NAS Registration Accept message to the UE via the sNB and the SV, wherein the NAS Registration Accept message includes identities and a geographic definition for the plurality of allowed TAs, and may also include identities and a geographic definition for a plurality of fixed cells of the serving PLMN. The NAS Registration Accept message may also include an indication as to whether the UE is required to perform a registration with the serving PLMN for a change of TA after detecting the UE is no longer in any of the plurality of allowed TAs.

The program code 4520 stored on medium 4518 and/or memory 4516 may include an identify fixed cell and TA module 4620 that when implemented by the one or more processors 4504 configures the one or more processors 4504 to determine the identity of the fixed serving cell and fixed TA, e.g., when NAS Registration Request message includes the location of the UE. For example, the one or more processors 4504 may be configured to map the location to an identity of the fixed serving cell and an identity of the fixed TA or send the location to an LMF that maps the location to an identity of the fixed serving cell and an identity of the fixed TA and returns the identity of the fixed serving cell and the identity of the fixed TA to the AMF.

Figure 47:
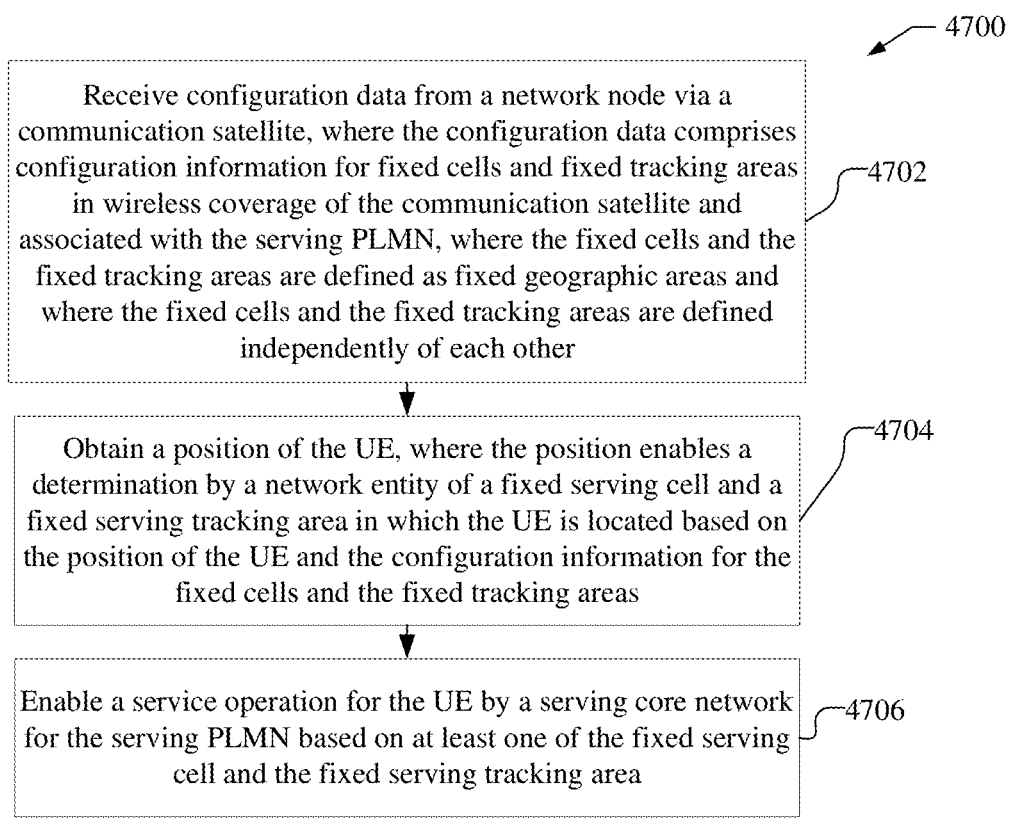
FIG. 47 is a flowchart of an example procedure performed by a UE for access to a serving PLMN through SVs as discussed herein.

FIG. 47 shows a flowchart of an example procedure 4700 for supporting satellite wireless access by a user equipment (UE) to a serving public land mobile network (PLMN), performed by the UE, such as the UE 105 in FIGS. 1, 2, 3.

As illustrated, at block 4702 the UE receives configuration data from a network node via a communication satellite (e.g. an SV 102, 202 or 302), where the configuration data comprises configuration information for fixed cells and fixed tracking areas in wireless coverage of the communication satellite and associated with the serving PLMN, where the fixed cells and the fixed tracking areas are defined as fixed geographic areas, and where the fixed cells and the fixed tracking areas are defined independently of each other, e.g., as discussed at stage 1 of FIG. 22, stage 4 of FIG. 37A and for FIGS. 21A and 21B. A means for receiving configuration data from a network node via a communication satellite, where the configuration data comprises configuration information for fixed cells and fixed tracking areas in wireless coverage of the communication satellite and associated with the serving PLMN, where the fixed cells and the fixed tracking areas are defined as fixed geographic areas, and where the fixed cells and the fixed tracking areas are defined independently of each other may include the satellite transceiver 3903 and one or more processors 3904 with dedicated hardware or implementing executable code or software instructions 3920 in in memory 3916 and/or medium 3918, such as the configuration data module 4002 in UE 3900 shown in FIGS. 39 and 40.

At block 4704, a position of the UE is obtained, where the position enables a determination by a network entity of a fixed serving cell and a fixed serving tracking area in which the UE is located based on the position of the UE and the configuration information for the fixed cells and the fixed tracking areas, e.g., as discussed at stages 3, 4, and 5 of FIG. 22, stages 5 and 8 of FIG. 37A, stages 3 and 9 of FIG. 37B and for FIGS. 17-20. A means for obtaining a position of the UE, wherein the position enables a determination by a network entity of a fixed serving cell and a fixed serving tracking area in which the UE is located based on the position of the UE and the configuration information for the fixed cells and the fixed tracking areas may include the SPS receiver 3908 or wireless transceiver 3902 and one or more processors 3904 with dedicated hardware or implementing executable code or software instructions 3920 in in memory 3916 and/or medium 3918, such as the position module 4004 in UE 3900 shown in FIGS. 39 and 40.

At block 4706, a service operation is enabled for the UE by a serving core network for the serving PLMN based on at least one of the fixed serving cell and the fixed serving tracking area, e.g., as discussed at stages 8, 9, and 10 of FIG. 22 and at stage 19 of FIG. 37A. A means for enabling a service operation for the UE by a serving core network for the serving PLMN based on at least one of the fixed serving cell and the fixed serving tracking area may include the satellite transceiver 3903 and one or more processors 3904 with dedicated hardware or implementing executable code or software instructions 3920 in in memory 3916 and/or medium 3918, such as the registration module 4008, handover module 4010, EM call module 4012, WEA module 4014, in UE 3900 shown in FIGS. 39 and 40.

In one implementation, each fixed cell has a cell identifier, and each fixed tracking area has a tracking area code and a color code, where adjacent fixed tracking areas have different color codes. In this implementation, the UE may generate a unique PLMN identifier for the fixed serving cell using the cell identifier for the fixed serving cell and the color code for the fixed serving tracking area in which the UE is located, where the service operation is performed based on the unique PLMN identifier, e.g., as discussed at stages 1, 8, 9, and 10 of FIG. 22. In one example, the cell identifier for the each fixed cell may comprise latitude and longitude coordinates of the UE. The latitude and longitude coordinates may be coarsened latitude and longitude coordinates of the UE rounded to a binary fraction of one degree. A means for generating a unique PLMN identifier for the fixed serving cell using the cell identifier for the fixed serving cell and the color code for the fixed serving tracking area in which the UE is located, wherein the service operation is performed based on the unique PLMN identifier may include the one or more processors 3904 with dedicated hardware or implementing executable code or software instructions 3920 in in memory 3916 and/or medium 3918, such as the PLMN identifier module 4006 in UE 3900 shown in FIGS. 39 and 40.

In one implementation, the configuration information for the fixed cells may comprise locations of grid points in an array of grid points and cell identifiers associated with the array of grid points, where each one grid point in the array of grid points defines one fixed cell and has one associated cell identifier, and where the one fixed cell comprises a coverage area of locations that are closer to a location of the one grid point than to a location of any other grid point in the array of grid points, e.g., as discussed at stage 1 of FIG. 22 and for FIGS. 1 and 11. For example, the array of grid points may be a rectangular array of grid points or a hexagonal array of grid points, as discussed for FIGS. 7 and 8.

In one implementation, the configuration information for the fixed tracking areas may comprise locations of grid points in an array of grid points and tracking area codes and color codes associated with the array of grid points, where each one grid point in the array of grid points defines one fixed tracking area and has one associated tracking area code and one associated color code, and where the one fixed tracking area may comprise a coverage area of locations that are closer to a location of the one grid point than to a location of any other grid point in the array of grid points, e.g., as discussed at stage 1 of FIG. 22 and for FIG. 21. For example, the array of grid points may be a rectangular array of grid points or a hexagonal array of grid points.

In one implementation, the configuration information for the fixed tracking areas may comprise locations of vertices for a plurality of polygons and tracking area codes and color codes associated with the plurality of polygons, where each one polygon in the array of polygons defines one fixed tracking area and has one associated tracking area code and one associated color code, and where the one fixed tracking area may be a coverage area of locations contained within the one polygon, e.g., as discussed at stage 1 of FIG. 22 and for FIG. 21.

In one implementation, the UE may obtain the position of the UE by obtaining location measurements for downlink signals received from one or more communication satellites (e.g. SVs 102, 202 and/or 302), one or more Global Navigation Satellite System (GNSS) satellites (e.g., SVs 190), one or more terrestrial base stations (e.g. gNBs 114) or a combination thereof, e.g., as discussed at stage 3 of FIG. 22. The UE may determine the position based on the location measurements, e.g., as discussed at stage 4 of FIG. 22 and stages 3 and 5 of FIG. 37A and stage 3 of FIG. 37B. A means for obtaining location measurements for downlink signals received from one or more of communication satellites, one or more Global Navigation Satellite System (GNSS) satellites, one or more terrestrial base stations or a combination thereof may include the SPS receiver 3908 or wireless transceiver 3902 shown in FIG. 39. A means for determining the position based on the location measurements may include the one or more processors 3904 with dedicated hardware or implementing executable code or software instructions 3920 in in memory 3916 and/or medium 3918, such as the position module 4004 in UE 3900 shown in FIGS. 39 and 40.

In one implementation, the serving PLMN may be a Fifth Generation (5G) PLMN, the network node may be a satellite NodeB (e.g. sNB 106, sNB 202 or sNB-CU 307), an Access and Mobility management Function (e.g. AMF 122) or the communication satellite, and the network entity may be one of the UE, the communication satellite, a serving sNB (e.g. sNB 106, sNB 202 or sNB-CU 307), a serving AMF (e.g. AMF 122) or a Location Management Function (e.g. LMF 124).

In one implementation, the configuration data is received from the network node via the communication satellite using broadcast or using unicast, e.g., as discussed at stage 1 of FIG. 22 and stage 4 of FIG. 37A and stage 2 of FIG. 37B.

In one implementation, the service operation may comprise one of a registration of the UE with the serving core network, an emergency services call from the UE to a Public Safety Answering Point (PSAP), delivery of a wireless emergency alert (WEA) message to the UE, lawful interception for the UE, or handover of the UE within the serving PLMN or to a new serving PLMN, e.g., as discussed at stages 8-10 of FIG. 22 and stage 19 of FIG. 37A.

FIG. 48 shows a flowchart of an example procedure 4800 for supporting satellite wireless access by a user equipment (e.g. a UE 105) to a serving public land mobile network (PLMN), performed by a network node in the PLMN, such as an sNB 106, 202 or 307, an SV 102, 202, or 302, an AMF 122, or an LMF 124.

At block 4802, configuration data is transmitted to the UE via a communication satellite (e.g. an SV 102, 202 or 302), where the configuration data comprises configuration information for fixed cells and fixed tracking areas in wireless coverage of the communication satellite and associated with the serving PLMN, where the fixed cells and the fixed tracking areas are defined as fixed geographic areas, and where the fixed cells and the fixed tracking area are defined independently of each other, e.g., as discussed at stage 1 of FIG. 22, stages 2 and 4 of FIG. 37A, stage 2 of FIG. 37B and for FIGS. 21A and 21B. A means for transmitting configuration data to the UE via a communication satellite, the configuration data comprising configuration information for fixed cells and fixed tracking areas in wireless coverage of the communications satellite and associated with the serving PLMN, wherein the fixed cells and the fixed tracking areas are defined as fixed geographic areas and wherein the fixed cells and the fixed tracking area are defined independently of each other may include the external interface 4106, the one or more processors 4104 with dedicated hardware or implementing executable code or software instructions 4120 in in memory 4116 and/or medium 4118, such as the configuration data module 4202 in sNB 4100 shown in FIGS. 41 and 42; the wireless interface 4302, the one or more processors 4304 with dedicated hardware or implementing executable code or software instructions 4320 in in memory 4316 and/or medium 4318, such as the configuration data module 4402 in SV 4300 shown in FIGS. 43 and 44; or the external interface 4502, the one or more processors 4504 with dedicated hardware or implementing executable code or software instructions 4520 in in memory 4516 and/or medium 4518, such as the configuration data module 4602 in network node 4500, which may be an AMF or LMF, shown in FIGS. 45 and 46.

At block 4804, a position of the UE is received, e.g., as discussed at stage 5 of FIG. 22 and stage 7 of FIG. 37A and stage 8 of FIG. 37B. A means for receiving a position of the UE may include the external interface 4106, the one or more processors 4104 with dedicated hardware or implementing executable code or software instructions 4120 in in memory 4116 and/or medium 4118, such as the position module 4204 in sNB 4100 shown in FIGS. 41 and 42; the wireless interface 4302, the one or more processors 4304 with dedicated hardware or implementing executable code or software instructions 4320 in in memory 4316 and/or medium 4318, such as the position module 4404 in SV 4300 shown in FIGS. 43 and 44; or the external interface 4502, the one or more processors 4504 with dedicated hardware or implementing executable code or software instructions 4520 in in memory 4516 and/or medium 4518, such as the position module 4604 in network node 4500, which may be an AMF or LMF, shown in FIGS. 45 and 46.

At block 4806, the position of the UE is used to enable a determination by a network entity of a fixed serving cell and a fixed serving tracking area in which the UE is located based on the position of the UE and the configuration information for the fixed cells and the fixed tracking areas. For example, the network entity may be the network node and may determine the fixed serving cell and the fixed serving tracking area in which the UE is located at block 4806, e.g. as described for stage 5 of FIG. 22 and stage 13 of FIG. 37A and stage 9 of FIG. 37B. Alternatively, the network node may transmit the position of the UE to the network entity which may then determine the fixed serving cell and the fixed serving tracking area in which the UE is located based on the position of the UE. e.g., as discussed at stage 5 of FIG. 22, stages 14-17 of FIG. 37A and stages 11-12 of FIG. 37B. A means for using the position of the UE to enable a determination by a network entity of a fixed serving cell and a fixed serving tracking area in which the UE is located based on the position of the UE and the configuration information for the fixed cells and the fixed tracking areas may include the external interface 4106, the one or more processors 4104 with dedicated hardware or implementing executable code or software instructions 4120 in in memory 4116 and/or medium 4118, such as the position transmit module 4206 or fixed cell and TA module 4210 in sNB 4100 shown in FIGS. 41 and 42; the wireless interface 4302, the one or more processors 4304 with dedicated hardware or implementing executable code or software instructions 4320 in in memory 4316 and/or medium 4318, such as the position transmit module 4406 or fixed cell and TA module 4410 in SV 4300 shown in FIGS. 43 and 44: or the external interface 4502, the one or more processors 4504 with dedicated hardware or implementing executable code or software instructions 4520 in in memory 4516 and/or medium 4518, such as the position transmit module 4606 or fixed cell and TA module 4610 in network node 4500, which may be an AMF or LMF, shown in FIGS. 45 and 46.

At block 4808, a service operation for the UE is enabled by a serving core network for the serving PLMN based on at least one of the fixed serving cell and the fixed serving tracking area, e.g., as discussed at stages 8, 9, or 10 of FIG. 22 and stage 19 of FIG. 37A. A means for enabling a service operation for the UE by a serving core network for the serving PLMN based on at least one of the fixed serving cell and the fixed serving tracking area may include the external interface 4106, the one or more processors 4104 with dedicated hardware or implementing executable code or software instructions 4120 in in memory 4116 and/or medium 4118, such as the service operation module 4208 in sNB 4100 shown in FIGS. 41 and 42; the wireless interface 4302, the one or more processors 4304 with dedicated hardware or implementing executable code or software instructions 4320 in in memory 4316 and/or medium 4318, such as the service operation module 4408 in SV 4300 shown in FIGS. 43 and 44; or the external interface 4502, the one or more processors 4504 with dedicated hardware or implementing executable code or software instructions 4520 in in memory 4516 and/or medium 4518, such as the service operation module 4608 in network node 4500, which may be an AMF or LMF, shown in FIGS. 45 and 46.

In one implementation, each fixed cell has a cell identifier, each fixed tracking area has a tracking area code and a color code, where adjacent fixed tracking areas have different color codes, and a unique PLMN identifier can be generated for the fixed serving cell using the cell identifier for the fixed serving cell and the color code for the fixed serving tracking area in which the UE is located, where the service operation can be performed based on the unique PLMN identifier, e.g., as discussed at stages 1, 8, 9, or 10 of FIG. 22 and for FIGS. 21A and 21B. For example, the cell identifier for the each fixed cell may comprise latitude and longitude coordinates of the UE. The latitude and longitude coordinates may be coarsened latitude and longitude coordinates of the UE rounded to a binary fraction of one degree.

In one implementation, the configuration information for the fixed cells may comprise locations of grid points in an array of grid points and cell identifiers associated with the array of grid points, where each one grid point in the array of grid points defines one fixed cell and has one associated cell identifier, and where the one fixed cell may be a coverage area of locations that are closer to a location of the one grid point than to a location of any other grid point in the array of grid points, e.g., as discussed at stage 1 of FIG. 22 and for FIGS. 7 and 11. For example, the array of grid points may be a rectangular array of grid points or a hexagonal array of grid points.

In one implementation, the configuration information for the fixed tracking areas may comprise locations of grid points in an array of grid points and tracking area codes and color codes associated with the array of grid points, where each one grid point in the array of grid points defines one fixed tracking area and has one associated tracking area code and one associated color code, and where the one fixed tracking area may be a coverage area of locations that are closer to a location of the one grid point than to a location of any other grid point in the array of grid points, e.g., as discussed at stage 1 of FIG. 22 and for FIG. 21. For example, the array of grid points may be a rectangular array of grid points or a hexagonal array of grid points.

In one implementation, the configuration information for the fixed tracking areas may comprise locations of vertices for a plurality of polygons and tracking area codes and color codes associated with the plurality of polygons, where each one polygon in the array of polygons defines one fixed tracking area and has one associated tracking area code and one associated color code, and where the one fixed tracking area may be a coverage area of locations contained within the one polygon, e.g., as discussed at stage 1 of FIG. 22 and for FIG. 21.

In one implementation, the position of the UE may be determined by the UE based on location measurements for downlink signals received by the UE from one or more of communication satellites (e.g. SVs 102, 202 and/or 302), one or more Global Navigation Satellite System (GNSS) satellites (e.g. SVs 190), one or more terrestrial base stations (e.g. gNBs 114) or a combination thereof, e.g., as discussed at stage 4 of FIG. 22 and stage 5 of FIG. 37A and stage 5 of FIG. 37B.

In one implementation, the serving PLMN may be a Fifth Generation (5G) PLMN, where the network node may be a satellite NodeB (e.g. sNB 106, sNB 202 or sNB-CU 307), an Access and Mobility management Function (e.g. AMF 122) or the communication satellite, and where the network entity may be one of the UE, the communication satellite, the network node, a serving AMF (e.g. AMF 122) or a Location Management Function (e.g. LMF 124).

In one implementation, the configuration data may be transmitted to the UE via the communication satellite using broadcast or using unicast, e.g., as discussed at stage 1 of FIG. 22 and stages 2 and 4 of FIG. 37A and stage 2 of FIG. 37B.

In one implementation, the service operation may be one of a registration of the UE with the serving core network, an emergency services call from the UE to a Public Safety Answering Point (PSAP), delivery of a wireless emergency alert (WEA) message to the UE, lawful interception for the UE, or handover of the UE within the serving PLMN or to a new serving PLMN, e.g., as discussed at stages 8-10 of FIG. 22 and stage 19 of FIG. 37A.

FIG. 49 shows a flowchart of an example procedure 4900 for supporting satellite wireless access by a user equipment (e.g. a UE 105) to a serving public land mobile network (PLMN), performed by a network entity in the serving PLMN, which may be an AMF 122 or LMF 124.

At block 4902, configuration data is sent to the UE, where the configuration data comprises configuration information for fixed cells and fixed tracking areas in wireless coverage of a communications satellite being accessed by the UE (e.g. an SV 102, 202 or 302) and associated with the serving PLMN, where the fixed cells and the fixed tracking areas are defined as fixed geographic areas and where the fixed cells and the fixed tracking areas are defined independently of each other, e.g., as discussed at stage 1 of FIG. 22, stage 18 of FIG. 37A, stage 13 of FIG. 37B and for FIGS. 21A and 21B. A means for sending configuration data to the UE, wherein the configuration data comprises configuration information for fixed cells and fixed tracking areas in wireless coverage of a communications satellite being accessed by the UE and associated with the serving PLMN, wherein the fixed cells and the fixed tracking areas are defined as fixed geographic areas and wherein the fixed cells and the fixed tracking area are defined independently of each other may include the external interface 4502, the one or more processors 4504 with dedicated hardware or implementing executable code or software instructions 4520 in in memory 4516 and/or medium 4518, such as the configuration data module 4602 in in network node 4500, which may be an AMF or LMF, shown in FIGS. 45 and 46.

At block 4904, a position of the UE is obtained (e.g. is received from the UE or is determined by the network entity), e.g., as discussed at stage 14 of FIG. 37A and stage 11 of FIG. 37B. A means for obtaining a position of the UE may include the external interface 4502, the one or more processors 4504 with dedicated hardware or implementing executable code or software instructions 4520 in in memory 4516 and/or medium 4518, such as the position module 4604 in in network node 4500, which may be an AMF or LMF, shown in FIGS. 45 and 46.

At block 4906, a fixed serving cell and a fixed serving tracking area in which the UE is located are determined based on the position of the UE and the configuration information for the fixed cells and the fixed tracking areas, e.g., as discussed at stage 5 of FIG. 22 and stages 14-17 of FIG. 37A and stage 12 of FIG. 37B. A means for determining a fixed serving cell and a fixed serving tracking area in which the UE is located based on the position of the UE and the configuration information for the fixed cells and the fixed tracking areas may include the external interface 4502, the one or more processors 4504 with dedicated hardware or implementing executable code or software instructions 4520 in in memory 4516 and/or medium 4518, such as the fixed cell and TA module 4608 in in network node 4500, which may be an AMF or LMF, shown in FIGS. 45 and 46.

At block 4908, a service operation is enabled for the UE by a serving core network for the serving PLMN based on at least one of the fixed serving cell and the fixed serving tracking area, e.g., as discussed at stages 8, 9, or 10 of FIG. 22 and stage 19 of FIG. 37A. A means for enabling a service operation for the UE by a serving core network for the serving PLMN based on at least one of the fixed serving cell and the fixed serving tracking area may include the external interface 4502, the one or more processors 4504 with dedicated hardware or implementing executable code or software instructions 4520 in in memory 4516 and/or medium 4518, such as the service operation module 4608 in in network node 4500, which may be an AMF or LMF, shown in FIGS. 45 and 46.

In one implementation, each fixed cell has a cell identifier, and each fixed tracking area has a tracking area code and a color code, where adjacent fixed tracking areas have different color codes, and the network entity may generate a unique PLMN identifier for the fixed serving cell using the cell identifier for the fixed serving cell and the color code for the fixed serving tracking area in which the UE is located, where the service operation can be performed based on the unique PLMN identifier, e.g., as discussed at stage 5 of FIG. 22 and for FIG. 21. For example, the cell identifier for the each fixed cell may comprise latitude and longitude coordinates of the UE. The latitude and longitude coordinates may comprise coarsened latitude and longitude coordinates of the UE rounded to a binary fraction of one degree. A means for generating a unique PLMN identifier for the fixed serving cell using the cell identifier for the fixed serving cell and the color code for the fixed serving tracking area in which the UE is located, wherein the service operation is performed based on the unique PLMN identifier may include the external interface 4502, the one or more processors 4504 with dedicated hardware or implementing executable code or software instructions 4520 in in memory 4516 and/or medium 4518, such as the PLMN identifier module 4612 in in network node 4500, which may be an AMF or LMF, shown in FIGS. 45 and 46.

In one implementation, the configuration information for the fixed cells may comprise locations of grid points in an array of grid points and cell identifiers associated with the array of grid points, where each one grid point in the array of grid points defines one fixed cell and has one associated cell identifier, and where the one fixed cell may be a coverage area of locations that are closer to a location of the one grid point than to a location of any other grid point in the array of grid points, e.g., as discussed at stage 1 of FIG. 22 and for FIGS. 7 and 11. For example, the array of grid points may be a rectangular array of grid points or a hexagonal array of grid points.

In one implementation, the configuration information for the fixed tracking areas may be locations of grid points in an array of grid points and tracking area codes and color codes associated with the array of grid points, where each one grid point in the array of grid points defines one fixed tracking area and has one associated tracking area code and one associated color code, and where the one fixed tracking area may be a coverage area of locations that are closer to a location of the one grid point than to a location of any other grid point in the array of grid points, e.g., as discussed at stage 1 of FIG. 22 and for FIG. 21. For example, the array of grid points may be a rectangular array of grid points or a hexagonal array of grid points.

In one implementation, the configuration information for the fixed tracking areas may be locations of vertices for a plurality of polygons and tracking area codes and color codes associated with the plurality of polygons, where each one polygon in the array of polygons defines one fixed tracking area and has one associated tracking area code and one associated color code, and where the one fixed tracking area may be a coverage area of locations contained within the one polygon, e.g., as discussed at stage 1 of FIG. 22 and for FIG. 21.

In one implementation, the position of the UE is determined (e.g. by the UE) based on location measurements for downlink signals received by the UE from one or more communication satellites (e.g. SVs 102, 202 and/or 302), one or more Global Navigation Satellite System (GNSS) satellites (e.g. SVs 114), one or more terrestrial base stations (e.g. gNBs 114) or a combination thereof, e.g., as discussed at stage 4 of FIG. 22 and stage 14 of FIG. 37A.

In one implementation, the serving PLMN may be a Fifth Generation (5G) PLMN, and the network entity may be a serving AMF for the UE (e.g. AMF 122) or a Location Management Function (e.g. LMF 124).

In one implementation, the service operation may be one of a registration of the UE with the serving PLMN, an emergency services call from the UE to a Public Safety Answering Point (PSAP), delivery of a wireless emergency alert (WEA) message to the UE, lawful interception for the UE, or handover of the UE within the serving PLMN or to a new serving PLMN, e.g., as discussed at stages 8, 9, or 10 of FIG. 22 and stage 19 of FIG. 37A.

Figure 50:
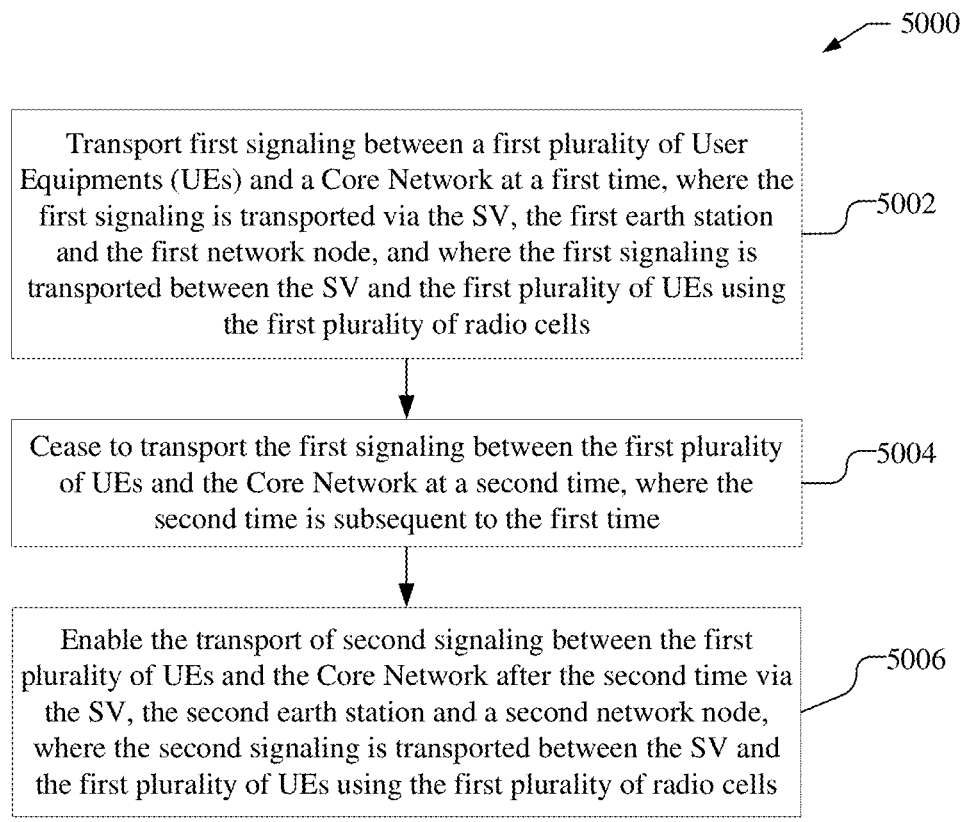
FIG. 50 is a flowchart of an example procedure performed by a network entity to transfer signaling for radio cells supported by a space vehicle from a first earth station to a second earth station as discussed herein.

FIG. 50 shows a flowchart of an example procedure 5000 performed by a first network node for transferring signaling for a first plurality of radio cells from a first earth station to a second earth station, where the first plurality of radio cells is supported by a space vehicle (e.g. an SV 102, 202 or 302). The first network node, for example, may be the sNB 106, sNB 202, sNB-DU 302 or sNB-CU 307.

As illustrated, at block 5002, first signaling is transported between a first plurality of User Equipments (e.g. UEs 105) and a Core Network (e.g. 5GCN 110) at a first time, where the first signaling is transported via the SV, the first earth station and the first network node, and wherein the first signaling is transported between the SV and the first plurality of UEs using the first plurality of radio cells, e.g., as discussed in reference to FIGS. 23-27, stage 1 of FIGS. 30 and 31, and FIGS. 32 and 33. A means for transporting first signaling between a first plurality of User Equipments (UEs) and a Core Network at a first time, wherein the first signaling is transported via the SV, the first earth station and the first network node, and wherein the first signaling is transported between the SV and the first plurality of UEs using the first plurality of radio cells may include the external interface 4106, sNB-DU 4112, sNB-CU 4114, the one or more processors 4104 with dedicated hardware or implementing executable code or software instructions 4120 in in memory 4116 and/or medium 4118, such as the transport signaling module 4214 in sNB 4100 shown in FIGS. 41 and 42.

At block 5004, the first network node ceases to transport the first signaling between the first plurality of UEs and the Core Network at a second time, where the second time is subsequent to the first time, e.g., as discussed in reference to FIGS. 23-27, stages 3-4 of FIGS. 30 and 31, and FIGS. 32 and 33. A means for ceasing to transport the first signaling between the first plurality of UEs and the Core Network at a second time, wherein the second time is subsequent to the first time may include the external interface 4106, sNB-DU 4112, sNB-CU 4114, the one or more processors 4104 with dedicated hardware or implementing executable code or software instructions 4120 in in memory 4116 and/or medium 4118, such as the handover module 4216 in sNB 4100 shown in FIGS. 41 and 42.

At block 5006, the transport of second signaling between the first plurality of UEs and the Core Network is enabled after the second time via the SV, the second earth station and a second network node, where the second signaling is transported between the SV and the first plurality of UEs using the first plurality of radio cells, as discussed in reference to FIGS. 23, 24, 26, 27, stages 5-7 of FIGS. 30 and 31, and FIGS. 32 and 33. A means for enabling the transport of second signaling between the first plurality of UEs and the Core Network after the second time via the SV, the second earth station and a second network node, wherein the second signaling is transported between the SV and the first plurality of UEs using the first plurality of radio cells may include the external interface 4106, sNB-DU 4112, sNB-CU 4114, the one or more processors 4104 with dedicated hardware or implementing executable code or software instructions 4120 in in memory 4116 and/or medium 4118, such as the transport signaling module 4214 in sNB 4100 shown in FIGS. 41 and 42.

In one implementation, the first signaling and the second signaling comprise user plane signaling and control plane signaling, where the user plane signaling includes signaling for data and voice connections between each of the plurality of UEs and external entities, and where the control plane signaling includes signaling for connections and associations between each of the plurality of UEs and entities in the Core Network, as discussed in reference to FIGS. 23-35.

In one implementation, each radio cell in the first plurality of radio cells comprises one or more radio beams supported by the SV, as discussed in reference to FIG. 4.

In one implementation, the first network node and the second network node may be a same satellite NodeB (e.g. an sNB 106), where the first signaling and the second signaling are transported via the SV in a transparent mode, e.g., as discussed in reference to FIG. 1 and FIGS. 23-25. Enabling the transport of the second signaling between the plurality of UEs and the Core Network after the second time may then comprise at least one of: (i) determining a timing for each radio cell in the first plurality of radio cells, where the timing is applicable after the second time, and providing the timing of a serving radio cell in the first plurality of radio cells to each UE in the first plurality of UEs before the second time; or (ii) determining a timing advance for each UE in the first plurality of UEs, where the timing advance is applicable after the second time, and providing the timing advance to each UE in the first plurality of UEs before the second time; or a combination thereof, e.g., as discussed in reference to FIGS. 23-25 and implementations 13, 13 and 15. A means for determining a timing for each radio cell in the first plurality of radio cells, wherein the timing is applicable after the second time, and providing the timing of a serving radio cell in the first plurality of radio cells to each UE in the first plurality of UEs before the second time may include the external interface 4106, sNB-DU 4112, sNB-CU 4114, the one or more processors 4104 with dedicated hardware or implementing executable code or software instructions 4120 in in memory 4116 and/or medium 4118, such as the timing module 4218 in sNB 4100 shown in FIGS. 41 and 42. A means for determining a timing advance for each UE in the first plurality of UEs, wherein the timing advance is applicable after the second time, and providing the timing advance to each UE in the first plurality of UEs before the second time may include the external interface 4106, sNB-DU 4112, sNB-CU 4114, the one or more processors 4104 with dedicated hardware or implementing executable code or software instructions 4120 in in memory 4116 and/or medium 4118, such as the timing advance module 4220 in sNB 4100 shown in FIGS. 41 and 42.

In one implementation, determining the timing for each radio cell in the first plurality of radio cells is based on (i) a known orbital position of the SV, and (ii) known or measured propagation and transmission delays for: signaling links between the sNB and the first earth station, signaling links between the first earth station and the SV; signaling links between the sNB and the second earth station; signaling links between the second earth station and the SV; and signaling links between the SV and the first plurality of UEs, e.g., as discussed in reference to FIGS. 23-25 and implementation 13.

In one implementation, referred to a "regenerative implementation", the first network node and the second network node may be a same satellite Node B (e.g. an sNB 202), where the sNB is included within the SV, and where the first signaling and the second signaling are transported via the SV in a regenerative mode, e.g., as discussed in reference to FIG. 2 and FIGS. 26-31. In the regenerative implementation, the first earth station and the second earth station may act as Level 1 relays, and enabling the transport of the second signaling between the plurality of UEs and the Core Network after the second time may comprise transferring, at the second time, a plurality of data links from the first earth station to the second earth station, where each data link in the plurality of data links may be a Level 2 connection between the sNB and the core network, and where signaling for each data link in the plurality of data links is transported through the first earth station at a Level 1 prior to the second time and is transported through the second earth station at a Level 1 after the second time, e.g., as discussed in reference to FIG. 30. A means for transferring, at the second time, a plurality of data links from the first earth station to the second earth station, wherein each data link in the plurality of data links comprises a Level 2 connection between the sNB and the core network, and wherein signaling for each data link in the plurality of data links is transported through the first earth station at a Level 1 prior to the second time and is transported through the second earth station at a Level 1 after the second time may include the external interface 4106, sNB-DU 4112, sNB-CU 4114, the one or more processors 4104 with dedicated hardware or implementing executable code or software instructions 4120 in in memory 4116 and/or medium 4118, such as the data link transfer module 4222 in sNB 4100 shown in FIGS. 41 and 42.

Alternatively in the regenerative implementation, the first earth station and the second earth station may act as Level 2 relays, where enabling the transport of the second signaling between the plurality of UEs and the Core Network after the second time may comprise: (i) releasing, immediately prior to the second time, a first plurality of data links between the sNB and the core network, where the first plurality of data links transports the first signaling, and where each data link in the first plurality of data links may comprise a Level 2 connection between the sNB and the first earth station and a concatenated Level 2 connection between the first earth station and the core network; (ii) transferring, at the second time and from the first earth station to the second earth station, a Level 1 transport of signaling between the sNB and the core network; and (iii) establishing, immediately after the second time, a second plurality of data links between the sNB and the core network, where the second plurality of data links transports the second signaling, where each data link in the second plurality of data links may comprise a Level 2 connection between the sNB and the second earth station and a concatenated Level 2 connection between the second earth station and the core network, and where each data link in the second plurality of data links corresponds to one data link in the first plurality of data links, e.g., as discussed in reference to FIG. 31. A means for releasing, immediately prior to the second time, a first plurality of data links between the sNB and the core network, wherein the first plurality of data links transports the first signaling, and wherein each data link in the first plurality of data links comprises a Level 2 connection between the sNB and the first earth station and a concatenated Level 2 connection between the first earth station and the core network may include the external interface 4106, sNB-DU 4112, sNB-CU 4114, the one or more processors 4104 with dedicated hardware or implementing executable code or software instructions 4120 in in memory 4116 and/or medium 4118, such as the release module 4224 in sNB 4100 shown in FIGS. 41 and 42. A means for transferring, at the second time and from the first earth station to the second earth station, a Level 1 transport of signaling between the sNB and the core network may include the external interface 4106, sNB-DU 4112, sNB-CU 4114, the one or more processors 4104 with dedicated hardware or implementing executable code or software instructions 4120 in in memory 4116 and/or medium 4118, such as the transfer module 4226 in sNB 4100 shown in FIGS. 41 and 42. A means for establishing, immediately after the second time, a second plurality of data links between the sNB and the core network, wherein the second plurality of data links transports the second signaling, wherein each data link in the second plurality of data links comprises a Level 2 connection between the sNB and the second earth station and a concatenated Level 2 connection between the second earth station and the core network, and wherein each data link in the second plurality of data links corresponds to one data link in the first plurality of data links may include the external interface 4106, sNB-DU 4112, sNB-CU 4114, the one or more processors 4104 with dedicated hardware or implementing executable code or software instructions 4120 in in memory 4116 and/or medium 4118, such as the establish module 4228 in sNB 4100 shown in FIGS. 41 and 42.

In one implementation, referred to as a "regenerative implementation with split architecture", the SV is used in a regenerative mode with a split architecture, where the SV (e.g. an sNB 302) includes a satellite NodeB (sNB) Distributed Unit (such as sNB-DU 302), where the sNB-DU communicates with a first sNB Central Unit (e.g. an sNB-CU 307-1) to transport the first signaling and with a second sNB-CU (e.g. an sNB-CU 307-2) to transport the second signaling, where the first signaling is transported between the sNB-DU and the core network via the first sNB-CU, and where the second signaling is transported between the sNB-DU and the core network via the second sNB-CU, e.g., as discussed in reference to FIG. 3 and FIGS. 32-36.

In one aspect of the regenerative implementation with split architecture, referred to as Aspect A1, the first sNB-CU may be the second sNB-CU, the first network node may be the second network node, and the first network node may be the sNB-DU or the first sNB-CU, e.g., as discussed in reference to FIG. 32.

In Aspect A1, the first earth station and the second earth station may act as Level 1 relays, where enabling the transport of the second signaling between the plurality of UEs and the Core Network after the second time may comprise transferring, at the second time, a plurality of data links from the first earth station to the second earth station, where each data link in the plurality of data links may be a Level 2 connection between the first network node and the other of the sNB-DU and the first sNB-CU, where each data link in the plurality of data links is transported through the first earth station at a Level 1 prior to the second time and is transported through the second earth station at a Level 1 after the second time, e.g., as discussed in reference to FIGS. 30 and 32. A means for transferring, at the second time, a plurality of data links from the first earth station to the second earth station, wherein each data link in the plurality of data links comprises a Level 2 connection between the first network node and the other of the sNB-DU and the first sNB-CU, wherein each data link in the plurality of data links is transported through the first earth station at a Level 1 prior to the second time and is transported through the second earth station at a Level 1 after the second time may include the external interface 4106, sNB-DU 4112, sNB-CU 4114, the one or more processors 4104 with dedicated hardware or implementing executable code or software instructions 4120 in in memory 4116 and/or medium 4118, such as the data link transfer module 4222 in sNB 4100 shown in FIGS. 41 and 42.

In Aspect A1, the first earth station and the second earth station may alternatively act as a Level 2 relays, where enabling the transport of the second signaling between the first plurality of UEs and the Core Network after the second time may comprise: (i) releasing, immediately prior to the second time, a first plurality of data links between the first network node and the other of the sNB-DU and the first sNB-CU, where the first plurality of data links transports the first signaling, and where each data link in the first plurality of data links may comprise a Level 2 connection between the first network node and the first earth station and a concatenated Level 2 connection between the first earth station and the other of the sNB-DU and the first sNB-CU; (ii) transferring, at the second time and from the first earth station to the second earth station, a Level 1 transport of signaling between the first network node and the other of the sNB-DU and the first sNB-CU; and (iii) establishing, immediately after the second time, a second plurality of data links between the first network node and the other of the sNB-DU and the first sNB-CU, where the second plurality of data links transports the second signaling, where each data link in the second plurality of data links may comprise a Level 2 connection between the first network node and the second earth station and a concatenated Level 2 connection between the second earth station and the other of the sNB-DU and the first sNB-CU, and where each data link in the second plurality of data links corresponds to one data link in the first plurality of data links, e.g., as discussed in reference to FIGS. 31 and 32. A means for releasing, immediately prior to the second time, a first plurality of data links between the first network node and the other of the sNB-DU and the first sNB-CU, wherein the first plurality of data links transports the first signaling, and wherein each data link in the first plurality of data links comprises a Level 2 connection between the first network node and the first earth station and a concatenated Level 2 connection between the first earth station and the other of the sNB-DU and the first sNB-CU may include the external interface 4106, sNB-DU 4112, sNB-CU 4114, the one or more processors 4104 with dedicated hardware or implementing executable code or software instructions 4120 in in memory 4116 and/or medium 4118, such as the release module 4224 in sNB 4100 shown in FIGS. 41 and 42. A means for transferring, at the second time and from the first earth station to the second earth station, a Level 1 transport of signaling between the first network node and the other of the sNB-DU and the first sNB-CU may include the external interface 4106, sNB-DU 4112, sNB-CU 4114, the one or more processors 4104 with dedicated hardware or implementing executable code or software instructions 4120 in in memory 4116 and/or medium 4118, such as the transfer module 4226 in sNB 4100 shown in FIGS. 41 and 42. A means for establishing, immediately after the second time, a second plurality of data links between the first network node and the other of the sNB-DU and the first sNB-CU, wherein the second plurality of data links transports the second signaling, wherein each data link in the second plurality of data links comprises a Level 2 connection between the first network node and the second earth station and a concatenated Level 2 connection between the second earth station and the other of the sNB-DU and the first sNB-CU, and wherein each data link in the second plurality of data links corresponds to one data link in the first plurality of data links may include the external interface 4106, sNB-DU 4112, sNB-CU 4114, the one or more processors 4104 with dedicated hardware or implementing executable code or software instructions 4120 in in memory 4116 and/or medium 4118, such as the establish module 4228 in sNB 4100 shown in FIGS. 41 and 42.

In another aspect of the regenerative implementation with split architecture, referred to as Aspect A2, the first sNB-CU is different than the second sNB-CU, and the process may further include enabling the transport of the second signaling between the first plurality of UEs and the Core Network after the second time via the SV by performing a modified handover procedure for each UE in the first plurality of UEs, where either (i) the first network node may be the first sNB-CU and the second network node may be the second sNB-CU, or (ii) the first network node and the second network node each may be the sNB-DU, e.g., as discussed in reference to FIGS. 33-36. A means for enabling the transport of the second signaling between the first plurality of UEs and the Core Network after the second time via the SV by performing a modified handover procedure for each UE in the first plurality of UEs, wherein either (i) the first network node comprises the first sNB-CU and the second network node comprises the second sNB-CU, or (ii) the first network node and the second network node each comprise the sNB-DU may include the external interface 4106, sNB-DU 4112, sNB-CU 4114, the one or more processors 4104 with dedicated hardware or implementing executable code or software instructions 4120 in in memory 4116 and/or medium 4118, such as the handover module 4216 in sNB 4100 shown in FIGS. 41 and 42.

In Aspect A2, performing the modified handover procedure for each UE in the first plurality of UEs may comprise at least one of: (i) releasing first non-UE associated links and connections between the sNB-DU and the first sNB-CU immediately before the second time, where signaling for the first non-UE associated links and connections is transported between the sNB-DU and the first sNB-CU via the first earth station at a Level 1 or a Level 2; (ii) establishing second non-UE associated links and connections between the sNB-DU and the second sNB-CU immediately after the second time, where signaling for the second non-UE associated links and connections is transported between the sNB-DU and the second sNB-CU via the second earth station at a Level 1 or a Level 2; (iii) releasing first UE associated connections and tunnels between the sNB-DU, the first sNB-CU and the core network immediately before the second time, where signaling for the first UE associated connections and tunnels is transported between the sNB-DU and the first sNB-CU using the first non-UE associated links and connections; (iv) establishing second UE associated connections and tunnels between the sNB-DU, the second sNB-CU and the core network immediately after the second time, where signaling for the second UE associated connections and tunnels is transported between the sNB-DU and the second sNB-CU via the second earth station using the second non-UE associated links and connections; or (v) a combination of these, e.g., as discussed in reference to FIGS. 33-35. A means for releasing first non-UE associated links and connections between the sNB-DU and the first sNB-CU immediately before the second time, wherein signaling for the first non-UE associated links and connections is transported between the sNB-DU and the first sNB-CU via the first earth station at a Level 1 or a Level 2 may include the external interface 4106, sNB-DU 4112, sNB-CU 4114, the one or more processors 4104 with dedicated hardware or implementing executable code or software instructions 4120 in in memory 4116 and/or medium 4118, such as the release module 4224 in sNB 4100 shown in FIGS. 41 and 42. A means for establishing second non-UE associated links and connections between the sNB-DU and the second sNB-CU immediately after the second time, wherein signaling for the second non-UE associated links and connections is transported between the sNB-DU and the second sNB-CU via the second earth station at a Level 1 or a Level 2 may include the external interface 4106, sNB-DU 4112, sNB-CU 4114, the one or more processors 4104 with dedicated hardware or implementing executable code or software instructions 4120 in in memory 4116 and/or medium 4118, such as the establish module 4228 in sNB 4100 shown in FIGS. 41 and 42. A means for releasing first UE associated connections and tunnels between the sNB-DU, the first sNB-CU and the core network immediately before the second time, wherein signaling for the first UE associated connections and tunnels is transported between the sNB-DU and the first sNB-CU using the first non-UE associated links and connections may include the external interface 4106, sNB-DU 4112, sNB-CU 4114, the one or more processors 4104 with dedicated hardware or implementing executable code or software instructions 4120 in in memory 4116 and/or medium 4118, such as the release module 4224 in sNB 4100 shown in FIGS. 41 and 42. A means for establishing second UE associated connections and tunnels between the sNB-DU, the second sNB-CU and the core network immediately after the second time, wherein signaling for the second UE associated connections and tunnels is transported between the sNB-DU and the second sNB-CU via the second earth station using the second non-UE associated links and connections may include the external interface 4106, sNB-DU 4112, sNB-CU 4114, the one or more processors 4104 with dedicated hardware or implementing executable code or software instructions 4120 in in memory 4116 and/or medium 4118, such as the establish module 4228 in sNB 4100 shown in FIGS. 41 and 42.

In Aspect A2, the first non-UE associated links and connections and the second non-UE associated links and connections may each include use of one or more of an Internet Protocol (IP), a User Datagram Protocol (UDP) and a Stream Control Transmission Protocol (SCTP), e.g., as discussed in reference to FIGS. 34-35.

In Aspect A2, the first UE associated connections and tunnels and the second UE associated connections and tunnels may each include use of one or more of a GPRS Tunneling Protocol (GTP), an F1 Application Protocol (F1AP), a Packet Data Convergence Protocol (PDCP), a Service Data Protocol (SDAP), a Radio Resource Control (RRC) protocol, a Next Generation Application Protocol (NGAP) and/or an NR User Plane Protocol (NRUPP), e.g., as discussed in reference to FIGS. 34-35.

In one implementation, the process may further include: (i) transporting third signaling between a second plurality of UEs and the Core Network at the first time, where the third signaling is transported via the SV, the first earth station and the first network node, where the third signaling is transported between the SV and the second plurality of UEs using a second plurality of radio cells; and (ii) handing over the second plurality of UEs before the second time to a third plurality of radio cells supported by one or more SVs different from the SV, where fourth signaling is transported between the second plurality of UEs and the Core Network after the second time, and where the fourth signaling is transported via the one or more SVs using the third plurality of radio cells, e.g., as discussed in reference to FIGS. 23-27, and FIGS. 32 and 33. A means for transporting third signaling between a second plurality of UEs and the Core Network at the first time, wherein the third signaling is transported via the SV, the first earth station and the first network node, wherein the third signaling is transported between the SV and the second plurality of UEs using a second plurality of radio cells may include the external interface 4106, sNB-DU 4112, sNB-CU 4114, the one or more processors 4104 with dedicated hardware or implementing executable code or software instructions 4120 in in memory 4116 and/or medium 4118, such as the transport signaling module 4214 in sNB 4100 shown in FIGS. 41 and 42. A means for handing over the second plurality of UEs before the second time to a third plurality of radio cells supported by one or more SVs different from the SV, wherein fourth signaling is transported between the second plurality of UEs and the Core Network after the second time, and wherein the fourth signaling is transported via the one or more SVs using the third plurality of radio cells may include the external interface 4106, sNB-DU 4112, sNB-CU 4114, the one or more processors 4104 with dedicated hardware or implementing executable code or software instructions 4120 in in memory 4116 and/or medium 4118, such as the handover module 4216 in sNB 4100 shown in FIGS. 41 and 42.

Figure 51:
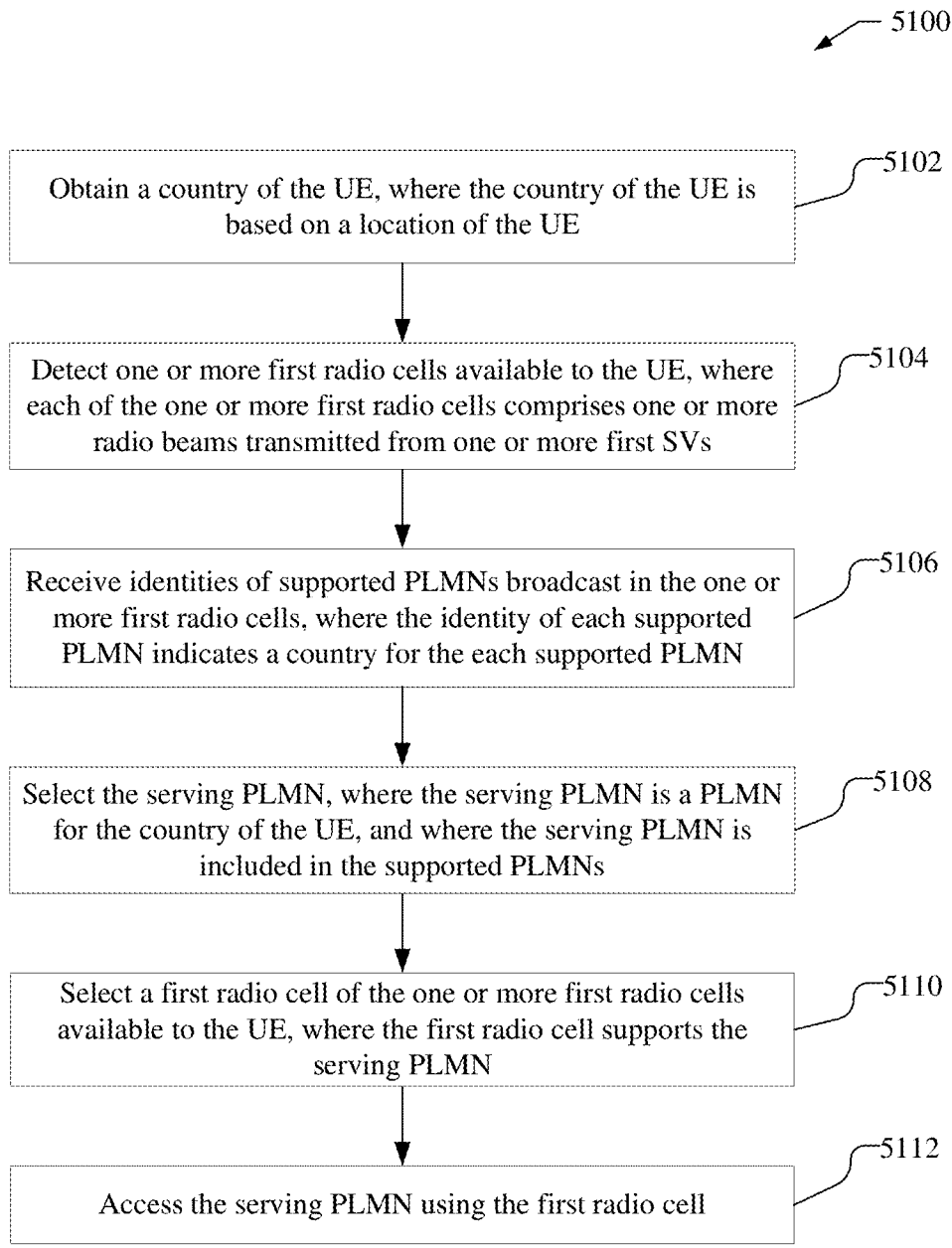
FIG. 51 shows a flowchart of an example procedure performed by a UE for supporting access by the UE via an SV to a serving PLMN.

FIG. 51 shows a flowchart of an example procedure 5100 performed by a user equipment (e.g. the UE 105 of FIGS. 1-3) for supporting access by the UE via a space vehicle (e.g. an SV 102, 202 or 302) to a serving Public Land Mobile Network (PLMN).

At block 5102, the UE obtains a country of the UE, where the country of the UE is based on a location of the UE, e.g., as discussed at stages 5, 9 and 10 of FIG. 37A and stages 3 and 10 of FIG. 37B. A means for obtaining a country of the UE, wherein the country of the UE is based on a location of the UE may include the satellite transceiver 3903 and one or more processors 3904 with dedicated hardware or implementing executable code or software instructions 3920 in in memory 3916 and/or medium 3918, such as the country module 4016 in UE 3900 shown in FIGS. 39 and 40.

At block 5104, one or more first radio cells available to the UE are detected, where each of the one or more first radio cells comprises one or more radio beams transmitted from one or more first SVs (e.g. SVs 102, 202 and/or 302), e.g., as discussed at stage 2 of FIG. 37A and stage 2 of FIG. 37B. A means for detecting one or more first radio cells available to the UE, wherein each of the one or more first radio cells comprises one or more radio beams transmitted from one or more first SVs may include the satellite transceiver 3903 and one or more processors 3904 with dedicated hardware or implementing executable code or software instructions 3920 in in memory 3916 and/or medium 3918, such as the detect radio cells 4018 in UE 3900 shown in FIGS. 39 and 40.

At block 5106, identities of supported PLMNs broadcast in the one or more first radio cells are received, where the identity of each supported PLMN indicates a country for the each supported PLMN, e.g., as discussed at stage 2 of FIG. 37A and stage 2 of FIG. 37B. A means for receiving identities of supported PLMNs broadcast in the one or more first radio cells, wherein the identity of each supported PLMN indicates a country for the each supported PLMN may include the satellite transceiver 3903 and one or more processors 3904 with dedicated hardware or implementing executable code or software instructions 3920 in in memory 3916 and/or medium 3918, such as the supported PLMNs module 4020 in UE 3900 shown in FIGS. 39 and 40.

At block 5108, the serving PLMN is selected, where the serving PLMN is a PLMN for the country of the UE, and where the serving PLMN is included in the supported PLMNs, e.g., as discussed at stage 11 of FIG. 37A and stage 7 of FIG. 37B. A means for selecting the serving PLMN, wherein the serving PLMN is a PLMN for the country of the UE, and wherein the serving PLMN is included in the supported PLMNs may include the satellite transceiver 3903 and one or more processors 3904 with dedicated hardware or implementing executable code or software instructions 3920 in in memory 3916 and/or medium 3918, such as the select PLMN module 4022 in UE 3900 shown in FIGS. 39 and 40.

At block 5110, a first radio cell of the one or more first radio cells available to the UE is selected, where the first radio cell supports the serving PLMN, e.g., as discussed at stage 6 of FIG. 37A and stage 4 of FIG. 37B. A means for selecting a first radio cell of the one or more first radio cells available to the UE, wherein the first radio cell supports the serving PLMN may include the satellite transceiver 3903 and one or more processors 3904 with dedicated hardware or implementing executable code or software instructions 3920 in in memory 3916 and/or medium 3918, such as the select radio cell module 4024 in UE 3900 shown in FIGS. 39 and 40.

At block 5112, the serving PLMN is accessed using the first radio cell, e.g., as discussed at stages 12-19 of FIG. 37A and stages 8-14 of FIG. 37B. A means for accessing the serving PLMN using the first radio cell may include the satellite transceiver 3903 and one or more processors 3904 with dedicated hardware or implementing executable code or software instructions 3920 in in memory 3916 and/or medium 3918, such as the PLMN access module 4026 in UE 3900 shown in FIGS. 39 and 40.

In one implementation, the serving PLMN may be a Fifth Generation (5G) Core Network (e.g. 5GCN 110).

In one implementation, the identity of each PLMN of the supported PLMNs broadcast in the one or more first radio cells may be a mobile country code (MCC) and a mobile network code (MNC), where the MCC indicates the country for the each PLMN, e.g., as discussed at stage 2 of FIG. 37A and stage 2 of FIG. 37B.

In one implementation, accessing the serving PLMN comprises exchanging signaling with the serving PLMN via the SV and a first satellite NodeB (e.g. an sNB 106, 202 or 307), e.g., as discussed at stages 12-19 of FIG. 37A and stages 8-14 of FIG. 37B. A means for accessing the serving PLMN using the first radio cell may include the satellite transceiver 3903 and one or more processors 3904 with dedicated hardware or implementing executable code or software instructions 3920 in in memory 3916 and/or medium 3918, such as the PLMN access module 4026 in UE 3900 shown in FIGS. 39 and 40.

In one implementation, obtaining the country of the UE may include selecting a second radio cell of the one or more first radio cells available to the UE based on the second radio cell supporting a preferred PLMN for the UE, e.g., as discussed at stage 6 of FIG. 37A and stage 4 of FIG. 37B. A means for selecting a second radio cell of the one or more first radio cells available to the UE based on the second radio cell supporting a preferred PLMN for the UE may include the satellite transceiver 3903 and one or more processors 3904 with dedicated hardware or implementing executable code or software instructions 3920 in in memory 3916 and/or medium 3918, such as the select radio cell module 4024 in UE 3900 shown in FIGS. 39 and 40. Using the second radio cell, a request may be sent to a second sNB (e.g. an sNB 106, 202 or 307) to access a PLMN, e.g. as discussed at stage 7 of FIG. 37A and stage 5 of FIG. 37B. A means for sending, using the second radio cell, a request to a second sNB to access a PLMN may include the satellite transceiver 3903 and one or more processors 3904 with dedicated hardware or implementing executable code or software instructions 3920 in in memory 3916 and/or medium 3918, such as the PLMN access module 4026 in UE 3900 shown in FIGS. 39 and 40. The country of the UE may then be received from the second sNB, e.g., as discussed at stages 9 and 10 of FIG. 37A and stage 10 of FIG. 37B. A means for receiving the country of the UE from the second sNB may include the satellite transceiver 3903 and one or more processors 3904 with dedicated hardware or implementing executable code or software instructions 3920 in in memory 3916 and/or medium 3918, such as the country module 4016 in UE 3900 shown in FIGS. 39 and 40. The second sNB, for example, may determine the location of the UE based on a coverage area of the second radio cell or a coverage area for a radio beam of the second radio cell, where the radio beam is used by the UE to send the request to the second sNB, e.g., as discussed at stage 8 of FIG. 37A and stage 9 of FIG. 37B. Additionally, the UE may obtain location measurements, where the location measurements include measurements of signals received from the one or more first SVs (e.g. SVs 102, 202 or 302), signals received from navigation SVs (e.g. SVs 190), or both types of signals, e.g., as discussed at stage 3 of FIG. 37A. A means for obtaining location measurements, wherein the location measurements include measurements of signals received from the one or more first SVs, signals received from navigation SVs, or both types of signals may include the satellite transceiver 3903 and the SPS receiver 3908. The UE may determine the location of the UE based on the location measurements, e.g., as discussed at stage 5 of FIG. 37A and stage 3 of FIG. 37B. A means for determining the location of the UE based on the location measurements may include the one or more processors 3904 with dedicated hardware or implementing executable code or software instructions 3920 in in memory 3916 and/or medium 3918, such as the position module 4004 in UE 3900 shown in FIGS. 39 and 40. The UE may then send the location of the UE to the second sNB as part of the request to access the PLMN, e.g., as discussed at stage 7 of FIG. 37A and stage 8 of FIG. 37B. A means for sending the location of the UE to the second sNB as part of the request to access the PLMN may include the satellite transceiver 3903 and one or more processors 3904 with dedicated hardware or implementing executable code or software instructions 3920 in in memory 3916 and/or medium 3918, such as the PLMN access module 4026 in UE 3900 shown in FIGS. 39 and 40. The UE may also receive security information from the second sNB, cipher the location of the UE based on the security information, and send the ciphered location of the UE to the second sNB as part of the request to access the PLMN, e.g. as described for stages 6 and 8 of FIG. 37B. A means for receiving security information from the second sNB, a means for ciphering the location of the UE based on the security information, and a means for sending the ciphered location of the UE to the second sNB as part of the request to access the PLMN may include the satellite transceiver 3903 and one or more processors 3904 with dedicated hardware or implementing executable code or software instructions 3920 in in memory 3916 and/or medium 3918, such as the PLMN access module 4026 in UE 3900 shown in FIGS. 39 and 40. The UE may send the request to access the PLMN to the second sNB in a Radio Resource Control (RRC) Setup Request message or an RRC Setup Complete message and may receive the country of the UE from the second sNB in an RRC Setup message or an RRC Reject message, e.g., as discussed at stages 7, 9 and 10 of FIG. 37A and stages 8 and 10 of FIG. 37B. In one example, the first sNB may be the second sNB, and the first radio cell may be the second radio cell.

In one implementation, obtaining the country of the UE may comprise obtaining location measurements, where the location measurements include measurements of signals received from the one or more first SVs (e.g. SVs 102, 202 or 302), signals received from navigation SVs (e.g. SVs 190), or both types of signals, e.g., as discussed at stage 3 of FIG. 37A and stage 3 of FIG. 37B. A means for obtaining location measurements, wherein the location measurements include measurements of signals received from the one or more first SVs, signals received from navigation SVs, or both types of signals may include the satellite transceiver 3903 and the SPS receiver 3908. The location of the UE may be determined based on the location measurements, e.g., as discussed at stage 5 of FIG. 37A and stage 3 of FIG. 37B. A means for determining the location of the UE based on the location measurements may include the one or more processors 3904 with dedicated hardware or implementing executable code or software instructions 3920 in in memory 3916 and/or medium 3918, such as the position module 4004 in UE 3900 shown in FIGS. 39 and 40. Location related information for the supported PLMNs may be received broadcast in the one or more radio cells, e.g., as discussed at stage 4 of FIG. 37A. A means for receiving location related information for the supported PLMNs broadcast in the one or more radio cells may include the satellite transceiver 3903 and one or more processors 3904 with dedicated hardware or implementing executable code or software instructions 3920 in in memory 3916 and/or medium 3918, such as the supported PLMNs module 4020 in UE 3900 shown in FIGS. 39 and 40. The country of the UE may be determined based on the location related information and the location of the UE, e.g., as discussed at stage 5 of FIG. 37A and stage 3 of FIG. 37B. A means for determining the country of the UE based on the location related information and the location of the UE may include the one or more processors 3904 with dedicated hardware or implementing executable code or software instructions 3920 in in memory 3916 and/or medium 3918, such as the country module 4016 in UE 3900 shown in FIGS. 39 and 40. In this implementation, the location related information for each supported PLMN may comprise geographic definition for fixed cells of the each supported PLMN, geographic definition for fixed tracking areas of the each supported PLMN, or both.

In one implementation, accessing the serving PLMN comprises exchanging signaling with the serving PLMN via the SV and a first sNB (e.g. an sNB 106, 202 or 307), and sending a Non-Access Stratum (NAS) Registration Request message to a network node for the serving PLMN and receiving a NAS Registration Accept from the network node, e.g., as discussed at stages 12 and 18 of FIG. 37A and stages 8 and 13 of FIG. 37B. A means for exchanging signaling with the serving PLMN via the SV and a first satellite NodeB (sNB) and a means for sending a Non-Access Stratum (NAS) Registration Request message to a network node for the serving PLMN and receiving a NAS Registration Accept from the network node may include the satellite transceiver 3903 and one or more processors 3904 with dedicated hardware or implementing executable code or software instructions 3920 in in memory 3916 and/or medium 3918, such as the PLMN access module 4026 and the registration module 4028 in UE 3900 shown in FIGS. 39 and 40. For example, the network node may be an Access and Mobility management Function (e.g. an AMF 122). In one example, sending the NAS Registration Request message to the network node may comprises sending a Radio Resource Control (RRC) Setup Complete message to the first sNB via the SV, where the RRC Setup Complete message includes the NAS Registration Request message and indicates the serving PLMN, e.g., as discussed at stage 12 of FIG. 37A and stage 8 of FIG. 37B. In one example, referred to as example E1, the NAS Registration Accept message may include identities and location information for a plurality of allowed (e.g. fixed) tracking areas (TAs) of the serving PLMN, where the UE is allowed to access the serving PLMN in each TA of the plurality of allowed TAs, e.g., as discussed at stages 18-20 of FIG. 37A and stages 13 and 14 of FIG. 37B. The NAS Registration Accept message, for example, may also include identities and a geographic definition for a plurality of fixed cells of the serving PLMN, e.g., as discussed at stage 18 of FIG. 37A and stage 13 of FIG. 37B. In one example, accessing the serving PLMN may include determining a current location of the UE, e.g., as discussed at stage 5 of FIG. 22 and stage 19 of FIG. 37A. A means for determining a current location of the UE may include the satellite transceiver 3903 and one or more processors 3904 with dedicated hardware or implementing executable code or software instructions 3920 in in memory 3916 and/or medium 3918, such as the position module 4004 in UE 3900 shown in FIGS. 39 and 40. The current location may be mapped to at least one of an allowed TA of the plurality of allowed TAs, a fixed cell of the plurality of fixed cells, or a combination thereof, based on the geographic definition for the plurality of allowed TAs, the geographic definition for the plurality of fixed cells or a combination thereof, e.g., as discussed at stage 5 of FIG. 22 and stage 19 of FIG. 37A. A means for mapping the current location to at least one of an allowed TA of the plurality of allowed TAs, a fixed cell of the plurality of fixed cells, or a combination thereof, based on the geographic definition for the plurality of allowed TAs, the geographic definition for the plurality of fixed cells or a combination thereof may include the satellite transceiver 3903 and one or more processors 3904 with dedicated hardware or implementing executable code or software instructions 3920 in in memory 3916 and/or medium 3918, such as the PLMN access module 4026 in UE 3900 shown in FIGS. 39 and 40. At least one of an indication of the allowed TA, an indication of the fixed cell or a combination thereof may be included in a message sent to the serving PLMN, where the at least one of the indication of the allowed TA, the indication of the fixed cell or the combination thereof enable a service for the UE by the serving PLMN, e.g., as discussed at stages 6-11 of FIG. 22 and stage 19 of FIG. 37A.

In one aspect of Example E1 above, referred to as Aspect A3, the UE may further detect one or more second radio cells available to the UE, where each of the one or more second radio cells comprises one or more radio beams transmitted from one or more second SVs (e.g. SVs 102, 202 and/or 302), where each of the one or more second radio cells indicates support for the serving PLMN, e.g., as discussed at stage 20 of FIG. 37A. A means for detecting one or more second radio cells available to the UE, wherein each of the one or more second radio cells comprises one or more radio beams transmitted from one or more second SVs, wherein each of the one or more second radio cells indicates support for the serving PLMN may include the satellite transceiver 3903 and one or more processors 3904 with dedicated hardware or implementing executable code or software instructions 3920 in in memory 3916 and/or medium 3918, such as the detect radio cells module 4018 in UE 3900 shown in FIGS. 39 and 40. Identities of a plurality of supported TAs of the serving PLMN may be received broadcast in the one or more second radio cells, e.g., as discussed at stage 20 of FIG. 37A. A means for receiving identities of a plurality of supported TAs of the serving PLMN broadcast in the one or more second radio cells may include the satellite transceiver 3903 and one or more processors 3904 with dedicated hardware or implementing executable code or software instructions 3920 in in memory 3916 and/or medium 3918, such as the supported PLMNs module 4020 in UE 3900 shown in FIGS. 39 and 40. The UE may determine whether the UE is required to perform a registration with the serving PLMN for a change of TA, based at least in part on the plurality of allowed TAs and the plurality of supported TAs, e.g., as discussed at stage 20 of FIG. 37A and following stage 14 of FIG. 37B. A means for determining whether the UE is required to perform a registration with the serving PLMN for a change of TA, based at least in part on the plurality of allowed TAs and the plurality of supported TAs may include the one or more processors 3904 with dedicated hardware or implementing executable code or software instructions 3920 in in memory 3916 and/or medium 3918, such as the registration module 4028 in UE 3900 shown in FIGS. 39 and 40. The UE may perform the registration with the serving PLMN for the change of TA using one of the one or more second radio cells when the UE determines the UE is required to perform the registration with the serving PLMN for the change of TA, e.g., as discussed at stage 21 of FIG. 37A and following stage 14 of FIG. 37B. A means for performing the registration with the serving PLMN for the change of TA using one of the one or more second radio cells when the UE determines the UE is required to perform the registration with the serving PLMN for the change of TA may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40. The UE may camp on the one of the one or more second radio cells without performing the registration with the serving PLMN for the change of TA, when the UE is in an idle state and when the UE determines the UE is not required to perform the registration with the serving PLMN for the change of TA, e.g., as discussed at stage 21 of FIG. 37A and following stage 14 of FIG. 37B. A means for camping on the one of the one or more second radio cells without performing the registration with the serving PLMN for the change of TA, when the UE is in an idle state and when the UE determines the UE is not required to perform the registration with the serving PLMN for the change of TA may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40. The UE may access the serving PLMN using the one of the one or more second radio cells without performing the registration with the serving PLMN for the change of TA, when the UE is in a connected state and when the UE determines the UE is not required to perform the registration with the serving PLMN for the change of TA, e.g., as discussed at stage 21 of FIG. 37A and following stage 14 of FIG. 37B. A means for accessing the serving PLMN using the one of the one or more second radio cells without performing the registration with the serving PLMN for the change of TA, when the UE is in a connected state and when the UE determines the UE is not required to perform the registration with the serving PLMN for the change of TA may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40.

For Aspect A3, the UE may determine that the UE is required to perform the registration with the serving PLMN for the change of TA by determining that the plurality of supported TAs do not include any TA of the plurality of allowed TAs, e.g., as discussed at stage 20 of FIG. 37A and following stage 14 of FIG. 37B.

For Aspect A3, the UE may determine that the UE is not required to perform the registration with the serving PLMN for the change of TA by determining that the plurality of supported TAs includes at least one of the plurality of allowed TAs, where the one of the one or more second radio cells indicates support for the at least one of the plurality of allowed TAs, e.g., as discussed at stage 20 of FIG. 37A and following stage 14 of FIG. 37B. For example, determining that the UE is not required to perform the registration with the serving PLMN for the change of TA may further comprise determining that the NAS Registration Accept message includes an indication allowing the UE to access the serving PLMN using a radio cell supporting at least one of the plurality of allowed TAs when the UE is not located in any of the plurality of allowed TAs, e.g., as discussed at stage 20 of FIG. 37A and following stage 14 of FIG. 37B.

In one implementation of Aspect A3, determining whether the UE is required to perform the registration for the change of TA with the serving PLMN may further comprise determining a current location of the UE, e.g., as discussed at stage 20 of FIG. 37A. A means for determining a current location of the UE may include the SPS receiver 3908, satellite transceiver 3903 and one or more processors 3904 with dedicated hardware or implementing executable code or software instructions 3920 in in memory 3916 and/or medium 3918, such as the position module 4004 in UE 3900 shown in FIGS. 39 and 40. The UE may determine whether the current location of the UE is inside any allowed TA of the plurality of allowed TAs, e.g., as discussed at stage 20 of FIG. 37A. A means for determining whether the current location of the UE is inside any allowed TA of the plurality of allowed TAs may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40. The UE may determine that the UE is required to perform the registration for the change of TA with the serving PLMN when the current location of the UE is not inside the any allowed TA or when the current location of the UE is inside the any allowed TA and the any allowed TA is not included in the plurality of supported TAs, e.g., as discussed at stage 20 of FIG. 37A and following stage 14 of FIG. 37B. A means for determining that the UE is required to perform the registration for the change of TA with the serving PLMN when the current location of the UE is not inside the any allowed TA or when the current location of the UE is inside the any allowed TA and the any allowed TA is not included in the plurality of supported TAs may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40. The UE may determine that the UE is not required to perform the registration for the change of TA with the serving PLMN when the current location of the UE is inside the any allowed TA and when the any allowed TA is included in the plurality of supported TAs, and where the one of the one or more second radio cells indicates support for the any allowed TA, e.g., as discussed at stage 20 of FIG. 37A and following stage 14 of FIG. 37B. A means for determining that the UE is not required to perform the registration for the change of TA with the serving PLMN when the current location of the UE is inside the any allowed TA and when the any allowed TA is included in the plurality of supported TAs, and wherein the one of the one or more second radio cells indicates support for the any allowed TA may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40. For example, determining whether the UE is required to perform the registration for the change of TA with the serving PLMN may further include determining whether the NAS Registration Accept message includes an indication (e.g. a Registration flag) requiring the UE to perform the registration for the change of TA with the serving PLMN when the UE is not located inside the any of the plurality of allowed TAs, e.g., as discussed at stages 18-20 of FIG. 37A and stages 13 and 14 of FIG. 37B. A means for determining whether the UE is required to perform the registration for the change of TA with the serving PLMN further comprises determining whether the NAS Registration Accept message includes an indication requiring the UE to perform the registration for the change of TA with the serving PLMN when the UE is not located inside the any of the plurality of allowed TAs may include the satellite transceiver 3903 and one or more processors 3904 with dedicated hardware or implementing executable code or software instructions 3920 in in memory 3916 and/or medium 3918, such as the registration module 4028 in UE 3900 shown in FIGS. 39 and 40.

Figure 52:
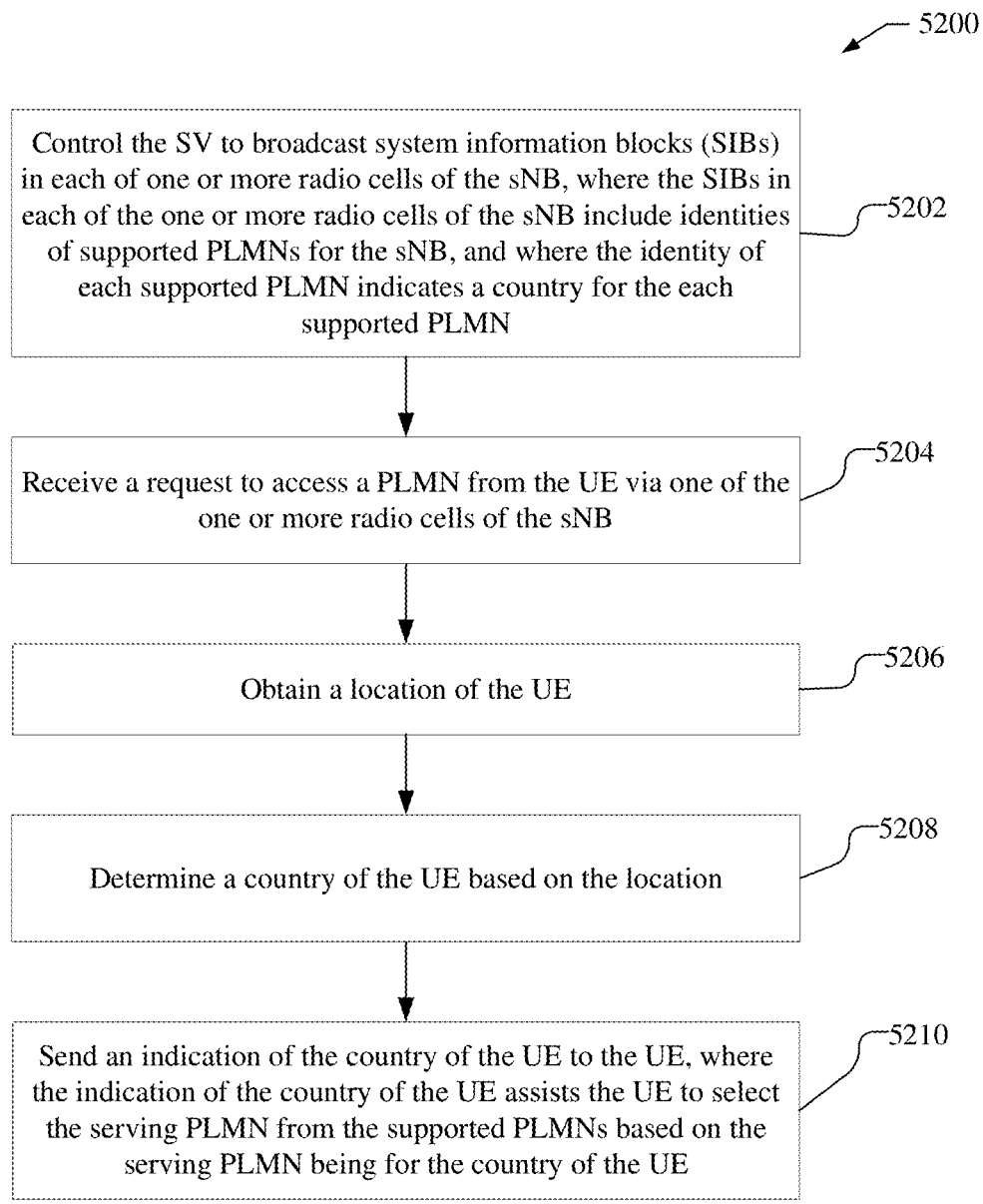
FIG. 52 shows a flowchart of an example procedure performed by an sNB for supporting access by a UE via a SV to a serving PLMN.

FIG. 52 shows a flowchart of an example procedure 5200 performed by a satellite Node B (e.g. an sNB 106, sNB 202 or sNB-CU 307) for supporting access by a user equipment (e.g. the UE 105 of FIGS. 1-3) via a space vehicle (e.g. an SV 102, 202 or 302) to a serving Public Land Mobile Network (PLMN).

At block 5202, the sNB controls the SV to broadcast system information blocks (SIBs) in each of one or more radio cells of the sNB, where the SIBs in each of the one or more radio cells of the sNB include identities of supported PLMNs for the sNB, and where the identity of each supported PLMN indicates a country for the each supported PLMN, e.g., e.g., as discussed at stage 2 of FIG. 37A and stage 2 of FIG. 37B. A means for controlling the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN may include the external interface 4106 and one or more processors 4104 with dedicated hardware or implementing executable code or software instructions 4120 in in memory 4116 and/or medium 4118, such as the SIB (supported PLMNs) module 4230 in sNB 4100 shown in FIGS. 41 and 42.

At block 5204, a request to access a PLMN is received from the UE via one of the one or more radio cells of the sNB, e.g., as discussed at stage 7 of FIG. 37A and stage 8 of FIG. 37B. A means for receiving a request to access a PLMN from the UE via one of the one or more radio cells of the sNB may include the external interface 4106 and one or more processors 4104 with dedicated hardware or implementing executable code or software instructions 4120 in in memory 4116 and/or medium 4118, such as the PLMN access request module 4232 in sNB 4100 shown in FIGS. 41 and 42.

At block 5206, a location of the UE is obtained, e.g., as discussed at stages 7 and 8 of FIG. 37A and stages 8 and 9 of FIG. 37B. A means for obtaining a location of the UE may include the external interface 4106 and one or more processors 4104 with dedicated hardware or implementing executable code or software instructions 4120 in in memory 4116 and/or medium 4118, such as the country module 4234 in sNB 4100 shown in FIGS. 41 and 42.

At block 5208, a country of the UE is determined based on the location, e.g., as discussed at stage 8 of FIG. 37A and stage 9 of FIG. 37B. A means for determining a country of the UE based on the location may include the external interface 4106 and one or more processors 4104 with dedicated hardware or implementing executable code or software instructions 4120 in in memory 4116 and/or medium 4118, such as the country module 4234 in sNB 4100 shown in FIGS. 41 and 42.

At block 5210, an indication of the country of the UE is sent to the UE, where the indication of the country of the UE assists the UE to select the serving PLMN from the supported PLMNs based on the serving PLMN being for the country of the UE, e.g., as discussed at stages 9-11 of FIG. 37A and stage 10 of FIG. 37B. A means for sending an indication of the country of the UE to the UE, wherein the indication of the country of the UE assists the UE to select the serving PLMN from the supported PLMNs based on the serving PLMN being for the country of the UE may include the external interface 4106 and one or more processors 4104 with dedicated hardware or implementing executable code or software instructions 4120 in in memory 4116 and/or medium 4118, such as the PLMN access response module 4236 in sNB 4100 shown in FIGS. 41 and 42.

In one implementation, the SV is used in a transparent mode, a regenerative mode with a non-split architecture or in a regenerative mode with a split architecture, where the sNB is terrestrial (e.g. an sNB 106) when the SV is used in the transparent mode, where the sNB is part of the SV (e.g. an sNB 202) when the SV is used in the regenerative mode with the non-split architecture, and where the sNB is terrestrial and comprises an sNB Central Unit (e.g. an sNB-CU 307) when the SV is used in the regenerative mode with the split architecture, e.g., as discussed in FIGS. 1, 2, and 3.

In one implementation, the identity of each PLMN of the supported PLMNs broadcast in the one or more radio cells comprises a mobile country code (MCC) and a mobile network code (MNC), where the MCC indicates the country for the each PLMN, e.g., as discussed at stage 2 of FIG. 37A and stage 2 of FIG. 37B.

In one implementation, the indication of the country of the UE comprises an MCC.

In one implementation, the location of the UE may be obtained by receiving the location of the UE from the UE in the request to access the PLMN, e.g., as discussed at stage 7 of FIG. 37A and stage 5 of FIG. 37B. A means for obtaining the location of the UE by receiving the location of the UE from the UE in the request to access the PLMN may include the external interface 4106 and one or more processors 4104 with dedicated hardware or implementing executable code or software instructions 4120 in in memory 4116 and/or medium 4118, such as the country module 4234 in sNB 4100 shown in FIGS. 41 and 42. In this implementation, security information may be sent to the UE, where the location received from the UE is ciphered by the UE based on the security information, and the location received from the UE may be deciphered by the sNB, e.g. as described for stages 6 and 8 of FIG. 37B. The security information may be sent to the UE in a broadcast SIB, e.g. as described for stage 2 of FIG. 37B. A means for sending security information to the UE, wherein the location received from the UE is ciphered based on the security information, a means for deciphering the location, and a means for sending the security information to the UE in a broadcast SIB, may include the external interface 4106 and one or more processors 4104 with dedicated hardware or implementing executable code or software instructions 4120 in in memory 4116 and/or medium 4118, such as the SIB (supported PLMNs) module 4230 and the country module 4234 in sNB 4100 shown in FIGS. 41 and 42.

In one implementation, the location of the UE may be obtained by determining the location based on a coverage area of the one of the one or more radio cells of the sNB or a coverage area for a radio beam of the one of the one or more radio cells of the sNB, where the radio beam is used by the UE to send the request to access the PLMN to the sNB, e.g., as discussed at stage 8 of FIG. 37A and stage 9 of FIG. 37B. A means for obtaining the location of the UE by determining the location based on a coverage area of the one of the one or more radio cells of the sNB or a coverage area for a radio beam of the one of the one or more radio cells of the sNB, wherein the radio beam is used by the UE to send the request to access the PLMN to the sNB may include the external interface 4106 and one or more processors 4104 with dedicated hardware or implementing executable code or software instructions 4120 in in memory 4116 and/or medium 4118, such as the country module 4234 in sNB 4100 shown in FIGS. 41 and 42.

In one implementation, the request to access the PLMN may be received from the UE in a Radio Resource Control (RRC) Setup Request message or an RRC Setup Complete message, where the indication of the country of the UE is sent to the UE in an RRC Setup message or an RRC Reject message, e.g., as discussed at stages 7, 9, and 10 of FIG. 37A and stages 8 and 10 of FIG. 37B. The sNB may further determine whether the country of the UE is supported by the sNB, e.g., as discussed at stage 8 of FIG. 37A and stage 9 of FIG. 37B. A means for determining whether the country of the UE is supported by the sNB may include the external interface 4106 and one or more processors 4104 with dedicated hardware or implementing executable code or software instructions 4120 in in memory 4116 and/or medium 4118, such as the PLMN access response module 4236 in sNB 4100 shown in FIGS. 41 and 42. The indication of the country of the UE may be sent to the UE when the country of the UE is not supported by the sNB, e.g., as discussed at stage 9 of FIG. 37A and stage 10 of FIG. 37B. A means for sending the RRC Setup message when the country of the UE is supported by the sNB and a means for sending the RRC Reject message when the country of the UE is not supported by the sNB may include the external interface 4106 and one or more processors 4104 with dedicated hardware or implementing executable code or software instructions 4120 in in memory 4116 and/or medium 4118, such as the PLMN access response module 4236 in sNB 4100 shown in FIGS. 41 and 42.

In one implementation, the sNB may additionally receive a first message from the UE, where the first message includes a second message and an indication of a selected PLMN, e.g., as discussed at stage 12 of FIG. 37A and stage 8 of FIG. 37B. A third message may be sent to a first network node in the selected PLMN, where the third message includes the second message and an indication of a fixed serving cell and a fixed tracking area (TA) for the UE, e.g., as discussed at stage 14 of FIG. 37A and stage 11 of FIG. 37B. A means for receiving a first message from the UE, wherein the first message includes a second message and an indication of a selected PLMN and a means for sending a third message to a first network node in the selected PLMN, wherein the third message includes the second message and an indication of a fixed serving cell and a fixed tracking area (TA) for the UE may include the external interface 4106 and one or more processors 4104 with dedicated hardware or implementing executable code or software instructions 4120 in in memory 4116 and/or medium 4118, such as the registration module 4238 in sNB 4100 shown in FIGS. 41 and 42. The first network node, for example, may be an Access and Mobility management Function (e.g. an AMF 122). The indication of the fixed serving cell and the fixed TA for the UE may comprise the location of the UE, where a second network node in the serving PLMN maps the location of the UE to the fixed serving cell and the fixed TA, e.g., as discussed at stages 13, 14, 15, and 16 of FIG. 37A and stages 11 and 12 of FIG. 37B. The second network node may be the AMF or a Location Management Function (e.g. LMF 124), e.g., as discussed at stages 14, 15, and 16 of FIG. 37A and stage 12 of FIG. 37B. The sNB may map the location of the UE to an identity of the fixed serving cell and an identity of the fixed TA, where the indication of the fixed serving cell and the fixed TA for the UE comprises the identity of the fixed serving cell and the identity of the fixed TA, e.g., as discussed at stage 13 of FIG. 37A and stage 9 of FIG. 37B. A means for mapping the location of the UE to an identity of the fixed serving cell and an identity of the fixed TA, wherein the indication of the fixed serving cell and the fixed TA for the UE comprises the identity of the fixed serving cell and the identity of the fixed TA may include the one or more processors 4104 with dedicated hardware or implementing executable code or software instructions 4120 in in memory 4116 and/or medium 4118, such as the registration module 4238 in sNB 4100 shown in FIGS. 41 and 42.

The first message may be an RRC Setup Complete message, the second message may be a Non Access Stratum (NAS) Registration Request message and the third message may be a Next Generation Application Protocol (NGAP) Initial UE message, e.g., as discussed at stages 12 and 14 of FIG. 37A and stages 8 and 11 of FIG. 37B.

FIG. 53 shows a flowchart of an example procedure 5300 performed by an Access and Mobility management Function (e.g. an AMF 122) for supporting access by a user equipment (e.g. the UE 105 in FIGS. 1-3) via a space vehicle (e.g. an SV 102, 202 or 302) to a serving Public Land Mobile Network (PLMN).

At block 5302, a Non-Access Stratum (NAS) Registration Request message is received from the UE via the SV and a satellite NodeB (e.g. an sNB 106, sNB 202 or sNB-CU 307), where the NAS Registration Request message is received with an indication of a fixed serving cell and a fixed tracking area (TA) for the UE, e.g., as discussed at stage 14 of FIG. 37A and stage 11 of FIG. 37B. A means for receiving a Non-Access Stratum (NAS) Registration Request message from the UE via the SV and a satellite NodeB (sNB), wherein the NAS Registration Request message is received with an indication of a fixed serving cell and a fixed tracking area (TA) for the UE may include the external interface 4502, the one or more processors 4504 with dedicated hardware or implementing executable code or software instructions 4520 in in memory 4516 and/or medium 4518, such as the registration request module 4614 in AMF 4500, shown in FIGS. 45 and 46.

At block 5304, a plurality of allowed tracking areas (TAs) of the serving PLMN is determined, where the UE is allowed to access the serving PLMN in each TA of the plurality of allowed TAs, e.g., e.g., as discussed at stage 17 of FIG. 37A and stage 13 of FIG. 37B. A means for determining a plurality of allowed tracking areas (TAs) of the serving PLMN, wherein the UE is allowed to access the serving PLMN in each TA of the plurality of allowed TAs may include the external interface 4502, the one or more processors 4504 with dedicated hardware or implementing executable code or software instructions 4520 in in memory 4516 and/or medium 4518, such as the allowed TAs module 4616 in AMF 4500, shown in FIGS. 45 and 46.

At block 5306, a NAS Registration Accept message is sent to the UE via the sNB and the SV, wherein the NAS Registration Accept message includes identities and a geographic definition for the plurality of allowed TAs, e.g., as discussed at stage 18 of FIG. 37A and stage 13 of FIG. 37B. A means for sending a NAS Registration Accept message to the UE via the sNB and the SV, wherein the NAS Registration Accept message includes identities and a geographic definition for the plurality of allowed TAs may include the external interface 4502, the one or more processors 4504 with dedicated hardware or implementing executable code or software instructions 4520 in in memory 4516 and/or medium 4518, such as the registration response module 4618 in AMF 4500, shown in FIGS. 45 and 46.

In one implementation, identities and a geographic definition for a plurality of fixed cells of the serving PLMN may be included in the NAS Registration Accept message sent to the UE, e.g., as discussed at stage 18 of FIG. 37A and stage 13 of FIG. 37B. The plurality of fixed cells of the serving PLMN, for example, may comprise fixed cells belonging to the plurality of allowed TAs, e.g., as discussed at stage 18 of FIG. 37A and stage 13 of FIG. 37B.

In one implementation, the NAS Registration Accept message may include an indication (e.g. a Registration flag) as to whether or not the UE is required to perform a registration with the serving PLMN for a change of TA after detecting the UE is no longer in any of the plurality of allowed TAs, e.g., as discussed at stage 18 of FIG. 37A and stage 13 of FIG. 37B.

In one implementation, the indication of the fixed serving cell and the fixed TA for the UE may be an identity of the fixed serving cell and an identity of the fixed TA, e.g., as discussed at stage 14 of FIG. 37A and stage 13 of FIG. 37B.

In one implementation, the indication of the fixed serving cell and the fixed TA for the UE may be a location of the UE. The AMF may then map the location to an identity of the fixed serving cell and an identity of the fixed TA, e.g., as discussed at stage 17 of FIG. 37A. A means for mapping the location to an identity of the fixed serving cell and an identity of the fixed TA may include the one or more processors 4504 with dedicated hardware or implementing executable code or software instructions 4520 in in memory 4516 and/or medium 4518, such as the identify fixed cell and TA module 4620 in AMF 4500, shown in FIGS. 45 and 46. Alternatively, the AMF may send the location of the UE to a Location Management Function (e.g. an LMF 124), where the LMF maps the location of the UE to an identity of the fixed serving cell and an identity of the fixed TA, and where the LMF returns the identity of the fixed serving cell and the identity of the fixed TA to the AMF, e.g., as discussed at stages 15 and 16 of FIG. 37A. A means for sending the location of the UE to a Location Management Function (LMF), wherein the LMF maps the location of the UE to an identity of the fixed serving cell and an identity of the fixed TA, wherein the LMF returns the identity of the fixed serving cell and the identity of the fixed TA to the AMF may include the one or more processors 4504 with dedicated hardware or implementing executable code or software instructions 4520 in in memory 4516 and/or medium 4518, such as the identify fixed cell and TA module 4620 in AMF 4500, shown in FIGS. 45 and 46.

Figure 54:
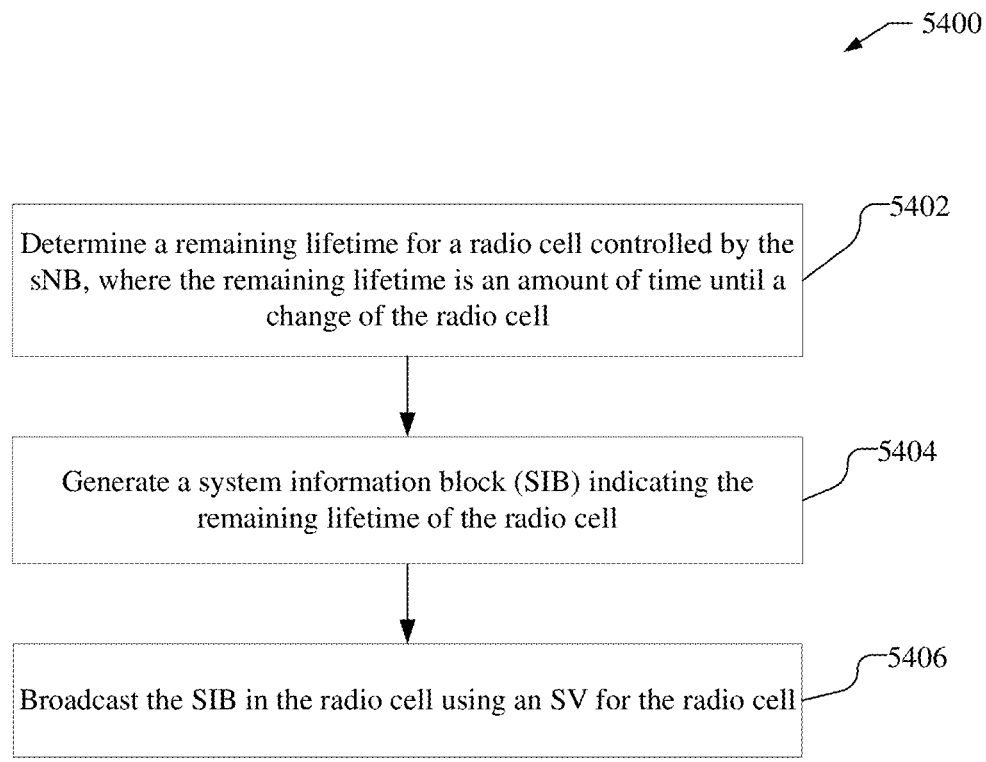
FIG. 54 shows a flowchart of an example procedure performed by a satellite Node B (sNB) to assist wireless access by user equipments (UEs) to serving Public Land Mobile Networks (PLMNs) via space vehicles (SVs).

FIG. 54 shows a flowchart of an example procedure 5400 performed by a satellite Node B (e.g. an sNB 106, sNB 202 or sNB-CU-307) to assist wireless access by user equipments (e.g. including UE 105 in FIGS. 1-3) to serving Public Land Mobile Networks (PLMNs) via space vehicles (e.g. SVs 102, 202 and/or 302).

At block 5402, a remaining lifetime for a radio cell controlled by the sNB is determined, where the remaining lifetime is an amount of time until a change of the radio cell, e.g., as discussed at stage 5 of FIG. 38. A means for determining a remaining lifetime for a radio cell controlled by the sNB, wherein the remaining lifetime is an amount of time until a change of the radio cell may include the external interface 4106 and one or more processors 4104 with dedicated hardware or implementing executable code or software instructions 4120 in in memory 4116 and/or medium 4118, such as the lifetime module 4240 in sNB 4100 shown in FIGS. 41 and 42.

At block 5404, a system information block (SIB) is generated indicating the remaining lifetime of the radio cell, e.g., as discussed at stage 6 of FIG. 38. A means for generating a system information block (SIB) indicating the remaining lifetime of the radio cell may include the external interface 4106 and one or more processors 4104 with dedicated hardware or implementing executable code or software instructions 4120 in in memory 4116 and/or medium 4118, such as the SIB module 4244 in sNB 4100 shown in FIGS. 41 and 42.

At block 5406, the SIB is broadcast in the radio cell using an SV (e.g. an SV 102, 202 or 302) for the radio cell, e.g., as discussed at stage 6 of FIG. 38. A means for broadcasting the SIB in the radio cell using an SV for the radio cell may include the external interface 4106 and one or more processors 4104 with dedicated hardware or implementing executable code or software instructions 4120 in in memory 4116 and/or medium 4118, such as the provide lifetime/TA module 4246 in sNB 4100 shown in FIGS. 41 and 42.

In one implementation, the SV may be used in a transparent mode, a regenerative mode with a non-split architecture or in a regenerative mode with a split architecture, e.g., as discussed in FIGS. 1-3. The sNB may be terrestrial (e.g. an sNB 106) when the SV is used in the transparent mode. The sNB may be part of the SV (e.g. an sNB 202) when the SV is used in the regenerative mode with the non-split architecture. The sNB may be terrestrial and may comprise an sNB Central Unit (e.g. may be an sNB-CU 307) when the SV is used in the regenerative mode with the split architecture.

In one implementation, the change of the radio cell may comprise at least one of: a change of an earth station (e.g. an ES 104) used by the sNB to exchange signaling for the radio cell with either the SV for the radio cell (e.g. when the sNB comprises an sNB 106 or sNB-CU 307) or with a 5G Core Network (e.g. when the sNB comprises an sNB 202); a change in timing for the radio cell; a change in carrier frequency for the radio cell; a change in bandwidth for the radio cell; a change in coverage area for the radio cell; a change to radio beams used by the radio cell; a change in a cell identity (ID) for the radio cell; a cessation of support by the radio cell for one or more tracking areas for one or more PLMNs supported by the radio cell; or a termination of support for the radio cell by the sNB, as discussed at stage 5 of FIG. 38.

In one implementation, the broadcasting the SIB in the radio cell using the SV for the radio cell enables each of the UEs to perform a cell change or a handover from the radio cell to a different radio cell before the change of the radio cell and to access a serving PLMN via one of the SVs using the different radio cell, e.g., as discussed at stages 7-9 of FIG. 38.

In one implementation, the SIB may be a SIB type 1 (SIB1) or a SIB type 2 (SIB2).

Figure 55:
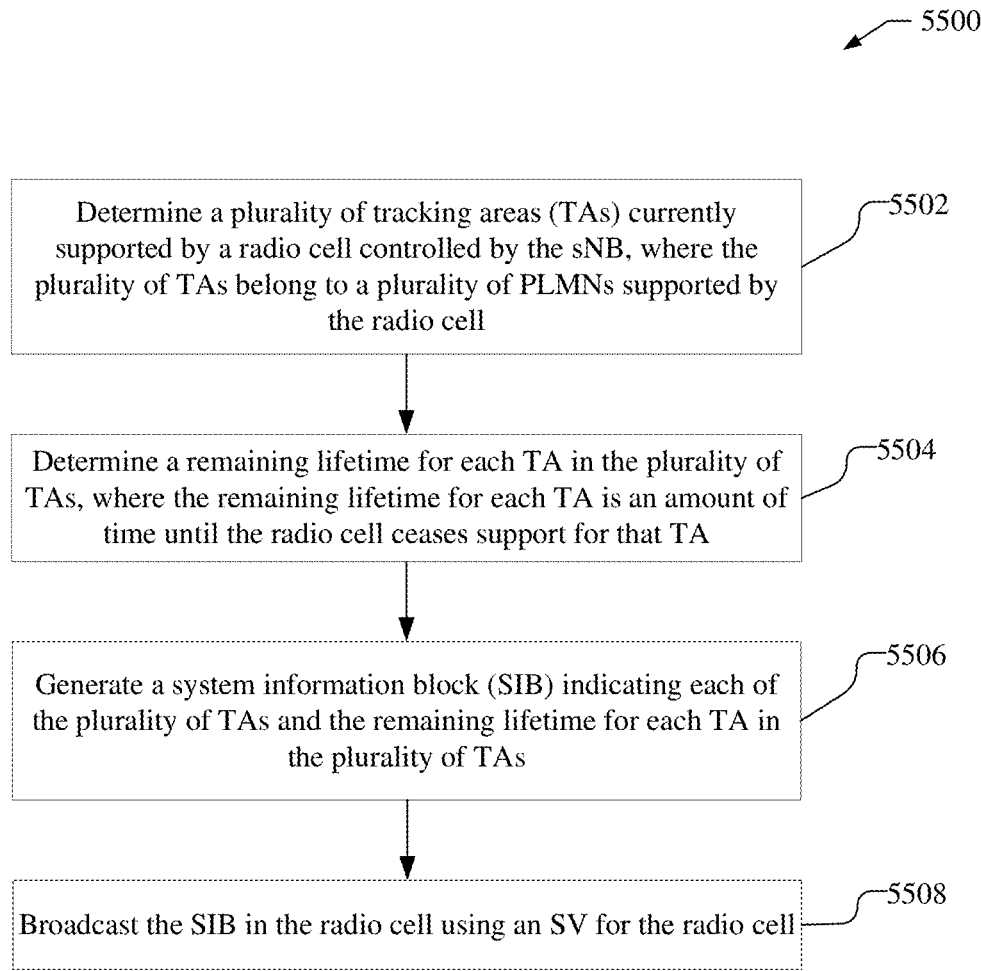
FIG. 55 shows a flowchart of an example procedure performed by a satellite Node B (sNB) to assist wireless access by user equipments (UEs) to serving Public Land Mobile Networks (PLMs) via space vehicles (SVs).

FIG. 55 shows a flowchart of an example procedure 5500 performed by a satellite Node B (e.g. an sNB 106, sNB 202 or sNB-CU 307) to assist wireless access by user equipments (e.g. including UE in FIGS. 1-3) to serving Public Land Mobile Networks (PLMNs) via space vehicles (e.g. SVs 102, 202 and/or 302).

At block 5502, a plurality of tracking areas (TAs) currently supported by a radio cell controlled by the sNB is determined, where the plurality of TAs belong to a plurality of PLMNs supported by the radio cell, e.g., as discussed at stage 4 of FIG. 38. A means for determining a plurality of tracking areas (TAs) currently supported by a radio cell controlled by the sNB, wherein the plurality of TAs belong to a plurality of PLMNs supported by the radio cell may include the external interface 4106 and one or more processors 4104 with dedicated hardware or implementing executable code or software instructions 4120 in in memory 4116 and/or medium 4118, such as the determine supported TAs module 4242 in sNB 4100 shown in FIGS. 41 and 42.

At block 5504, a remaining lifetime for each TA in the plurality of TAs is determined, where the remaining lifetime for each TA is an amount of time until the radio cell ceases support for that TA, e.g. as discussed at stage 5 of FIG. 38. A means for determining a remaining lifetime for each TA in the plurality of TAs, wherein the remaining lifetime for each TA is an amount of time until the radio cell ceases support for that TA may include the external interface 4106 and one or more processors 4104 with dedicated hardware or implementing executable code or software instructions 4120 in in memory 4116 and/or medium 4118, such as the lifetime module 4240 in sNB 4100 shown in FIGS. 41 and 42.

At block 5506, a system information block (SIB) is generated indicating each of the plurality of TAs and the remaining lifetime for each TA in the plurality of TAs, e.g. as discussed at stage 6 of FIG. 38. A means for generating a system information block (SIB) indicating each of the plurality of TAs and the remaining lifetime for each TA in the plurality of TAs may include the one or more processors 4104 with dedicated hardware or implementing executable code or software instructions 4120 in in memory 4116 and/or medium 4118, such as the SIB module 4244 in sNB 4100 shown in FIGS. 41 and 42.

At block 5508, the SIB may be broadcast in the radio cell using an SV for the radio cell (e.g. an SV 102, 202 or 302), as discussed at stage 6 of FIG. 38. A means for broadcasting the SIB in the radio cell using an SV for the radio cell may include the external interface 4106 and one or more processors 4104 with dedicated hardware or implementing executable code or software instructions 4120 in in memory 4116 and/or medium 4118, such as the provide lifetime/TA module 4246 in sNB 4100 shown in FIGS. 41 and 42.

In one implementation, the SV may be used in a transparent mode, a regenerative mode with a non-split architecture or in a regenerative mode with a split architecture, e.g. as discussed in FIGS. 1-3. The sNB may be terrestrial (e.g. may be an sNB 106) when the SV is used in the transparent mode. The sNB may be part of the SV (e.g. may be an sNB 202) when the SV is used in the regenerative mode with the non-split architecture. The sNB may be terrestrial and may comprise an sNB Central Unit (e.g. an sNB-CU 307) when the SV is used in the regenerative mode with the split architecture.

In one implementation, the plurality of TAs currently supported by the radio cell may be determined by determining TAs with geographic areas overlapping with a coverage area of the radio cell, where the overlap between the geographic area of each TA of the TAs and the coverage area of the radio cell satisfies one or more criteria for each TA of the TAs, e.g., as discussed at stages 4 and 5 of FIG. 38. A means for determining TAs with geographic areas overlapping with a coverage area of the radio cell, where the overlap between the geographic area of each TA of the TAs and the coverage area of the radio cell satisfies one or more criteria for each TA of the TAs may include the external interface 4106 and one or more processors 4104 with dedicated hardware or implementing executable code or software instructions 4120 in in memory 4116 and/or medium 4118, such as the determine supported TAs module 4242 in sNB 4100 shown in FIGS. 41 and 42. For example, the one or more criteria for each TA may include inclusion of the geographic area of the each TA within the coverage area of the radio cell; inclusion of the coverage area of the radio cell within the geographic area of the each TA; an overlap of the coverage area of the radio cell with the geographic area of the each TA which exceeds a threshold for the each TA; or some combination of these, e.g., as discussed at stages 4 and 5 of FIG. 38.

In one aspect, the first radio cell may cease support for a TA in the plurality of TAs when the overlap between the geographic area of that TA and the coverage area of the radio cell no longer satisfies the one or more criteria for that TA.

In one implementation, the SIB may be a SIB type 1 (SIB1) or a SIB type 2 (SIB2), as discussed at stage 6 of FIG. 38.

Figure 56:
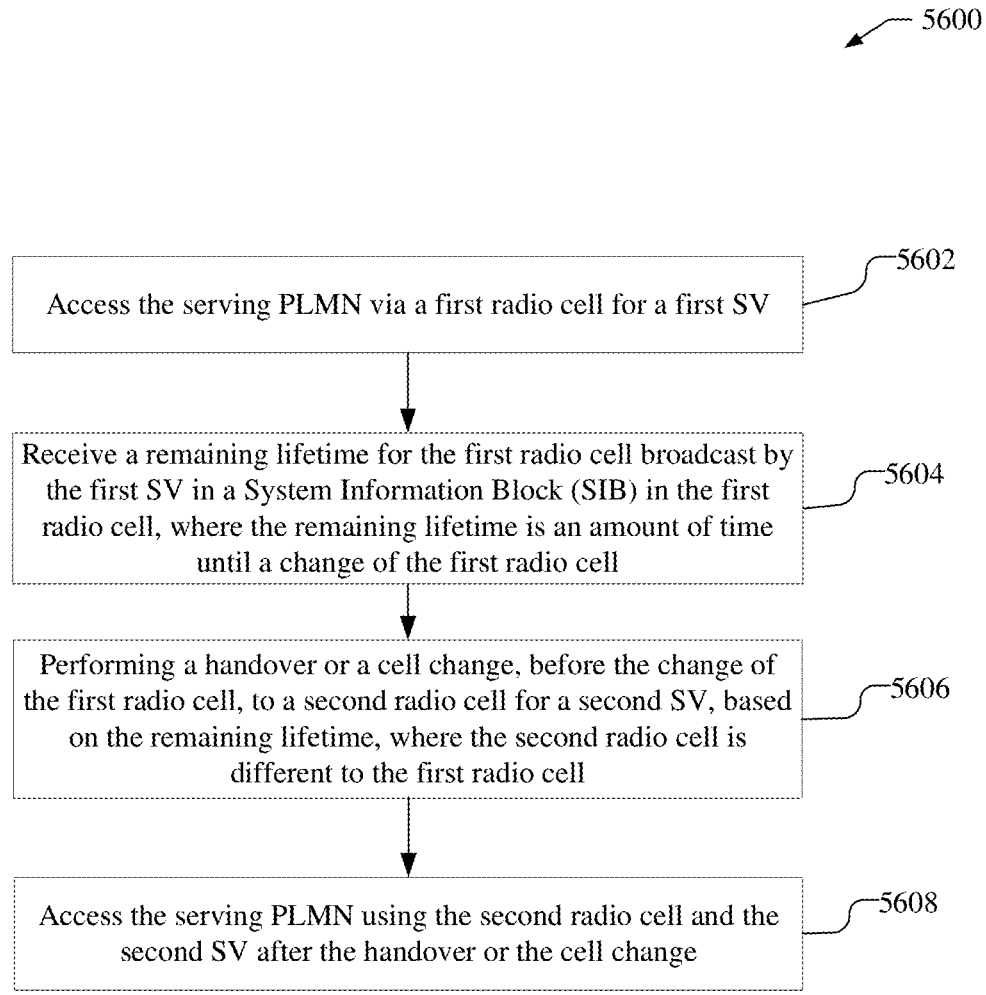
FIG. 56 shows a flowchart of an example procedure performed by a user equipment (UE) to assist wireless access by the UE to a serving Public Land Mobile Network (PLMN) via space vehicles (SVs).

FIG. 56 shows a flowchart of an example procedure 5600 performed by a user equipment (e.g. the UE 105 in FIGS. 1-3) to assist wireless access by the UE to a serving Public Land Mobile Network (PLMN) via space vehicles (e.g. SVs 102, 202 and/or 302).

At block 5602, the serving PLMN is accessed via a first radio cell for a first SV (e.g. an SV 102, 202 or 302), e.g., as discussed at stage 3 of FIG. 38. A means for accessing the serving PLMN via a first radio cell for a first SV may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40.

At block 5604, a remaining lifetime for the first radio cell broadcast by the first SV is received in a System Information Block (SIB) in the first radio cell, where the remaining lifetime is an amount of time until a change of the first radio cell, e.g. as discussed at stage 6 of FIG. 38. A means for accessing the serving PLMN via a first radio cell for a first SV may include the satellite transceiver 3903 and one or more processors 3904 with dedicated hardware or implementing executable code or software instructions 3920 in in memory 3916 and/or medium 3918, such as the lifetime module 4032 in UE 3900 shown in FIGS. 39 and 40.

At block 5606, a handover or a cell change is performed, before the change of the first radio cell, to a second radio cell for a second SV (e.g. an SV 102, 202 or 302), based on the remaining lifetime, where the second radio cell is different to the first radio cell, as discussed at stages 7 and 8 of FIG. 38. A means for accessing the serving PLMN via a first radio cell for a first SV may include the satellite transceiver 3903 and one or more processors 3904 with dedicated hardware or implementing executable code or software instructions 3920 in in memory 3916 and/or medium 3918, such as the cell change module 4034 or handover module 4036 in UE 3900 shown in FIGS. 39 and 40.

At block 5608, the serving PLMN is accessed using the second radio cell and the second SV after the handover or the cell change, e.g. as discussed at stage 9 of FIG. 38. A means for accessing the serving PLMN via a first radio cell for a first SV may include the satellite transceiver 3903 and one or more processors 3904 with dedicated hardware or implementing executable code or software instructions 3920 in in memory 3916 and/or medium 3918, such as the cell change module 4034 or handover module 4036 in UE 3900 shown in FIGS. 39 and 40.

In one implementation, the change of the first radio cell may comprise at least one of: a change of an earth station (e.g. an ES 104) used to exchange signaling for the first radio cell between the first SV and either a satellite NodeB for the first radio cell (e.g. an sNB 106 or sNB-CU 307 when the first SV is an SV 102 or SV 302) or a core network for the first radio cell (e.g. a 5GCN 110 when the first SV is an SV 202); a change in timing for the first radio cell; a change in carrier frequency for the first radio cell; a change in bandwidth for the first radio cell; a change in coverage area for the first radio cell; a change to radio beams used by the first radio cell; a change in a cell identity for the first radio cell; a cessation of support by the first radio cell for one or more tracking areas for one or more PLMNs supported by the first radio cell; or a termination of support for the first radio cell by the sNB for the first radio cell, e.g. as discussed at stage 5 of FIG. 38.

In one implementation, the UE performs the cell change when the UE is an idle state and performs the handover when the UE is in a connected state, e.g., as discussed at stage 8 of FIG. 38. When the UE is in the idle state, for example, the UE may select the second radio cell prior to the cell change based in part on a remaining lifetime for the second radio cell, which is greater than the remaining lifetime for the first radio cell, as discussed at stages 8 and 8a of FIG. 38. A means for selecting the second radio cell prior to the cell change based in part on a remaining lifetime for the second radio cell which is greater than the remaining lifetime for the first radio cell may include the satellite transceiver 3903 and one or more processors 3904 with dedicated hardware or implementing executable code or software instructions 3920 in in memory 3916 and/or medium 3918, such as the cell change module 4034 in UE 3900 shown in FIGS. 39 and 40. When the UE is in the connected state, for example, the UE may obtain signal measurements for the second radio cell prior to the handover, as discussed at stages 8 and 8a of FIG. 38. The UE may send the signal measurements to a satellite NodeB (e.g. an sNB 106, sNB 202 or sNB-CU 307) for the first radio cell, where the sNB instigates the handover based in part on the signal measurements and a remaining lifetime for the second radio cell which is greater than the remaining lifetime for the first radio cell, as discussed at stages 8, 8a, 8b, 8c, and 8d of FIG. 38. A means for obtaining signal measurements for the second radio cell prior to the handover and a means for sending the signal measurements to a satellite NodeB (sNB) for the first radio cell, wherein the sNB instigates the handover based in part on the signal measurements and a remaining lifetime for the second radio cell which is greater than the remaining lifetime for the first radio cell may include the satellite transceiver 3903 and one or more processors 3904 with dedicated hardware or implementing executable code or software instructions 3920 in in memory 3916 and/or medium 3918, such as the handover module 4036 in UE 3900 shown in FIGS. 39 and 40.

In one implementation, the SIB may be a SIB type 1 (SIB1) or a SIB type 2 (SIB2), as discussed at stage 6 of FIG. 38.

Figure 57:
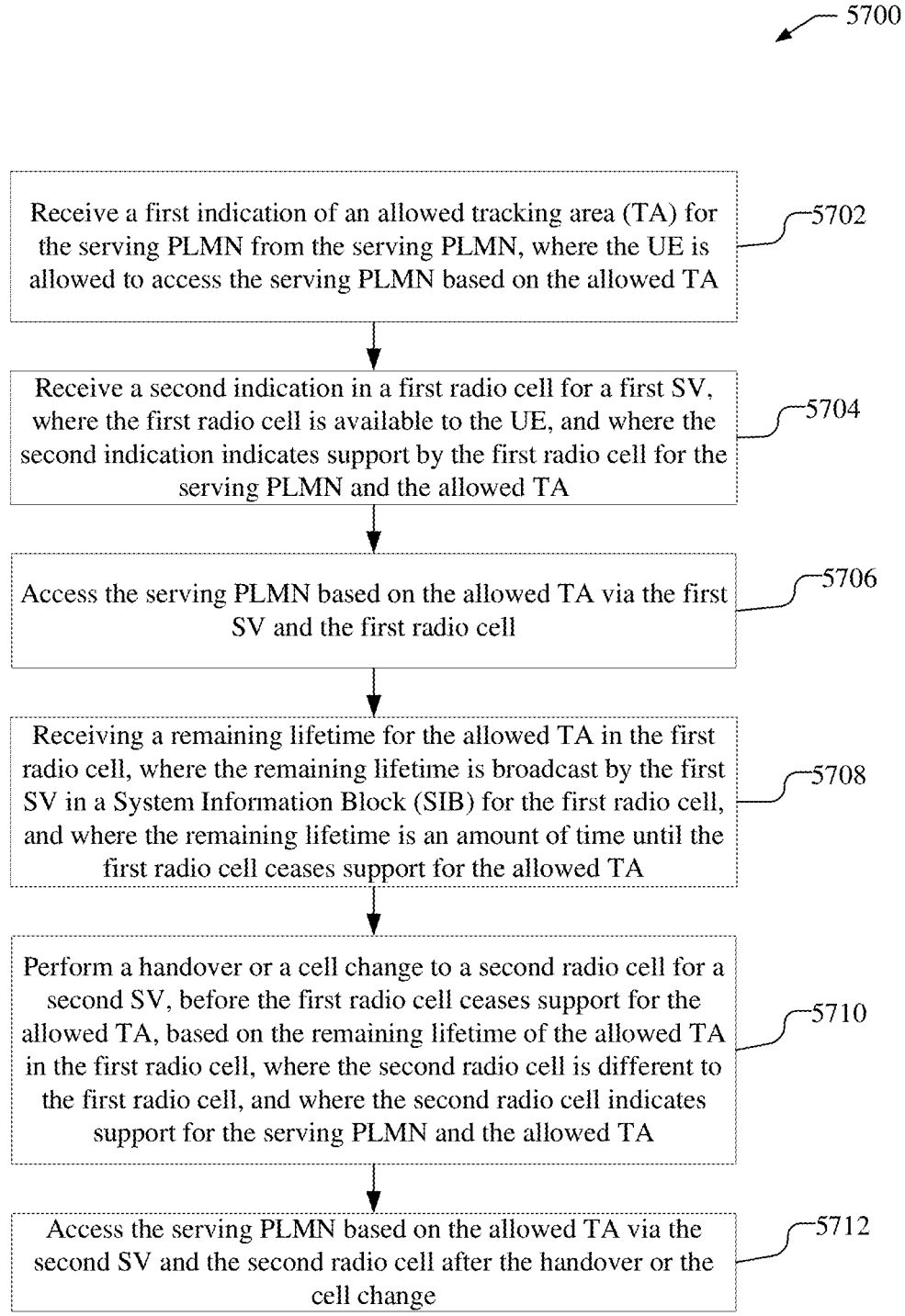
FIG. 57 shows a flowchart of an example procedure performed by a user equipment (UE) to assist wireless access by the UE to a serving Public Land Mobile Network (PLMN) via space vehicles (SVs).

FIG. 57 shows a flowchart of an example procedure 5700 performed by a user equipment (e.g. the UE 105 in FIGS. 1-3) to assist wireless access by the UE to a serving Public Land Mobile Network (PLMN) via space vehicles (e.g. SVs 102, 202 and/or 302).

At block 5702, a first indication of an allowed tracking area (TA) for the serving PLMN is received from the serving PLMN, where the UE is allowed to access the serving PLMN based on the allowed TA, e.g., as discussed at stage 1 of FIG. 38. A means for receiving a first indication of an allowed tracking area (TA) for the serving PLMN from the serving PLMN, wherein the UE is allowed to access the serving PLMN based on the allowed TA may include the satellite transceiver 3903 and one or more processors 3904 with dedicated hardware or implementing executable code or software instructions 3920 in in memory 3916 and/or medium 3918, such as the allowed TAs module 4038 in UE 3900 shown in FIGS. 39 and 40.

At block 5704, a second indication is received in a first radio cell for a first SV (e.g. an SV 102, 202 or 302), where the first radio cell is available to the UE, and where the second indication indicates support by the first radio cell for the serving PLMN and the allowed TA, e.g., as discussed at stage 2 of FIG. 38. A means for receiving a second indication in a first radio cell for a first SV, wherein the first radio cell is available to the UE, and wherein the second indication indicates support by the first radio cell for the serving PLMN and the allowed TA include the satellite transceiver 3903 and one or more processors 3904 with dedicated hardware or implementing executable code or software instructions 3920 in in memory 3916 and/or medium 3918, such as the PLMN support module 4040 in UE 3900 shown in FIGS. 39 and 40.

At block 5706, the serving PLMN is accessed based on the allowed TA via the first SV and the first radio cell, as discussed at stage 3 of FIG. 38. A means for accessing the serving PLMN based on the allowed TA via the first SV and the first radio cell may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40.

At block 5708, a remaining lifetime for the allowed TA in the first radio cell is received, where the remaining lifetime is broadcast by the first SV in a System Information Block (SIB) for the first radio cell, and where the remaining lifetime is an amount of time until the first radio cell ceases support for the allowed TA, e.g. as discussed at stages 5 and 6 of FIG. 38. A means for receiving a remaining lifetime for the allowed TA in the first radio cell, wherein the remaining lifetime is broadcast by the first SV in a System Information Block (SIB) for the first radio cell, and wherein the remaining lifetime is an amount of time until the first radio cell ceases support for the allowed TA may include the satellite transceiver 3903 and one or more processors 3904 with dedicated hardware or implementing executable code or software instructions 3920 in in memory 3916 and/or medium 3918, such as the lifetime module 4032 in UE 3900 shown in FIGS. 39 and 40.

At block 5710, a handover or a cell change to a second radio cell for a second SV (e.g. an SV 102, 202 or 302) is performed before the first radio cell ceases support for the allowed TA, based on the remaining lifetime of the allowed TA in the first radio cell, where the second radio cell is different to the first radio cell, and where the second radio cell indicates support for the serving PLMN and the allowed TA, e.g. as discussed for stages 7 and 8 of FIG. 38. A means for performing a handover or a cell change to a second radio cell for a second SV, before the first radio cell ceases support for the allowed TA, based on the remaining lifetime of the allowed TA in the first radio cell, wherein the second radio cell is different to the first radio cell, and wherein the second radio cell indicates support for the serving PLMN and the allowed TA may include the satellite transceiver 3903 and one or more processors 3904 with dedicated hardware or implementing executable code or software instructions 3920 in in memory 3916 and/or medium 3918, such as the cell change module 4034 or handover module 4036 in UE 3900 shown in FIGS. 39 and 40.

At block 5712, the serving PLMN may be accessed based on the allowed TA via the second SV and the second radio cell after the handover or the cell change, e.g. as discussed at stage 9 of FIG. 38. A means for accessing the serving PLMN based on the allowed TA via the second SV and the second radio cell after the handover or the cell change may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40.

In one implementation, the UE may perform the cell change when the UE is in an idle state and the UE may perform the handover when the UE is in a connected state, e.g. as discussed at stage 8 of FIG. 38. When the UE is in the idle state, for example, the UE may select the second radio cell prior to the cell change based in part on a remaining lifetime for the allowed TA in the second radio cell which is greater than the remaining lifetime for the allowed TA in the first radio cell, e.g. as discussed at stages 8 and 8a of FIG. 38. A means for selecting the second radio cell prior to the cell change based in part on a remaining lifetime for the allowed TA in the second radio cell which is greater than the remaining lifetime for the allowed TA in the first radio cell may include the satellite transceiver 3903 and one or more processors 3904 with dedicated hardware or implementing executable code or software instructions 3920 in in memory 3916 and/or medium 3918, such as the cell change module 4034 in UE 3900 shown in FIGS. 39 and 40. When the UE is in the connected state, the UE may obtain signal measurements for the second radio cell prior to the handover as discussed at stages 8 and 8a of FIG. 38. The UE may then send the signal measurements to a satellite NodeB (e.g. an sNB 106, sNB 202 or sNB-CU 307) for the first radio cell, where the sNB instigates the handover based in part on the signal measurements and a remaining lifetime for the allowed TA in the second radio cell which is greater than the remaining lifetime for the allowed TA in the first radio cell, e.g. as discussed at stages 8, 8a, 8b, 8c, and 8d of FIG. 38. A means for obtaining signal measurements for the second radio cell prior to the handover and a means for sending the signal measurements to a satellite NodeB (sNB) for the first radio cell, wherein the sNB instigates the handover based in part on the signal measurements and a remaining lifetime for the allowed TA in the second radio cell which is greater than the remaining lifetime for the allowed TA in the first radio cell may include the satellite transceiver 3903 and one or more processors 3904 with dedicated hardware or implementing executable code or software instructions 3920 in in memory 3916 and/or medium 3918, such as the handover module 4036 in UE 3900 shown in FIGS. 39 and 40.

In one implementation, the UE may access the serving PLMN based on the allowed TA via an SV (e.g. an SV 102, 202 or 302) and a radio cell for the SV by determining whether the UE is located inside the allowed TA; determining whether the radio cell supports the serving PLMN and the allowed TA; and accessing the serving PLMN via the SV and the radio cell for the SV when the UE determines the UE is located inside the allowed TA and the UE determines the radio cell supports the serving PLMN and the allowed TA, e.g., as discussed at stage 3 and 9 of FIG. 38. The SV may be the first SV, the second SV or another SV. A means for determining whether the UE is located inside the allowed TA may include the satellite transceiver 3903 and one or more processors 3904 with dedicated hardware or implementing executable code or software instructions 3920 in memory 3916 and/or medium 3918, such as the location in TA module 4042 in UE 3900 shown in FIGS. 39 and 40. A means for determining whether the radio cell supports the serving PLMN and the allowed TA may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40. A means for accessing the serving PLMN via the first SV and the first radio cell for the first SV when the UE determines the UE is located inside the allowed TA and the UE determines the radio cell supports the serving PLMN and the allowed TA may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40.

In one implementation, the UE may access the serving PLMN based on the allowed TA via an SV (e.g. an SV 102, 202 or 302) and a radio cell for the SV by: determining whether the radio cell supports the serving PLMN and the allowed TA; receiving a third indication (e.g. a Registration flag) that the UE may access the serving PLMN via the SV and the radio cell for the SV when the UE is not located in the allowed TA; and accessing the serving PLMN via the SV and the radio cell for the SV when the UE determines the serving PLMN and the allowed TA are supported by the radio cell and, e.g., as discussed at stages 8 and 9 of FIG. 38. The UE may then either be located inside the allowed TA or not located inside the allowed TA. The SV may be the first SV, the second SV or another SV. The third indication, for example, may be received from the serving PLMN along with the first indication, e.g., providing the allowed tracking area (TA) for the serving PLMN, e.g., as discussed at stages 1 and 9 of FIG. 38. A means for determining whether the radio cell supports the serving PLMN and the allowed TA may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40. A means for receiving a third indication that the UE may access the serving PLMN via the SV and the radio cell for the SV when the UE is not located in the allowed TA may include the satellite transceiver 3903 and one or more processors 3904 with dedicated hardware or implementing executable code or software instructions 3920 in in memory 3916 and/or medium 3918, such as the access PLMN module 4030 in UE 3900 shown in FIGS. 39 and 40. A means for accessing the serving PLMN via the first SV and the first radio cell for the first SV when the UE determines the serving PLMN and the allowed TA are supported by the radio cell and when the UE is either located inside the allowed TA or not located inside the allowed TA may include the satellite transceiver 3903 and one or more processors 3904 with dedicated hardware or implementing executable code or software instructions 3920 in in memory 3916 and/or medium 3918, such as the access PLMN module 4030 or access when not in TA module 4044 in UE 3900 shown in FIGS. 39 and 40.

In one implementation, the SIB may be a SIB type 1 (SIB1) or SIB type 2 (SIB2), as discussed at stage 6 of FIG. 38.

In one implementation, the UE may receive the first indication in a Non-Access Stratum (NAS) Registration Accept message sent by an Access and Mobility management Function (e.g. an AMF 122) in the serving PLMN, e.g. as discussed at stage 1 of FIG. 38.

Abbreviations used herein may be identified in Table 2 as follows:

TABLE 2

| | |
|---|---|
| EM | Emergency |
| ES | Earth Station |
| GEO | Geostationary Earth Orbit |
| ISL | Inter-Satellite Links |
| LEO | Low Earth Orbit |
| LI | Lawful Interception |
| MEO | Medium Earth Orbit |
| MNO | Mobile Network Operator |
| NGEO | Non-Geostationary Earth Orbiting |

TABLE 2-continued

| | |
|---|---|
| NTN | Non-Terrestrial Network |
| sNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. Byway of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection-regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

Example dependent claims may include one or more of the following features. The wireless access type is Fifth Generation (5G), New Radio (NR) or Long Term Evolution (LTE). The location-related information comprises a Positioning Reference Signal (PRS). The increased quantity of location-related information comprises an increased PRS bandwidth, an increased frequency of PRS positioning occasions, an increased duration for a PRS positioning occasion, an increased number of separate PRS signals, a transmission of PRS using an uplink carrier frequency, or some combination thereof. The method may further include sending a second request for a muting of transmission to a second wireless node for the wireless access type, wherein the muting of transmission is based on avoiding radio interference with the broadcast of the increased quantity of location-related information by the first wireless node. The location-related information may comprise location assistance data. The location assistance data may comprise assistance data for Observed Time Difference Of Arrival (OTDOA), assistance data for Assisted Global Navigation Satellite System (A-GNSS), assistance data for Real Time Kinematics (RTK), assistance data for Precise Point Positioning (PPP), assistance data for Differential GNSS (DGNSS), or any combination thereof. The increased quantity of location-related information may comprise an increased quantity of location assistance data, additional types of location assistance data, an increased frequency of broadcasting location assistance data, an increased repetition of the broadcasting of the location assistance data, or any combination thereof. The first request may be received from a third wireless node. The first request may be received from the UE. The first request may be received using a Radio Resource Control (RRC) protocol for the wireless access type. The first wireless node may be a serving wireless node for the UE based on the wireless access type. The method may further include sending a third request for the broadcast of an increased quantity of location-related information to a fourth wireless node for the wireless access type, wherein the third request is based on the first request. The method may further include sending a response to the UE, wherein the response comprises a confirmation of the broadcasting of the increased quantity of location-related information by the first wireless node. The method may further include receiving a fourth request from the UE for a termination of the broadcast of the increased quantity of location-related information, and terminating the broadcasting of the increased quantity of location-related information using the wireless access type based on the fourth request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method performed by a user equipment (UE) for supporting access by the UE via a space vehicle (SV) to a serving Public Land Mobile Network (PLMN), comprising:
  obtaining a country of the UE, wherein the country of the UE is based on a location of the UE;
  detecting one or more first radio cells available to the UE, wherein each of the one or more first radio cells comprises one or more radio beams transmitted from one or more first SVs;
  receiving identities of supported PLMNs broadcast in the one or more first radio cells, wherein the identity of each supported PLMN indicates a country for the each supported PLMN;
  selecting the serving PLMN, wherein the serving PLMN is a PLMN for the country of the UE, and wherein the serving PLMN is included in the supported PLMNs;
  selecting a first radio cell of the one or more first radio cells available to the UE, wherein the first radio cell supports the serving PLMN; and
  accessing the serving PLMN using the first radio cell.

2. The method of clause 1, wherein the serving PLMN comprises a Fifth Generation (5G) Core Network (5GCN).

3. The method of either of clauses 1 or 2, wherein the identity of each PLMN of the supported PLMNs broadcast in the one or more first radio cells comprises a mobile country code (MCC) and a mobile network code (MNC), wherein the MCC indicates the country for the each PLMN.

4. The method of any of clauses 1-3, wherein accessing the serving PLMN comprises exchanging signaling with the serving PLMN via the SV and a first satellite NodeB (sNB).

5. The method of clause 4, wherein obtaining the country of the UE comprises:
  selecting a second radio cell of the one or more first radio cells available to the UE based on the second radio cell supporting a preferred PLMN for the UE;
  sending, using the second radio cell, a request to a second sNB to access a PLMN; and
  receiving the country of the UE from the second sNB.

6. The method of clause 5, wherein the second sNB determines the location of the UE based on a coverage area of the second radio cell or a coverage area for a radio beam of the second radio cell, wherein the radio beam is used by the UE to send the request to the second sNB.

7. The method of clause 5, further comprising:
  obtaining location measurements, wherein the location measurements include measurements of signals received from the one or more first SVs, signals received from navigation SVs, or both types of signals:
  determining the location of the UE based on the location measurements: and
  sending the location of the UE to the second sNB as part of the request to access the PLMN.

8. The method of clause 7, further comprising:
  receiving security information from the second sNB;
  ciphering the location of the UE based on the security information; and
  sending the ciphered location of the UE to the second sNB as part of the request to access the PLMN.

9. The method of clause 5, wherein the UE sends the request to access the PLMN to the second sNB in a Radio Resource Control (RRC) Setup Request or an RRC Setup Complete message and receives the country of the UE from the second sNB in an RRC Setup message or an RRC Reject message.

10. The method of clause 5, wherein the first sNB comprises the second sNB, wherein the first radio cell comprises the second radio cell.

11. The method of any of clauses 1-4, wherein obtaining the country of the UE comprises:
  obtaining location measurements, wherein the location measurements include measurements of signals received from the one or more first SVs, signals received from navigation SVs, or both types of signals;
  determining the location of the UE based on the location measurements;
  receiving location related information for the supported PLMNs broadcast in the one or more radio cells; and
  determining the country of the UE based on the location related information and the location of the UE.

12. The method of clause 11, wherein the location related information for each supported PLMN comprises geographic definition for fixed cells of the each supported PLMN, geographic definition for fixed tracking areas of the each supported PLMN, or both.

13. The method of any of clauses 1-12, wherein accessing the serving PLMN comprises exchanging signaling with the serving PLMN via the SV and a first satellite NodeB (sNB), and sending a Non-Access Stratum (NAS) Registration Request message to a network node for the serving PLMN and receiving a NAS Registration Accept from the network node.

14. The method of clause 13, wherein the network node comprises an Access and Mobility management Function (AMF).

15. The method of clause 13, wherein sending the NAS Registration Request message to the network node comprises sending a Radio Resource Control (RRC) Setup Complete message to the first sNB via the SV, wherein the RRC Setup Complete message includes the NAS Registration Request message and indicates the serving PLMN.

16. The method of clause 13, wherein the NAS Registration Accept message includes identities and location information for a plurality of allowed tracking areas (TAs) of the serving PLMN, wherein the UE is allowed to access the serving PLMN in each TA of the plurality of allowed TAs.

17. The method of clause 16, wherein the NAS Registration Accept message includes identities and a geographic definition for a plurality of fixed cells of the serving PLMN.

18. The method of clause 17, wherein accessing the serving PLMN comprises:
  determining a current location of the UE;
  mapping the current location to at least one of an allowed TA of the plurality of allowed TAs, a fixed cell of the plurality of fixed cells, or a combination thereof, based on the geographic definition for the plurality of allowed TAs, the geographic definition for the plurality of fixed cells or a combination thereof; and including at least one of an indication of the allowed TA, an indication of the fixed cell or a combination thereof in a message sent to the serving PLMN, wherein the at least one of the indication of the allowed TA, the indication of the fixed cell or the combination thereof enable a service for the UE by the serving PLMN.

19. The method of clause 16, further comprising:

detecting one or more second radio cells available to the UE, wherein each of the one or more second radio cells comprises one or more radio beams transmitted from one or more second SVs, wherein each of the one or more second radio cells indicates support for the serving PLMN;

receiving identities of a plurality of supported TAs of the serving PLMN broadcast in the one or more second radio cells;

determining whether the UE is required to perform a registration with the serving PLMN for a change of TA, based at least in part on the plurality of allowed TAs and the plurality of supported TAs;

performing the registration with the serving PLMN for the change of TA using one of the one or more second radio cells when the UE determines the UE is required to perform the registration with the serving PLMN for the change of TA;

camping on the one of the one or more second radio cells without performing the registration with the serving PLMN for the change of TA, when the UE is in an idle state and when the UE determines the UE is not required to perform the registration with the serving PLMN for the change of TA; and accessing the serving PLMN using the one of the one or more second radio cells without performing the registration with the serving PLMN for the change of TA, when the UE is in a connected state and when the UE determines the UE is not required to perform the registration with the serving PLMN for the change of TA.

20. The method of clause 19, wherein determining that the UE is required to perform the registration with the serving PLMN for the change of TA includes determining that the plurality of supported TAs do not include any TA of the plurality of allowed TAs.

21. The method of clause 19, wherein determining that the UE is not required to perform the registration with the serving PLMN for the change of TA includes determining that the plurality of supported TAs includes at least one of the plurality of allowed TAs, wherein the one of the one or more second radio cells indicates support for the at least one of the plurality of allowed TAs.

22. The method of clause 21, wherein determining that the UE is not required to perform the registration with the serving PLMN for the change of TA further comprises determining that the NAS Registration Accept message includes an indication allowing the UE to access the serving PLMN using a radio cell supporting at least one of the plurality of allowed TAs when the UE is not located in any of the plurality of allowed TAs.

23. The method of clause 19, wherein determining whether the UE is required to perform the registration for the change of TA with the serving PLMN further comprises:

determining a current location of the UE;

determining whether the current location of the UE is inside any allowed TA of the plurality of allowed TAs;

determining that the UE is required to perform the registration for the change of TA with the serving PLMN when the current location of the UE is not inside the any allowed TA or when the current location of the UE is inside the any allowed TA and the any allowed TA is not included in the plurality of supported TAs; and determining that the UE is not required to perform the registration for the change of TA with the serving PLMN when the current location of the UE is inside the any allowed TA and when the any allowed TA is included in the plurality of supported TAs, and wherein the one of the one or more second radio cells indicates support for the any allowed TA.

24. The method of clause 23, wherein determining whether the UE is required to perform the registration for the change of TA with the serving PLMN further comprises determining whether the NAS Registration Accept message includes an indication requiring the UE to perform the registration for the change of TA with the serving PLMN when the UE is not located inside the any of the plurality of allowed TAs.

25. A user equipment (UE) configured to support access by the UE via a space vehicle (SV) to a serving Public Land Mobile Network (PLMN), comprising:

a wireless transceiver configured to wirelessly communicate with a communication satellite;

at least one memory;

at least one processor coupled to the wireless transceiver and the at least one memory, wherein the at least one processor is configured to:

obtain a country of the UE, wherein the country of the UE is based on a location of the UE;

detect one or more first radio cells available to the UE, wherein each of the one or more first radio cells comprises one or more radio beams transmitted from one or more first SVs;

receive identities of supported PLMNs broadcast in the one or more first radio cells, wherein the identity of each supported PLMN indicates a country for the each supported PLMN:

select the serving PLMN, wherein the serving PLMN is a PLMN for the country of the UE, and wherein the serving PLMN is included in the supported PLMNs;

select a first radio cell of the one or more first radio cells available to the UE, wherein the first radio cell supports the serving PLMN; and access the serving PLMN using the first radio cell.

26. The UE of clause 25, wherein the serving PLMN comprises a Fifth Generation (5G) Core Network (5GCN).

27. The UE of either of clauses 25 or 26, wherein the identity of each PLMN of the supported PLMNs broadcast in the one or more first radio cells comprises a mobile country code (MCC) and a mobile network code (MNC), wherein the MCC indicates the country for the each PLMN.

28. The UE of either of clauses 25-27, wherein accessing the serving PLMN comprises exchanging signaling with the serving PLMN via the SV and a first satellite NodeB (sNB).

29. The UE of clause 28, wherein the at least one processor is configured to obtain the country of the UE by being configured to:

select a second radio cell of the one or more first radio cells available to the UE based on the second radio cell supporting a preferred PLMN for the UE;

send, using the second radio cell, a request to a second sNB to access a PLMN; and receive the country of the UE from the second sNB.

30. The UE of clause 29, wherein the second sNB determines the location of the UE based on a coverage area of the second radio cell or a coverage area for a radio beam of the second radio cell, wherein the radio beam is used by the UE to send the request to the second sNB.

31. The UE of clause 29, the at least one processor is further configured to:
  obtain location measurements, wherein the location measurements include measurements of signals received from the one or more first SVs, signals received from navigation SVs, or both types of signals;
  determine the location of the UE based on the location measurements; and
  send the location of the UE to the second sNB as part of the request to access the PLMN.

32. The UE of clause 31, the at least one processor is further configured to:
  receive security information from the second sNB;
  cipher the location of the UE based on the security information; and
  send the ciphered location of the UE to the second sNB as part of the request to access the PLMN.

33. The UE of clause 29, wherein the UE sends the request to access the PLMN to the second sNB in a Radio Resource Control (RRC) Setup Request or an RRC Setup Complete message and receives the country of the UE from the second sNB in an RRC Setup message or an RRC Reject message.

34. The UE of clause 29, wherein the first sNB comprises the second sNB, wherein the first radio cell comprises the second radio cell.

35. The UE of either of clauses 25-28, wherein the at least one processor is configured to obtain the country of the UE by being configured to:
  obtain location measurements, wherein the location measurements include measurements of signals received from the one or more first SVs, signals received from navigation SVs, or both types of signals;
  determine the location of the UE based on the location measurements;
  receive location related information for the supported PLMNs broadcast in the one or more radio cells; and
  determine the country of the UE based on the location related information and the location of the UE.

36. The UE of clause 35, wherein the location related information for each supported PLMN comprises geographic definition for fixed cells of the each supported PLMN, geographic definition for fixed tracking areas of the each supported PLMN, or both.

37. The UE of either of clauses 25-36, wherein the at least one processor is configured to access the serving PLMN by being configured to exchange signaling with the serving PLMN via the SV and a first satellite NodeB (sNB), and to send a Non-Access Stratum (NAS) Registration Request message to a network node for the serving PLMN and receiving a NAS Registration Accept from the network node.

38. The UE of clause 37, wherein the network node comprises an Access and Mobility management Function (AMF).

39. The UE of clause 37, wherein the at least one processor is configured to send the NAS Registration Request message to the network node by being configured to send a Radio Resource Control (RRC) Setup Complete message to the first sNB via the SV, wherein the RRC Setup Complete message includes the NAS Registration Request message and indicates the serving PLMN.

40. The UE of clause 37, wherein the NAS Registration Accept message includes identities and location information for a plurality of allowed tracking areas (TAs) of the serving PLMN, wherein the UE is allowed to access the serving PLMN in each TA of the plurality of allowed TAs.

41. The UE of clause 40, wherein the NAS Registration Accept message includes identities and a geographic definition for a plurality of fixed cells of the serving PLMN.

42. The UE of clause 41, wherein the at least one processor is configured to access the serving PLMN by being configured to:
  determine a current location of the UE;
  map the current location to at least one of an allowed TA of the plurality of allowed TAs, a fixed cell of the plurality of fixed cells, or a combination thereof, based on the geographic definition for the plurality of allowed TAs, the geographic definition for the plurality of fixed cells or a combination thereof; and
  include at least one of an indication of the allowed TA, an indication of the fixed cell or a combination thereof in a message sent to the serving PLMN, wherein the at least one of the indication of the allowed TA, the indication of the fixed cell or the combination thereof enable a service for the UE by the serving PLMN.

43. The UE of clause 40, the at least one processor is further configured to:
  detect one or more second radio cells available to the UE, wherein each of the one or more second radio cells comprises one or more radio beams transmitted from one or more second SVs, wherein each of the one or more second radio cells indicates support for the serving PLMN;
  receive identities of a plurality of supported TAs of the serving PLMN broadcast in the one or more second radio cells;
  determine whether the UE is required to perform a registration with the serving PLMN for a change of TA, based at least in part on the plurality of allowed TAs and the plurality of supported TAs;
  perform the registration with the serving PLMN for the change of TA using one of the one or more second radio cells when the UE determines the UE is required to perform the registration with the serving PLMN for the change of TA;
  camp on the one of the one or more second radio cells without performing the registration with the serving PLMN for the change of TA, when the UE is in an idle state and when the UE determines the UE is not required to perform the registration with the serving PLMN for the change of TA; and
  access the serving PLMN using the one of the one or more second radio cells without performing the registration with the serving PLMN for the change of TA, when the UE is in a connected state and when the UE determines the UE is not required to perform the registration with the serving PLMN for the change of TA.

44. The UE of clause 43, wherein the at least one processor is configured to determine that the UE is required to perform the registration with the serving PLMN for the change of TA by being configured to determine that the plurality of supported TAs do not include any TA of the plurality of allowed TAs.

45. The UE of clause 43, wherein the at least one processor is configured to determine that the UE is not required to perform the registration with the serving PLMN for the change of TA by being configured to determine that the plurality of supported TAs includes at least one of the plurality of allowed TAs, wherein the one of the one or more second radio cells indicates support for the at least one of the plurality of allowed TAs.

46. The UE of clause 45, wherein the at least one processor is configured to determine that the UE is not required to perform the registration with the serving PLMN for the change of TA by being further configured to determine that the NAS Registration Accept message includes an indication allowing the UE to access the serving PLMN using a radio cell supporting at least one of the plurality of allowed TAs when the UE is not located in any of the plurality of allowed TAs.

47. The UE of clause 43, wherein the at least one processor is configured to determine whether the UE is required to perform the registration for the change of TA with the serving PLMN by being configured to:
determine a current location of the UE;
determine whether the current location of the UE is inside any allowed TA of the plurality of allowed TAs;
determine that the UE is required to perform the registration for the change of TA with the serving PLMN when the current location of the UE is not inside the any allowed TA or when the current location of the UE is inside the any allowed TA and the any allowed TA is not included in the plurality of supported TAs; and
determine that the UE is not required to perform the registration for the change of TA with the serving PLMN when the current location of the UE is inside the any allowed TA and when the any allowed TA is included in the plurality of supported TAs, and wherein the one of the one or more second radio cells indicates support for the any allowed TA.

48. The UE of clause 47, wherein the at least one processor is configured to determine whether the UE is required to perform the registration for the change of TA with the serving PLMN by being configured to determine whether the NAS Registration Accept message includes an indication requiring the UE to perform the registration for the change of TA with the serving PLMN when the UE is not located inside the any of the plurality of allowed TAs.

49. A user equipment (UE) configured to support access by the UE via a space vehicle (SV) to a serving Public Land Mobile Network (PLMN), comprising:
means for obtaining a country of the UE, wherein the country of the UE is based on a location of the UE;
means for detecting one or more first radio cells available to the UE, wherein each of the one or more first radio cells comprises one or more radio beams transmitted from one or more first SVs;
means for receiving identities of supported PLMNs broadcast in the one or more first radio cells, wherein the identity of each supported PLMN indicates a country for the each supported PLMN;
means for selecting the serving PLMN, wherein the serving PLMN is a PLMN for the country of the UE, and wherein the serving PLMN is included in the supported PLMNs;
means for selecting a first radio cell of the one or more first radio cells available to the UE, wherein the first radio cell supports the serving PLMN; and
means for accessing the serving PLMN using the first radio cell.

50. A non-transitory storage medium including program code stored thereon, the program code is operable to configure at least one processor in a user equipment (UE) to support access by the UE via a space vehicle (SV) to a serving Public Land Mobile Network (PLMN), comprising:
program code to obtain a country of the UE, wherein the country of the UE is based on a location of the UE;
program code to detect one or more first radio cells available to the UE, wherein each of the one or more first radio cells comprises one or more radio beams transmitted from one or more first SVs;
program code to receive identities of supported PLMNs broadcast in the one or more first radio cells, wherein the identity of each supported PLMN indicates a country for the each supported PLMN;
program code to select the serving PLMN, wherein the serving PLMN is a PLMN for the country of the UE, and wherein the serving PLMN is included in the supported PLMNs;
program code to select a first radio cell of the one or more first radio cells available to the UE, wherein the first radio cell supports the serving PLMN; and
program code to access the serving PLMN using the first radio cell.

51. A method performed by a satellite Node B (sNB) for supporting access by a user equipment (UE) via a space vehicle (SV) to a serving Public Land Mobile Network (PLMN), comprising:
controlling the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN;
receiving a request to access a PLMN from the UE via one of the one or more radio cells of the sNB;
obtaining a location of the UE;
determining a country of the UE based on the location; and
sending an indication of the country of the UE to the UE, wherein the indication of the country of the UE assists the UE to select the serving PLMN from the supported PLMNs based on the serving PLMN being for the country of the UE.

52. The method of clause 51, wherein the SV is used in a transparent mode, a regenerative mode with a non-split architecture or in a regenerative mode with a split architecture, wherein the sNB is terrestrial when the SV is used in the transparent mode, wherein the sNB is part of the SV when the SV is used in the regenerative mode with the non-split architecture, and wherein the sNB is terrestrial and comprises an sNB Central Unit (sNB-CU) when the SV is used in the regenerative mode with the split architecture.

53. The method of either of clauses 51 or 52, wherein the identity of each PLMN of the supported PLMNs broadcast in the one or more radio cells comprises a mobile country code (MCC) and a mobile network code (MNC), wherein the MCC indicates the country for the each PLMN.

54. The method of any of clauses 51-53, wherein the indication of the country of the UE comprises a mobile country code (MCC).

55. The method of any of clauses 51-54, further comprising obtaining the location of the UE by receiving the location of the UE from the UE in the request to access the PLMN.

56. The method of clause 55, further comprising:
sending security information to the UE, wherein the location received from the UE is ciphered based on the security information; and
deciphering the location.

57. The method of clause 56, further comprising sending the security information to the UE in a broadcast SIB.

58. The method of any of clauses 51-54, further comprising obtaining the location of the UE by determining the location based on a coverage area of the one of the one or more radio cells of the sNB or a coverage area for a radio beam of the one of the one or more radio cells of the sNB, wherein the radio beam is used by the UE to send the request to access the PLMN to the sNB.

59. The method of any of clauses 51-58, wherein the request to access the PLMN is received from the UE in a Radio Resource Control (RRC) Setup Request message or an RRC Setup Complete message, wherein the indication of the country of the UE is sent to the UE in an RRC Setup message or an RRC Reject message.

60. The method of clause 59, further comprising:
determining whether the country of the UE is supported by the sNB; and
sending the indication of the country of the UE to the UE when the country of the UE is not supported by the sNB.

61. The method of any of clauses 51-60, further comprising:
receiving a first message from the UE, wherein the first message includes a second message and an indication of a selected PLMN; and
sending a third message to a first network node in the selected PLMN, wherein the third message includes the second message and an indication of a fixed serving cell and a fixed tracking area (TA) for the UE.

62. The method of clause 61, wherein the first network node is an Access and Mobility management Function (AMF).

63. The method of clause 62, wherein the indication of the fixed serving cell and the fixed TA for the UE comprises the location of the UE, wherein a second network node in the serving PLMN maps the location of the UE to the fixed serving cell and the fixed TA.

64. The method of clause 63, wherein the second network node is the AMF or a Location Management Function.

65. The method of clause 61, further comprising mapping the location of the UE to an identity of the fixed serving cell and an identity of the fixed TA, wherein the indication of the fixed serving cell and the fixed TA for the UE comprises the identity of the fixed serving cell and the identity of the fixed TA.

66. The method of clause 61, wherein the first message is an RRC Setup Complete message, the second message is a Non Access Stratum (NAS) Registration Request message and the third message is a Next Generation Application Protocol (NGAP) Initial UE message.

67. A satellite Node B (sNB) configured to support access by a user equipment (UE) via a space vehicle (SV) to a serving Public Land Mobile Network (PLMN), comprising:
an external interface configured to communicate with network entities;
at least one memory;
at least one processor coupled to the external interface and the at least one memory, wherein the at least one processor is configured to:
control the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN;
receive a request to access a PLMN from the UE via one of the one or more radio cells of the sNB;
obtain a location of the UE;
determine a country of the UE based on the location; and
send an indication of the country of the UE to the UE, wherein the indication of the country of the UE assists the UE to select the serving PLMN from the supported PLMNs based on the serving PLMN being for the country of the UE.

68. The sNB of clause 67, wherein the SV is used in a transparent mode, a regenerative mode with a non-split architecture or in a regenerative mode with a split architecture, wherein the sNB is terrestrial when the SV is used in the transparent mode, wherein the sNB is part of the SV when the SV is used in the regenerative mode with the non-split architecture, and wherein the sNB is terrestrial and comprises an sNB Central Unit (sNB-CU) when the SV is used in the regenerative mode with the split architecture.

69. The sNB of either of clauses 67 or 68, wherein the identity of each PLMN of the supported PLMNs broadcast in the one or more radio cells comprises a mobile country code (MCC) and a mobile network code (MNC), wherein the MCC indicates the country for the each PLMN.

70. The sNB of any of clauses 67-69, wherein the indication of the country of the UE comprises a mobile country code (MCC).

71. The sNB of any of clauses 67-70, wherein the at least one processor is further configured to obtain the location of the UE by being configured to receive the location of the UE from the UE in the request to access the PLMN.

72. The sNB of clause 71, wherein the at least one processor is further configured to:
send security information to the UE, wherein the location received from the UE is ciphered based on the security information; and
decipher the location.

73. The sNB of clause 72, wherein the at least one processor is further configured to send the security information to the UE in a broadcast SIB.

74. The sNB of any of clauses 67-70, wherein the at least one processor is further configured to obtain the location of the UE by being configured to determine the location based on a coverage area of the one of the one or more radio cells of the sNB or a coverage area for a radio beam of the one of the one or more radio cells of the sNB, wherein the radio beam is used by the UE to send the request to access the PLMN to the sNB.

75. The sNB of any of clauses 67-74, wherein the request to access the PLMN is received from the UE in a Radio Resource Control (RRC) Setup Request or an RRC Setup Complete message, wherein the indication of the country of the UE is sent to the UE in an RRC Setup message or an RRC Reject message.

76. The sNB of clause 75, wherein the at least one processor is further configured to:
determine whether the country of the UE is supported by the sNB; and
send the indication of the country to the UE when the country of the UE is not supported by the sNB.

77. The sNB of any of clauses 67-76, wherein the at least one processor is further configured to:
receive a first message from the UE, wherein the first message includes a second message and an indication of a selected PLMN; and
send a third message to a first network node in the selected PLMN, wherein the third message includes the second message and an indication of a fixed serving cell and a fixed tracking area (TA) for the UE.

78. The sNB of clause 77, wherein the first network node is an Access and Mobility management Function (AMF).

79. The sNB of clause 78, wherein the indication of the fixed serving cell and the fixed TA for the UE comprises the location of the UE, wherein a second network node in the serving PLMN maps the location of the UE to the fixed serving cell and the fixed TA.

80. The sNB of clause 79, wherein the second network node is the AMF or a Location Management Function.

81. The sNB of clause 77, wherein the at least one processor is further configured to map the location of the UE to an identity of the fixed serving cell and an identity of the fixed TA, wherein the indication of the fixed serving cell and the fixed TA for the UE comprises the identity of the fixed serving cell and the identity of the fixed TA.

82. The sNB of clause 77, wherein the first message is an RRC Setup Complete message, the second message is a Non Access Stratum (NAS) Registration Request message and the third message is a Next Generation Application Protocol (NGAP) Initial UE message.

83. A satellite Node B (sNB) configured to support access by a user equipment (UE) via a space vehicle (SV) to a serving Public Land Mobile Network (PLMN), comprising:
means for controlling the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN;
means for receiving a request to access a PLMN from the UE via one of the one or more radio cells of the sNB;
means for obtaining a location of the UE;
means for determining a country of the UE based on the location; and
means for sending an indication of the country of the UE to the UE, wherein the indication of the country of the UE assists the UE to select the serving PLMN from the supported PLMNs based on the serving PLMN being for the country of the UE.

84. A non-transitory storage medium including program code stored thereon, the program code is operable to configure at least one processor in a satellite Node B (sNB) to support access by a user equipment (UE) via a space vehicle (SV) to a serving Public Land Mobile Network (PLMN), comprising:
program code to control the SV to broadcast system information blocks (SIBs) in each of one or more radio cells of the sNB, wherein the SIBs in each of the one or more radio cells of the sNB include identities of supported PLMNs for the sNB, and wherein the identity of each supported PLMN indicates a country for the each supported PLMN;
program code to receive a request to access a PLMN from the UE via one of the one or more radio cells of the sNB;
program code to obtain a location of the UE;
program code to determine a country of the UE based on the location; and
program code to send an indication of the country of the UE to the UE, wherein the indication of the country of the UE assists the UE to select the serving PLMN from the supported PLMNs based on the serving PLMN being for the country of the UE.

85. A method performed by an Access and Mobility management Function (AMF) for supporting access by a user equipments (UE) via a space vehicle (SV) to a serving Public Land Mobile Network (PLMN), comprising:
receiving a Non-Access Stratum (NAS) Registration Request message from the UE via the SV and a satellite NodeB (sNB), wherein the NAS Registration Request message is received with an indication of a fixed serving cell and a fixed tracking area (TA) for the UE;
determining a plurality of allowed tracking areas (TAs) of the serving PLMN, wherein the UE is allowed to access the serving PLMN in each TA of the plurality of allowed TAs; and
sending a NAS Registration Accept message to the UE via the sNB and the SV, wherein the NAS Registration Accept message includes identities and a geographic definition for the plurality of allowed TAs.

86. The method of clause 85, further comprising including identities and a geographic definition for a plurality of fixed cells of the serving PLMN in the NAS Registration Accept message sent to the UE.

87. The method of clause 86, wherein the plurality of fixed cells of the serving PLMN comprise fixed cells belonging to the plurality of allowed TAs.

88. The method of any of clauses 85-87, wherein the NAS Registration Accept message includes an indication as to whether or not the UE is required to perform a registration with the serving PLMN for a change of TA after detecting the UE is no longer in any of the plurality of allowed TAs.

89. The method of any of clauses 85-88, wherein the indication of the fixed serving cell and the fixed TA for the UE comprises an identity of the fixed serving cell and an identity of the fixed TA.

90. The method of any of clauses 85-88, wherein the indication of the fixed serving cell and the fixed TA for the UE comprises a location of the UE and further comprising one of:
mapping the location to an identity of the fixed serving cell and an identity of the fixed TA; or
sending the location of the UE to a Location Management Function (LMF), wherein the LMF maps the location of the UE to an identity of the fixed serving cell and an identity of the fixed TA, wherein the LMF returns the identity of the fixed serving cell and the identity of the fixed TA to the AMF.

91. An Access and Mobility management Function (AMF) configured to support access by a user equipments (UE) via a space vehicle (SV) to a serving Public Land Mobile Network (PLMN), comprising:
an external interface configured to communicate with network entities;
at least one memory;
at least one processor coupled to the external interface and the at least one memory, wherein the at least one processor is configured to:
receive a Non-Access Stratum (NAS) Registration Request message from the UE via the SV and a satellite NodeB (sNB), wherein the NAS Registration Request message is received with an indication of a fixed serving cell and a fixed tracking area (TA) for the UE;
determine a plurality of allowed tracking areas (TAs) of the serving PLMN, wherein the UE is allowed to access the serving PLMN in each TA of the plurality of allowed TAs; and
send a NAS Registration Accept message to the UE via the sNB and the SV, wherein the NAS Registration Accept message includes identities and a geographic definition for the plurality of allowed TAs.

92. The AMF of clause 91, the at least one processor is further configured to include identities and a geographic definition for a plurality of fixed cells of the serving PLMN in the NAS Registration Accept message sent to the UE.

93. The AMF of clause 92, wherein the plurality of fixed cells of the serving PLMN comprise fixed cells belonging to the plurality of allowed TAs.

94. The AMF of any of clauses 91-93, wherein the NAS Registration Accept message includes an indication as to whether or not the UE is required to perform a registration with the serving PLMN for a change of TA after detecting the UE is no longer in any of the plurality of allowed TAs.

95. The AMF of any of clauses 91-94, wherein the indication of the fixed serving cell and the fixed TA for the UE comprises an identity of the fixed serving cell and an identity of the fixed TA.

96. The AMF of any of clauses 91-94, wherein the indication of the fixed serving cell and the fixed TA for the UE comprises a location of the UE and the at least one processor is further configured to one of:
map the location to an identity of the fixed serving cell and an identity of the fixed TA; or
send the location of the UE to a Location Management Function (LMF), wherein the LMF maps the location of the UE to an identity of the fixed serving cell and an identity of the fixed TA, wherein the LMF returns the identity of the fixed serving cell and the identity of the fixed TA to the AMF.

97. An Access and Mobility management Function (AMF) configured to support access by a user equipments (UE) via a space vehicle (SV) to a serving Public Land Mobile Network (PLMN), comprising:
means for receiving a Non-Access Stratum (NAS) Registration Request message from the UE via the SV and a satellite NodeB (sNB), wherein the NAS Registration Request message is received with an indication of a fixed serving cell and a fixed tracking area (TA) for the UE;
means for determining a plurality of allowed tracking areas (TAs) of the serving PLMN, wherein the UE is allowed to access the serving PLMN in each TA of the plurality of allowed TAs; and
means for sending a NAS Registration Accept message to the UE via the sNB and the SV, wherein the NAS Registration Accept message includes identities and a geographic definition for the plurality of allowed TAs.

98. A non-transitory storage medium including program code stored thereon, the program code is operable to configure at least one processor in an Access and Mobility management Function (AMF) to support access by a user equipments (UE) via a space vehicle (SV) to a serving Public Land Mobile Network (PLMN), comprising:
program code to receive a Non-Access Stratum (NAS) Registration Request message from the UE via the SV and a satellite NodeB (sNB), wherein the NAS Registration Request message is received with an indication of a fixed serving cell and a fixed tracking area (TA) for the UE;
program code to determine a plurality of allowed tracking areas (TAs) of the serving PLMN, wherein the UE is allowed to access the serving PLMN in each TA of the plurality of allowed TAs; and
program code to send a NAS Registration Accept message to the UE via the sNB and the SV, wherein the NAS Registration Accept message includes identities and a geographic definition for the plurality of allowed TAs.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a user equipment (UE) for supporting access by the UE via a space vehicle (SV) to a serving Public Land Mobile Network (PLMN), comprising:
obtaining a country of the UE, wherein the country of the UE is based on a location of the UE;
detecting one or more first radio cells available to the UE, wherein each of the one or more first radio cells comprises one or more radio beams transmitted from one or more first SVs;
receiving identities of supported PLMNs broadcast in the one or more first radio cells, wherein the identity of each supported PLMN indicates a country for the each supported PLMN;
selecting the serving PLMN, wherein the serving PLMN is a PLMN for the country of the UE, and wherein the serving PLMN is included in the supported PLMNs;
selecting a first radio cell of the one or more first radio cells available to the UE, wherein the first radio cell supports the serving PLMN; and
accessing the serving PLMN using the first radio cell.

2. The method of claim 1, wherein the identity of each PLMN of the supported PLMNs broadcast in the one or more first radio cells comprises a mobile country code (MCC) and a mobile network code (MNC), wherein the MCC indicates the country for the each PLMN.

3. The method of claim 1, wherein accessing the serving PLMN comprises exchanging signaling with the serving PLMN via the SV and a first satellite NodeB (sNB), wherein obtaining the country of the UE comprises:
selecting a second radio cell of the one or more first radio cells available to the UE based on the second radio cell supporting a preferred PLMN for the UE;
sending, using the second radio cell, a request to a second sNB to access a PLMN; and
receiving the country of the UE from the second sNB.

4. The method of claim 3, wherein the second sNB determines the location of the UE based on a coverage area of the second radio cell or a coverage area for a radio beam of the second radio cell, wherein the radio beam is used by the UE to send the request to the second sNB.

5. The method of claim 3, further comprising:
obtaining location measurements, wherein the location measurements include measurements of signals received from the one or more first SVs, signals received from navigation SVs, or both types of signals;
determining the location of the UE based on the location measurements; and
sending the location of the UE to the second sNB as part of the request to access the PLMN.

6. The method of claim 5, further comprising:
receiving security information from the second sNB;
ciphering the location of the UE based on the security information; and
sending the ciphered location of the UE to the second sNB as part of the request to access the PLMN.

7. The method of claim 1, wherein obtaining the country of the UE comprises:
obtaining location measurements, wherein the location measurements include measurements of signals received from the one or more first SVs, signals received from navigation SVs, or both types of signals;

determining the location of the UE based on the location measurements;
receiving location related information for the supported PLMNs broadcast in the one or more radio cells; and
determining the country of the UE based on the location related information and the location of the UE.

8. The method of claim 1, wherein accessing the serving PLMN comprises exchanging signaling with the serving PLMN via the SV and a first satellite NodeB (sNB), and sending a Non-Access Stratum (NAS) Registration Request message to a network node for the serving PLMN and receiving a NAS Registration Accept from the network node.

9. The method of claim 8, wherein the NAS Registration Accept message includes identities and location information for a plurality of allowed tracking areas (TAs) of the serving PLMN, wherein the UE is allowed to access the serving PLMN in each TA of the plurality of allowed TAs.

10. The method of claim 9, wherein the NAS Registration Accept message includes identities and a geographic definition for a plurality of fixed cells of the serving PLMN, wherein accessing the serving PLMN comprises:
determining a current location of the UE;
mapping the current location to at least one of an allowed TA of the plurality of allowed TAs, a fixed cell of the plurality of fixed cells, or a combination thereof, based on the geographic definition for the plurality of allowed TAs, the geographic definition for the plurality of fixed cells or a combination thereof; and
including at least one of an indication of the allowed TA, an indication of the fixed cell or a combination thereof in a message sent to the serving PLMN, wherein the at least one of the indication of the allowed TA, the indication of the fixed cell or the combination thereof enable a service for the UE by the serving PLMN.

11. The method of claim 9, further comprising:
detecting one or more second radio cells available to the UE, wherein each of the one or more second radio cells comprises one or more radio beams transmitted from one or more second SVs, wherein each of the one or more second radio cells indicates support for the serving PLMN;
receiving identities of a plurality of supported TAs of the serving PLMN broadcast in the one or more second radio cells;
determining whether the UE is required to perform a registration with the serving PLMN for a change of TA, based at least in part on the plurality of allowed TAs and the plurality of supported TAs;
performing the registration with the serving PLMN for the change of TA using one of the one or more second radio cells when the UE determines the UE is required to perform the registration with the serving PLMN for the change of TA;
camping on the one of the one or more second radio cells without performing the registration with the serving PLMN for the change of TA, when the UE is in an idle state and when the UE determines the UE is not required to perform the registration with the serving PLMN for the change of TA; and
accessing the serving PLMN using the one of the one or more second radio cells without performing the registration with the serving PLMN for the change of TA, when the UE is in a connected state and when the UE determines the UE is not required to perform the registration with the serving PLMN for the change of TA.

12. The method of claim 11, wherein determining that the UE is required to perform the registration with the serving PLMN for the change of TA includes determining that the plurality of supported TAs do not include any TA of the plurality of allowed TAs.

13. The method of claim 11, wherein determining that the UE is not required to perform the registration with the serving PLMN for the change of TA includes determining that the plurality of supported TAs includes at least one of the plurality of allowed TAs, wherein the one of the one or more second radio cells indicates support for the at least one of the plurality of allowed TAs.

14. The method of claim 11, wherein determining whether the UE is required to perform the registration for the change of TA with the serving PLMN further comprises:
determining a current location of the UE;
determining whether the current location of the UE is inside any allowed TA of the plurality of allowed TAs;
determining that the UE is required to perform the registration for the change of TA with the serving PLMN when the current location of the UE is not inside the any allowed TA or when the current location of the UE is inside the any allowed TA and the any allowed TA is not included in the plurality of supported TAs; and
determining that the UE is not required to perform the registration for the change of TA with the serving PLMN when the current location of the UE is inside the any allowed TA and when the any allowed TA is included in the plurality of supported TAs, and wherein the one of the one or more second radio cells indicates support for the any allowed TA.

15. A user equipment (UE) configured to support access by the UE via a space vehicle (SV) to a serving Public Land Mobile Network (PLMN), comprising:
a wireless transceiver configured to wirelessly communicate with a communication satellite;
at least one memory;
at least one processor coupled to the wireless transceiver and the at least one memory, wherein the at least one processor is configured to:
obtain a country of the UE, wherein the country of the UE is based on a location of the UE;
detect one or more first radio cells available to the UE, wherein each of the one or more first radio cells comprises one or more radio beams transmitted from one or more first SVs;
receive identities of supported PLMNs broadcast in the one or more first radio cells, wherein the identity of each supported PLMN indicates a country for the each supported PLMN;
select the serving PLMN, wherein the serving PLMN is a PLMN for the country of the UE, and wherein the serving PLMN is included in the supported PLMNs;
select a first radio cell of the one or more first radio cells available to the UE, wherein the first radio cell supports the serving PLMN; and
access the serving PLMN using the first radio cell.

16. The UE of claim 15, wherein the identity of each PLMN of the supported PLMNs broadcast in the one or more first radio cells comprises a mobile country code (MCC) and a mobile network code (MNC), wherein the MCC indicates the country for the each PLMN.

17. The UE of claim 15, wherein accessing the serving PLMN comprises exchanging signaling with the serving PLMN via the SV and a first satellite NodeB (sNB), wherein the at least one processor is configured to obtain the country of the UE by being configured to:

select a second radio cell of the one or more first radio cells available to the UE based on the second radio cell supporting a preferred PLMN for the UE;

send, using the second radio cell, a request to a second sNB to access a PLMN; and receive the country of the UE from the second sNB.

18. The UE of claim 17, wherein the second sNB determines the location of the UE based on a coverage area of the second radio cell or a coverage area for a radio beam of the second radio cell, wherein the radio beam is used by the UE to send the request to the second sNB.

19. The UE of claim 17, the at least one processor is further configured to:

obtain location measurements, wherein the location measurements include measurements of signals received from the one or more first SVs, signals received from navigation SVs, or both types of signals;

determine the location of the UE based on the location measurements; and send the location of the UE to the second sNB as part of the request to access the PLMN.

20. The UE of claim 19, the at least one processor is further configured to:

receive security information from the second sNB;

cipher the location of the UE based on the security information; and send the ciphered location of the UE to the second sNB as part of the request to access the PLMN.

21. The UE of claim 15, wherein the at least one processor is configured to obtain the country of the UE by being configured to:

obtain location measurements, wherein the location measurements include measurements of signals received from the one or more first SVs, signals received from navigation SVs, or both types of signals;

determine the location of the UE based on the location measurements;

receive location related information for the supported PLMNs broadcast in the one or more radio cells; and determine the country of the UE based on the location related information and the location of the UE.

22. The UE of claim 15, wherein the at least one processor is configured to access the serving PLMN by being configured to exchange signaling with the serving PLMN via the SV and a first satellite NodeB (sNB), and to send a Non-Access Stratum (NAS) Registration Request message to a network node for the serving PLMN and receiving a NAS Registration Accept from the network node.

23. The UE of claim 22, wherein the NAS Registration Accept message includes identities and location information for a plurality of allowed tracking areas (TAs) of the serving PLMN, wherein the UE is allowed to access the serving PLMN in each TA of the plurality of allowed TAs.

24. The UE of claim 22, wherein the NAS Registration Accept message includes identities and a geographic definition for a plurality of fixed cells of the serving PLMN, wherein the at least one processor is configured to access the serving PLMN by being configured to:

determine a current location of the UE;

map the current location to at least one of an allowed TA of the plurality of allowed TAs, a fixed cell of the plurality of fixed cells, or a combination thereof, based on the geographic definition for the plurality of allowed TAs, the geographic definition for the plurality of fixed cells or a combination thereof; and include at least one of an indication of the allowed TA, an indication of the fixed cell or a combination thereof in a message sent to the serving PLMN, wherein the at least one of the indication of the allowed TA, the indication of the fixed cell or the combination thereof enable a service for the UE by the serving PLMN.

25. The UE of claim 23, the at least one processor is further configured to:

detect one or more second radio cells available to the UE, wherein each of the one or more second radio cells comprises one or more radio beams transmitted from one or more second SVs, wherein each of the one or more second radio cells indicates support for the serving PLMN;

receive identities of a plurality of supported TAs of the serving PLMN broadcast in the one or more second radio cells;

determine whether the UE is required to perform a registration with the serving PLMN for a change of TA, based at least in part on the plurality of allowed TAs and the plurality of supported TAs;

perform the registration with the serving PLMN for the change of TA using one of the one or more second radio cells when the UE determines the UE is required to perform the registration with the serving PLMN for the change of TA;

camp on the one of the one or more second radio cells without performing the registration with the serving PLMN for the change of TA, when the UE is in an idle state and when the UE determines the UE is not required to perform the registration with the serving PLMN for the change of TA; and access the serving PLMN using the one of the one or more second radio cells without performing the registration with the serving PLMN for the change of TA, when the UE is in a connected state and when the UE determines the UE is not required to perform the registration with the serving PLMN for the change of TA.

26. The UE of claim 25, wherein the at least one processor is configured to determine that the UE is required to perform the registration with the serving PLMN for the change of TA by being configured to determine that the plurality of supported TAs do not include any TA of the plurality of allowed TAs.

27. The UE of claim 25, wherein the at least one processor is configured to determine that the UE is not required to perform the registration with the serving PLMN for the change of TA by being configured to determine that the plurality of supported TAs includes at least one of the plurality of allowed TAs, wherein the one of the one or more second radio cells indicates support for the at least one of the plurality of allowed TAs.

28. The UE of claim 25, wherein the at least one processor is configured to determine whether the UE is required to perform the registration for the change of TA with the serving PLMN by being configured to:

determine a current location of the UE;

determine whether the current location of the UE is inside any allowed TA of the plurality of allowed TAs;

determine that the UE is required to perform the registration for the change of TA with the serving PLMN when the current location of the UE is not inside the any allowed TA or when the current location of the UE is inside the any allowed TA and the any allowed TA is not included in the plurality of supported TAs; and determine that the UE is not required to perform the registration for the change of TA with the serving PLMN when the current location of the UE is inside the any allowed TA and when the any allowed TA is included in the plurality of supported TAs, and wherein the one of the one or more second radio cells indicates support for the any allowed TA.

29. A user equipment (UE) configured to support access by the UE via a space vehicle (SV) to a serving Public Land Mobile Network (PLMN), comprising:
   means for obtaining a country of the UE, wherein the country of the UE is based on a location of the UE;
   means for detecting one or more first radio cells available to the UE, wherein each of the one or more first radio cells comprises one or more radio beams transmitted from one or more first SVs;
   means for receiving identities of supported PLMNs broadcast in the one or more first radio cells, wherein the identity of each supported PLMN indicates a country for the each supported PLMN;
   means for selecting the serving PLMN, wherein the serving PLMN is a PLMN for the country of the UE, and wherein the serving PLMN is included in the supported PLMNs;
   means for selecting a first radio cell of the one or more first radio cells available to the UE, wherein the first radio cell supports the serving PLMN; and
   means for accessing the serving PLMN using the first radio cell.

30. A non-transitory storage medium including program code stored thereon, the program code is operable to configure at least one processor in a user equipment (UE) to support access by the UE via a space vehicle (SV) to a serving Public Land Mobile Network (PLMN), comprising:
   program code to obtain a country of the UE, wherein the country of the UE is based on a location of the UE;
   program code to detect one or more first radio cells available to the UE, wherein each of the one or more first radio cells comprises one or more radio beams transmitted from one or more first SVs;
   program code to receive identities of supported PLMNs broadcast in the one or more first radio cells, wherein the identity of each supported PLMN indicates a country for the each supported PLMN;
   program code to select the serving PLMN, wherein the serving PLMN is a PLMN for the country of the UE, and wherein the serving PLMN is included in the supported PLMNs;
   program code to select a first radio cell of the one or more first radio cells available to the UE, wherein the first radio cell supports the serving PLMN; and
   program code to access the serving PLMN using the first radio cell.

* * * * *